United States Patent
Fudemoto et al.

(10) Patent No.: US 9,387,725 B2
(45) Date of Patent: Jul. 12, 2016

(54) TIRE, AND MANUFACTURING METHOD FOR SAME

(75) Inventors: Hiroyuki Fudemoto, Yokohama (JP); Takashi Harada, Yokohama (JP); Yoshihide Kouno, Kodaira (JP); Seiji Kon, Kodaira (JP); Keiichi Hasegawa, Kodaira (JP); Munenori Iizuka, Kodaira (JP); Takayuki Yako, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 307 days.

(21) Appl. No.: 13/818,348

(22) PCT Filed: Aug. 25, 2011

(86) PCT No.: PCT/JP2011/069224
§ 371 (c)(1),
(2), (4) Date: Apr. 29, 2013

(87) PCT Pub. No.: WO2012/026548
PCT Pub. Date: Mar. 1, 2012

(65) Prior Publication Data
US 2013/0206311 A1 Aug. 15, 2013

(30) Foreign Application Priority Data

Aug. 25, 2010 (JP) .................. 2010-188905
Aug. 25, 2010 (JP) .................. 2010-188906
Aug. 25, 2010 (JP) .................. 2010-188907
Aug. 25, 2010 (JP) .................. 2010-188908
Aug. 25, 2010 (JP) .................. 2010-188909
Aug. 25, 2010 (JP) .................. 2010-188917
Sep. 10, 2010 (JP) .................. 2010-203737
Aug. 25, 2011 (JP) .................. 2011-183582
Aug. 25, 2011 (JP) .................. 2011-183583

(51) Int. Cl.
*B60C 1/00* (2006.01)
*B60C 9/18* (2006.01)
(Continued)

(52) U.S. Cl.
CPC .............. *B60C 1/0041* (2013.04); *B29D 30/08* (2013.01); *B60C 1/00* (2013.01); *B60C 5/007* (2013.01);
(Continued)

(58) Field of Classification Search
CPC ............ B60C 1/0041; B60C 9/18; B60C 9/20
See application file for complete search history.

(56) References Cited

U.S. PATENT DOCUMENTS 3,608,605 A * 9/1971 Cole .............................. 152/533
3,888,291 A * 6/1975 Herzlich et al. ............. 152/209.5
(Continued)

FOREIGN PATENT DOCUMENTS

CN 102548774 A 7/2012
EP 2676809 A1 12/2013
(Continued)

OTHER PUBLICATIONS

Communication from the Japanese Patent Office dated Oct. 14, 2014 in corresponding Japanese Application No. 2010-188906.
(Continued)

*Primary Examiner* — Justin Fischer
(74) *Attorney, Agent, or Firm* — Sughrue Mion, PLLC

(57) ABSTRACT

Provided is a tire having a circular tire frame formed of at least a thermoplastic resin material, in which the tire includes a reinforcing cord member that forms a reinforcing cord layer on an outer circumference of the tire frame, and the thermoplastic resin material contains at least a polyester-based thermoplastic elastomer.

7 Claims, 9 Drawing Sheets

(51) Int. Cl.
  *B60C 9/22* (2006.01)
  *B60C 5/00* (2006.01)
  *B60C 5/01* (2006.01)
  *B29D 30/08* (2006.01)

(52) U.S. Cl.
  CPC ... *B60C 5/01* (2013.01); *B60C 9/22* (2013.01); *Y10T 152/1081* (2015.01); *Y10T 152/10765* (2015.01)

(56) References Cited

U.S. PATENT DOCUMENTS

| | | | |
|---|---|---|---|
| 3,956,546 A * | 5/1976 | Neville et al. | 428/43 |
| 3,977,453 A * | 8/1976 | Coran et al. | 152/323 |
| 2006/0094829 A1 | 5/2006 | Chino et al. | |
| 2010/0263777 A1 | 10/2010 | Sakai et al. | |

FOREIGN PATENT DOCUMENTS

| | | | |
|---|---|---|---|
| JP | 54-162307 A | 12/1979 | |
| JP | 1278803 A | 11/1989 | |
| JP | 2267004 A | 10/1990 | |
| JP | H02-305850 A | 12/1990 | |
| JP | H03-148302 A | 6/1991 | |
| JP | H03143702 A | 6/1991 | |
| JP | H05-116504 A | 5/1993 | |
| JP | H06-016008 A | 1/1994 | |
| JP | H08-003427 A | 1/1996 | |
| JP | 11321233 A | 11/1999 | |
| JP | 2000-119448 A | 4/2000 | |
| JP | 2000198312 A | 7/2000 | |
| JP | 2001-9062 A | 1/2001 | |
| JP | 03-143701 A | 3/2001 | |
| JP | 2003-104005 A | 4/2003 | |
| JP | 2003-104008 A | 4/2003 | |
| JP | 2006-131663 A | 5/2006 | |
| JP | 2006-289818 A | 10/2006 | |
| JP | 2007-069745 A | 3/2007 | |
| JP | 2007-70447 A | 3/2007 | |
| JP | 2008-260887 A | 10/2008 | |
| JP | 2009-286183 A | 12/2009 | |
| JP | 2010-59248 A | 3/2010 | |
| JP | 2010053495 A | 3/2010 | |
| WO | 2009-084660 A1 | 7/2009 | |
| WO | 2009/093695 A1 | 7/2009 | |

OTHER PUBLICATIONS

Notice of Reasons for Rejection issued Apr. 22, 2014 in corresponding Japanese Patent Application No. 2010-188906 with English translation.
Notice of Reasons for Rejection issued May 20, 2014 in corresponding Japanese Patent Application No. 2010-188908 with English translation.
Notice of Reasons for Rejection issued May 13, 2014 in corresponding Japanese Patent Application No. 2010-188905 with English translation.
Notice of Reasons for Rejection issued May 20, 2014 in corresponding Japanese Patent Application No. 2010-188909 with English translation.
Notice of Reasons for Rejection issued Dec. 9, 2014 in Japanese Patent Application No. 2010-203737 with translation.
Notice of Reasons for Rejection issued Jan. 6, 2015 in Japanese Patent Application No. 2010-188909 with translation.
First Notice of Reasons for Rejection issued Jan. 13, 2015 in Chinese Patent Application No. 201180051344.X with partial translation.
Extended European Search Report issued Apr. 2, 2015 in European Patent Application No. 14185862.1.
Notice of Reasons for Rejection issued on May 12, 2015 in Japanese Patent Application No. 2011-183583 with English translation.
Communication dated Aug. 25, 2015 from the Japanese Patent Office in counterpart application No. 2010-188909.
Communication dated Aug. 25, 2015 from the Japanese Patent Office in counterpart application No. 2010-188908.

* cited by examiner (A)

TIRE, AND MANUFACTURING METHOD FOR SAME

TECHNICAL FIELD

The present invention relates to a tire that is to be mounted on a rim, and particularly, to a tire in which at least a portion thereof is formed of a thermoplastic material, and to a method for producing the same.

BACKGROUND ART

Generally, in the vehicles such as passenger cars, pneumatic tires formed from rubber, organic fiber materials, steel members and the like have been used hitherto.

In recent years, from the viewpoints of weight reduction, ease of molding, and ease in recycling, investigations have been conducted on the use of resin materials, particularly thermoplastic resins, thermoplastic elastomers and the like as the tire materials.

For example, Japanese Patent Application Laid-Open (JP-A) No. 2003-104008 and JP-A No. 03-143701 disclose pneumatic tires molded using thermoplastic polymer materials.

Furthermore, in JP-A No. 03-143701, a reinforcing layer in which a reinforcing cord is helically wound in succession along a circumferential direction of the tire, is provided on the outer surface in the tire radial direction at the tread bottom of the tire main body (tire frame), whereby the resistance to cutting and the resistance to puncture of the tire main body are improved.

SUMMARY OF INVENTION

Technical Problem

Tires using thermoplastic polymer materials can be easily produced at lower cost as compared with conventional tires formed from rubber. However, when a tire frame is formed from a uniform thermoplastic material and is not equipped with a reinforcing member such as a carcass ply, there is room for improvement from the viewpoints of stress resistance, internal pressure resistance, and the like, as compared with conventional tires formed from rubber (see, for example, JP-A No. 2003-104008).

In JP-A No. 03-143701, the resistance to cutting and the resistance to puncture of the tire main body are improved by providing a reinforcing layer in which a reinforcing cord is helically wound in succession along a circumferential direction of the tire, on the outer surface in the tire radial direction at the tread bottom of the tire main body (tire frame). However, when a reinforcing layer in which a reinforcing cord is directly wound in a helical shape is formed on a tire frame formed of a thermoplastic polymer material, and the tread is formed at the outer side in the radial direction of the reinforcing layer, even if an adhesive is used for the reinforcing cord, it cannot be said that sufficient adhesion property is obtained, and air may remain in the vicinity of the reinforcing cord. As such, if air remains in the vicinity of the reinforcing cord, the reinforcing cord may move about at the time of driving, causing separation between the members. Therefore, there is room for improvement from the viewpoint of durability of the tire. Furthermore, since the circumference of the reinforcing cord is covered with a cushion rubber, separation of the reinforcing cord and the like may occur due to the difference in the hardness of the materials of the tire main body and the circumferential section of reinforcing cord.

Furthermore, in the case of producing a tire by using a thermoplastic polymer material, it is required that the production efficiency be increased to realize low cost production, while a performance that compares favorably with conventional tires made of rubber is realized. For example, when a thermoplastic resin material is used as the material of a tire frame, the tire frame may be formed by injecting a polymer material into a mold by injection molding of JP-A No. 03-143701, from the viewpoint of production efficiency or the like. For this reason, it is desirable to select, as the thermoplastic polymer material, a material which exhibits excellent durability when produced into a tire and excellent handleability at the time of molding (manufacturability).

Furthermore, in the case of producing a tire by using a thermoplastic polymer material, for example, it is also required that the tire have a strong impact resistance, and that the tire molded using a thermoplastic polymer material have an impact resistance equivalent to or higher than that of the conventional tires using rubber.

Moreover, it is also desirable that the thermoplastic resin material used for the production of tires have heat resistance, and that the change in properties of the thermoplastic resin material caused by a change in temperature be small.

Also, in the case of producing a tire using a thermoplastic polymer material, one characteristic required for the tire is, for example, to have an elastic modulus in a certain range, and having a low mechanical loss factor (rolling coefficient: Tan δ) as well as an excellent heat resistance. However, for polymer materials, lowering of Tan δ and increasing of elastic modulus are usually in an antinomic relation. Accordingly, there is a demand for the development of a tire which is capable of achieving a balance between these characteristics at high levels.

Furthermore, when the tire frame in a tire using a thermoplastic polymer material is formed from a uniform thermoplastic polymer material which is not equipped with a reinforcing member such as a carcass ply, there is room for improvement from the viewpoints of stress resistance, internal pressure resistance and the like, as compared with conventional tires made of rubber.

The present invention is achieved under various circumstances as described above.

According to a first aspect of the present invention, it is an object of the invention to provide a tire which is formed using a thermoplastic polymer material and has an excellent durability and an excellent manufacturability.

According to a second aspect of the present invention, it is another object of the invention to provide a tire which is formed from a thermoplastic resin material and has an excellent impact resistance.

According to a third aspect of the present invention, it is another object of the invention to provide a tire which is formed using a thermoplastic resin material, enables the prevention of air residual in the circumferential section of the reinforcing cord member, and has an excellent impact resistance.

According to a fourth aspect of the present invention, it is another object of the invention to provide a tire which is formed using a thermoplastic resin material and has an excellent durability, in which an increase in the rolling resistance is suppressed even if the elastic modulus increases.

According to a fifth aspect of the present invention, it is another object of the invention to provide a tire which is formed using a thermoplastic polymer material and has an excellent durability and an excellent manufacturability from a viewpoint different from the first aspect described above, and to provide a method for producing the tire.

According to a sixth aspect of the present invention, it is another object of the invention to provide a tire which is formed using a thermoplastic resin material and has an excellent impact resistance from a viewpoint different from the second aspect described above, and to provide a method for producing a tire which achieves an excellent productivity.

According to a seventh aspect of the present invention, it is an object of the invention to provide a tire which is formed using a thermoplastic polymer material, exhibits a high elasticity and a low loss coefficient, and also has an excellent heat resistance.

Solution to Problem

The means for addressing the problem according to the first aspect is as follows:

(1-1) The tire according to the first aspect of the present invention is a tire which has a circular tire frame that is formed of a thermoplastic resin material, in which the tire includes a reinforcing cord member that forms a reinforcing cord layer on an outer circumference of the tire frame, and the thermoplastic resin material includes at least a polyester-based thermoplastic elastomer.

The reinforcing cord layer may be wound around an outer circumference of the tire frame in a circumferential direction, or may be wound around an outer circumference in a crossing manner.

The tire according to the first aspect of the present invention has a circular tire frame formed of a thermoplastic resin material including a polyester-based thermoplastic elastomer.

When the thermoplastic resin material that forms the tire frame includes a polyester-based thermoplastic elastomer, there may be various advantages as described below.

A polyester-based thermoplastic elastomer has an advantage in that it exhibits heat resistance, impact resistance and oil resistance, and also is excellent in tensile elastic modulus, tensile strength and fracture strain. Therefore, when the polyester-based thermoplastic elastomer is formed into a tire frame, the abrasion resistance, durability, impact resistance, oil resistance and heat resistance of the tire can be enhanced.

Polyester-based thermoplastic elastomers have an advantage in that the fluctuation in elastic modulus caused by a temperature change is smaller as compared with other thermoplastic elastomers. Therefore, a tire configured by including a polyester-based thermoplastic elastomer exhibits less deformation or a small change in hardness which is caused by temperature fluctuation in the use environment, and the tire is strong against impact and exerts less influence on the ride quality of the car equipped with the tire.

Since a polyester-based thermoplastic elastomer exhibits a high deflection temperature under load, vulcanization may be carried out at a high temperature in the case of performing vulcanization in the production of a tire, whereby the tire frame, a cushion rubber and the like may be firmly adhered.

Polyester-based thermoplastic elastomers have an advantage in that is has a high resistance to flexural fatigue. Therefore, in a tire configured by including a polyester-based thermoplastic elastomer, the generation or growth of fatigue cracks is suppressed against repeatedly applied flection, and the tire thus exhibits a high durability. Particularly, in the case of the tire of the present invention having a structure in which a reinforcing cord layer is formed by a reinforcing cord member on an outer circumference of the tire frame, since flection occurs at the site of a reinforcing cord member as a starting point, the above-described advantage of the tire frame containing a polyester-based thermoplastic elastomer is significantly exhibited.

Polyester-based thermoplastic elastomers have excellent heat fusibility with other resins (for example, polyester resins, polycarbonate resins, ABS resins, and polybutylene terephthalate resins). Therefore, when the reinforcing cord layer contains a resin material as will be explained below, there is a wide range of selection of the resin material, and a tire equipped with a tire frame having an excellent adhesion property to the reinforcing cord layer may be realized.

Furthermore, when a thermoplastic resin material including a polyester-based thermoplastic elastomer is used in the tire frame, the structure of the tire may be simplified as compared with the conventional tires made of rubber, leading to the weight reduction of the tire.

In an embodiment of the tire according to the first aspect of the present invention, a reinforcing cord member is wound around an outer circumference of a tire frame formed of a thermoplastic resin material including a polyester-based thermoplastic elastomer, thereby forming a reinforcing cord layer. When a reinforcing cord layer is formed on an outer circumference of the tire frame, the resistance to puncture and resistance to cutting of the tire, and the rigidity in a circumferential direction of the tire (tire frame) are enhanced. In addition, as the rigidity in a circumferential direction increases, creeping (a phenomenon in which plastic deformation of the tire frame increases with time under a constant stress) in the tire frame formed of a thermoplastic material is suppressed.

The polyester-based thermoplastic elastomer contained in the thermoplastic resin material has adhesion property to the reinforcing cord member. Therefore, for example, a phenomenon in which air remains in the vicinity of the reinforcing cord member (incorporation of air) during the process of winding the reinforcing cord member may be suppressed. When the elastomer has adhesion property to the reinforcing cord, and incorporation of air in the surroundings of the reinforcing cord member is suppressed, the moving of the reinforcing cord member caused by the force applied thereto or the like at the time of driving can be effectively prevented. As a result, since the movement of the reinforcing cord member is suppressed, for example, even in the case in which a tire-constituting member is arranged on an outer circumference of the tire frame in such a manner that the entirety of the reinforcing cord member is covered, the occurrence of separation between the members (including the tire frame) and the like is suppressed, and durability of the tire is enhanced.

(1-2) The tire according to the first aspect of the present invention may be configured such that the reinforcing cord layer includes a resin material. As such, since the difference in hardness between the tire and the reinforcing cord layer may be made smaller when a resin material is contained in the reinforcing cord layer, as compared with the case in which the reinforcing cord member is fixed using a cushion rubber, the reinforcing cord member may be tightly adhered and fixed to the tire frame. As a result, the incorporation of air described above can be effectively prevented in the process of winding a reinforcing cord member at the time of producing a tire, and the movement of the reinforcing cord member during driving can be effectively suppressed.

Furthermore, in a case in which the reinforcing cord member is a steel cord in particular, when an attempt is made to separate the reinforcing cord member from the cushion rubber at the time of tire disposal, it is difficult for a vulcanized rubber to be separated from the reinforcing cord member only by heating, while a resin material can be separated from the reinforcing cord member only by heating. Accordingly, it is advantageous in view of the recyclability of the tire. Furthermore, resin materials usually have lower loss factors (Tan δ) as compared with vulcanized rubbers, whereby the rolling property of the tire can be improved. Moreover, a resin material having a relatively higher elastic modulus as compared with vulcanized rubbers, has an advantage in that the resin material exhibits a high in-plane shear rigidity, leading to excellent steering stability at the time of tire driving and excellent abrasion resistance.

With regard to the tire according to the first aspect of the present invention, the term "resin material" is a concept which includes thermoplastic resins (including thermoplastic elastomers) and thermosetting resins, and does not include a vulcanized rubber.

In the tire according to the first aspect of the present invention, when the reinforcing cord layer contains a resin material, it is preferable that the reinforcing cord member have its surface covered with the resin material in an area of 20% or larger, and more preferably covered in an area of 50% or larger, from the viewpoint of increasing the pull-out property (difficulty to be pulled out) of the reinforcing cord.

From the viewpoint of increasing the pull-out property of the reinforcing cord, the content of the resin material in the reinforcing cord layer is preferably 20% by mass or larger, and more preferably 50% by mass or larger, with respect to the total amount of the materials that constitute the reinforcing cord layer except for the reinforcing cord.

In order to construct the tire according to the first aspect of the present invention such that the reinforcing cord layer includes a resin material, for example, the tire may be formed in such a manner that at least a portion of the reinforcing cord member is embedded in an outer circumference of the tire frame formed of a thermoplastic resin material as viewed from a cross-section along the axial direction of the tire frame. In this case, the thermoplastic resin material containing a polyester-based thermoplastic elastomer which is used in the outer circumference of the tire frame in which the reinforcing cord member is embedded, corresponds to the resin material as a component of the reinforcing cord layer, and the reinforcing cord layer is constituted from the polyester-based thermoplastic elastomer (thermoplastic resin material) that forms the tire frame and the reinforcing cord member. Also, a reinforcing cord layer including a resin material may be formed by coating a reinforcing cord with a resin material which is the same kind as or different from the resin material that forms the tire frame, and applying the coated cord member by winding in a circumferential direction of the tire frame. The resin material of the same kind refers to a combination of ester-based resin materials, a combination of styrene-based resin materials, or the like.

(1-3) The tire according to the first aspect of the present invention may be configured such that the melting temperature of the thermoplastic resin material including a polyester-based thermoplastic elastomer is from 100° C. to 260° C. As such, when the melting temperature of the thermoplastic resin material including a polyester-based thermoplastic elastomer is adjusted to 100° C. to 260° C., a good balance can be achieved between durability as a tire performance, and manufacturability from the viewpoint of production cost reduction.

(1-4) The tire according to the first aspect of the present invention may be configured such that the content ratio of the polyester-based thermoplastic elastomer in the thermoplastic resin material is from 50% to 100% by mass. When the content ratio of the polyester-based thermoplastic elastomer in the thermoplastic resin material is from 50% to 100% by mass, the performance of the polyester-based thermoplastic elastomer can be sufficiently exhibited, and a good balance can be achieved between durability as a tire performance, and manufacturability from the viewpoint of handleability or production cost reduction.

The tire according to the first aspect of the present invention may be produced according to a production method which includes: a tire frame piece forming step of forming a tire frame piece for constituting a portion of a circular tire frame using a thermoplastic resin material containing at least a polyester-based thermoplastic elastomer; a tire frame piece bonding step of forming a tire frame by fusing two or more of the tire frame pieces, which make a pair, applying heat to bonding surfaces of the tire frame pieces; and a reinforcing cord member winding step of forming a reinforcing cord layer by winding a reinforcing cord member around an outer circumference of the tire frame in a circumferential direction thereof.

In the tire according to the first aspect of the present invention, a tire frame piece of a circular tire frame is formed using a thermoplastic resin material including a polyester-based thermoplastic elastomer. The tire frame piece using a polyester-based thermoplastic elastomer enables improvement in durability at the time of driving, such as puncture resistance or abrasion resistance, of the tire thus produced, since the adhesive strength between the tire frame pieces is sufficient when the tire frame pieces are fused to form a tire frame, and the performance of the frame itself is not deteriorated by the temperature at the time of the fusing.

The means for addressing the problem according to the second aspect is as follows:

(2-1) The tire of the present invention is a tire having at least a circular tire frame formed of a thermoplastic resin material, in which the tire includes a reinforcing cord member that forms a reinforcing cord layer on an outer circumference of the tire frame, and the thermoplastic resin material includes at least a polyester-based thermoplastic elastomer and an elastomer other than the polyester-based thermoplastic elastomer.

The reinforcing cord layer may be wound around an outer circumference of the tire frame in a circumferential direction thereof, or may be wound around an outer circumference in a crossing manner.

The tire according to the second aspect of the present invention includes a circular tire frame formed of a thermoplastic resin material containing a polyester-based thermoplastic elastomer and another elastomer.

In the tire according to the second aspect of the present invention, the polyester-based thermoplastic elastomer contained in the thermoplastic resin material has an advantage in that it exhibits heat resistance, impact resistance and oil resistance, and also is excellent in tensile elastic modulus, tensile strength and fracture strain.

Furthermore, polyester-based thermoplastic elastomers have an advantage in that the fluctuation in elastic modulus caused by a temperature change is smaller as compared with other thermoplastic elastomers. Therefore, a tire configured by including a polyester-based thermoplastic elastomer exhibits less deformation or change in hardness that is caused by temperature fluctuation in the use environment, and the tire is strong against impact and exerts less influence on the ride quality of the car equipped with the tire.

Since a polyester-based thermoplastic elastomer exhibits a high deflection temperature under load, in the case of performing vulcanization in the production of a tire, vulcanization can be carried out at a high temperature, and the tire frame can be firmly adhered to a cushion rubber or the like.

Furthermore, polyester-based thermoplastic elastomers have an advantage in that it has a high resistance to flexural fatigue. Therefore, the tire according to the second aspect of the present invention which is configured by including a polyester-based thermoplastic elastomer exhibits a high durability, while the generation or growth of fatigue cracks against repeatedly applied flection is suppressed. Particularly, in the tire of the present invention having a structure in which a reinforcing cord layer is formed of a reinforcing cord member on an outer circumference of the tire frame, since flection occurs at the site of a reinforcing cord member as a starting point, the above-described advantage of the tire frame containing a polyester-based thermoplastic elastomer is significantly exhibited.

On the other hand, from the viewpoint of further enhancing impact resistance of the tire, when it is intended to use a polyester-based thermoplastic elastomer alone and to thereby adjust the elastic modulus, it is necessary to control the ratio of hard segments and soft segments, and the adjustment of this ratio needs to involve a complicated process. In contrast, in the tire according to the second aspect of the present invention, when a polyester-based thermoplastic elastomer and another elastomer are used in combination, the elastic modulus of the thermoplastic resin composition can be easily adjusted by adjusting the content ratio of the two components, as compared with the case of using a polyester-based thermoplastic elastomer alone. Therefore, since the elastic modulus of the thermoplastic resin material can be easily set to a desired range while maintaining the above-described characteristics derived from the polyester-based thermoplastic elastomer, impact resistance of the tire can be easily enhanced, and also it is also excellent in terms of production cost.

Furthermore, when a thermoplastic resin material containing a polyester-based thermoplastic elastomer is used in the tire frame, the structure of the tire can be simplified as compared with conventional tires made of rubber, so that weight reduction of the tire can be realized, and the fuel efficiency of a car equipped with the tire can be made high.

In an embodiment of the tire according to the second aspect of the present invention, a reinforcing cord member is wound around an outer circumference of a tire frame formed of a thermoplastic resin material including a polyester-based thermoplastic elastomer and another elastomer, whereby a reinforcing cord layer is formed. When a reinforcing cord layer is formed on an outer circumference of the tire frame, the resistance to puncture and resistance to cutting of the tire, and the rigidity in a circumferential direction of the tire (tire frame) are enhanced. In addition, as the rigidity in a circumferential direction increases, creeping (a phenomenon in which plastic deformation of the tire frame increases with time under a constant stress) in the tire frame formed of a thermoplastic material is suppressed.

The thermoplastic resin material according to the second aspect of the present invention has a high adhesion property to the reinforcing cord member, and also has an excellent fixing performance such as welding strength. Therefore, when the thermoplastic resin material is used, for example, the phenomenon in which air remains in the vicinity of the reinforcing cord members (incorporation of air) during the process of winding the reinforcing cord member may be suppressed. When the elastomer has a high adhesion property and a high weldability to the reinforcing cord, and incorporation of air in the surroundings of the reinforcing cord member is suppressed, the moving of the reinforcing cord member caused by the force applied thereto or the like at the time of driving can be effectively prevented. As a result, since the movement of the reinforcing cord member is suppressed, for example, even in the case in which a tire-constituting member is arranged on an outer circumference of the tire frame in such a manner that the entirety of the reinforcing cord member is covered, the occurrence of separation between these members (including the tire frame) and the like is suppressed, and durability of the tire is enhanced.

(2-2) The tire according to the second aspect of the present invention may be configured such that the reinforcing cord layer includes a resin material. As such, since the difference in hardness between the tire and the reinforcing cord layer may be made smaller when a resin material is contained in the reinforcing cord layer, as compared with the case in which the reinforcing cord member is fixed using with a cushion rubber, the reinforcing cord members may be tightly adhered and fixed to the tire frame. As a result, the incorporation of air described above can be effectively prevented, and the movement of the reinforcing cord member during driving can be effectively suppressed.

Furthermore, in the tire according to the second aspect of the present invention, in a case in which the reinforcing cord is a steel cord in particular, when an attempt is made to separate the reinforcing cord from the cushion rubber at the time of tire disposal, it is difficult for a vulcanized rubber to be separated from the reinforcing cords only by heating, while a resin material can be separated from the reinforcing cord only by heating. Accordingly, it is advantageous in view of the recyclability of the tire. Furthermore, resin materials usually have lower loss factors (Tan δ) as compared with vulcanized rubbers, whereby the rolling property of the tire can be improved. Moreover, a resin material having a relatively higher elastic modulus as compared with vulcanized rubbers, has an advantage in that the resin material exhibits a high in-plane shear rigidity, leading to excellent steering stability at the time of tire driving and excellent abrasion resistance.

With regard to the tire according to the second aspect of the present invention, the term "resin material" is a concept which includes thermoplastic resins (including thermoplastic elastomers) and thermosetting resins, and does not include a vulcanized rubber.

In the tire according to the second aspect of the present invention, when the reinforcing cord layer contains a resin material, it is preferable that the reinforcing cord member have its surface covered with the resin material in an area of 20% or larger, and more preferably covered in an area of 50% or larger, from the viewpoint of increasing the pull-out property (difficulty to be pulled out) of the reinforcing cord. From the viewpoint of increasing the pull-out property of the reinforcing cord, the content of the resin material in the reinforcing cord layer is preferably 20% by mass or larger, and more preferably 50% by mass or larger, with respect to the total amount of the materials that constitute the reinforcing cord layer except for the reinforcing cord.

In order to construct the tire according to the second aspect of the present invention such that the reinforcing cord layer includes a resin material, for example, the tire may be formed in such a manner that at least a portion of the reinforcing cord member is embedded in an outer circumference of the tire frame formed of a thermoplastic resin material as viewed from a cross-section of the tire frame dissected along the axial direction. In this case, the thermoplastic resin material which includes a polyester-based thermoplastic elastomer and another elastomer and which is used in an outer circumference of the tire frame in which the reinforcing cord member is embedded, corresponds to the resin material as a component of the reinforcing cord layer, the reinforcing cord layer is constituted from the thermoplastic resin material that forms the tire frame, and the reinforcing cord member. Also, a reinforcing cord layer including a resin material may be formed by coating a reinforcing cord with a resin material which is the same as or different from the resin material that forms the tire frame, and applying the coated cord member by winding in a circumferential direction of the tire frame. The resin material of the same kind refers to a combination of ester-based resin materials, a combination of styrene-based resin materials, or the like.

(2-3) The tire according to the second aspect of the present invention may be configured such that the mass ratio (a:b) between the polyester-based thermoplastic elastomer (a) and the other elastomer (b) in the thermoplastic resin is from 95:5 to 50:50. As such, when the mass ratio (a:b) of the polyester-based thermoplastic elastomer (a) and the other elastomer (b) is adjusted to from 95:5 to 50:50, a balance between weldability of the reinforcing cord members and the tire frame, and impact resistance of the tire can be easily promoted.

(2-4) The tire according to the second aspect of the present invention may be configured such that the other elastomer is any one selected from a polyurethane-based thermoplastic elastomer, a polyolefin-based thermoplastic elastomer, or a polystyrene-based thermoplastic elastomer. When the other elastomer in the thermoplastic resin material is any one selected from a polyurethane-based thermoplastic elastomer, a polyolefin-based thermoplastic elastomer or a polystyrene-based thermoplastic elastomer, the other elastomer can sufficiently exhibit the performance of the polyester-based thermoplastic elastomer, and also, the range of selection in the adjustment of the elastic modulus of the thermoplastic resin material can be further extended. Thus, a tire having a superior impact resistance may be obtained.

The tire according to the second aspect of the present invention may be produced according to a production method which includes: a tire frame piece forming step of forming a tire frame piece for constituting a portion of a circular tire frame using a thermoplastic resin material containing at least a polyester-based thermoplastic elastomer and another elastomer; a tire frame piece bonding step of forming a tire frame by fusing two or more of the tire frame pieces, which make a pair, by applying heat to the bonding surfaces of the tire frame pieces; and a reinforcing cord member winding step of forming a reinforcing cord layer by winding a reinforcing cord member around an outer circumference of the tire frame in a circumferential direction thereof.

In the production method, a tire frame piece of a circular tire frame is formed by using a thermoplastic resin material including a polyester-based thermoplastic elastomer and another elastomer. The tire frame piece using a thermoplastic resin material in the tire according to the second aspect of the present invention enables improvement in durability at the time of driving, such as puncture resistance or abrasion resistance, of the tire thus produced, since the adhesive strength between the tire frame pieces is sufficient when the tire frame pieces are fused to form a tire frame, and the performance of the frame itself is not deteriorated by the temperature at the time of fusion.

The means to address the problem according to the third aspect is as follows.

(3-1) The tire of the present invention related to the third aspect is a tire having at least a circular tire frame formed of a thermoplastic resin material, in which the tire includes a reinforcing cord member that forms a reinforcing cord layer on an outer circumference of the tire frame, and the thermoplastic resin material containing at least a polyester-based thermoplastic elastomer and a rubber.

The reinforcing cord layer may be wound around the outer circumference of the tire frame in the circumferential direction, or may be wound around the outer circumference in a crossing manner.

The tire of the present invention related to the third aspect has a circular tire frame formed of a thermoplastic resin material including a polyester-based thermoplastic elastomer and a rubber.

The thermoplastic resin material that forms the tire frame related to the present invention according to the third aspect has flexibility and has excellent impact resistance. Furthermore, since the thermoplastic resin material contains a polyester-based thermoplastic elastomer, the tire frame exhibits less deformation or change in hardness that is caused by temperature fluctuation in the use environment, and the thermoplastic resin material has excellent tensile characteristics such as tensile elastic modulus and tensile strength. Accordingly, when the thermoplastic resin material is formed into a tire frame, the tire exhibits excellent durability and manufacturability. Furthermore, since the structure can be simplified, there is an advantage that weight reduction can be promoted.

On the other hand, in the case of using the polyester-based thermoplastic elastomer alone, when it is intended to adjust elastic modulus, it is necessary to control a ratio of hard segments and soft segments. On the contrary, when a polyester-based thermoplastic elastomer and a rubber are used in combination, an elastic modulus of the thermoplastic resin material can be easily adjusted by adjusting a content ratio of the two components, as compared with a case of using a polyester-based thermoplastic elastomer alone.

However, since rolling resistance of a tire is produced by a vibration at a frequency of approximately from 10 Hz to 100 Hz at near 50° C., when the measurement of viscoelasticity of the tire is carried out, the magnitude of rolling resistance can be expressed by Tan δ at from 30° C. to 50° C. When Tan δ at from 30° C. to 50° C. is small, the rolling resistance of the tire also tends to become small.

Here, if a polyester-based thermoplastic elastomer is used alone, when dynamic viscoelasticity is measured, a peak of Tan δ originating from the polyester-based thermoplastic elastomer is observed. As the elastic modulus of the polyester-based thermoplastic elastomer increases, the peak value tends to be shifted to the higher temperature side. For example, when the dynamic viscoelasticity of HYTREL 6347 manufactured by DuPont-Toray Co., Ltd. is measured, a peak exists at near 15° C.

On the other hand, when dynamic viscoelasticity of a rubber is measured, generally a peak is observed at −10° C. or below. Accordingly, as a polyester-based thermoplastic elastomer and a rubber are mixed, the height of the peak originating from the polyester-based thermoplastic elastomer decreases in accordance with the mixing ratio, while the height of the peak originating from a rubber increases. However, since the peak position of a rubber is −10° C. or lower, there is less influence on the value of Tan δ at from 30° C. to 50° C., and consequently, the Tan δ value generally becomes lower.

According to an embodiment of the tire of the present invention related to the third aspect, a reinforcing cord member is wound around the outer circumference of a tire frame formed of a thermoplastic resin material containing a polyester-based thermoplastic elastomer and a rubber, and thereby a reinforcing cord layer is formed. When a reinforcing cord layer is formed on the outer circumference of the tire frame, resistance to puncture and resistance to cutting of the tire, and rigidity in the circumferential direction of the tire (tire frame) are enhanced. In addition, as the rigidity in the circumferential direction increases, creeping (a phenomenon in which plastic deformation of the tire frame increases with time under a constant stress) in the tire frame formed of a thermoplastic material is suppressed.

Furthermore, in regard to the tire of the present invention related to the third aspect, the polyester-based thermoplastic elastomer contained in the thermoplastic resin material that forms the tire frame has adhesiveness to the reinforcing cord member, and also has excellent fixing performance such as welding strength. Therefore, when a thermoplastic resin material containing the polyester-based thermoplastic elastomer and a rubber is used, for example, a phenomenon in which air remains in the vicinity of the reinforcing cord member (incorporation of air) during the process of winding reinforcing cord member can be suppressed. If the thermoplastic resin material has high adhesiveness and weldability to the reinforcing cord member, and incorporation of air into the surroundings of the reinforcing cord member is suppressed, the reinforcing cord member can be effectively prevented from moving around as a result of the force applied thereto and the like at the time of driving. Thereby, for example, even in a case where tire-constituting members are arranged on the outer circumference of the tire frame such that the entirety of the reinforcing cord member is covered, since movement of the reinforcing cord member is suppressed, occurrence of separation between these members (including the tire frame) and the like is suppressed, and durability of the tire is enhanced.

(3-2) In regard to the tire of the present invention related to the third aspect, the thermoplastic resin material forming the tire frame may further contain a thermoplastic elastomer having high affinity for rubber. When the thermoplastic resin material contains, for example, an acid modification product as the thermoplastic elastomer having high affinity for rubber, the rubber can be finely dispersed in the thermoplastic resin material. Furthermore, the tensile strength is enhanced by an interaction between the polyester-based thermoplastic elastomer and an acid modification site, and it is thought that even if the tire is fractured, the tire may be subjected to ductile fracture but not likely to undergo brittle fracture or lamellar fracture.

Meanwhile, the phrase "having high affinity for rubber" means a state in which, when a thermoplastic elastomer is mixed with a rubber, a molecular structure of the rubber and a molecular structure of the thermoplastic elastomer are similar, and the rubber is incorporated into dispersed particles of the thermoplastic elastomer, or a state in which the thermoplastic elastomer is incorporated into dispersed particles of the rubber.

However, it is not necessary that the entirety of the thermoplastic elastomer and the rubber in the thermoplastic resin material be in the state as described above, and the thermoplastic elastomer and the rubber in the thermoplastic resin material may be partially in the state as described above.

(3-3) The tire of the present invention related to the third aspect can be configured such that the reinforcing cord layer contains a resin material. As such, when a resin material is contained in the reinforcing cord layer, difference in hardness between the tire and the reinforcing cord layer can be made smaller as compared with a case of fixing the reinforcing cord member with a cushion rubber, and thus, the reinforcing cord member can be adhered and fixed to the tire frame. Thereby, the phenomenon of incorporation of air described above can be effectively prevented, and the movement of the reinforcing cord member at the time of driving can be effectively suppressed. Here, the term "resin material" is a material containing at least a resin, and may also contain a resin as well as a rubber or an inorganic compound. In addition, the term "resin" is a concept which includes thermoplastic resins (including thermoplastic elastomers) and thermosetting resins, and does not include a rubber such as a vulcanized rubber, or an inorganic compound.

When the reinforcing cord layer contains a resin material, it is preferable that the reinforcing cords have their surfaces covered with the resin material in an area of 20% or larger, and more preferably covered in an area of 50% or larger, from a viewpoint of increasing pull-out properties (difficulty to be pulled out) of the reinforcing cords. Furthermore, a content of the resin material in the reinforcing cord layer is preferably 20% by mass or greater, and more preferably 50% by mass or greater, with respect to a total amount of the materials that constitute the reinforcing cord layer except for the reinforcing cords, from the viewpoint of increasing the pull-out properties of the reinforcing cords.

In order to construct the tire such that the reinforcing cord layer contains a resin material, for example, the tire can be formed such that at least a portion of the reinforcing cord member as viewed from a cross-section of the tire frame dissected along the axial direction, is embedded in the outer circumference of the tire frame formed of a thermoplastic resin material. In this case, the thermoplastic resin material containing a polyester-based thermoplastic elastomer and a rubber used in the outer circumference of the tire frame in which the reinforcing cord member are embedded, corresponds to the resin material as a component of the reinforcing cord layer, the reinforcing cord layer is constituted of the thermoplastic resin material that forms the tire frame, and the reinforcing cord member. Furthermore, in order to construct the tire such that the reinforcing cord layer contains a resin material, it is also acceptable that a coated cord member produced by coating a reinforcing cord with a resin material of the same kind as or different from that of the resin material that forms the tire frame, be wound in the circumferential direction of the tire frame. The term resin materials of the same kind refers to a form of grouping of ester-based resin materials only or grouping of styrene-based resin materials only, or the like.

(3-4) The tire of the present invention related to the third aspect can be configured such that a mass ratio (x:y) of the polyester-based thermoplastic elastomer (x) and the rubber (y) in the thermoplastic resin is from 95:5 to 50:50. As such, when the mass ratio (x:y) of the polyester-based thermoplastic elastomer (x) and the rubber (y) is adjusted to from 95:5 to 50:50, the performance that can be exhibited by a combination of a polyester-based thermoplastic elastomer and a rubber can be further enhanced.

However, when the thermoplastic resin material contains a thermoplastic elastomer other than the polyester-based thermoplastic elastomer, the tire can be configured such that a mass ratio (x:y') of the polyester-based thermoplastic elastomer (x) and the total amount (y') of the rubber and the thermoplastic elastomer other than the polyester-based thermoplastic elastomer is from 95:5 to 50:50.

(3-5) The tire of the present invention related to the third aspect can be configured such that a mass ratio {(x:(y+z)} of the polyester-based thermoplastic elastomer (x) and a total amount of the rubber (y) and the thermoplastic elastomer (z) having high affinity for rubber in the thermoplastic resin material is from 95:5 to 50:50. As such, when the mass ratio {(x:(y+z)} of the polyester-based thermoplastic elastomer (x) and the total amount (y+z) of the rubber (y) and the thermoplastic elastomer (z) other than the polyester-based thermoplastic elastomer is adjusted to from 95:5 to 50:50, the performance that can be exhibited by a combination of a polyester-based thermoplastic elastomer and a rubber can be further enhanced.

(3-6) The tire of the present invention related to the third aspect can be configured such that a total content of the polyester-based thermoplastic elastomer and the rubber in the thermoplastic resin material is from 50% by mass to 100% by mass. By adopting the configuration described above, the performance that can be exhibited by a combination of a polyester-based thermoplastic elastomer and a rubber can be further enhanced.

However, when the thermoplastic resin material contains a thermoplastic elastomer other than the polyester-based thermoplastic elastomer, the tire can be configured such that a total amount of the polyester-based thermoplastic elastomer, the rubber, and the thermoplastic elastomer other than the polyester-based thermoplastic elastomer is 50% by mass to 100% by mass.

(3-7) The tire of the present invention related to the third aspect can be configured such that a total content of the polyester-based thermoplastic elastomer, the rubber, and a thermoplastic elastomer having high affinity for rubber in the thermoplastic resin material is 50% by mass to 100% by mass. By adopting the configuration described above, the performance that can be exhibited by a combination of a polyester-based thermoplastic elastomer and a rubber can be further enhanced.

By adopting the configuration described above, the performance that can be exhibited by a combination of a polyester-based thermoplastic elastomer and a rubber can be further enhanced.

The means to address the problem according to the fourth aspect is as follows:

(1) The tire of the present invention related to the fourth aspect is a tire having a circular tire frame formed of a thermoplastic resin material, in which the thermoplastic resin material includes a polyester-based thermoplastic elastomer (A) having a hard segment containing a polyester resin and a soft segment (hereinafter, appropriately referred to as "polyester-based thermoplastic elastomer (A)", and a polyester resin (B) other than a thermoplastic elastomer (hereinafter, appropriately referred to as "polyester resin (B)").

The polyester resin (B) according to the present invention related to the fourth aspect is preferably a resin of the same kind as that of the polyester resin contained in the hard segment of the polyester-based thermoplastic elastomer (A). Here, the phrase "resin of the same kind as that of the polyester resin contained in the hard segment" means a polyester resin having a skeleton that is common with a skeleton constituting a main chain of the hard segment carried by the polyester-based thermoplastic elastomer.

It is believed that when the polyester resin (B) is a polyester resin having a skeleton that is common with the skeleton constituting the main chain of the hard segment carried by the polyester-based thermoplastic elastomer (A), affinity between the hard segment in the polyester-based thermoplastic elastomer (A) and the polyester resin (B) increases. In this case, as the thermoplastic resin material contains the polyester-based thermoplastic elastomer (A) and the polyester resin (B), the polyester resin (B) is compatible with the hard segment of the polyester-based thermoplastic elastomer (A) and is localized in the hard segment of the polyester-based thermoplastic elastomer (A), so that a domain of the hard segment increases.

Therefore, the thermoplastic resin material containing the polyester-based thermoplastic elastomer (A) and the polyester resin (B) is not simply configured such that the polyester-based thermoplastic elastomer (A) and the polyester resin (B) are included, and the polyester resin (B) is uniformly dispersed in the polyester-based thermoplastic elastomer (A), while the components maintain their respective properties; but, in the thermoplastic resin material, the domain of the hard segment of the polyester-based thermoplastic elastomer (A) increases, and thereby the elastic modulus of the thermoplastic resin material increases.

However, since the rolling resistance of a tire is produced by vibration at a frequency of approximately 10 Hz to 100 Hz at near 50° C., when the measurement of viscoelasticity of the tire is carried out, the magnitude of rolling resistance can be expressed by Tan δ at from 30° C. to 50° C.

A tire formed by using a resin material composed only of the polyester thermoplastic elastomer (A) has a tendency that when the elastic modulus is increased by increasing the number of domains of the hard segment of the thermoplastic elastomer, a loss tangent (Tan δ) increases. Specifically, when the elastic modulus is increased by changing the ratio of the hard segment and the soft segment of the polyester-based thermoplastic elastomer (A), the peak of Tan δ of the polyester-based thermoplastic elastomer (A) in the viscoelasticity measurement is shifted to the higher temperature side, and the Tan δ value at from 30° C. to 50° C. tends to increase.

If the loss tangent (Tan δ) of the resin material increases, the energy loss (heat generation) occurring as a result of deformation at the time when the tire rolls, is increased, and the rolling resistance tends to increase. Therefore, a car which uses a tire formed of such a resin material as a raw material is likely to have high fuel consumption.

That is, a tire formed by using a resin material which is composed only of a thermoplastic elastomer is such that if the elastic modulus of the resin material is increased for the purpose of enhancing the resistance to deformation or the like of the tire, the Tan δ value of the resin material increases at the same time. Therefore, it has been difficult to realize low fuel consumption.

In contrast to this, when a thermoplastic resin material containing a polyester-based thermoplastic elastomer (A) and a polyester resin (B) is used to form a tire frame, and a tire is formed, even if the elastic modulus of the thermoplastic resin material is increased, the Tan δ value does not easily increase. An increase in the Tan δ value is markedly suppressed when the polyester resin (B) is a resin of the same kind as that of the polyester resin contained in the hard segment of the polyester-based thermoplastic elastomer (A). The reason why such an effect is provided is not clearly known, but the reason is speculated to be as follows.

When the elastic modulus is increased by changing the ratio of the hard segment and the soft segment of the polyester-based thermoplastic elastomer (A), the peak of Tan δ of the polyester-based thermoplastic elastomer (A) is shifted to the higher temperature side, and the Tan δ value at 30° C. to 50° C. is increased.

On the other hand, when the polyester resin (B) is compatibilized with the domain of the hard segment of the polyester-based thermoplastic elastomer (A), the domain of the hard segment is increased, and the shift of the peak of Tan δ to the high temperature side is suppressed. In this case, a peak of Tan δ of the polyester resin (B) appears, but increasing of the overall Tan δ value of the thermoplastic resin material is suppressed.

From the above findings, it is speculated that in the present invention, even if the elastic modulus of the thermoplastic resin material is increased, it is difficult for the Tan δ value to increase.

Furthermore, a polyester-based thermoplastic elastomer exhibits heat resistance, impact resistance and oil resistance, and also has an advantage that the tensile elastic modulus, tensile strength and fracture strain are excellent. Also, a polyester-based thermoplastic elastomer also has an advantage that the fluctuation of the elastic modulus caused by temperature change is smaller as compared with different thermoplastic elastomers.

Therefore, when the polyester resin (B) is used in combination with the polyester-based thermoplastic elastomer (A), the resin material can exhibit excellent characteristics originating from the polyester-based thermoplastic elastomer, and can also exhibit an effect of suppressing rolling resistance. Also, a tire having satisfactory durability and low fuel consumption can be obtained.

(4-2) The tire of the present invention related to the fourth aspect can be configured such that an elastic modulus of the polyester resin (B) is 700 MPa or greater.

As such, when the elastic modulus of the polyester resin (B) that can be easily compatibilized with the hard segment carried by the polyester-based thermoplastic elastomer (A) is adjusted to the range described above, an elastic modulus of the hard segment of the polyester-based thermoplastic elastomer (A) can be further increased, and therefore, a thermoplastic resin material having a higher elastic modulus can be obtained. As a result, a tire having a high elastic modulus can be obtained.

(4-3) The tire of the present invention related to the fourth aspect can be configured such that a mass ratio (A:B) of the polyester-based thermoplastic elastomer (A) and the polyester resin (B) is from 95:5 to 50:50.

When the mass ratio of the polyester-based thermoplastic elastomer (A) and the polyester resin (B) is in the range described above, the performance of the thermoplastic resin material can be sufficiently exhibited, and tensile characteristics such as tensile elasticity and breaking strength as the tire performance can be enhanced.

(4-4) The tire of the present invention related to the fourth aspect can be configured such that a content of the polyester-based thermoplastic elastomer (A) in the thermoplastic resin material is from 50% by mass to 95% by mass.

When the content of the polyester-based thermoplastic elastomer (A) in the thermoplastic resin material is in the range described above, the performance of the thermoplastic resin material can be sufficiently exhibited, and tensile characteristics such as tensile elasticity and breaking strength as the tire performance can be further enhanced.

(4-5) Furthermore, the tire of the present invention related to the fourth aspect may further include, in addition to the tire frame formed of a thermoplastic resin material, a reinforcing cord member that forms a reinforcing cord layer in which the reinforcing cord member is wound around the outer circumference of the tire frame formed of a thermoplastic resin material.

When the reinforcing cord member is wound around the outer circumference of the tire frame formed of a thermoplastic resin material, and thereby a reinforcing cord layer is formed, the resistance to puncture and resistance to cutting of the tire, and the rigidity in the circumferential direction of the tire (tire frame) are enhanced. In addition, as the rigidity in the circumferential direction increases, creeping (a phenomenon in which plastic deformation of the tire frame increases with time under a constant stress) in the tire frame formed of a thermoplastic material is suppressed.

The means to address the problem according to the fifth aspect is as follows:

(5-1) The tire of the present invention related to the fifth aspect is a tire having a circular tire frame formed of a thermoplastic resin material, in which the thermoplastic resin material includes a polyester-based thermoplastic elastomer, and an acid-modified elastomer obtained by acid-modifying a thermoplastic elastomer other than the polyester-based thermoplastic elastomer, or a mixture of a thermoplastic elastomer other than the polyester-based thermoplastic elastomer and an acid-modified elastomer obtained by acid-modifying the elastomer.

That is, the tire of the present invention related to the fifth aspect has a circular tire frame formed of a particular thermoplastic resin material, and the particular thermoplastic resin material includes at least: 1) a combination of a polyester-based thermoplastic elastomer and an acid-modified elastomer obtained by acid-modifying a thermoplastic elastomer other than the polyester-based thermoplastic elastomer, or 2) a combination of a polyester-based thermoplastic elastomer, a thermoplastic elastomer other than the polyester-based thermoplastic elastomer, and an acid-modified elastomer obtained by acid-modifying a thermoplastic elastomer other than the polyester-based thermoplastic elastomer.

In the present invention related to the fifth aspect, the polyester-based thermoplastic elastomer contained in the thermoplastic resin material exhibits heat resistance, impact resistance and oil resistance, and also has an advantage that the tensile elastic modulus, tensile strength and fracture strain are excellent. Furthermore, as the thermoplastic resin material contains an acid-modified elastomer, while the thermoplastic resin material retains the above-mentioned characteristics originating from the polyester-based thermoplastic elastomer, the resin material acquires elasticity that is not too strong and becomes flexible. Thus, even if the resin material is fractured, the resin material does not easily gets fractured by being torn apart and broken down, and easily attains a stretched state.

Furthermore, since a polyester-based thermoplastic elastomer has an advantage that the fluctuation of the elastic modulus caused by temperature change is smaller as compared with different thermoplastic elastomers, a range of selection of the temperature conditions at the time of using the tire can be broadened. In addition, even if an acid-modified elastomer is used in combination, fluidity of the thermoplastic resin material is secured at the time of forming the tire frame, and there is less influence on manufacturability.

For this reason, the tire of the present invention according to the fifth aspect has excellent manufacturability, and exhibits less deformation or change in hardness that is caused by temperature fluctuation in the use environment, and the tire is strong against impact and exerts less influence on the ride quality of the car equipped with the tire. Also, even when the tire is damaged, the tire is not easily subjected to puncture, and rupture of the tire can be avoided.

(5-2) The tire of the present invention related to the fifth aspect can be configured such that an acid value of the thermoplastic resin material is from 0.1 mg-$CH_3ONa$/g to 10 mg-$CH_3ONa$/g.

As such, when the acid value of the thermoplastic resin material is adjusted to the range described above, particularly, an increase in the melt viscosity of the thermoplastic resin material is suppressed, and since the thermoplastic resin material has excellent fluidity, the resin material exhibits excellent injection molding property. Therefore, the production efficiency of the tire is further enhanced. Accordingly, a good balance can be achieved between the tensile characteristics as a tire performance, and manufacturability from the viewpoint of injection molding property.

The thermoplastic resin material has a sea-island structure having a matrix phase formed of a polyester-based thermoplastic elastomer (hereinafter, also referred to as "sea phase") and a dispersed phase formed of an acid-modified elastomer, or an acid-modified elastomer and another thermoplastic elastomer (unmodified) (hereinafter, also referred to as "island phase"). In regard to the sea-island structure, as the acid value is higher, the island phase tends to be smaller, and as the acid value is lower, the island phase tends to be larger. When the acid value of the acid-modified elastomer is in the range described above, the island phase is finely dispersed in the thermoplastic resin, and impact resistance and tensile characteristics are enhanced.

(5-3) The tire of the present invention related to the fifth aspect can be configured such that a ratio (A:B) of the mass (A) of the polyester-based thermoplastic elastomer in the thermoplastic resin material, and the total mass (B) of the thermoplastic elastomer other than the polyester-based thermoplastic elastomer and the acid-modified elastomer is from 90:10 to 50:50.

When the proportion of the acid-modified elastomer with respect to the polyester-based thermoplastic elastomer in the thermoplastic resin material is adjusted to the range described above, the performance of the thermoplastic resin material can be sufficiently exhibited, and the tensile characteristics as the tire performance can be further enhanced.

(5-4) The tire of the present invention related to the fifth aspect can be configured such that the content of the polyester-based thermoplastic elastomer in the thermoplastic resin material is from 50% by mass to 95% by mass.

When the content of the polyester-based thermoplastic elastomer in the thermoplastic resin material is in the range described above, the characteristics originating from the polyester-based thermoplastic elastomer are sufficiently exhibited, and at the same time, the performance of the thermoplastic resin material can be sufficiently exhibited. Also, the tensile characteristics as the tire performance can be further enhanced.

(5-5) The tire of the present invention related to the fifth aspect may have a reinforcing cord member wound around the outer circumference of a tire frame formed of a thermoplastic resin material, and thereby have a reinforcing cord layer formed thereon. When a reinforcing cord layer is formed on the outer circumference of the tire frame, the resistance to puncture and resistance to cutting of the tire, and the rigidity in the circumferential direction of the tire (tire frame) are enhanced. In addition, as the rigidity in the circumferential direction increases, creeping (a phenomenon in which plastic deformation of the tire frame increases with time under a constant stress) in the tire frame formed of a thermoplastic material is suppressed.

(5-6) The method of producing a tire of the present invention related to the fifth aspect includes a tire frame piece forming step of forming a tire frame piece for constituting a portion of a circular tire frame, using a thermoplastic resin material including a polyester-based thermoplastic elastomer; and an acid-modified elastomer obtained by acid-modifying a thermoplastic elastomer other than the polyester-based thermoplastic elastomer, or a mixture of a thermoplastic elastomer other than the polyester-based thermoplastic elastomer and an acid-modified elastomer obtained by acid-modifying the elastomer; and a tire frame piece bonding step of forming the tire frame by fusing two or more of the tire frame pieces, which make a pair, by applying heat to bonding surfaces of the tire frame pieces, and thereby forming the tire frame.

According to the method of producing a tire of the present invention related to the fifth aspect, a tire frame piece of a circular tire frame is formed by using a thermoplastic resin material. Since the thermoplastic resin material used in the production method of the present invention has excellent tensile characteristics, the ride quality of a car which uses the tire thus produced is excellent, and the bursting resistance or puncture resistance of the tire can be enhanced.

(5-7) The method of producing a tire of the present invention related to the fifth aspect can be configured such that the acid value of the thermoplastic resin material is from 0.1 mg-$CH_3ONa$/g to 10 mg-$CH_3ONa$/g.

As such, when an acid value of the acid-modified elastomer is adjusted to the range described above, particularly, an increase in the melt viscosity of the thermoplastic resin material is suppressed, and since fluidity is excellent, the thermoplastic resin material has excellent injection molding property. Therefore, the production efficiency of the tire is enhanced, and it is also preferable from environmental viewpoints such as energy saving.

(5-8) The method of producing a tire of the present invention related to the fifth aspect can be configured such that the tire frame piece forming step includes a step of performing injection molding by using the thermoplastic resin material.

Since the thermoplastic resin material used in the production method of the present invention related to the fifth aspect exhibits excellent injection molding property, productivity of the tire can be increased.

The means to address the problem according to the sixth aspect is as follows:

(6-1) The tire of the present invention related to the sixth aspect is a tire having at least a circular tire frame formed of a thermoplastic resin material, the thermoplastic resin material including a polyester-based thermoplastic elastomer and at least one copolymer of an olefin-(meth)acrylic acid copolymer or an acid-modified copolymer obtained by acid-modifying an olefin-(meth)acrylate copolymer.

Meanwhile, in the following description, the "olefin-(meth)acrylic acid copolymer" is also referred to as a specific copolymer, and the "acid-modified copolymer formed by acid-modifying an olefin-(meth)acrylate copolymer" is also referred to as a specific acid-modified copolymer.

The thermoplastic resin material according to the present invention related to the sixth aspect has excellent impact resistance by containing a polyester-based thermoplastic elastomer and at least one of the specific copolymer or the specific acid-modified copolymer. Furthermore, as the thermoplastic resin material contains a polyester-based thermoplastic elastomer, the thermoplastic resin material can suppress the deformation or change in hardness that is caused by temperature fluctuation in the use environment.

In a case in which the polyester-based thermoplastic elastomer is used singly, if it is intended to adjust the elastic modulus of the elastomer, it is necessary to control the ratio of the hard segment and the soft segment. In contrast thereto, by adjusting the content ratio of the various components of a two-component system or a three-component system, that is, the polyester-based thermoplastic elastomer and at least one of the specific copolymer or the specific acid-modified copolymer, the elastic modulus of the thermoplastic resin material can be easily adjusted as compared with the case in which the polyester-based thermoplastic elastomer is used singly.

Meanwhile, the terms "two-component" and "three-component" mean that the "polyester-based thermoplastic elastomer", "specific copolymer" and "specific acid-modified copolymer" are respectively understood as "one component", and it is not intended to inhibit the use of two or more kinds for each of the "polyester-based thermoplastic elastomer", "specific copolymer" and "specific acid-modified copolymer".

(6-2) The tire of the present invention related to the sixth aspect can be configured such that the mass ratio (x:y+z) of the polyester-based thermoplastic elastomer (x), the olefin-(meth)acrylic acid copolymer (specific copolymer; y), and the acid-modified copolymer (specific acid-modified copolymer; z) is from 95:5 to 50:50.

Meanwhile, when the thermoplastic resin material does not contain the specific acid-modified copolymer (z) (z=0), the mass ratio (x:y+z) means a mass ratio (x:y), and when the thermoplastic resin material does not contain the specific copolymer (y) (y=0), the mass ratio (x:y+z) means a mass ratio (x:z).

When the mass ratio of the polyester-based thermoplastic elastomer, the olefin-(meth)acrylic acid copolymer and the acid-modified copolymer in the thermoplastic resin material is in the range described above, the performance of the thermoplastic resin material can be sufficiently exhibited, and the tensile characteristics such as tensile elasticity and breaking strength as the tire performance can be enhanced.

Meanwhile, the tire of the present invention related to the sixth aspect can be configured such that the mass ratio (y:z) of the olefin-(meth)acrylic acid copolymer (specific copolymer; y) and the acid-modified copolymer (specific acid-modified copolymer; z) is from 95:5 to 10:90.

When the amount ratio of the specific copolymer and the specific acid-modified copolymer in the thermoplastic resin material is in the range described above, the performance of the thermoplastic resin material can be sufficiently exhibited, and the tensile characteristics such as tensile elasticity and breaking strength as the tire performance can be enhanced.

(6-3) The tire of the present invention related to the sixth aspect can be configured such that a total content of the polyester-based thermoplastic elastomer, the olefin-(meth) acrylic acid copolymer (specific copolymer), and the acid-modified copolymer (specific acid-modified copolymer) in the thermoplastic resin material is from 50% by mass to 100% by mass.

In the present invention related to the sixth aspect, when the content of the polyester-based thermoplastic elastomer is designated as "x", if the thermoplastic resin material does not contain the specific acid-modified copolymer (z) (z=0), the total content (x+y+z) means (x+y). If the thermoplastic resin material does not contain the specific copolymer (y) (y=0), the total content (x+y+z) means (x+z).

When the total content of the polyester-based thermoplastic elastomer and at least one of the specific copolymer or the specific acid-modified copolymer in the thermoplastic resin material is in the range described above, the performance of the thermoplastic resin material can be sufficiently exhibited, and the tensile characteristics such as tensile elasticity and breaking strength as the tire performance can be further enhanced.

Further, the tire of the present invention related to the sixth aspect may further include, in addition to a tire frame formed of a thermoplastic resin material, a reinforcing cord member that forms a reinforcing cord member layer in which the reinforcing cord member is wound around an outer circumference of the tire frame formed of a thermoplastic resin material.

When a reinforcing cord member is wound around an outer circumference of the tire frame formed of a thermoplastic resin material and form a reinforcing cord member layer, the resistance to puncture and resistance to cutting of the tire and the rigidity in a circumferential direction of the tire (tire frame) are enhanced. As the rigidity in a circumferential direction increases, creeping (a phenomenon in which plastic deformation of the tire frame increases with time under a constant stress) in the tire frame formed of a thermoplastic material is suppressed.

(6-4) The method of producing a tire of the present invention related to the sixth aspect includes at least a tire frame piece forming step of forming a tire frame piece for constituting a portion of a circular tire frame, using a thermoplastic resin material containing: a polyester-based thermoplastic elastomer; and at least one copolymer of an olefin-(meth) acrylic acid copolymer or an acid-modified copolymer formed by acid-modifying an olefin-(meth)acrylate copolymer; and a tire frame piece bonding step of forming the tire frame by fusing two or more of the tire frame pieces, which make a pair, by applying heat to bonding surfaces of the tire frame pieces.

In the method of producing a tire of the present invention related to the sixth aspect, tire frame pieces of a circular tire frame is formed by using a thermoplastic resin material. Since the thermoplastic resin material related to the present invention contains a polyester-based thermoplastic elastomer and at least one of the specific copolymer or the specific acid-modified copolymer, the thermoplastic resin material has excellent fluidity, and accordingly, injection molding using the thermoplastic resin material can be easily carried out. Therefore, productivity of the tire can be enhanced.

This is thought to be caused by the following reason.

Due to the acid group carried by the specific acid-modified copolymer, the miscibility of the polyester-based thermoplastic elastomer and the specific copolymer is increased, and when the polyester-based thermoplastic elastomer is made into the sea phase, while the specific copolymer is made into the island phase, the sea-island structure can be easily formed. In such a sea-island structure, it is thought that the specific acid-modified copolymer is interposed at the interface between the sea phase and the island phase to increase the affinity between the sea phase and the island phase. Particularly, as compared with polyamide-based thermoplastic elastomers, polyester-based thermoplastic elastomers are such that as the affinity between the sea phase and the island phase increases, an increase in the viscosity of the thermoplastic resin material is suppressed, and the resin material has excellent fluidity, so that injection molding can be easily carried out.

The means to address the problem according to the seventh aspect is as follows:

(7-1) The tire of the present invention related to the seventh aspect is a tire having at least a circular tire frame that is formed of a resin material, in which the resin material contains a first thermoplastic elastomer having a tensile elastic modulus in the range of from 150 MPa to 700 MPa, and a second thermoplastic elastomer having a loss factor (Tan δ) smaller than that of the first thermoplastic elastomer.

The tire of the present invention related to the seventh aspect has a circular tire frame that is formed of a resin material containing a first thermoplastic elastomer having a tensile elastic modulus in the range of from 150 MPa to 700 MP, and a second thermoplastic elastomer having a loss factor (Tan δ) smaller than that of the first thermoplastic elastomer. In the tire of the present invention, since the tire frame is formed of the resin material, a vulcanizing step, which is an essential step for the conventional tires made of rubber, is not essential, and for example, the tire frame can be molded by injection molding or the like. Therefore, simplification of the production process, shortening of the time, cost reduction, and the like can be promoted. Further, when a resin material is used in the tire frame, the structure of the tire can be simplified as compared with conventional tires made of rubber, so that weight reduction of the tire can be realized. Accordingly, when a resin material is formed into the tire frame, abrasion resistance and durability of the tire can be enhanced.

The term "thermoplastic elastomer" means a thermoplastic resin material consisted of a copolymer containing: a polymer that constitutes: a hard segment which is crystalline and has a high melting temperature; or a hard segment having a high aggregating power; and a polymer that constitutes a soft segment which is amorphous and has a low glass transition temperature.

Usually, many of thermoplastic elastomers having high elastic moduli also have high loss factors (Tan δ), and it is difficult to form a tire frame having a high elastic modulus and a low Tan δ value.

In the tire of the present invention, since a tire frame is formed using a resin material containing both the first thermoplastic elastomer having a high elastic modulus, which has a tensile elastic modulus of 150 MPa to 700 MP, and the second thermoplastic elastomer having a loss factor (Tan δ) smaller than that of the first thermoplastic elastomer, for example, as compared with the case that either the first thermoplastic elastomer or the second thermoplastic elastomer is used singly, an increase in the elastic modulus can be achieved while the Tan δ value of the tire frame is maintained at a low level. Thereby, a tire having a low rolling resistance and a high elastic modulus can be provided. Further, since the elastic modulus can be increased while the Tan δ value of the tire frame is maintained at a low level, heat resistance of the tire frame can also be enhanced.

In regard to the tire of the present invention related to the seventh aspect, the difference (Tan $δ_2$–Tan $δ_1$) between the loss factor of the second thermoplastic elastomer (Tan $δ_2$) and the loss factor of the first thermoplastic elastomer (Tan $δ_1$) is preferably 0.02 or greater, and more preferably 0.05 or greater.

(7-2) In the tire of the present invention related to the seventh aspect, a first thermoplastic elastomer having a tensile elastic modulus in the range of from 200 MPa to 500 MPa can be used. When the tensile elastic modulus of the first thermoplastic elastomer is set to from 200 MPa to 500 MPa, the elastic modulus of the tire frame can be set to a more preferred range.

In regard to the tire of the present invention related to the seventh aspect, the tensile elastic modulus of the first thermoplastic elastomer is particularly preferably from 300 MPa to 500 MPa.

(7-3) In the tire of the present invention related to the seventh aspect, the loss factor (Tan δ) of the second thermoplastic elastomer can be adjusted to 0.01 to 0.08. In the tire of the present invention, when the Tan δ value of the second elastomer is adjusted to 0.01 to 0.08, lowering of the Tan δ value of the tire frame can be efficiently achieved.

In regard to the tire of the present invention related to the seventh aspect, the loss factor (Tan δ) of the second thermoplastic elastomer is more preferably from 0.01 to 0.06.

(7-4) The tire of the present invention related to the seventh aspect can be configured such that a mass ratio (x/y) of the first thermoplastic elastomer (x) and the second thermoplastic elastomer (y) is from 10/90 to 90/10. Thereby, an effect of achieving both of increase of the elastic modulus and a low Tan δ value in the tire frame can be sufficiently exhibited.

In regard to the tire of the present invention related to the seventh aspect, the mass ratio (x/y) of the first thermoplastic elastomer (x) and the second thermoplastic elastomer (y) is more preferably from 20/80 to 80/20, and particularly preferably from 30/70 to 70/30.

Examples of the combination of the first thermoplastic elastomer and the second thermoplastic elastomer include a combination of a polyester-based elastomer and a polyester-based elastomer, and a combination of a polyamide-based elastomer and a polyamide-based elastomer.

Advantageous Effects of Invention

According to the present invention related to the first aspect, a tire which is formed using a thermoplastic polymer material and has excellent durability and manufacturability can be provided.

According to the present invention related to the second aspect, a tire which is formed using a thermoplastic resin material and has excellent impact resistance can be provided.

According to the present invention related to the third aspect, a tire in which remaining of air in the surroundings of reinforcing cord member is suppressed and which has excellent impact resistance can be provided.

According to the present invention related to the fourth aspect, a tire which is formed using a thermoplastic resin material, has an increased elastic modulus while an increase in the rolling resistance is suppressed, and has excellent durability, can be provided.

According to the present invention related to the fifth aspect, a tire which is formed using a thermoplastic polymer material and has excellent durability and manufacturability, and a method of producing this tire can be provided.

According to the present invention related to the sixth aspect, a tire which is formed using a thermoplastic resin material and has excellent impact resistance, and a method of producing a tire having excellent productivity can be provided.

According to the present invention related to the seventh aspect, a tire which is highly elastic, has a low loss factor, and has excellent heat resistance, can be provided.

DESCRIPTION OF EMBODIMENTS

Figure 1A:
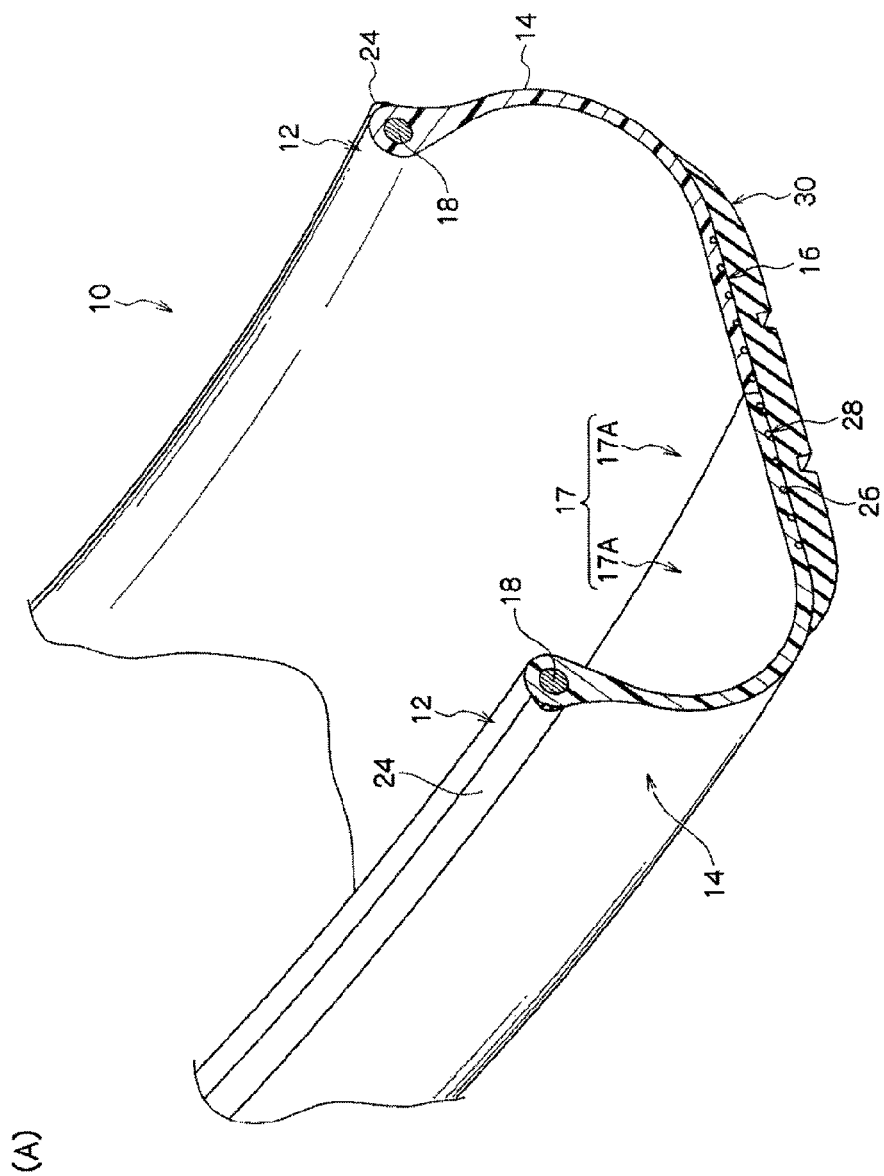
FIG. 1A is a perspective diagram illustrating the cross-section of a part of a tire according to an embodiment of the tire of the present invention which is related to the first to seventh aspects.

Hereinafter, the tire of the present invention will be described in detail.

Herein, in the present invention, the "thermoplastic elastomer" means a polymer compound having elasticity, which is a thermoplastic resin material that is composed of a copolymer having: a polymer that constitutes the hard segment, which is crystalline and has high melting temperature, and a polymer that constitutes the soft segment, which is amorphous and has a low glass transition temperature.

In addition, the "polyester-based thermoplastic elastomer" means a polymer compound having elasticity, which is a thermoplastic resin material that is composed of a copolymer having: a polymer containing polyester that forms the hard segment, which is crystalline and has high melting temperature; and a polymer that forms the soft segment, which is amorphous and has a low glass transition temperature, and is thus that having a partial structure that is composed of polyester in a structure thereof.

The "rubber" is a polymer compound having elasticity, and is distinguished from the thermoplastic elastomer described above in the present specification.

The thermoplastic elastomer expresses elasticity as the hard segment, that is crystalline and has high melting temperature, behaves as a pseudocross-linking point. On the other hand, the rubber has a double bond and the like in its molecular chain, and generates three-dimensional reticular structure by adding sulfur and the like thereto and cross-linking (vulcanization), to express elasticity. Therefore, the thermoplastic elastomer is reusable since the hard segment is melt with heating and the pseudocross-linking point again is regenerated by cooling. On the other hand, the rubber generates a three-dimensional reticular structure when cross-linked (vulcanized), and loses the fluidity, and difficult to reuse even with heating. However, a non-cross-linked rubber exhibits similar behaviors to those of the thermoplastic elastomer.

The "thermoplastic elastomer other than the polyester-based thermoplastic elastomer" refers to, among the thermoplastic elastomers, those not containing the hard segment that is composed of polyester as a partial structure thereof. Hereinafter, this thermoplastic elastomer is also arbitrarily referred to as the "other elastomer".

The "acid-modified elastomer obtained by acid-modifying a thermoplastic elastomer other than the polyester-based thermoplastic elastomer" means the thermoplastic elastomer other than the polyester-based thermoplastic elastomer (other thermoplastic elastomer) to which a compound having an acidic group is bonded. Hereinafter, this thermoplastic elastomer is also arbitrarily referred to as the "acid-modified elastomer". Meanwhile, the "other thermoplastic elastomer" does not include the acid-modified elastomer.

In addition, the "resin" means a resin having thermoplasticity or thermosetting property, and does not include conventional vulcanized rubbers such as a natural rubber and a synthetic rubber. The thermoplastic elastomer also does not include conventional vulcanized rubbers such as a natural rubber and a synthetic rubber. In addition, the "polyester resin" refers to a resin having an ester bond in the main chain.

In addition, the thermoplastic resin in the present invention means a resin having thermoplasticity, and does not include conventional vulcanized rubbers such as a natural rubber and a synthetic rubber. Note that the "thermoplastic resin material" means a material that includes at least a thermoplastic resin, and also includes a material which contains a rubber in addition to the thermoplastic resin.

Examples of the thermosetting resin include a phenol resin, a urea resin, a melamine resin, an epoxy resin, a polyamide resin, and a polyester-based resin.

Examples of the thermoplastic resin include a urethane resin, an olefin resin, a vinyl chloride resin, a polyamide resin, and a polyester-based resin.

In addition, the "olefin-(meth)acrylic acid copolymer" refers to a copolymer that contains a (meth)acrylic acid-derived partial structure in an olefin repeating unit. The "(meth)acrylic acid" means at least one of acrylic acid or methacrylic acid.

The "acid-modified copolymer obtained by acid-modifying an olefin-(meth)acrylate copolymer" refers to a copolymer obtained by bonding a compound having an acidic group to a copolymer that contains a (meth)acrylate-derived partial structure in the olefin repeating unit. The "(meth)acrylate" means at least one of acrylate or methacrylate.

The "tensile elastic modulus" in the present specification means the tensile elastic modulus set forth in JIS K7113: 1995. (Meanwhile, the "elastic modulus" in the present specification means the tensile elastic modulus unless particularly specified.)

The "loss coefficient (Tan δ)" in the present specification means the loss coefficient at 30° C., 20 Hz, and 1% shear distortion (it may be simply referred to as "Tan δ" in the present specification.)

Meanwhile, when the amount of each component in the composition is mentioned in the present specification, and a substance corresponding to each component in the composition exists in a plural number, the amount means a total amount of the aforementioned substances in a plural number existing in the composition unless otherwise stated.

The numerical range indicated with use of "from . . . to . . . " in the present specification represents a range including the numbers described before and after the "to" as the minimum value and the maximum value, respectively.

The term "process" in the present specification is not only an independent process, but the present term also includes a process allowing desired actions of the present process to be achieved even though the process cannot be clearly distinguished from other processes.

Hereinafter, first of all, the resin material that constitutes the tire frame, and the resin material that constitutes the reinforcing cord layer in each of the tires of the present invention pertaining to the first to seventh aspects, will be explained, and subsequently, specific embodiments of the tire will be explained with use of figures.

Meanwhile, each of the tires of the present invention pertaining to the first to seventh aspects may be referred to as the tires (1) to (7), respectively in the description below.

[Resin Material that Constitutes Tire Frame]

The tires (1) to (7) of the present invention have a tire frame formed with a resin material. Hereinafter, the resin material that forms the tire frame in the tires (1) to (7) of the present invention will be explained in detail.

<Thermoplastic Resin Material Applied to Tire Frame in Tire (1)>

The tire (1) of the present invention has a circular tire frame formed of a thermoplastic resin material containing at least a polyester-based thermoplastic elastomer.

—Polyester-Based Thermoplastic Elastomer—

The "polyester-based thermoplastic elastomer" is, as described previously, a polymer compound having elasticity, and is a thermoplastic resin material formed of a copolymer that contains a polyester-containing polymer that forms a hard segment, which is crystalline and has a high melting temperature, and a polymer that forms a soft segment, which is amorphous and has a low glass transition temperature, in which the polymer that constitutes the hard segment includes a polyester resin. Examples of the polyester-based thermoplastic elastomer applied to the tire (1) include the ester-based thermoplastic elastomers (TPC) as defined by JIS K6418 and the like.

Examples of the polyester-based thermoplastic elastomer are not particularly limited, but include copolymers in which a crystalline polyester constitutes the hard segment having a high melting temperature, and an amorphous polymer constitutes the soft segment having a low glass transition temperature.

As the hard segment-forming crystalline polyester, an aromatic polyester may be used. The aromatic polyester may be formed from, for example, an aromatic dicarboxylic acid or an ester-forming derivative thereof and an aliphatic diol.

Examples of the hard segment-forming aromatic polyester include polyethylene terephthalate, polybutylene terephthalate, polystyrene terephthalate, polyethylene naphthalate, polybutylene naphthalate, and the like, and the hard segment-forming aromatic polyester is preferably polybutylene terephthalate.

One example of a preferred hard segment-forming aromatic polyester includes polybutylene terephthalate that is derived from terephthalic acid and/or dimethyl terephthalate and 1,4-butanediol. Examples of the preferred hard segment-forming aromatic polyester further include a polyester that is derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, or an ester-forming derivative thereof, and a diol having a molecule weight of 300 or less [for example, aliphatic diols such as ethylene glycol, trimethylene glycol, pentamethylene glycol, hexamethylene glycol, neopentyl glycol, or decamethylene glycol, alicyclic diols such as 1,4-cyclohexane dimethanol or tricyclodecane dimethylol, and aromatic diols such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, or 4,4'-dihydroxy-p-quaterphenyl] and the like, or a copolymerized polyester from a combination of 2 or more kinds of these dicarboxylic acid components and diol components. In addition, a multifunctional carboxylic acid component, multifunctional oxyacid component or a multifunctional hydroxy component, which has 3 or more functionality, and the like may be also copolymerized within a range of 5 mole % or less.

Examples of the polymer that forms the soft segment include a polymer selected from aliphatic polyester and aliphatic polyether.

Examples of the aliphatic polyether include poly(ethylene oxide)glycol, poly(propylene oxide)glycol, poly(tetramethylene oxide)glycol, poly(hexamethylene oxide)glycol, a copolymer of ethylene oxide and propylene oxide, an ethylene oxide-addition polymer of poly(propylene oxide)glycol, a copolymer of ethylene oxide and tetrahydrofuran, and the like.

Examples of the aliphatic polyester include poly($\epsilon$-caprolactone), polyenantholactone, polycaprylolactone, polybutylene adipate, polyethylene adipate, and the like.

Among these aliphatic polyether and aliphatic polyester, poly(tetramethylene oxide)glycol, an ethylene oxide adduct of poly(propylene oxide)glycol, poly($\epsilon$-caprolactone), polybutylene adipate, polyethylene adipate, and the like are preferred from a viewpoint of elastic properties of the obtained copolymer.

The number average molecular weight of the hard segment-forming polymer (polyester) is preferably from 300 to 6000 from the viewpoints of toughness and the flexibility at low temperature. The number average molecular weight of the soft segment-forming polymer is preferably from 300 to 6000 from the viewpoints of the toughness and the flexibility at low temperature. Furthermore, the volume ratio (x:y) of the hard segment (x) and the soft segment (y) is preferably from 99:1 to 20:80, and is further preferably from 98:2 to 30:70, from a viewpoint of the formability.

The polyester-based thermoplastic elastomer may be synthesized by copolymerization of the hard segment-forming polymer and the soft segment-forming polymer by a known method.

As the polyester-based thermoplastic elastomer, a commercial product may be used, and for example, "HYTREL" series manufactured by DuPont-Toray Co., Ltd. (for example, 3046, 5557, 6347, 4047, 4767), "PELPRENE" series manufactured by TOYOBO CO., LTD. (for example, P30B, P40B, P40H, P55B, P70B, P150B, P250B, E450B, P150M, S1001, S2001, S5001, S6001, S9001), or the like may be used.

Meanwhile, the polyester-based thermoplastic elastomer applied to the tire (1) of the present invention may be used singly, or may be used in a mixture of 2 or more kinds thereof.

The melting temperature of the thermoplastic resin containing the polyester-based thermoplastic elastomer applied to the tire frame in the tire (1) of the present invention is generally from about 100° C. to 260° C.

In addition, the content ratio of the polyester-based thermoplastic elastomer in the thermoplastic resin material in the tire (1) of the present invention is not particularly limited, but is preferably from 50 to 100 mass % with respect to the total amount of the thermoplastic resin material. When the content ratio of the polyester-based thermoplastic elastomer is 50 mass % or more with respect to the total amount of the thermoplastic resin material, properties of the polyester-based thermoplastic elastomer can be sufficiently exerted, and the heat resistance, shape retention property, durability and productivity of the tire can be improved.

The thermoplastic resin material may contain a variety of additives such as a rubber, another thermoplastic elastomer, another thermoplastic resin, a variety of fillers (for example, silica, calcium carbonate, clay, and the like), an anti-aging agent, oil, a plasticizer, a colorant, a weather resistant agent, or a reinforcing material, if desired.

The thermoplastic resin material in the tire (1) of the present invention may be obtained by mixing the polyester-based thermoplastic elastomer described above (and additional thermoplastic elastomer when the thermoplastic resin material contains another thermoplastic elastomer), and adding a variety of additives if necessary, and melting and mixing them. In addition, the thermoplastic resin material may be made into a pellet before use, if necessary.

—Properties of Thermoplastic Resin Material—

In the tire (1) of the present invention, the tensile elastic modulus as defined in JIS K7113: 1995 of the thermoplastic resin material containing the polyester-based thermoplastic elastomer is preferably from 100 MPa to 1000 MPa, further preferably from 100 MPa to 800 MPa, and particularly preferably from 100 MPa to 700 MPa. When the tensile elastic modulus of the thermoplastic resin material is 100 MPa to 1000 MPa, it is possible to perform the rim fitting effectively while retaining the shape of the tire frame.

In the tire (1) of the present invention, the tensile yield strength set forth in JIS K7113: 1995 of the thermoplastic resin material containing the polyester-based thermoplastic elastomer is preferably 5 MPa or more, preferably 5 MPa to 70 MPa, and further preferably 5 MPa to 50 MPa. When the tensile yield strength of the thermoplastic resin material is 50 MPa or more, the tire can bear with deformation for the load on the tire at the time of the running or the like.

In the tire (1) of the present invention, the tensile yield elongation set forth in JIS K7113: 1995 of the thermoplastic resin material containing the polyester-based thermoplastic elastomer is preferably 10% or more, preferably from 10 to 70%, and further preferably from 15 to 60%. When the tensile yield elongation of the thermoplastic resin material is 10% or more, the elastic region is large, and the fittability onto a rim can be improved.

In the tire (1) of the present invention, the tensile elongation at break set forth in JIS K7113: 1995 of the thermoplastic resin material containing the polyester-based thermoplastic elastomer is preferably 50% or more, preferably 100% or more, further preferably 150% or more, and particularly preferably 200% or more. When the tensile elongation at break of the thermoplastic resin material is 50% or more, the fittability onto a rim is good, and it is possible to render the thermoplastic resin material to hardly fracture against the collision.

In the tire (1) of the present invention, the deflection temperature under load (at the load of 0.45 MPa) set forth in ISO75-2 or ASTM D648 of the thermoplastic resin material containing the polyester-based thermoplastic elastomer is preferably 50° C. or more, preferably from 50 to 150° C., and further preferably from 50 to 130° C. When the deflection temperature under load of the thermoplastic resin material is 50° C. or more, it is possible to suppress deformation of the tire frame even in a case where vulcanization is performed in the manufacture of the tire.

In the tire (1) of the present invention, the Vicat softening temperature (Method A) set forth in JIS K7206 of the thermoplastic resin material containing the polyester-based thermoplastic elastomer is preferably 130° C. or more, preferably 130 to 250° C., and further preferably 130 to 220° C. When the softening temperature (Method A) of the thermoplastic resin material is 130° C. or more, it is possible to suppress the softening or deformation of the tire in the use environment thereof. In addition, it is possible to suppress the deformation of the tire frame even in a case where vulcanization is performed in the manufacture of the tire jointing.

<Thermoplastic Resin Material Applied to Tire Frame in Tire (2)>

The tire (2) of the present invention has a circular tire frame that is formed of a thermoplastic resin material at least containing a polyester-based thermoplastic elastomer and another elastomer other than the polyester-based thermoplastic elastomer.

—Polyester-Based Thermoplastic Elastomer—

The "polyester-based thermoplastic elastomer" means, as described above, a polymer compound having elasticity, which is a thermoplastic resin material formed of a copolymer that contains a polyester-containing polymer that forms a hard segment, which is crystalline and has a high melting temperature, and a polymer that forms a soft segment, which is amorphous and has a low glass transition temperature, and has a partial structure that is formed of polyester in the structure thereof. Examples of the polyester-based thermoplastic elastomer applied to the tire (2) include the ester-based thermoplastic elastomers (TPC) set forth in JIS K6418: 2007 and the like.

The details of the polyester-based thermoplastic elastomer applied to the tire frame in the tire (2) of the present invention are similar to those of the polyester-based thermoplastic elastomer applied to the tire frame in the tire (1). The matters pertaining to the polyester-based thermoplastic elastomer described in the tire (1) of the present invention are applied similarly to the polyester-based thermoplastic elastomer in the tire (2), except for the matters particularly mentioned to be applied only to the tire (2) in the description below.

—Another Elastomer Other than Polyester-Based Thermoplastic Elastomer—

The elastomer other than the polyester-based thermoplastic elastomer (another elastomer) in the tire (2) of the present invention refers to, as described above, those not containing a hard segment partial structure that is formed of polyester, among the thermoplastic elastomers.

Examples of another elastomer include those having a partial structure of polyurethane, polystyrene, polyolefin or the like at least as the main chain structure of the hard segment. Examples of another elastomer include the polyurethane-based thermoplastic elastomers (TPU), polystyrene-based thermoplastic elastomers (TPS), polyolefin-based thermoplastic elastomers (TPO), and the like, which are set forth in JIS K6418: 2007.

The other elastomer may be used singly, or in combination of 2 or more kinds thereof.

As the other elastomer that may be applied to the tire frame in the tire (2) of the present invention, a thermoplastic elastomer resulting from acid modification of the thermoplastic elastomer other than the polyester-based thermoplastic elastomer may be used.

The "thermoplastic elastomer resulting from acid modification of the thermoplastic elastomer other than the polyester-based thermoplastic elastomer" refers to those resulting from acid modification of the another elastomer described above with an acidic group such as a carboxylic acid group, a sulfuric acid group, or a phosphoric acid group.

Examples of the aspect of the acid modification of the other elastomer include an aspect of introducing an acidic group to the other elastomer with use of a compound having an acidic group.

The compound having an acidic group which is used in the acid modification of the other elastomer is preferably an unsaturated compound having a carboxylic acid group that is a weak acid group, such as acrylic acid, methacrylic acid, itaconic acid, crotonic acid, isocrotonic acid, or maleic acid, from a viewpoint of suppressing deterioration of the thermoplastic elastomer.

Examples of the acid modification of the other elastomer include an aspect of bonding an unsaturated binding site of the aforementioned unsaturated carboxylic acid to an olefin-based thermoplastic elastomer or styrene-based thermoplastic elastomer by graft polymerization or the like.

Hereinafter, the other elastomer suitable for the tire frame in the tire (2) of the present invention will be further described in detail.

—Polyurethane-Based Thermoplastic Elastomer—

Examples of the polyurethane-based thermoplastic elastomer that may be applied as the other elastomer in the tire (2) of the present invention include materials in which at least polyurethane constitutes a hard segment that forms pseudo-cross-linking by physical aggregation, and the other polymer constitutes a soft segment that is amorphous and has a low glass transition temperature. The polyurethane-based thermoplastic elastomer may be represented by, for example, a copolymer that contains a soft segment containing the unit structure represented by the following Formula A, and a hard segment containing the unit structure represented by the following Formula B.

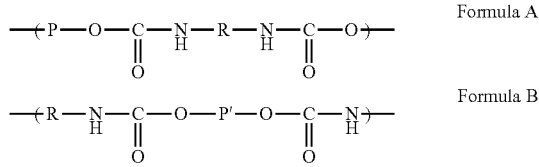

In Formula A, P represents a long chain aliphatic polyether or a long chain aliphatic polyester. In Formula A or Formula B, R represents an aliphatic hydrocarbon, an alicyclic hydrocarbon, or an aromatic hydrocarbon. In Formula B, P' represents a short chain aliphatic hydrocarbon, an alicyclic hydrocarbon, or an aromatic hydrocarbon.

Examples of the long chain aliphatic polyether or long chain aliphatic polyester represented by P in Formula A include a long chain aliphatic polyether or long chain aliphatic polyester having a molecule weight of from 500 to 5000 The P is derived from a diol compound containing the long chain aliphatic polyether or long chain aliphatic polyester represented by P. Examples of such a diol compound include polyethylene glycol, polypropylene glycol, polytetramethylene ether glycol, poly(butylene adipate) diol, poly-ε-caprolactone diol, poly(hexamethylene carbonate) diol, ABA type triblock polyether mentioned above, and the like which have molecule weights within the ranges described above.

These diol compounds may be used alone, or in combination of 2 or more kinds thereof.

In Formula A or Formula B, R is derived from a diisocyanate compound containing an aliphatic hydrocarbon, alicyclic hydrocarbon, or aromatic hydrocarbon that is represented by R.

Examples of aliphatic diisocyanate compound containing the aliphatic hydrocarbon represented by R include 1,2-ethylene diisocyanate, 1,3-propylene diisocyanate, 1,4-butane diisocyanate, and 1,6-hexamethylene diisocyanate.

Examples of diisocyanate compound containing the alicyclic hydrocarbon represented by R include 1,4-cyclohexane diisocyanate and 4,4-cyclohexane diisocyanate.

Examples of aromatic diisocyanate compound containing the aromatic hydrocarbon represented by R include 4,4'-diphenylmethane diisocyanate and tolylene diisocyanate.

These diisocyanate compounds may be used alone, or in combination of 2 or more kinds thereof.

Examples of the short chain aliphatic hydrocarbon, alicyclic hydrocarbon, or aromatic hydrocarbon represented by P' in Formula B include a short chain aliphatic hydrocarbon, alicyclic hydrocarbon, or aromatic hydrocarbon which has a molecule weight of less than 500

In addition, P' is derived from a diol compound containing P'.

Examples of aliphatic diol compound containing the short chain aliphatic hydrocarbon represented by P' include glycols and polyalkylene glycols, and for example, include ethylene glycol, propylene glycol, trimethylene glycol, 1,4-butanediol, 1,3-butanediol, 1,5-pentanediol, 1,6-hexane diol, 1,7-heptane diol, 1,8-octanediol, 1,9-nonanediol, and 1,10-decanediol.

Examples of alicyclic diol compound containing the alicyclic hydrocarbon represented by P' include cyclopentane-1,2-diol, cyclohexane-1,2-diol, cyclohexane-1,3-diol, cyclohexane-1,4-diol, and cyclohexane-1,4-dimethanol.

Examples of aromatic diol compound containing the aromatic hydrocarbon represented by P' include hydroquinone, resorcin, chlorohydroquinone, bromohydroquinone, methyl hydroquinone, phenyl hydroquinone, methoxyhydroquinone, phenoxyhydroquinone, 4,4'-dihydroxybiphenyl, 4,4'-dihydroxydiphenyl ether, 4,4'-dihydroxydiphenyl sulfide, 4,4'-dihydroxydiphenylsulfone, 4,4'-dihydroxybenzophenone, 4,4'-dihydroxydiphenyl methane, bisphenol A, 1,1-di(4-hydroxyphenyl)cyclohexane, 1,2-bis(4-hydroxyphenoxy)ethane, 1,4-dihydroxynaphthalene, and 2,6-dihydroxynaphthalene.

These diol compounds may be used alone, or in combination of 2 or more kinds thereof.

The number average molecular weight of the polymer (polyurethane) that constitutes the hard segment is preferably from 300 to 1500 from a viewpoint of the melt-formability. The number average molecular weight of the polymer that constitutes the soft segment is preferably from 500 to 20,000, further preferably from 500 to 5,000, and particularly preferably from 500 to 3,000, from the viewpoints of the flexibility and the thermal stability of the polyurethane-based thermoplastic elastomer. In addition, the mass ratio (x:y) of the hard segment (x) and the soft segment (y) is preferably from 15:85 to 90:10, and further preferably from 30:70 to 90:10 from a viewpoint of the formability.

The polyurethane-based thermoplastic elastomer may be synthesized by copolymerization of the hard segment-forming polymer and the soft segment-forming polymer by a known method. As the polyurethane-based thermoplastic elastomer, for example, the thermoplastic polyurethane described in JP-A No. 5-331256 may be used.

A concomitant use of the polyester-based thermoplastic elastomer and the polyurethane-based thermoplastic elastomer is preferred since high adhesion and close contact with the reinforcing cord are achieved while controlling the elastic modulus.

—Polystyrene-Based Thermoplastic Elastomer—

Examples of the polystyrene-based thermoplastic elastomer that may be applied as the other elastomer in the tire (2) of the present invention include materials in which at least polystyrene constitutes a hard segment, and the other polymer (for example, polybutadiene, polyisoprene, hydrogenated polybutadiene, hydrogenated polyisoprene, or the like) constitutes a soft segment that is amorphous and has a low glass transition temperature. As the hard segment-forming polystyrene, for example, those obtained by a known radical polymerization method or ionic polymerization method may be suitably used, and examples thereof include polystyrene having anionic living polymerization.

Examples of the soft segment-forming polymer include polybutadiene, polyisoprene, poly(2,3-dimethyl-butadiene).

Examples of the combination of the hard segment and the soft segment described above include respective combinations of the hard segments and soft segments exemplified above. Among them, a combination of polystyrene/polybutadiene, or a combination of polystyrene/polyisoprene is preferred. In addition, the soft segment is preferably hydrogenated in order to suppress an unintended cross-linking reaction of the thermoplastic elastomer.

The number average molecular weight of the polymer (polystyrene) that constitutes the hard segment is preferably from 5,000 to 500,000, and preferably from 10,000 to 200,000.

The number average molecular weight of the polymer that constitutes the soft segment is preferably from 5,000 to 1,000,000, further preferably from 10,000 to 800,000, and particularly preferably from 30,000 to 500,000. Furthermore, the mass ratio (x:y) of the hard segment (x) and the soft segment (y) is preferably from 5:95 to 80:20, and further preferably from 10:90 to 70:30, from a viewpoint of the formability.

The polystyrene-based thermoplastic elastomer may be synthesized by copolymerization of the hard segment-forming polymer and the soft segment-forming polymer by a known method.

Examples of the polystyrene-based thermoplastic elastomer include styrene-butadiene-based copolymers [SBS (polystyrene-poly(butylene) block-polystyrene), SEBS (polystyrene-poly(ethylene/butylene) block-polystyrene)], styrene-isoprene copolymers [polystyrene-polyisoprene block-polystyrene), styrene-propylene-based copolymers [SEP (polystyrene-(ethylene/propylene) block), SEPS (polystyrene-poly(ethylene/propylene) block-polystyrene), SEEPS (polystyrene-poly(ethylene-ethylene/propylene) block-polystyrene), SEB (polystyrene(ethylene/butylene) block) and the like.

One of preferred aspects of the polystyrene-based thermoplastic elastomer is an acid-modified, polystyrene-based thermoplastic elastomer.

A concomitant use of the polyester-based thermoplastic elastomer and the polystyrene-based thermoplastic elastomer is preferred from control of the elastic modulus, and further concomitant use with the acid-modified, polystyrene-based thermoplastic elastomer is preferred from high adhesion, and better fracture state by the interaction of the polyester-based thermoplastic elastomer and the acid modification site.

—Polyolefin-Based Thermoplastic Elastomer—

Examples of the polyolefin-based thermoplastic elastomer that may be applied as the other elastomer in the tire (2) of the present invention include materials in which at least polyolefin constitutes a hard segment that is crystalline and has a high melting temperature, and the other polymer (for example, the polyolefin described above, another polyolefin, a polyvinyl compound) constitutes a soft segment that is amorphous and has a low glass transition temperature. Examples of the hard segment-forming polyolefin include polyethylene, polypropylene, isotactic polypropylene, and polybutene.

Examples of the polyolefin-based thermoplastic elastomer include olefin-α-olefin random copolymers and olefin block copolymers, and for example, include propylene block copolymers, ethylene-propylene copolymers, propylene-1-hexene copolymers, propylene-4-methyl-1 pentene copolymers, propylene-1-butene copolymers, ethylene-1-hexene copolymers, ethylene-4-methyl-pentene copolymers, ethylene-1-butene copolymers, 1-butene-1-hexene copolymers, 1-butene-4-methyl-pentene, ethylene-methacrylic acid copolymers, ethylene-methyl methacrylate copolymers, ethylene-ethyl methacrylate copolymers, ethylene-butyl methacrylate copolymers, ethylene-methyl acrylate copolymers, ethylene-ethyl acrylate copolymers, ethylene-butyl acrylate copolymers, propylene-methacrylic acid copolymers, propylene-methyl methacrylate copolymers, propylene-ethyl methacrylate copolymers, propylene-butyl methacrylate copolymers, propylene-methyl acrylate copolymers, propylene-ethyl acrylate copolymers, propylene-butyl acrylate copolymers, ethylene-vinyl acetate copolymers, and propylene-vinyl acetate copolymers.

The polyolefin-based thermoplastic elastomer is preferably a propylene block copolymer, an ethylene-propylene copolymer, a propylene-1-hexene copolymer, a propylene-4-methyl-1 pentene copolymer, a propylene-1-butene copolymer, an ethylene-1-hexene copolymer, an ethylene-4-methyl-pentene copolymer, an ethylene-1-butene copolymer, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, an ethylene-vinyl acetate copolymer, or a propylene-vinyl acetate copolymer, and further preferably an ethylene-propylene copolymer, a propylene-1-butene copolymer, an ethylene-1-butene copolymer, an ethylene-methyl methacrylate copolymer, an ethylene-methyl acrylate copolymer, an ethylene-ethyl acrylate copolymer, or an ethylene-butyl acrylate copolymer.

In addition, the polyolefin resin may be used in combination of 2 or more kinds thereof, such as a combination of ethylene and propylene. In addition, the content ratio of the polyolefin in the polyolefin-based thermoplastic elastomer is preferably 50 mass % or more and 100 mass % or less.

The number average molecular weight of the polyolefin-based thermoplastic elastomer is preferably from 5,000 to 10,000,000. When the number average molecular weight of the polyolefin-based thermoplastic elastomer is within 5,000 to 10,000,000, the mechanical properties of the thermoplastic resin material are satisfactory, and the workability is also excellent. The number average molecule weight is further preferably from 7,000 to 1,000,000, and particularly preferably from 10,000 to 1,000,000, from the similar viewpoints. This can further improve the mechanical properties and the workability of the thermoplastic resin material. In addition, the number average molecular weight of the polymer that constitutes the soft segment is preferably 200 to 6000 from the viewpoints of the toughness and the flexibility at low temperature. Furthermore, the mass ratio (x:y) of the hard segment (x) and the soft segment (y) is preferably from 50:50 to 95:5, and further preferably from 50:50 to 90:10, from a viewpoint of the formability.

One of preferred aspects of the polyolefin-based thermoplastic elastomer is an acid-modified, polyolefin-based thermoplastic elastomer.

A concomitant use of the polyester-based thermoplastic elastomer and the polyolefin-based thermoplastic elastomer is preferred from control of the elastic modulus, and further concomitant use with the acid-modified, olefin-based thermoplastic elastomer is preferred from high adhesion, and better fracture state by the interaction of the polyester-based thermoplastic elastomer and the acid modification site.

The polyolefin-based thermoplastic elastomer may be synthesized by copolymerization using a known method.

As the other elastomer in the tire (2) of the present invention, for example, a commercial product may be used.

As the polyurethane-based thermoplastic resin composition, for example, "ELASTOLLAN" series manufactured by BASF Corporation (for example, ET680, ET880, ET690, ET890), "KURAMIRON U" series manufactured by KURARAY CO., LTD (for example, 2000's, 3000's, 8000's, 9000's), "MIRACTON" series manufactured by Nippon Miractran Co, Ltd. (for example, XN-2001, XN-2004, P390RSUP, P480RSU1, P26MRNAT, E480, E580, P485, P985), or the like may be used.

As the polystyrene-based thermoplastic elastomer, for example, "TUFTEC" series manufactured by Asahi Kasei Corporation (for example, H1031, H1041, H1043, H1051, H1052, H1053, H1082, H1141, H1221, H1272), SEBS (8007, 8076, and the like), SEPS (2002, 2063, and the like) manufactured by KURARAY CO., LTD, or the like may be used.

Examples of the acid-modified, styrene-based thermoplastic elastomer include "TUFTEC" series manufactured by Asahi Kasei Corporation (for example, M1943, M1911, M1913), and FG19181G manufactured by Kraton Polymers LLC.

Examples of the polyolefin-based thermoplastic elastomer to be used include "TAFMER" series manufactured by Mitsui Chemicals, Inc. (for example, A0550S, A1050S, A4050S, A1070S, A4070S, A35070S, A1085S, A4085S, A7090, A70090, MH7007, MH7010, XM-7070, XM-7080, BL4000, BL2481, BL3110, BL3450, P-0275, P-0375, P-0775, P-0780, P-0280, P-0480, P-0680), "NUCREL" series of DuPont-Mitsui Polychemicals Co., Ltd. (for example, AN4214C, AN4225C, AN42115C, N0903HC, N0908C, AN42012C, N410, N1035, N1050H, N1108C, N1110H, N1207C, N1214, AN4221C, N1525, N1560, N0200H, AN4228C, AN4213C, N035C), "ELVALOY AC" series (for example, 1125AC, 1209AC, 1218AC, 1609AC, 1820AC, 1913AC, 2112AC, 2116AC, 2615AC, 2715AC, 3117AC, 3427AC, 3717AC), "ACRYFT" series and "ECATATEe" series of Sumitomo Chemical Company, Limited, and "ULTRACENT" series of TOSOH CORPORATION.

Examples of the acid-modified, olefin-based thermoplastic elastomer include the "TAFMER" series manufactured by Mitsui Chemicals, Inc. (for example, MA8510, MH7007, MH7010, MH7020, MP0610, MP0620, and the like).

The mass ratio (a:b) of the polyester-based thermoplastic elastomer (a) and the other elastomer (b) in the thermoplastic resin in the tire (2) of the present invention is preferably from 50:50 to 95:5. When the mass ratio of these elastomers is within the range of from 50:50 to 95:5, the polyamide-based elastomer and the other elastomer form the sea-island structure in which the polyester-based thermoplastic elastomer is the "sea", and it is possible to easily control the elastic modulus of the tire, while maintaining the weldability between the reinforcing cord member and the tire frame by the polyester-based thermoplastic elastomer, whereby it is possible to attain the balance between the durability and the impact resistance of the tire. The mass ratio (a:b) of the polyester-based thermoplastic elastomer (a) and the other elastomer (b) is further preferably from 50:50 to 90:10. When the other elastomer is concomitantly used in 2 or more kinds thereof, the total amount of the other elastomers in total and the polyester-based thermoplastic elastomer is preferably within the ranges.

The melting temperature of the thermoplastic resin including the polyester-based thermoplastic elastomer and the other elastomer in the tire (2) of the present invention is generally from about 100° C. to 350° C., but is preferably from about 100 to 250° C., and further preferably from 120° C. to 200° C., from a viewpoint of the tire productivity. With use of a thermoplastic resin material which contains the polyester-based thermoplastic elastomer and the other elastomer and has a melting temperature of 120 to 200° C., for example, it is possible to set the heating temperature of the jointing part to a temperature equal to or higher than the melting temperature of the thermoplastic resin material that forms the tire frame, when the divided bodies (frame pieces) are fused to form the tire frame.

In addition, the total content ratio of the polyester-based thermoplastic elastomer and the other elastomer in the thermoplastic resin material in the tire (2) of the present invention is not particularly limited, but is preferably 50 mass % or more with respect to the total amount of the thermoplastic resin material. When the total content ratio of the polyester-based thermoplastic elastomer and the other elastomer with respect to the total amount of the thermoplastic resin material is 50 mass % or more, properties of respective elastomers can be sufficiently exerted, and the durability and the productivity of the tire are improved.

The thermoplastic resin material applied to the tire frame in the tire (2) of the present invention may contain a variety of additives such as a rubber, another thermoplastic elastomer, a thermoplastic resin, a variety of fillers (for example, silica, calcium carbonate, clay), an anti-aging agent, oil, a plasticizer, a colorant, a weather resistant agent, or a reinforcing material, if desired.

The thermoplastic resin material applied to the tire frame in the tire (2) of the present invention may be obtained by, for example, mixing the polyester-based thermoplastic elastomer and the other elastomer, adding respective additives if necessary, and melting and mixing them. The mixing ratio of the polyester-based thermoplastic elastomer and the other elastomer is pursuant to the ratio described previously. The resin material obtained through the melting and mixing may be made into a pellet before use, if necessary.

—Property of Thermoplastic Resin Material—

The tensile elastic modulus set forth in JIS K7113: 1995 of the thermoplastic resin material containing the polyester-based thermoplastic elastomer and the other elastomer in the tire (2) of the present invention (hereinafter, the "elastic modulus" means a tensile elastic modulus unless particularly specified in the present specification) is preferably from 100 to 1,000 MPa, further preferably from 100 to 800 MPa, and particularly preferably from 100 to 700 MPa. When the tensile elastic modulus of the thermoplastic resin material is from 100 to 1000 MPa, it is possible to effectively perform the rim fitting while retaining the shape of the tire frame.

The tensile yield strength set forth in JIS K7113: 1995 of the thermoplastic resin material containing the polyester-based thermoplastic elastomer and the other elastomer in the tire (2) of the present invention is preferably 5 MPa or more, preferably from 5 to 20 MPa, and further preferably from 5 to 17 MPa. When the tensile yield strength of the thermoplastic resin material is 5 MPa or more, it is possible to bear with deformation for the load on the tire at the time of the running, and the like.

The tensile yield elongation set forth in JIS K7113: 1995 of the thermoplastic resin material containing the polyester-based thermoplastic elastomer and the other elastomer in the tire (2) of the present invention is preferably 10% or more, preferably from 10 to 70%, and further preferably from 15 to 60%. When the tensile yield elongation of the thermoplastic resin material is 10% or more, the elastic region is large, and the fittability onto a rim can be improved.

The tensile elongation at break set forth in JIS K7113: 1995 of the thermoplastic resin material containing the polyester-based thermoplastic elastomer and the other elastomer in the tire (2) of the present invention is preferably 50% or more, preferably 100% or more, further preferably 150% or more, and particularly preferably 200% or more. When the tensile elongation at break of the thermoplastic resin material is 50% or more, the fittability onto a rim is good, and it is possible to render the thermoplastic resin material to hardly fracture against the collision.

The deflection temperature under load set forth in ISO75-2 or ASTM D648 (at the load of 0.45 MPa) of the thermoplastic resin material containing the polyester-based thermoplastic elastomer and the other elastomer in the tire (2) of the present invention is preferably 50° C. or more, preferably from 50 to 150° C., and further preferably from 50 to 130° C. When the deflection temperature under load of the thermoplastic resin material is 50° C. or more, it is possible to suppress deformation of the tire frame even in a case where vulcanization is performed in the manufacture of the tire.

<Thermoplastic Resin Material Applied to the Tire Frame in the Tire (3)>

The tire (3) of the present invention has a circular tire frame formed of a thermoplastic resin material including at least a polyester-based thermoplastic elastomer and a rubber.

—Polyester-Based Thermoplastic Elastomer—

The polyester-based thermoplastic elastomer is a polymer compound having elasticity, which is a thermoplastic resin material formed of a copolymer that contains a polymer that constitutes the hard segment, which is crystalline and has high melting temperature, and a polymer that constitutes the soft segment, which is amorphous and has low glass transition temperature, and thus those having a polyester resin as a polymer that constitutes the hard segment. Examples of the polyester-based thermoplastic elastomer applied to the tire (3) include ester-based thermoplastic elastomers which are set forth in JIS K6418:2007, and the like.

The details of the polyester-based thermoplastic elastomer applied to the tire frame in the tire (3) of the present invention are similar to those of the polyester-based thermoplastic elastomer applied to the tire frame in the tire (1). The matters pertaining to the polyester-based thermoplastic elastomer described for the tire (1) of the present invention are applied similarly to the polyester-based thermoplastic elastomer in the tire (3) except for the matters particularly mentioned to be applied only to the tire (3) in the description below.

—Rubber—

The "rubber" is a polymer compound having elasticity.

As described previously, the "rubber" is distinguished in the present specification from the thermoplastic elastomer that is a thermoplastic resin material formed of a copolymer that contains a polymer constituting a hard segment, that is crystalline and has a high melting temperature, and a polymer constituting a soft segment, that is amorphous and has a low glass transition temperature.

Examples of the rubber applied to the tire frame in the tire (3) of the present invention are not particularly limited, but include a natural rubber (NR), an isoprene rubber (IR), a butadiene rubber (BR), a styrene-butadiene copolymerized rubber (SBR), an acrylonitrile-butadiene copolymerized rubber (NBR), a chloroprene rubber (CR), a butyl rubber (IIR), a halogenated butyl rubber (Br-IIR, Cl-IIR, and the like), an ethylene-propylene-diene rubber (EPDM), and the like. NIR obtained by replacing all of the butadienes of an acrylonitrile-butadiene copolymerized rubber with isoprene, or NBIR obtained by replacing a portion of the butadiene with isoprene may also be used.

Among them, the rubber is preferably BR, SBR, NBR, NIR, IR, EPDM and NBIR, and more preferably BR, SBR, NBR, IR, and EPDM from a viewpoint of easy control of the flexibility of the thermoplastic resin material.

As the rubber, a vulcanized rubber by vulcanizing the rubber may be used from viewpoints of enhancing the elastic modulus of the rubber, immobilizing the particle size of the dispersed rubber and improving the creep. The vulcanization of the rubber may be performed with a known method, for example, with the method described in JP-A No. 11-048264, JP-A No. 11-029658, JP-A No. 2003-238744, and the like. In blending with the polyester-based thermoplastic elastomer, the rubber is preferably pulverized for miniaturization, and injected.

Particularly, dynamic cross-linking is preferably used, in which dispersion and cross-linking of the rubber (vulcanization) are performed while kneading the polyester-based thermoplastic elastomer and the rubber.

The vulcanization of the rubber may be performed by blending the aforementioned rubber arbitrarily with, for example, a reinforcing material such as carbon black, a filler, a vulcanizing agent, a vulcanization promoter, an aliphatic acid or a salt thereof, metal oxide, process oil, an anti-aging agent, and the like, kneading the blend with use of a Banbury mixer, and then heating it at from 120° C. to 200° C.

As the vulcanizing agent, a known vulcanizing agent, for example, sulfur, organic peroxide, a resin vulcanizing agent, and the like are used.

As the vulcanization promoter, a known vulcanization promoter, for example, aldehydes, ammonias, amines, guanidines, thioureas, thiazoles, sulfenamides, thiurams, dithiocarbamates, xanthates, and the like are used.

Examples of the aliphatic acid include stearic acid, palmitic acid, myristic acid, lauric acid, and the like, and they may be blended in a state of a salt thereof such as zinc stearate. Among them, stearic acid is preferable.

In addition, examples of the metal oxide include zinc oxide (ZnO), iron oxide, magnesium oxide, and the like. Among them, zinc oxide is preferable.

As the process oil, any of aromatic-based, naphthene-based or paraffin-based oils may be used.

Examples of the anti-aging agent include amine-ketone-based, imidazole-based, amine-based, phenol-based, sulfur-based and phosphorus-based agents, and the like.

In the tire (3) of the present invention, the mass ratio (x:y) of the polyester-based thermoplastic elastomer (x) and the rubber (y) in the thermoplastic resin [the mass ratio (x:y') of the polyester-based thermoplastic elastomer (x), and the total amount (y') of the rubber and the thermoplastic elastomer other than the polyester-based thermoplastic elastomer when the thermoplastic resin contains the thermoplastic elastomer other than the polyester-based thermoplastic elastomer] is preferably from 95:5 to 50:50. When the mass ratio of these elastomers is within a range of from 95:5 to 50:50, it is possible for the polyester-based thermoplastic elastomer and the rubber to grant properties of the rubber while maintaining properties of the polyester-based thermoplastic elastomer. Furthermore, it is possible to easily control the elastic modulus of the tire and improve the durability of the tire while maintaining weldability of the reinforcing cord member and the tire frame by the polyester-based thermoplastic elastomer. Both of the (x:y) and the (x:y') are more preferably 90:10 to 50:50.

—Thermoplastic Elastomer Having High Affinity for Rubber—

The thermoplastic resin material in the tire (3) of the present invention may contain a thermoplastic elastomer having high affinity for the rubber. Hereinafter, the thermoplastic elastomer having high affinity for the rubber is also referred to as the "rubber-philic thermoplastic elastomer".

With the thermoplastic resin material further containing the rubber-philic thermoplastic elastomer, the rubber may be finely dispersed in the thermoplastic resin material. Furthermore, when the rubber-philic thermoplastic elastomer is the acid-modified thermoplastic elastomer described below, it is contemplated that the tensile strength improves, and the ductile fracture occurs even if fractured, and the brittle fracture or lamellar fracture hardly occurs by the interaction of the polyester-based thermoplastic elastomer and the acid modification site. The distinction of the ductile fracture, the brittle fracture and the lamellar fracture can be identified by visual observation of the fracture surface of the thermoplastic resin material.

Herein, the "having high affinity for the rubber" refers to the state in which the molecular skeleton of the rubber and the molecular skeleton of the thermoplastic elastomer are similar to each other, and the rubber is incorporated into the dispersed particles of the thermoplastic elastomer, or the thermoplastic elastomer is incorporated into the dispersed particles of the rubber when the thermoplastic elastomer and the rubber are mixed together.

However, not all of the thermoplastic elastomer and the rubber in the thermoplastic resin material are necessarily in the aforementioned state, but a portion of the thermoplastic elastomer and the rubber in the thermoplastic resin material may be in the aforementioned state.

For example, when the skeleton that constitutes the main chain of the polymer constituting the hard segment or the soft segment of the thermoplastic elastomer is similar to the skeleton that constitutes the main chain of the rubber, it is contemplated that the thermoplastic elastomer has high affinity for the rubber. Specifically, examples of the rubber-philic thermoplastic elastomer with respect to a styrene-butadiene copolymerized rubber (SBR) include a polystyrene-based thermoplastic elastomer. In addition, examples of the rubber-philic thermoplastic elastomer with respect to a butadiene rubber (BR), an ethylene-propylene-diene rubber (EPDM) include a polyolefin-based thermoplastic elastomer.

In addition, the rubber-philic thermoplastic elastomer is preferably an acid-modified thermoplastic elastomer in which an acid group (for example, a carboxy group) is introduced to a portion of the thermoplastic elastomer molecule. The acid modification of the rubber-philic thermoplastic elastomer can improve fine dispersion of the rubber through the interaction of the polyester-based thermoplastic elastomer and the acid modification site in the thermoplastic resin material.

The rubber-philic thermoplastic elastomer is a thermoplastic elastomer other than the polyester thermoplastic elastomer, and is not particularly limited as long as it is a thermoplastic elastomer having high affinity for the rubber. Examples of the rubber-philic thermoplastic elastomer include a polyolefin-based thermoplastic elastomer, a polystyrene-based thermoplastic elastomer, a polyester-based thermoplastic elastomer, a polyurethane-based thermoplastic elastomer, and the like. The rubber-philic thermoplastic elastomer is preferably a polyolefin-based thermoplastic elastomer or a styrene-based thermoplastic elastomer.

Next, the polyolefin-based thermoplastic elastomer, the polystyrene-based thermoplastic elastomer, the polyamide-based thermoplastic elastomer, and the polyurethane-based thermoplastic elastomer will be described, which can be applied as the rubber-philic thermoplastic elastomer.

(Polyolefin-Based Thermoplastic Elastomer)

The polyolefin-based thermoplastic elastomer refers to a polymer compound having elasticity, which is a thermoplastic resin material formed of a copolymer that contains a polymer constituting the hard segment, that is crystalline and has a high melting temperature, and a polymer constituting the soft segment, that is amorphous and has a low glass transition temperature, in which the polymer that constitutes the hard segment is a polyolefin such as polypropylene and polyethylene.

Examples of the polyolefin-based thermoplastic elastomer that can be applied to the tire (3) of the present invention include materials in which at least polyolefin constitutes the hard segment that is crystalline and has a high melting temperature, and the polyolefin and an olefin other than the polyolefin constitute the soft segment that is amorphous and has a low glass transition temperature.

Examples of the hard segment-forming polyolefin include polypropylene, isotactic polypropylene, polyethylene, 1-butene, and the like.

Examples of the polyolefin-based thermoplastic elastomer include ethylene-propylene copolymers, propylene-1-hexene copolymers, propylene-4-methyl-1-pentene copolymers, propylene-1-butene copolymers, ethylene-1-hexene copolymers, ethylene-4-methyl-pentene copolymers, ethylene-1-butene copolymers, 1-butene-1-hexene copolymers, 1-butene-4-methyl-pentene, ethylene-methacrylic acid copolymers, ethylene-methyl methacrylate copolymers, ethylene-ethyl methacrylate copolymers, ethylene-butyl methacrylate copolymers, ethylene-methyl acrylate copolymers, ethylene-ethyl acrylate copolymers, ethylene-butyl acrylate copolymers, propylene-methacrylic acid copolymers, propylene-methyl methacrylate copolymers, propylene-ethyl methacrylate copolymers, propylene-butyl methacrylate copolymers, propylene-methyl acrylate copolymers, propylene-ethyl acrylate copolymers, propylene-butyl acrylate copolymers, ethylene-vinyl acetate copolymers, propylene-vinyl acetate copolymers, and the like.

The polyolefin-based thermoplastic elastomer that can be applied to the tire (3) of the present invention is preferably ethylene-propylene copolymers, propylene-1-hexene copolymers, propylene-4-methyl-1-pentene copolymers, propylene-1-butene copolymers, ethylene-1-hexene copolymers, ethylene-4-methyl-pentene copolymers, ethylene-1-butene copolymers, ethylene-methacrylic acid copolymers, ethylene-methyl methacrylate copolymers, ethylene-ethyl methacrylate copolymers, ethylene-butyl methacrylate copolymers, ethylene-methyl acrylate copolymers, ethylene-ethyl acrylate copolymers, ethylene-butyl acrylate copolymers, propylene-methacrylic acid copolymers, propylene-methyl methacrylate copolymers, propylene-ethyl methacrylate copolymers, propylene-butyl methacrylate copolymers, propylene-methyl acrylate copolymers, propylene-ethyl acrylate copolymers, propylene-butyl acrylate copolymers, ethylene-vinyl acetate copolymers or propylene-vinyl acetate copolymers, and further preferably ethylene-propylene copolymers, propylene-1-butene copolymers, ethylene-1-butene copolymers, ethylene-1-hexene copolymers, and propylene-1-hexene copolymers.

The number average molecular weight of the polyolefin-based thermoplastic elastomer that can be applied to the tire (3) of the present invention is preferably from 5,000 to 10,000,000. When the number average molecular weight is less than 5,000, it is feared that the mechanical properties of the resin composite material deteriorate. When the number average molecular weight is more than 10,000,000, it is feared that the workability of the resin composite material is problematic. For the similar reasons to those described above, the number average molecular weight of the polyolefin-based thermoplastic elastomer is from 7,000 to 1,000,000. The number average molecular weight of the polyolefin-based thermoplastic elastomer is particularly preferably from 10,000 to 1,000,000. This can further improve mechanical properties and the workability of the resin composite material.

The polyolefin-based thermoplastic elastomer can be synthesized with copolymerization of the polymer constituting the hard segment and the polymer constituting the soft segment by a known method.

As the polyolefin-based thermoplastic elastomer that can be applied to the tire (3) of the present invention, for example, commercial products such as Prime TPO (registered trademark) manufactured by Prime Polymer Co., Ltd., TAFMER (registered trademark) manufactured by Mitsui Chemicals, Inc. and the like may be used.

(Polystyrene-Based Thermoplastic Elastomer)

The polystyrene-based thermoplastic elastomer refers to a polymer compound having elasticity, which is a thermoplastic resin material formed of a copolymer that contains a polymer constituting the hard segment and the polymer constituting the soft segment, which is amorphous and has a low glass transition temperature, in which the polymer constituting the hard segment contains polystyrene.

The polystyrene-based thermoplastic elastomer that can be applied to the tire (3) of the present invention is not particularly limited, but includes copolymers in which polystyrene constitutes the hard segment, and an amorphous polymer constitutes the soft segment having a low glass transition temperature (for example, polyethylene, polybutadiene, polyisoprene, hydrogenated polybutadiene, hydrogenated polyisoprene, poly(2,3-dimethyl-butadiene), and the like).

Examples of the polymer constituting the soft segment include polyethylene, polybutadiene, polyisoprene, hydrogenated polybutadiene, hydrogenated polyisoprene, poly(2,3-dimethyl-butadiene), and the like.

A number average molecular weight of the polymer constituting the hard segment (polystyrene) of the polystyrene-based thermoplastic elastomer that can be applied to the tire (3) of the present invention is preferably from 5,000 to 500,000, and is more preferably from 10,000 to 200,000.

The number average molecular weight of the polymer constituting the soft segment is preferably from 5,000 to 1,000,000, more preferably from 10,000 to 800,000, and further preferably from 30,000 to 500,000.

Furthermore, a mass ratio (Hs:Ss) of the hard segment (Hs) and the soft segment (Ss) is preferably from 5:95 to 80:20, and further preferably from 10:90 to 70:30 from viewpoints of the formability and the physical properties.

The polystyrene-based thermoplastic elastomer can be synthesized with copolymerization of the polymer constituting the hard segment and the polymer constituting the soft segment by a known method.

As the polystyrene-based thermoplastic elastomer that can be applied to the tire (3) of the present invention, for example, commercial products such as Tufprene (registered trademark) and TUFTEC (registered trademark) manufactured by Asahi Kasei Corporation, SEPTON (registered trademark) manufactured by KURARAY CO., LTD, and the like may be used.

The polystyrene-based thermoplastic elastomer (including acid-modified products) that can be applied to the tire (3) is preferably hydrogenated in order to suppress the thermoplastic resin material from causing unintended cross-linking reaction. Examples of the other thermoplastic elastomer and the acid-modified elastomer of the hydrogenated type (SEBS, SEPS) include TUFTEC (registered trademark) manufactured by Asahi Kasei Corporation, SEPTON (registered trademark) manufactured by KURARAY CO., LTD, and the like.

(Polyamide-Based Thermoplastic Elastomer)

The polyamide-based thermoplastic elastomer means a polymer compound having elasticity, which is a thermoplastic resin material formed of a copolymer that contains a polymer constituting the hard segment, that is crystalline and has a high melting temperature, and the polymer constituting the soft segment, that is amorphous and has a low glass transition temperature, and thus those having an amide bond (—CONH—) in the main chain of the polymer constituting the hard segment. Examples of the polyamide-based thermoplastic elastomer may include the amide-based thermoplastic elastomers (TPA), and the like which are set forth in JIS K6418:2007, and the polyamide-based thermoplastic elastomers, and the like described in JP-A No. 2004-346273.

The polyamide-based thermoplastic elastomer that can be applied to the tire (3) of the present invention include materials in which at least polyamide constitutes the hard segment that is crystalline and has a high melting temperature, and the other polymer (for example, polyester or polyether, and the like) constitutes the soft segment that is amorphous and has a low glass transition temperature. In addition, the polyamide-based thermoplastic elastomer may use a chain-length elongating agent such as dicarboxylic acid in addition to the hard segment and the soft segment. Examples of the polyamide forming the hard segment may include polyamides generated with a monomer represented by the following Formula (1) or Formula (2) described below.

$$H_2N-R^1-COOH \qquad \text{Formula (1)}$$

In Formula (1), $R^1$ represents a hydrocarbon molecular chain having a carbon number of from 2 to 20, or an alkylene group having a carbon number of from 2 to 20.

Formula (2)

In Formula (2), $R^2$ represents a hydrocarbon molecular chain having a carbon number of from 3 to 20, or an alkylene group having a carbon number of from 3 to 20.

In Formula (1), $R^1$ is preferably a hydrocarbon molecular chain having a carbon number of from 3 to 18 or an alkylene group having a carbon number of from 3 to 18, further preferably a hydrocarbon molecular chain having a carbon number of from 4 to 15 or an alkylene group having a carbon number of from 4 to 15, and particularly preferably a hydrocarbon molecular chain having a carbon number of from 10 to 15 or an alkylene group having a carbon number of from 10 to 15. In addition, in the general formula (2), $R^2$ is preferably a hydrocarbon molecular chain having a carbon number of from 3 to 18 or an alkylene group having a carbon number of from 3 to 18, further preferably a hydrocarbon molecular chain having a carbon number of from 4 to 15 or an alkylene group having a carbon number of from 4 to 15, and particularly preferably a hydrocarbon molecular chain having a carbon number of from 10 to 15 or an alkylene group having a carbon number of from 10 to 15.

Examples of the monomer represented by the general formula (1) or the general formula (2) include ω-aminocarboxylic acid and lactam. In addition, examples of the polyamide forming the hard segment include a polycondensate of these ω-aminocarboxylic acid and lactam, a co-condensation polymer of diamine and dicarboxylic acid, and the like.

Examples of the ω-aminocarboxylic acid may include an aliphatic ω-aminocarboxylic acid having a carbon number of from 5 to 20 such as 6-aminocaproic acid, 7-aminoheptanoic acid, 8-aminooctanoic acid, 10-aminocapric acid, 11-aminoundecanoic acid and 12-aminododecanoic acid, and the like. In addition, examples of the lactam may include an aliphatic lactam having a carbon number of from 5 to 20 such as lauryl lactam, ε-caprolactam, undecanolactam, ω-enantholactam and 2-pyrrolidone, and the like.

Examples of the diamine may include diamine compounds such as aliphatic diamines having a carbon number 2 to 20, e.g., ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, 3-methylpentamethylene diamine and m-xylene diamine. In addition, the dicarboxylic acid may be represented by HOOC—$(R^3)$m—COOH($R^3$ is a hydrocarbon molecular chain having a carbon number of from 3 to 20, and m is 0 or 1), and may include, for example, aliphatic dicarboxylic acids having a carbon number of from 2 to 20 such as oxalic acid, succinic acid, glutaric acid, adipic acid, pimelic acid, suberic acid, azelaic acid, sebacic acid and dodecanedioic acid.

As the polyamide forming the hard segment, polyamides obtained by ring-opening polycondensation of lauryl lactam, ε-caprolactam or undecanolactam may be preferably used.

In addition, examples of the soft segment-forming polymer in the polyamide-based thermoplastic elastomer that can be applied to the tire (3) of the present invention, include polyester, polyether, and include, for example, polyethylene glycol, polypropylene glycol, polytetramethylene ether glycol, ABA type triblock polyether, and the like, which may be used alone or in a combination of 2 or more kinds thereof. In addition, polyether diamine obtained by reacting ammonia, and the like to the end of polyether, and the like may be used.

Herein, the "ABA type triblock polyether" means a polyether represented by the following Formula (3).

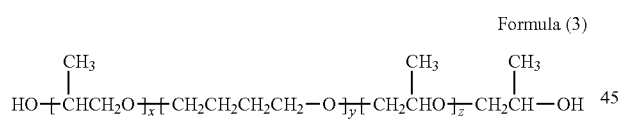

Formula (3)

In Formula (3), x and z represent an integer of 1 to 20. y represents an integer of 4 to 50.

In Formula (3), x and z are preferably an integer of 1 to 18, respectively, further preferably an integer of 1 to 16, and particularly preferably an integer of 1 to 14, and most preferably an integer of 1 to 12. In addition, in the general formula (3), y is preferably an integer of 5 to 45, respectively, further preferably an integer of 6 to 40, and particularly preferably an integer of 7 to 35, and most preferably an integer of 8 to 30.

In the polyamide-based thermoplastic elastomer that can be applied to the tire (3) of the present invention, examples of the combination of the hard segment and the soft segment may include each combination of the hard segment and the soft segment exemplified above. Among them, the combination is preferably a combination of a ring-opening polycondensate of lauryl lactam/polyethylene glycol, a combination of a ring-opening polycondensate of lauryl lactam/polypropylene glycol, a combination of a ring-opening polycondensate of lauryl lactam/polytetramethylene ether glycol, a combination of a ring-opening polycondensate of lauryl lactam/ABA type triblock polyether, and particularly preferably a combination of an open loop polycondensate of lauryl lactam/ABA type triblock polyether.

A number average molecular weight of the polymer constituting the hard segment (polyamide) in the polyamide-based thermoplastic elastomer that can be applied to the tire (3) of the present invention, is preferably from 300 to 15,000 from a viewpoint of the melt-formability. In addition, the number average molecular weight of the polymer constituting the soft segment is preferably from 200 to 6,000 from viewpoints of the toughness and the flexibility at low temperature. Furthermore, a mass ratio (Ha:Sa) of the hard segment (Ha) and the soft segment (Ha) is preferably from 50:50 to 90:10, and further preferably from 50:50 to 80:20 from a viewpoint of the formability.

The polyamide-based thermoplastic elastomer can be synthesized with copolymerization of the hard segment-forming polymer and the soft segment-forming polymer by a known method.

As the polyamide-based thermoplastic elastomer that can be applied to the tire (3) of the present invention, for example, commercial products such as "UBESTA, XPA" (registered trademark) series of Ube Industries, Ltd. (for example, XPA9063X1, XPA9055X1, XPA9048X2, XPA9048X1, XPA9040X1, XPA9040X2, and the like), "VESTAMID" (registered trademark) series of Daicel-Evonik, Ltd. (for example, E40-S3, E47-S1, E47-S3, E55-S1, E55-S3, EX9200, and E50-R2), and the like may be used.

(Polyurethane-Based Thermoplastic Elastomer)

Examples of the polyurethane-based thermoplastic elastomer include materials in which at least polyurethane constitutes a hard segment that forms pseudocross-linking by physical cohesion, and the other polymer constitutes the soft segment that is amorphous and has a low glass transition temperature, and for example, may be represented by a copolymer that contains a soft segment containing a unit structure represented by the following Formula A, and a hard segment containing a unit structure represented by the following Formula B.

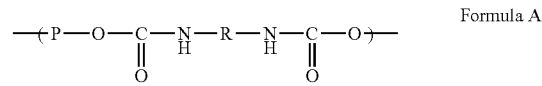

Formula A

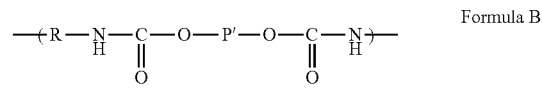

Formula B

In Formula A, P represents a long chain aliphatic polyether or a long chain aliphatic polyester. In Formula A or Formula B, R represents an aliphatic hydrocarbon, an alicyclic hydrocarbon, or an aromatic hydrocarbon. In Formula B, P' represents a short chain aliphatic hydrocarbon, an alicyclic hydrocarbon, or an aromatic hydrocarbon.

The details of the polyurethane-based thermoplastic elastomer applied to the tire (7) are similar to those of the polyamide-based thermoplastic elastomer applied to the tire (2), including the matters pertaining to the copolymer that contains the soft segment containing the unit structure represented by Formula A and the hard segment containing the unit structure represented by Formula B.

The matters pertaining to the polyurethane-based thermoplastic elastomer described in the tire (3) are applied similarly to the polyurethane-based thermoplastic elastomer in the tire (7), except for the matters particularly mentioned to be applied only to the tire (7) in the description below.

Meanwhile, a number average molecular weight of the polymer constituting the hard segment (polyurethane) in the polyurethane-based thermoplastic elastomer that can be applied to the tire (3) is preferably from 300 to 1,500 from a viewpoint of the melt-formability. In addition, the number average molecular weight of the polymer constituting the soft segment is preferably from 500 to 20,000, further preferably from 500 to 5,000, and particularly preferably from 800 to 2,500 from viewpoints of the flexibility and the thermal stability of the polyurethane-based thermoplastic elastomer. In addition, a mass ratio (Hu:Su) of the hard segment (Hu) and the soft segment (Su) is preferably from 50:50 to 90:10, and further preferably from 50:50 to 80:20 from a viewpoint of the formability.

A mass ratio (z:y) of the rubber-philic thermoplastic elastomer (z) and the rubber (y) in the thermoplastic resin material in the tire (3) of the present invention, is preferably from 95:5 to 0:100, and more preferably from 90:10 to 0:100.

In addition, a total content of the polyester-based thermoplastic elastomer and the rubber (the polyester-based thermoplastic elastomer, the rubber, and the rubber-philic thermoplastic elastomer in a case where the thermoplastic resin material contains the rubber-philic thermoplastic elastomer) in the thermoplastic resin material in the tire (3) of the present invention, is not particularly limited, but is preferably from 50 mass % to 100 mass % with respect to the total amount of the thermoplastic resin material. When the total content is 50 mass % or more with respect to the total amount of the thermoplastic resin material, the properties of the thermoplastic resin material can be sufficiently exerted.

The thermoplastic resin material in the tire (3) of the present invention may contain a variety of additives such as another thermoplastic elastomer other than the polyester-based thermoplastic elastomer, a thermoplastic resin, a variety of fillers (for example, silica, calcium carbonate, clay), an anti-aging agent, oil, a plasticizer, a colorant, a weather resistant agent and a reinforcing material, if desired.

In obtaining the thermoplastic resin material in the tire (3) of the present invention, the polyester-based thermoplastic elastomer and the rubber described previously, and if necessary, the rubber-philic thermoplastic elastomer, the additives, and the like may be mixed in the amount ratio described previously, and kneaded.

In mixing and kneading each component, for example, LABOPLASTOMILL 50MR biaxial extruder manufactured by Toyo Seiki Manufacturing Co. may be used.

A vulcanized rubber may be injected as finely pulverized to the biaxial extruder, or the rubber may be kneaded with a vulcanizing agent, and the like with Banbury, and the like, and then vulcanized while kneading in the biaxial extruder. The vulcanization while kneading in the biaxial extruder is preferable.

—Property of the Thermoplastic Resin Material—

A tensile elastic modulus set forth in JIS K7113:1995 of the thermoplastic resin material (hereinafter, the "elastic modulus" means the tensile elastic modulus unless particularly specified in the present specification) in the tire (3) of the present invention is preferably from 100 to 1,000 MPa, further preferably from 100 to 800 MPa, and particularly preferably from 100 to 700 MPa. When the tensile elastic modulus of the thermoplastic resin material is from 100 to 1,000 MPa, it is possible to effectively perform rim fitting while retaining the shape of the tire frame.

A tensile yield strength set forth in JIS K7113:1995 of the thermoplastic resin material in the tire (3) of the present invention, is preferably 5 MPa or more, preferably from 5 to 20 MPa, and further preferably from 5 to 17 MPa. When the tensile yield strength of the thermoplastic resin material is 5 MPa or more, it is possible to bear with deformation for the load on the tire at the time of the running, and the like.

A tensile yield elongation set forth in JIS K7113:1995 of the thermoplastic resin material in the tire (3) of the present invention, is preferably 10% or more, more preferably from 10% to 70%, and further preferably from 15% to 60%. When the tensile yield elongation of the thermoplastic resin material is 10% or more, the elastic region is large, and fittability onto a rim can be improved.

A tensile elongation at break set forth in JIS K7113:1995 of the thermoplastic resin material in the tire (3) of the present invention, is preferably 50% or more, preferably 100% or more, further preferably 150% or more, and particularly preferably 200% or more. When the tensile elongation at break of the thermoplastic resin material is 50% or more, the fittability onto a rim are good, and it is possible to render the thermoplastic resin material to hardly fracture against the collision.

A deflection temperature under load set forth in ISO75-2 or ASTM D648 of the thermoplastic resin material (at the load of 0.45 MPa) in the tire (3) of the present invention, is preferably 50° C. or higher, preferably from 50° C. to 150° C., and further preferably from 50° C. to 130° C. When the deflection temperature under load of the thermoplastic resin material is 50° C. or higher, it is possible to suppress deformation of the tire frame even in a case where vulcanization is performed in the manufacture of the tire.

<Thermoplastic Resin Material Applied to the Tire Frame in the Tire (4)>

The tire (4) of the present invention is a tire that has a circular tire frame formed of a thermoplastic resin material, in which the thermoplastic resin material includes the polyester-based thermoplastic elastomer (A) having the hard segment and the soft segment containing a polyester resin, and the polyester resin (B) other than the thermoplastic elastomer.

As the thermoplastic resin material that constitutes the circular tire frame that forms the tire in the tire (4) of the present invention, a combination of the polyester-based thermoplastic elastomer (A) and the polyester resin (B) other than the thermoplastic elastomer may be applied, whereby to obtain a tire of which rolling resistance hardly rises, and which is excellent in the durability.

Hereinafter, the polyester-based thermoplastic elastomer (A) and the polyester resin (B) other than the thermoplastic elastomer will be described.

[Polyester-Based Thermoplastic Elastomer (A)]

The polyester-based thermoplastic elastomer (A) in the present invention is a polymer compound having elasticity, which is a thermoplastic resin material formed of a copolymer that contains the polymer constituting the hard segment, that is crystalline and has a high melting temperature and the polymer constituting the soft segment, that is amorphous and has a low glass transition temperature, and thus those having a polyester resin as the polymer constituting the hard segment. Examples of the polyester-based thermoplastic elastomer include the ester-based thermoplastic elastomers (TPC) set forth in JIS K6418:2007, and the like.

The details of the polyester-based thermoplastic elastomer (A) applied to the tire frame in the tire (4) of the present invention are similar to those of the polyester-based thermoplastic elastomer applied to the tire frame in the tire (1) of the present invention. The matters pertaining to the polyester-based thermoplastic elastomer described in the tire (1) are similarly applied to the polyester-based thermoplastic elastomer (A) in the tire (4) except for the matters particularly mentioned to be applied only to the tire (4) in the description below.

The polyester-based thermoplastic elastomer (A) contained in the thermoplastic resin material in the tire (4) of the present invention may be in a combination of 2 or more kinds, however, it is preferable that the polyester-based thermoplastic elastomer (A) be in one kind from a viewpoint of controlling the tire performances of the tire formed with use of the thermoplastic resin material.

[Polyester Resin (B)]

The thermoplastic resin material in the tire (4) of the present invention contains the polyester resin (B) other than the thermoplastic elastomer. The polyester-based resin is a resin having an ester bond in the main chain.

The polyester resin (B) is not particularly limited, but is preferably the same kind of the resin as the polyester resin contained in the hard segment in the polyester-based thermoplastic elastomer (A), and is more preferably crystalline polyester.

As the crystalline polyester, aromatic polyester may be used. The aromatic polyester may be formed of, for example, aromatic dicarboxylic acid or an ester-forming derivative thereof and aliphatic diol.

Examples of the aromatic polyester include polyethylene terephthalate, polybutylene terephthalate, polystyrene terephthalate, polyethylene naphthalate, polybutylene naphthalate, and the like, and the aromatic polyester is preferably polybutylene terephthalate.

One example of the aromatic polyester includes polybutylene terephthalate derived from terephthalic acid and/or dimethyl terephthalate and 1,4-butanediol, and further may be polyesters derived from a dicarboxylic acid component such as isophthalic acid, phthalic acid, naphthalene-2,6-dicarboxylic acid, naphthalene-2,7-dicarboxylic acid, diphenyl-4, 4'-dicarboxylic acid, diphenoxyethane dicarboxylic acid, 5-sulfoisophthalic acid, or an ester-forming derivative thereof, and a diol having 300 or less of the molecular weight [for example, aliphatic diol such as ethylene glycol, trimethylene glycol, pentamethylene glycol, hexamethylene glycol, neopentyl glycol, and decamethylene glycol, alicyclic diol such as 1,4-cyclohexane dimethanol and tricyclodecane dimethylol, and aromatic diol such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl] cyclohexane, 4,4'-dihydroxy-p-terphenyl and 4,4'-dihydroxy-p-quaterphenyl], and the like, or may be copolymerized polyester by concomitant use of these dicarboxylic acid component and diol component in a combination of 2 or more kinds. In addition, a multifunctional carboxylic acid component having 3 or more functionality, a multifunctional oxyacid component and a multifunctional hydroxy component, and the like may be copolymerized within a range of 5 mole % or less.

As the polyester resin as described above, a commercial product may be used, for example, "DURANEX" (registered trademark) series manufactured by Polyplastics Co., Ltd. (for example, 2000, 2002, and the like), NOVADURAN (registered trademark) series manufactured by Mitsubishi Engineering-Plastics Corporation (for example, 5010R5, 5010R3-2, and the like), "TORECON" (registered trademark) series manufactured by TORAY INDUSTRIES, INC. (for example, 1401X06, 1401X31 and the like).

In addition, the elastic modulus of the polyester resin (B) is preferably 700 MPa or more, and more preferably from 800 MPa to 3000 MPa from a viewpoint of increasing the elastic modulus of the thermoplastic resin material. Meanwhile, the elastic modulus of the polyester resin (B) means the tensile elastic modulus set forth in JIS K7113:1995. The elastic modulus of a specific resin can be measured, for example, with use of the precision universal tester autograph manufactured by Shimadzu Corporation.

The thermoplastic resin material in the tire (4) of the present invention may contain 2 or more kinds of the polyester resin (B). However, it is preferable that at least one kind among these be necessarily the same kind of the polyester resin as that of the hard segment contained in the polyester-based thermoplastic elastomer (A). In addition, as described previously, the polyester-based thermoplastic elastomer (A) in the thermoplastic resin material is preferably in one kind, and thus, the polyester resin (B) is preferably in one kind as well.

The mass ratio (A:B) of the polyester-based thermoplastic elastomer (A) and the polyester resin (B) in the thermoplastic resin material in the tire (4) of the present invention is preferably from 95:5 to 50:50, and more preferably from 90:10 to 50:50 based on the mass from a viewpoint of the impact resistance.

In addition, the content of the polyester-based thermoplastic elastomer (A) in the thermoplastic resin material is preferably from 95 mass % to 50 mass %, and more preferably from 90 mass % to 10 mass % with respect to the total mass of the thermoplastic resin material from a viewpoint of the impact resistance.

The thermoplastic resin material in the tire (4) of the present invention may contain a variety of additives such as another thermoplastic elastomer, a variety of fillers (for example, silica, calcium carbonate, and clay), an anti-aging agent, oil, a plasticizer, a colorant, a weather resistant agent, and a reinforcing material if desired unless it harms the effects of the present invention.

The thermoplastic resin material in the tire (4) of the present invention may be obtained by mixing the polyester-based thermoplastic elastomer (A) and the polyester resin (B), adding a variety of additives if necessary, and melting and mixing them. The mixing ratio of the polyester-based thermoplastic elastomer (A) and the polyester resin (B) is pursuant to the ratio described previously. The thermoplastic resin material obtained by the melting and mixing may be made as a pellet shape and used if necessary.

—Property of Thermoplastic Resin Material—

A tensile elastic modulus set forth in JIS K7113:1995 of the thermoplastic resin material in the tire (4) of the present invention is preferably from 100 MPa to 1000 MPa, further preferably from 100 MPa to 800 MPa, and particularly preferably from 100 MPa to 700 MPa. When the tensile elastic modulus of the thermoplastic resin material is from 100 MPa to 1000 MPa, it is possible to perform rim fitting effectively while retaining the shape of the tire frame.

A tensile yield strength set forth in JIS K7113:1995 of the thermoplastic resin material in the tire (4) of the present invention is preferably 5 MPa or more, preferably from 5 MPa to 20 MPa, and further preferably from 5 MPa to 17 MPa. When the tensile yield strength of the thermoplastic resin material is 5 MPa or more, it is possible to bear with deformation for the load on the tire at the time of the running and the like.

A tensile yield elongation set forth in JIS K7113:1995 of the thermoplastic resin material in the tire (4) of the present invention is preferably 10% or more, preferably from 10% to 70%, and further preferably from 15% to 60%. When the tensile yield elongation of the polyester-based thermoplastic elastomer is 10% or more, the elastic region is large, and the rim fitting property can be improved.

A tensile elongation at break set forth in JIS K7113:1995 of the thermoplastic resin material in the tire (4) of the present invention is preferably 50% or more, preferably 100% or more, further preferably 150% or more, and particularly preferably 200% or more. When the tensile elongation at break of the thermoplastic resin material is 50% or more, the fittability onto a rim are good, and it is possible to render the thermoplastic resin material to hardly fracture against the collision.

A deflection temperature under load set forth in ISO75-2 or ASTM D648 of the thermoplastic resin material (at the load of 0.45 MPa) in the tire (4) of the present invention is preferably 50° C. or higher, preferably from 50° C. to 150° C., and further preferably from 50° C. to 130° C. When the deflection temperature under load of the thermoplastic resin material is 50° C. or higher, it is possible to suppress deformation of the tire frame even in a case where vulcanization is performed in the manufacture of the tire.

<Thermoplastic Resin Material Applied to the Tire Frame in the Tire (5)>

The tire (5) of the present invention has a circular tire frame formed of a thermoplastic resin material including a mixture of a polyester-based thermoplastic elastomer and an acid-modified elastomer resulting from acid modification of a thermoplastic elastomer other than the polyester-based thermoplastic elastomer, or a thermoplastic elastomer other than the polyester-based thermoplastic elastomer and an acid-modified elastomer resulting from acid modification of the elastomer.

As described previously, the thermoplastic resin material includes at least 1) a combination of a polyester-based thermoplastic elastomer and an acid-modified elastomer resulting from acid modification of a thermoplastic elastomer other than the polyester-based thermoplastic elastomer, or 2) a combination of a polyester-based thermoplastic elastomer, a thermoplastic elastomer other than the polyester-based thermoplastic elastomer, and an acid-modified elastomer resulting from acid modification of the thermoplastic elastomer other than the polyester-based thermoplastic elastomer.

When any of the combinations 1) and 2) is applied as the thermoplastic resin material in the tire (5) of the present invention, the tire frame formed of the resin material exerts excellent tensile properties and excellent manufacturability such as injection molding property. Furthermore, when the combination 2) is applied, the total amount of a thermoplastic elastomer other than the polyester-based thermoplastic elastomer and the acid-modified elastomer resulting from acid modification of the thermoplastic elastomer other than the polyester-based thermoplastic elastomer is set up to be constant, whereby to control the acid value, and thus achieve a balance of the injection molding property and the elastic modulus.

Hereinafter, the polyester-based thermoplastic elastomer, the thermoplastic elastomer other than the polyester-based thermoplastic elastomer (another thermoplastic elastomer), and the acid-modified elastomer resulting from acid modification of the thermoplastic elastomer other than the polyester-based thermoplastic elastomer, which are applied in the tire (5) of the present invention, will be described.

The "thermoplastic elastomer" refers to, as described previously, a polymer compound having elasticity, which is a thermoplastic resin material formed of a copolymer that contains a polymer constituting the hard segment, that is crystalline and has a high melting temperature, and a polymer constituting the soft segment, that is amorphous and has a low glass transition temperature.

The "polyester-based thermoplastic elastomer" refers to, as described previously, a polymer compound having elasticity, which is a thermoplastic resin material formed of a copolymer that has a polymer that contains a polyester that forms the hard segment, which is crystalline and has high melting temperature, and a polymer that forms the soft segment, which is amorphous and has low glass transition temperature, and thus those having a partial structure that is composed of polyester in the structure. Examples of the polyester-based thermoplastic elastomer applied to the tire (5) include an ester-based thermoplastic elastomers (TPC) set forth in JIS K6418 and the like.

The details of the polyester-based thermoplastic elastomer applied to the tire frame in the tire (5) are similar to those of the polyester-based thermoplastic elastomer applied to the tire frame in the tire (1). The matters pertaining to the polyester-based thermoplastic elastomer described in the tire (1) are applied similarly to the polyester-based thermoplastic elastomer in the tire (5) except for the matters particularly mentioned to be applied only to the tire (5) in the description below.

The "thermoplastic elastomer other than the polyester-based thermoplastic elastomer (another thermoplastic elastomer)" is, as described previously, those not containing a partial structure that is composed of polyester among the thermoplastic elastomers. Meanwhile, another thermoplastic elastomer does not include an acid-modified elastomer resulting from acid modification of the other thermoplastic elastomer.

Examples of the other thermoplastic elastomer in the tire (5) of the present invention include olefin-based thermoplastic elastomers (unmodified olefin-based thermoplastic elastomer), styrene-based thermoplastic elastomers (unmodified styrene-based thermoplastic elastomer), and the like.

Meanwhile, the olefin-based thermoplastic elastomers, and the styrene-based thermoplastic elastomers refer to those in which the polymers constituting the hard segments are olefin and polystyrene, respectively.

As the polyolefin-based thermoplastic elastomer (unmodified olefin-based thermoplastic elastomer), a commercial product may be used, for example, "TAFMER" series manufactured by Mitsui Chemicals, Inc. (for example, A1050S, A4050S, P275) and the like.

As the polystyrene-based thermoplastic elastomer (unmodified styrene-based thermoplastic elastomer), a commercial product may be used, for example, "TUFTEC" (registered trademark) series manufactured by Asahi Kasei Corporation (for example, H1031, H1041, H1043, H1051, H1052, H1053, H1082, H1141, H1221, H1272), G1641H and G1643M (registered trademark) manufactured by Kraton Polymers LLC, and the like.

The "resulting from acid modification of a thermoplastic elastomer other than the polyester-based thermoplastic elastomer" refers to bonding of an unsaturated compound having an acidic group such as a carboxylic acid group, a sulfuric acid group, and a phosphoric acid group to another thermoplastic elastomer. For example, examples of the unsaturated compound having an acidic group include an embodiment in which an unsaturated binding site of an unsaturated carboxylic acid is bonded to an olefin-based thermoplastic elastomer (for example, by graft polymerization) in a case where an unsaturated carboxylic acid (generally, maleic anhydride) is used.

Examples of the elastomer resulting from acid modification of the other thermoplastic elastomer (hereinafter, also referred to as the "acid-modified elastomer") include a compound of an unmodified olefin-based thermoplastic elastomer or an unmodified styrene-based thermoplastic elastomer having an acidic group that is bonded thereto.

The compound having an acidic group is preferably a compound having a carboxylic acid group that is a weak acid group, for example, acrylic acid, methacrylic acid, itaconic acid, crotonic acid, isocrotonic acid, maleic acid, and the like, from a viewpoint of suppressing deterioration of the polyester-based thermoplastic elastomer and the other thermoplastic elastomer.

As the acid-modified, olefin-based thermoplastic elastomer, a commercial product may be used, for example, "TAFMER" (registered trademark) series manufactured by Mitsui Chemicals, Inc. (for example, MA8510, MH7007, MH7010, MH7020, MP0610, MP0620) and the like.

As the acid modification styrene-based thermoplastic elastomer, a commercial product may be used, for example, "TUFTEC" (registered trademark) series manufactured by Asahi Kasei Corporation (for example, M1943, M1911, M1913), FG19181G (registered trademark) manufactured by Kraton Polymers LLC, and the like.

The other thermoplastic elastomer and the acid-modified elastomer are preferably hydrogenated in order to suppress the thermoplastic resin material from causing unintended cross-linking reaction. Examples of the hydrogenated type (SEBS) of the acid-modified elastomer include TUFTEC (registered trademark) manufactured by Asahi Kasei Corporation and the like.

The acid value of the thermoplastic resin material in the tire (5) of the present invention may be more than 0 mg-$CH_3ONa$/g.

Herein, in the present specification, the "acid value of the thermoplastic resin material" is the total mass of sodium methoxide ($CH_3ONa$) necessary for neutralization of the acid modification site of the acid-modified elastomer with respect to the total mass of the thermoplastic resin material, and is calculated from the following calculating formula (1) in a case where the acid-modified elastomer contained in the thermoplastic resin material is in one kind, or calculated from the following calculating formula (2) in a case where the acid-modified elastomer contained in the thermoplastic resin material is in a combination of 2 or more kinds.

[(Acid value of acid-modified elastomer A)×(Total mass of acid-modified elastomer A)]/[Total mass of the thermoplastic resin material]    Calculating Formula (1)

[(Acid value of acid-modified elastomer A)×(Total mass of acid-modified elastomer A)+(Acid value of acid-modified elastomer B)×(Total mass of acid-modified elastomer B)+ . . . ]/[Total mass of thermoplastic resin material]    Calculating Formula (2)

Meanwhile, in the present specification, the acid value of the acid-modified elastomer is measured as the mass [mg] of sodium methoxide ($CH_3ONa$) used in performing neutralization titration with use of sodium methoxide ($CH_3ONa$) with respect to 1 [g] of the acid-modified elastomer.

The acid value of the thermoplastic resin material in the tire (5) of the present invention is preferably 0.1 mg-$CH_3ONa$/g or more and 10 mg-$CH_3ONa$/g or less, more preferably 0.1 mg-$CH_3ONa$/g or more and 7 mg-$CH_3ONa$/g or less, and further preferably 0.1 mg-$CH_3ONa$/g or more and 5 mg-$CH_3ONa$/g or less from a viewpoint of the injection molding property of the thermoplastic resin material.

The acid value of the thermoplastic resin material may be controlled by controlling the acid value of the acid-modified elastomer, or may be controlled by controlling the mixing ratio of the other thermoplastic elastomer and the acid-modified elastomer contained in the thermoplastic resin material.

The thermoplastic resin material in the tire (5) of the present invention has a sea-island structure having the sea phase constituted with the polyester-based thermoplastic elastomer, and the island phase constituted with the acid-modified elastomer and another thermoplastic elastomer (unmodified). When the interaction of the phase interface of the sea phase and the island phase is weak, the fluidity of the thermoplastic resin material increases, and the thermoplastic resin material is excellent in the injection molding property. The acid-modified elastomer has stronger interaction with the polyester-based thermoplastic elastomer in comparison to a non-acid-modified elastomer since the acid-modified elastomer has an acid modification site in the molecule.

On the other hand, in the sea-island structure, as the acid value of the elastomer increases, the island phase tends to decrease, and as the acid value decreases, the island phase tends to increase. With the acid value of the elastomer in the range described above, the island phase is finely dispersed in the thermoplastic resin, and the impulsivity of the thermoplastic resin material particularly improves. In addition, the increase of the melt viscosity of the thermoplastic resin material is suppressed, and thus the injection molding property of the thermoplastic resin material is excellent. Accordingly, damage of the thermoplastic resin material from excessive heating can be suppressed due to no heating of the thermoplastic resin at high temperature when the tire case is manufactured with use of the thermoplastic resin material.

Meanwhile, fine dispersion of the island phase of the acid-modified elastomer in the thermoplastic resin can be identified from photographic observation with use of SEM (scanning electron microscope).

The acid value of the acid-modified elastomer contained as the thermoplastic resin material in the tire (5) of the present invention is preferably more than 0 mg-$CH_3ONa$/g and 20 mg-$CH_3ONa$/g or less, more preferably more than 0 mg-$CH_3ONa$/g and 17 mg-$CH_3ONa$/g or less, and further preferably more than 0 mg-$CH_3ONa$/g and 15 mg-$CH_3ONa$/g or less.

With respect to the acid value of the acid-modified elastomer, in a case where the acid-modified elastomer contained in the thermoplastic resin material is in one kind, the acid value of the aforementioned acid-modified elastomer is in the range described above, and in a case where the acid-modified elastomer is in a combination of 2 or more kinds, the acid value of each of the acid-modified elastomers is preferably in the range described above.

The ratio (A:B) of the mass (A) of the polyester-based thermoplastic elastomer and the total mass (B) of the other thermoplastic elastomer and the acid-modified elastomer in the thermoplastic resin material in the tire (5) of the present invention is preferably from 95:5 to 50:50, and more preferably from 90:10 to 55:45 from a viewpoint of rendering the polyester-based thermoplastic elastomer to be the sea phase.

In addition, in the tire (5) of the present invention, the content of the polyester-based thermoplastic elastomer in the thermoplastic resin material is not particularly limited, but is preferably 50 mass % to 95 mass %, and further preferably from 50 mass % to 90 mass % with respect to the total amount of the thermoplastic resin material.

With the content of the polyester-based thermoplastic elastomer set to be from 50 mass % to 95 mass % with respect to the total amount of the thermoplastic resin material, the properties of the thermoplastic resin material can be sufficiently exerted, and the tensile properties of the tire can be improved.

The thermoplastic resin material in the tire (5) of the present invention may contain a variety of additives such as a variety of fillers (for example, silica, calcium carbonate, clay), an anti-aging agent, oil, a plasticizer, a colorant, a weather resistant agent, and a reinforcing material if desired.

The thermoplastic resin material in the tire (5) of the present invention may be obtained by mixing the polyester-based thermoplastic elastomer, and the acid-modified elastomer (and further the other thermoplastic elastomer when the thermoplastic resin material contains the other thermoplastic elastomer), which are described previously, adding a variety of additives if necessary, and melting and mixing them. The mixing ratio of the polyester-based thermoplastic elastomer, the acid-modified elastomer, and the other thermoplastic elastomer is pursuant to the ratio described previously. The resin obtained by the melting and mixing may be made as a pellet shape and used if necessary.

—Property of the Thermoplastic Resin Material—

A tensile elastic modulus set forth in JIS K7113:1995 of the thermoplastic resin material in the tire (5) of the present invention is preferably from 100 MPa to 1000 MPa, further preferably from 100 MPa to 800 MPa, and particularly preferably from 100 MPa to 700 MPa. When the tensile elastic modulus of the thermoplastic resin material is from 100 MPa to 1000 MPa, it is possible to effectively perform the rim fitting while retaining the shape of the tire frame.

A tensile yield strength set forth in JIS K7113:1995 of the thermoplastic resin material in the tire (5) of the present invention is preferably 5 MPa or more, preferably from 5 MPa to 20 MPa, and further preferably from 5 MPa to 17 MPa. When the tensile yield strength of the thermoplastic resin material is 5 MPa or more, it is possible to bear with deformation for the load on the tire at the time of the running and the like.

A tensile yield elongation set forth in JIS K7113:1995 of the thermoplastic resin material in the tire (5) of the present invention is preferably 10% or more, preferably from 10% to 70%, and further preferably from 15% to 60%. When the tensile yield elongation of the polyester-based thermoplastic elastomer is 10% or more, the elastic region is large, and the fittability onto a rim can be improved.

A tensile elongation at break set forth in JIS K7113:1995 of the thermoplastic resin material in the tire (5) of the present invention is preferably 50% or more, preferably 100% or more, further preferably 150% or more, and particularly preferably 200% or more. When the tensile elongation at break of the thermoplastic resin material is 50% or more, the rim fitting property is good, and it is possible to render the thermoplastic resin material to hardly fracture against the collision.

A deflection temperature under load set forth in ISO75-2 or ASTM D648 of the thermoplastic resin material (at the load of 0.45 MPa) in the tire (5) of the present invention is preferably 50° C. or higher, preferably from 50° C. to 150° C., and further preferably from 50° C. to 130° C. When the deflection temperature under load of the thermoplastic resin material is 50° C. or higher, it is possible to suppress deformation of the tire frame even in a case where vulcanization is performed in the manufacture of the tire.

<Thermoplastic Resin Material Applied to the Tire Frame in the Tire (6)>

The tire (6) of the present invention is a tire that has at least a circular tire frame formed of a thermoplastic resin material, in which the thermoplastic resin material contains a polyester-based thermoplastic elastomer and at least one of an olefin-(meth)acrylic acid copolymer (specific copolymer) or an acid-modified copolymer obtained by acid-modifying an olefin-(meth)acrylate copolymer (specific acid-modified copolymer).

With the thermoplastic resin material pertaining to the tire (6) of the present invention containing the polyester-based thermoplastic elastomer, the specific copolymer, and the specific acid-modified copolymer, a tire excellent in impact resistance may be obtained when the thermoplastic resin material pertaining to the present invention is applied to the tire.

Hereinafter, the polyester-based thermoplastic elastomer, the specific copolymer, and the specific acid-modified copolymer will be described.

[Polyester-Based Thermoplastic Elastomer]

The polyester-based thermoplastic elastomer in the present invention is a polymer compound having elasticity, is a thermoplastic resin material that is composed of a copolymer that contains a polymer constituting a hard segment that is crystalline and has a high melting temperature, and a polymer constituting a soft segment that is amorphous and has a low glass transition temperature, and is that containing a polyester resin as the polymer constituting the hard segment. Examples of the polyester-based thermoplastic elastomer applied to the tire (6) include ester-based thermoplastic elastomers set forth in JIS K6418:2007 and the like.

Details of the polyester-based thermoplastic elastomer applied to the tire frame in the tire (6) are similar to those of the polyester-based thermoplastic elastomer applied to the tire frame in the tire (1). The matters pertaining to the polyester-based thermoplastic elastomer described in the tire (1) are similarly applied to the polyester-based thermoplastic elastomer in the tire (6) except for the matters particularly mentioned to be applied only to the tire (6) in the description below.

—Specific Copolymer—

In the tire (6) of the present invention, the "olefin-(meth)acrylic acid copolymer" (the specific copolymer) that may be contained in the thermoplastic resin material refers to a copolymer that contains a (meth)acrylic acid-derived partial structure in an olefin repeating unit. The "(meth)acrylic acid" means at least one of acrylic acid or methacrylic acid. The aspect of the polymer may be a radical polymer, a block copolymer, or a graft copolymer.

The number average molecular weight (Mn) of the specific copolymer is preferably from 5,000 to 10,000,000, and more preferably from 7,000 to 1,000,000, from a viewpoint of the melt-formability of the thermoplastic resin material.

The olefin that constitutes the olefin repeating unit in the olefin-(meth)acrylic acid copolymer is preferably ethylene, propylene, or 1-butene, and more preferably ethylene.

That is, the olefin-(meth)acrylic acid copolymer is preferably an ethylene-(meth)acrylic acid copolymer. The olefin-(meth)acrylic acid copolymer is more preferably an ethylene-methacrylic acid copolymer.

The specific copolymer may be used in one kind, or may be used in a mixture of two or more kinds.

As the specific copolymer, a commercial product may be used, and for example, NUCREL manufactured by Du Pont-Mitsui Polychemicals Co., Ltd. (N035C, AN42115C, and the like) and the like may be used.

—Specific Acid-Modified Copolymer—

The "acid-modified copolymer obtained by acid-modifying an olefin-(meth)acrylate copolymer" that may be contained in the thermoplastic resin material in the tire (6) of the present invention (the specific acid-modified copolymer) refers to a copolymer in which a compound having an acidic group (also referred to as the acid group) is bonded to a copolymer that contains a (meth)acrylate-derived partial structure in an olefin repeating unit[that is, the olefin-(meth)acrylate copolymer]. The aspect of the polymer may be a radical polymer, a block copolymer, or a graft copolymer.

The "(meth)acrylate" means at least one of acrylate or methacrylate.

The "olefin-(meth)acrylate copolymer to which a compound having an acidic group is bonded" more specifically refers to an olefin-(meth)acrylate copolymer to which an unsaturated compound having an acidic group such as a carboxylic acid group, a sulfuric acid group, or a phosphoric acid group is bonded. For example, when an unsaturated carboxylic acid (generally, maleic anhydride) is used as the unsaturated compound having an acidic group, the "olefin-(meth) acrylate copolymer to which a compound having an acidic group is bonded" includes an olefin-(meth)acrylate copolymer to which an unsaturated binding site of an unsaturated carboxylic acid is bonded (for example, by graft polymerization).

From a viewpoint of suppressing deterioration of the olefin-(meth)acrylate copolymer, the compound having an acidic group is preferably a compound having a carboxylic acid group (carboxy group) that is a weak acid group, example of which including acrylic acid, methacrylic acid, itaconic acid, crotonic acid, isocrotonic acid, maleic acid, and the like.

In addition, the olefin that constitutes the olefin repeating unit in the olefin-(meth)acrylate copolymer in the specific acid-modified copolymer is preferably ethylene, propylene, or 1-butene, and more preferably ethylene. That is, the olefin-(meth)acrylate copolymer in the specific acid-modified copolymer is preferably an ethylene-(meth)acrylate copolymer.

Accordingly, the specific acid-modified copolymer is preferably an acid-modified copolymer of the ethylene-(meth) acrylate copolymer, more preferably a carboxylic acid-modified copolymer of the ethylene-(meth)acrylate copolymer, and further preferably a carboxylic acid-modified copolymer of the ethylene-acrylate ethyl ester copolymer.

The specific acid-modified copolymer may be used in one kind, or may be used in a mixture of two or more kinds.

The number average molecular weight (Mn) of the specific acid-modified copolymer is preferably from 5,000 to 10,000,000, and more preferably from 7,000 to 1,000,000 from a viewpoint of the melt-formability of the thermoplastic resin material.

As the specific acid-modified copolymer, a commercial product may be used, and examples thereof include HPR manufactured by Du Pont-Mitsui Polychemicals Co., Ltd. (AR2011 and the like) and the like.

While it is enough that the thermoplastic resin material in the tire (6) of the present invention contains at least one of the specific copolymer or the specific acid-modified copolymer, the thermoplastic resin material preferably contains both of the specific copolymer and the specific acid-modified copolymer in order to lower the elastic modulus of the thermoplastic resin material, and to obtain a tire excellent in impact resistance.

The mass ratio (x:y+z) of the polyester-based thermoplastic elastomer (x) and the specific copolymer (y) and the specific acid-modified copolymer (z) in the thermoplastic resin material in the tire (6) of the present invention is preferably from 95:5 to 50:50, and more preferably from 90:10 to 50:50, from a viewpoint of the impact resistance.

In addition, the mass ratio (y:z) of the specific copolymer (y) and the specific acid-modified copolymer (z) in the thermoplastic resin material in the tire (6) of the present invention is preferably from 95:5 to 0:100, and more preferably from 90:10 to 10:90. By setting the mass ratio (y:z) to be in such range, the thermoplastic resin material can exert the performances sufficiently, and improve tensile properties such as the tensile elasticity and the breaking strength as the tire performances. Meanwhile, as the specific copolymer and the specific acid-modified copolymer, the ethylene-methacrylic acid copolymer and the acid-modified product of the ethylene-acrylate copolymer are used preferably in combination.

Further, in the thermoplastic resin material in the tire (6) of the present invention, the total content of the polyester-based thermoplastic elastomer, the specific copolymer, and the specific acid-modified copolymer in the thermoplastic resin material is preferably from 50 mass % to 100 mass %, and more preferably from 55 mass % to 100 mass %, with respect to the total mass of the thermoplastic resin material from a viewpoint of rendering the thermoplastic resin material to sufficiently exert the performances.

The thermoplastic resin material in the tire (6) of the present invention may contain a variety of additives such as various fillers (for example, silica, calcium carbonate, and clay), an anti-aging agent, oil, a plasticizer, a colorant, a weather resistant agent, and a reinforcing material if desired.

The thermoplastic resin material in the tire (6) of the present invention may be obtained by mixing the polyester-based thermoplastic elastomer and at least one of the specific copolymer or the specific acid-modified copolymer, adding a variety of additives if necessary, and melting and mixing them. The mixing ratio of the polyester-based thermoplastic elastomer, the specific copolymer and the specific acid-modified copolymer is pursuant to the ratio described previously. The thermoplastic resin material obtained by the melting and mixing may be used in a form of a pellet shape, if necessary.

—Property of the Thermoplastic Resin Material—

In the tire (6) of the present invention, the tensile elastic modulus set forth in JIS K7113:1995 of the thermoplastic resin material is preferably from 100 to 1,000 MPa, further preferably from 100 to 800 MPa, and particularly preferably from 100 to 700 MPa. When the tensile elastic modulus of the thermoplastic resin material is from 100 to 1,000 MPa, it is possible to perform the rim fitting effectively while retaining the shape of the tire frame.

The tensile yield strength set forth in JIS K7113:1995 of the thermoplastic resin material in the tire (6) of the present invention is preferably 5 MPa or more, preferably from 5 to 20 MPa, and further preferably from 5 to 17 MPa. When the tensile yield strength of the thermoplastic resin material is 5 MPa or more, it is possible to bear with deformation for the load on the tire at the time of the running and the like.

The tensile yield elongation set forth in JIS K7113:1995 of the thermoplastic resin material in the tire (6) of the present invention is preferably 10% or more, preferably from 10 to 70%, and further preferably from 15 to 60%. When the tensile yield elongation of the thermoplastic resin material is 10% or more, the elastic region is large, and the fittability onto a rim can be improved.

The tensile elongation at break set forth in JIS K7113:1995 of the thermoplastic resin material (JIS K7113:1995) in the tire (6) of the present invention is preferably 50% or more, preferably 100% or more, further preferably 150% or more, and particularly preferably 200% or more. When the tensile elongation at break of the thermoplastic resin material is 50% or more, the fittability onto a rim is good, and it is possible to render the thermoplastic resin material to hardly fracture against the collision.

The deflection temperature under load set forth in ISO75-2 or ASTM D648 of the thermoplastic resin material (at the load of 0.45 MPa) in the tire (6) of the present invention is preferably 50° C. or more, preferably from 50 to 150° C., and further preferably from 50 to 130° C. When the deflection temperature under load of the thermoplastic resin material is 50° C. or more, it is possible to suppress deformation in the vulcanization process such as the tread.

<Resin Material Applied to the Tire Frame in the Tire (7)>

The tire (7) of the present invention has a circular tire frame which is formed of at least a resin material, in which the resin material contains a first thermoplastic elastomer, the tensile elastic modulus of which is in a range of from 150 MPa to 700 MP, and a second thermoplastic elastomer, the loss coefficient (Tan δ) of which is less than that of the first thermoplastic elastomer.

A tire in which a tire frame is formed with use of aresin material containing the first thermoplastic elastomer having high elastic modulus and the second thermoplastic elastomer having low loss coefficient (Tan δ) as described above can enhance the elastic modulus while maintaining low Tan δ of the tire frame. Therefore, for example, it is possible to lower the rolling resistance of the tire and enhance the elastic modulus (heat resistance).

(Thermoplastic Elastomer)

The first or the second thermoplastic elastomer applied to the tire (7) of the present invention may be respectively arbitrarily selected from known thermoplastic elastomers that meet the requirements described above and used in a range where the effects of the present invention is not impaired. In other words, the first thermoplastic elastomer can be selected on the basis of the elastic modulus, and the second thermoplastic elastomer can be selected on the basis of Tan δ of the first thermoplastic elastomer.

Examples of the known thermoplastic elastomers that can be used as the first or the second thermoplastic elastomer in the tire (7) of the present invention include polyamide-based thermoplastic elastomers (TPA), polyester-based thermoplastic elastomers (TPC), polyolefin-based thermoplastic elastomers (TPO), polystyrene-based thermoplastic elastomers (TPS), polyurethane-based thermoplastic elastomers (TPU), thermoplastic rubber vulcanizates (TPV), or other thermoplastic elastomers (TPZ), which are set forth in JIS K6418:2007, and the like.

In addition, when the resin materials are referred to as being in the same kind hereinafter, it indicates a form such as one in which both resin materials are ester-based or one in which both resin materials are styrene-based.

—Polyamide-Based Thermoplastic Elastomer—

The polyamide-based thermoplastic elastomer means a thermoplastic resin material that is composed of a copolymer that has: a polymer constituting a hard segment that is crystalline and has a high melting temperature; and a polymer constituting a soft segment that is amorphous and has a low glass transition temperature, in which the thermoplastic resin material has an amide bond (—CONH—) in the main chain of the polymer constituting the hard segment. Examples of the polyamide-based thermoplastic elastomer may include the amide-based thermoplastic elastomers (TPA) and the like which are set forth in HS K6418:2007, the polyamide-based elastomers described in JP-A No. 2004-346273, and the like.

Examples of the polyamide-based thermoplastic elastomer applied to the tire (7) of the present invention include materials in which at least polyamide constitutes the hard segment that is crystalline and has a high melting temperature, and another polymer (for example, polyeste, polyether or the like) constitutes the soft segment that is amorphous and has a low glass transition temperature. In addition, the polyamide-based thermoplastic elastomer may use a chain length elongating agent such as dicarboxylic acid in addition to the hard segment and the soft segment.

Examples of the polyamide which forms the hard segment may include polyamides generated by using a monomer represented by Formula (1) or Formula (2) described below.

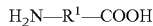

Formula (1)

[In Formula (1), $R^1$ represents a hydrocarbon molecular chain having a carbon number of from 2 to 20 or an alkylene group having a carbon number of from 2 to 20.]

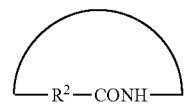

Formula (2)

[In Formula (2), $R^2$ represents a hydrocarbon molecular chain having a carbon number of from 3 to 20 or an alkylene group having a carbon number of from 3 to 20.]

Details of the polyamide-based thermoplastic elastomer applied to the tire (7) of the present invention are similar to those of the polyamide-based thermoplastic elastomer applied to the tire (3) of the present invention including the matters pertaining to the monomers represented by Formula (1) or Formula (2). The matters pertaining to the polyamide-based thermoplastic elastomer described in the tire (3) are applied similarly to the polyamide-based thermoplastic elastomer in the tire (7) except for the matters particularly mentioned to be applied only to the tire (7) in the description below.

Polystyrene-Based Thermoplastic Elastomer

Examples of the polystyrene-based thermoplastic elastomer include materials in which at least polystyrene constitutes the hard segment, and another polymer (for example, polybutadiene, polyisoprene, polyethylene, hydrogenated polybutadiene, hydrogenated polyisoprene, or the like) constitutes the soft segment that is amorphous and has a low glass transition temperature.

Details of polystyrene-based thermoplastic elastomer applied to the tire frame in the tire (7) of the present invention are similar to those of the polystyrene-based thermoplastic elastomer applied to the tire frame in the tire (2) of the present invention. The matters pertaining to the polystyrene-based thermoplastic elastomer described in the tire (2) are applied similarly to the polystyrene-based thermoplastic elastomer in the tire (7) except for the matters particularly mentioned to be applied only to the tire (7) in the description below.

—Polyurethane-Based Thermoplastic Elastomer—

Examples of the polyurethane-based thermoplastic elastomer include materials in which at least polyurethane forms pseudocross-linking by physical cohesion to constitute the hard segment and another polymer constitutes the soft segment that is amorphous and has a low glass transition temperature, and for example, may be expressed as a copolymer that contains the soft segment containing a unit structure represented by Formula A described below and the hard segment containing a unit structure represented by Formula B described below.

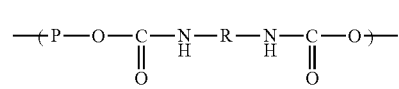

Formula A

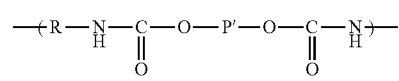

Formula B (In Formula A, P represents a long chain aliphatic polyether or a long chain aliphatic polyester. In Formula A or Formula B, R represents an aliphatic hydrocarbon, an alicyclic hydrocarbon, or an aromatic hydrocarbon. In Formula B, P' represents a short chain aliphatic hydrocarbon, an alicyclic hydrocarbon, or an aromatic hydrocarbon.)

Details of the polyurethane-based thermoplastic elastomer applied to the tire (7) of the present invention are similar to those of the polyimide-based thermoplastic elastomer applied to the tire (2) of the present invention, including the matters pertaining to the copolymer that contains the soft segment containing the unit structure represented by Formula A and the hard segment containing the unit structure represented by Formula B.

The matters pertaining to the polyurethane-based thermoplastic elastomer described in the tire (2) are applied similarly to the polyurethane-based thermoplastic elastomer in the tire (7) except for the matters particularly mentioned to be applied to the tire (7) in the description below.

Specifically, the polyurethane-based thermoplastic elastomer applied to the tire (7) of the present invention is preferably tolylene diisocyanate (TDI)/polyester-based polyol copolymers, TDI/polyether-based polyol copolymers, TDI/caprolactone-based polyol copolymers, TDI/polycarbonate-based polyol copolymers, 4,4'-diphenylmethane diisocyanate (MDI)/polyester-based polyol copolymers, MDI/polyether-based polyol copolymers, MDI/caprolactone-based polyol copolymers or MDI/polycarbonate-based polyol copolymers, and further preferably TDI and polyester-based polyol, TDI and polyether-based polyol, MDI and polyester polyol, MDI and polyether-based polyol.

In addition, as a commercial product of the polyurethane-based thermoplastic elastomer in the tire (7) of the present invention, for example, commercial products such as "ELASTOLLAN" series manufactured by BASF Corporation (for example, ET680, ET880, ET690, ET890 and the like), "KURAMIRON U" series manufactured by KURARAY CO., LTD (for example, 2000's, 3000's, 8000's, 9000's), "MIRACTRAN" series manufactured by Nippon Miractran Co, Ltd. (for example, XN-2001, XN-2004, P390RSUP, P480RSUI, P26MRNAT, E490, E590, P890) and the like may be used.

—Polyolefin-Based Thermoplastic Elastomer—

Examples of the polyolefin-based thermoplastic elastomer include materials in which at least polyolefin constitutes the hard segment that is crystalline and has a high melting temperature, and another polymer (for example, the polyolefin, another polyolefin or polyvinyl compound) constitutes the soft segment that is amorphous and has a low glass transition temperature. Examples of the polyolefin which forms the hard segment include polyethylene, polypropylene, isotactic polypropylene, polybutene and the like.

Details of the polyolefin-based thermoplastic elastomer applied to the tire (7) of the present invention are similar to those of the polyolefin-based thermoplastic elastomer applied to the tire (2) of the present invention.

The matters pertaining to the polyolefin-based thermoplastic elastomer described in the tire (2) are applied similarly to the polyolefin-based thermoplastic elastomer in the tire (7) except for the matters particularly mentioned to be applied to the tire (7) in the description below.

Meanwhile, the mass ratio (x:y) of the hard segment (x) and the soft segment (y) in the polyolefin-based thermoplastic elastomer applied to the tire (7) of the present invention is preferably from 50:50 to 95:15, and further preferably from 50:50 to 90:10 from a viewpoint of the formability.

As the polyolefin-based thermoplastic elastomer applied to the tire (7) of the present invention, for example, those exemplified as the commercial products of the polyolefin-based thermoplastic elastomer applied to the tire (2) of the present invention may be used. In addition, as the polyolefin-based thermoplastic elastomer, for example, commercial products such as "PRIME TPO" series manufactured by Prime Polymer Co., Ltd. (for example, E-2900H, F-3900H, E-2900, F-3900, J-5900, E-2910, F-3910, J-5910, E-2710, F-3710, J-5910, E-2740, F-3740, R110MP, R110E, T310E, M142E and the like) and the like may be further used.

—Polyester-Based Thermoplastic Elastomer—

Examples of the polyester-based thermoplastic elastomer include materials in which at least polyester constitutes the hard segment that is crystalline and has high a melting temperature, and another polymer (for example, polyester, polyether or the like) constitutes the soft segment that is amorphous and has a low glass transition temperature.

Details of the polyester-based thermoplastic elastomer applied to the tire frame in the tire (7) of the present invention are similar to those of the polyester-based thermoplastic elastomer applied to the tire frame in the tire (1) of the present invention. The matters pertaining to the polyester-based thermoplastic elastomer described in the tire (1), are applied similarly to the polyester-based thermoplastic elastomer in the tire (7) except for the matters particularly mentioned to be applied only to the tire (7) in the description below.

Meanwhile, examples of the combination of the hard segment and the soft segment in the thermoplastic elastomer applied to the tire (7) may include each combination of the hard segment and the soft segment exemplified above. Among them, a combination in which polybutylene terephthalate is the hard segment and aliphatic polyether is the soft segment is preferable, and a combination in which polybutylene terephthalate is the hard segment and poly(ethylene oxide)glycol is the soft segment is further preferable.

In addition, as the thermoplastic elastomer applied to the tire (7) of the present invention, those obtained by acid-modifying a thermoplastic elastomer may be used.

The "those obtained by acid-modifying a thermoplastic elastomer" refers to a thermoplastic elastomer to which an unsaturated compound having an acidic group such as a carboxylic acid group, a sulfuric acid group or a phosphoric acid group is bonded. For example, when an unsaturated carboxylic acid (generally, maleic anhydride) is used as the unsaturated compound having an acidic group, examples of those obtained by acid-modifying a thermoplastic elastomer include an olefin-based thermoplastic elastomer to which an unsaturated binding site of an unsaturated carboxylic acid is bonded (for example, by graft polymerization).

From a viewpoint of suppressing deterioration of the polyamide-based thermoplastic elastomer and the thermoplastic elastomer besides the polyimide-based thermoplastic elastomer, the compound having an acidic group is preferably a compound having a carboxylic acid group that is a weak acid group, examples of acrylic acid, methacrylic acid, itaconic acid, crotonic acid, isocrotonic acid, maleic acid and the like.

The thermoplastic elastomer described above can be synthesized with copolymerization of the polymer that forms the hard segment and the polymer that forms the soft segment by a known method.

—Properties of the Thermoplastic Elastomer—

As described above, the tensile elastic modulus of the first thermoplastic elastomer applied to the tire (7) of the present invention (the tensile elastic modulus set forth in JIS K7113: 1995) is from 150 MPa to 700 MPa. If the tensile elastic modulus of the first thermoplastic elastomer is less than 150 MPa, the elastic modulus of a molded article (the tire frame) is low, and the molded article becomes a molded body that is poor in the heat resistance. In addition, if the tensile elastic modulus of the first thermoplastic elastomer is more than 700 MPa, the flexibility of the tire frame is impaired, and the frame becomes poor in the molding property.

The tensile elastic modulus of the first thermoplastic elastomer is preferably from 200 MPa to 500 MPa, and further preferably from 300 MPa to 500 MPa, from a viewpoint of setting the tensile elastic modulus of the tire frame to be in a more preferable range.

The elastic modulus is, for example, a value measured for a dumbbell shape test fragment set forth in JISK6251: 1993 (No. 5 type test fragment) with use of Shimadzu AUTOGRAPH AGS-J (51N) manufactured by Shimadzu Corporation at a tension speed of 200 min/min.

The tensile elastic modulus of the second thermoplastic elastomer applied to the tire (7) of the present invention is not particularly limited as long as the effects of the present invention are not impaired, and is preferably from 20 MPa to 300 MPa, and further preferably from 40 MPa to 200 MPa, from a viewpoint of setting the tensile elastic modulus of the tire frame to be in a more preferable range.

As described above, the loss coefficient (Tan δ) of the second thermoplastic elastomer applied to the tire (7) of the present invention is less than the loss coefficient of the first thermoplastic elastomer. When the loss coefficient (Tan δ) of the second thermoplastic elastomer is more than that of the first thermoplastic elastomer having high elastic modulus, the effect of achieving both of increase of the elastic modulus and reduction of Tan δ of the tire cannot be attained.

Herein, the "loss coefficient (Tan δ)" is a value calculated from the ratio (G"/G') of the storage shear elastic modulus (G') and the loss shear elastic modulus (G") at 30° C., 20 Hz, and shear distortion of 1%, and is a value that indicates how much energy is absorbed (changed to heat) by a material when the material is deformed. As the value of Tan δ is larger, the rolling resistance as the tire is larger due to the absorption of the energy, and as the results, this is a factor of declining the fuel consumption performance of the tire. Meanwhile, Tan δ of the thermoplastic elastomer can be measured with a dynamic viscoelasticity measurement apparatus (Dynamic-Mechanical Analysis: DMA).

The difference (Tan $δ_2$–Tan $δ_1$) between the loss coefficient of the second thermoplastic elastomer (Tan $δ_2$) and the loss coefficient of the first thermoplastic elastomer (Tan $δ_1$) varies on what is used for the first thermoplastic elastomer that becomes a reference, and usually it is preferably 0.02 or more, and further preferably 0.05 or more.

Tan δ of the first thermoplastic elastomer itself is preferably from 0.01 to 0.2, and further preferably from 0.01 to 0.15 from a viewpoint of achieving both of increase of the elastic modulus and reduction of Tan δ of the tire.

In addition, Tan δ of the second thermoplastic elastomer is set up on the basis of Tan of the first thermoplastic elastomer, but is preferably from 0.01 to 0.08, and further preferably from 0.01 to 0.06 from a viewpoint of achieving both of increase of the elastic modulus and reduction of Tan δ of the tire.

In addition, the glass transition temperature (Tg) of the hard segment of the first thermoplastic elastomer is preferably from –20° C. to 100° C., and further preferably from 0° C. to 80° C., from a viewpoint of the manufacturability such as a handling property at the time of the injection molding and a balance of the tensile elastic modulus and the Tan δ value.

Further, the glass transition temperature (Tg) of the hard segment of the second thermoplastic elastomer is preferably from –50° C. to 100° C., and further preferably from –30° C. to 70° C., from a viewpoint of the manufacturability such as a handling property at the time of the injection molding and a balance of the tensile elastic modulus and the Tan δ value.

The glass transition temperature of the hard segment can be measured with Differential scanning calorimetry (DSC). Meanwhile, the glass transition temperature of the "hard segment" in the present invention means the glass transition temperature of the polymer itself that forms the hard segment.

Examples of the first thermoplastic elastomer having high elasticity include polyester-based thermoplastic elastomers, polyamide-based thermoplastic elastomers, polyurethane-based thermoplastic elastomers, polyolefin-based thermoplastic elastomers and polystyrene-based thermoplastic elastomers, and the first thermoplastic elastomer having high elasticity is preferably polyester-based thermoplastic elastomers, polyamide-based thermoplastic elastomers or polystyrene-based thermoplastic elastomer, and further preferably polyester-based thermoplastic elastomers or polyamide-based thermoplastic elastomers.

Examples of the second thermoplastic elastomer having low Tan δ include polyester-based thermoplastic elastomers, polyamide-based thermoplastic elastomers, polyurethane-based thermoplastic elastomers, polyolefin-based thermoplastic elastomers and polystyrene-based thermoplastic elastomer, and the second thermoplastic elastomer having low Tan δ is preferably polyester-based thermoplastic elastomers, polyamide-based thermoplastic elastomers or polystyrene-based thermoplastic elastomers, and further preferably polyester-based thermoplastic elastomers or polyamide-based thermoplastic elastomers.

In addition, the combination of the first and the second thermoplastic elastomers is preferably a combination of the same kind (for example, a combination of the same kind of amide-based thermoplastic elastomers, a combination of the same kind of polyester-based thermoplastic elastomers), and the like from a viewpoint of improving the mechanical properties such as the elastic modulus and the strength and improving the viscoelastic properties resulting from the compatibility.

From the viewpoints described above, the combination of the first and the second thermoplastic elastomers is preferably a combination of a polyester-based elastomer and a polyester-based elastomer, and a combination of a polyamide-based elastomer and a polyamide-based elastomer, and further preferably a combination of a polyester-based elastomer and a polyester-based elastomer.

(Resin Material)

The mass ratio (x/y) of the first thermoplastic elastomer (x) and the second thermoplastic elastomer (y) in the resin material containing the first and the second thermoplastic elastomers is preferably from 10/90 to 90/10, further preferably from 20/80 to 80/20, and particularly preferably from 30/70 to 70/30 from a viewpoint of sufficiently exerting the effects of achieving both of increase of the elastic modulus and reduction of Tan 6 of the tire frame.

The melting temperature of the resin material containing the first and the second thermoplastic elastomers is ordinarily from about 100° C. to 350° C., and preferably from about 100° C. to 250° C., and is preferably from about 120° C. to 250° C., and further preferably from 150° C. to 200° C. from a viewpoint of the productivity of the tire. With use of the resin material containing the thermoplastic elastomers having from 120 to 250° C. of the melting temperature as described above, for example, when the tire frame is formed by fusing divided bodies thereof (frame fragment), it is possible to set the heating temperature of the bonding section to be equal to or higher than the melting temperature of the thermoplastic resin material that forms the tire frame. The tire of the present invention has sufficient adhesion strength of the tire frame pieces to each other even when the frame is that made by fusing in a temperature range of from 120° C. to 250° C. due to use of the thermoplastic resin material containing the thermoplastic elastomers. Therefore, the tire of the present invention has excellent durability at the time of the running such as the resistance to puncture and the abrasion resistance. Meanwhile, the heating temperature is preferably from 10 to 150° C. higher, and further preferably from 10 to 100° C. higher, than the melting temperature of the thermoplastic resin material temperature containing the thermoplastic elastomers that forms the tire frame piece.

In addition, the total content of the first and the second thermoplastic elastomers in the resin material in the tire (7) of the present invention is not particularly limited, and is preferably 50 mass % or more, and further preferably 90 mass % or more, with respect to the total amount of the resin material. When the total content of the first and the second thermoplastic elastomers is 50 mass % or more with respect to the total amount of the resin material, the effects from combination of the first and the second thermoplastic elastomers can be sufficiently exerted. The resin material may contain a variety of additives such as a rubber, another thermoplastic elastomer, a thermoplastic resin, various fillers (for example, silica, calcium carbonate, clay), an anti-aging agent, oil, a plasticizer, a colorant, a weather resistant agent and a reinforcing material, if desired.

The resin material in the tire (7) of the present invention may be obtained by mixing the first and the second thermoplastic elastomers, adding a variety of additives if necessary, and appropriately mixing them by a known method (for example, melting and mixing). The thermoplastic resin material obtained by the melting and mixing may be used as a pellet shape, if necessary.

The tensile elastic modulus set forth in JIS K7113:1995 of the resin material itself in the tire (7) of the present invention is preferably from 100 to 1000 MPa, further preferably from 100 to 800 MPa, and particularly preferably from 100 to 700 MPa. When the tensile elastic modulus of the resin material is from 100 to 1000 MPa, the rim fitting can be effectively performed while retaining the shape of the tire frame.

The tensile yield strength set forth in JIS K7113:1995 of the resin material itself in the tire (7) of the present invention is preferably 5 MPa or more, preferably from 5 to 20 MPa, and further preferably from 5 to 17 MPa. When the tensile yield strength of the resin material is 5 MPa or more, it is possible to bear with deformation for the load on the tire at the time of the running and the like.

The tensile yield elongation set forth in JIS K7113:1995 of the resin material itself in the tire (7) of the present invention is preferably 10% or more, preferably from 10 to 70%, and further preferably from 15 to 60%. When the tensile yield elongation of the resin material is 10% or more, the elastic region is large, and the fittability onto a rim can be improved.

The tensile elongation at break set forth in JIS K7113:1995 (JIS K7113) of the resin material itself in the tire (7) of the present invention is preferably 50% or more, preferably 100% or more, further preferably 150% or more, and particularly preferably 200% or more. When the tensile elongation at break of the resin material is 50% or more, the fittability onto a rim is good, and it is possible to render the thermoplastic resin material to hardly fracture against the collision.

The deflection temperature under load set forth in ISO75-2 or ASTM D648 (at the load of 0.45 MPa) of the resin material itself in the tire (7) of the present invention is preferably 50° C. or more, preferably from 50 to 150° C., and further preferably from 50 to 130° C. When the deflection temperature under load of the resin material is 50° C. or more, it is possible to suppress deformation of the tire frame even in a case where vulcanization is performed in the manufacture of the tire.

[Resin Material that Constitutes Reinforcing Cord Layer]

The tires (1) to (7) of the present invention have a reinforcing cord member that forms a reinforcing cord layer on an outer circumference of the tire frame. In addition, the tires (4) to (7) of the present invention may have a reinforcing cord member that forms a reinforcing cord layer in an outer circumference of the tire frame.

The tires (1) to (7) of the present invention may be constituted so as to contain a resin material in the reinforcing cord layer.

When the resin material is contained in the reinforcing cord layer as described above, it is possible to further closely contact and fix the reinforcing cord member to the tire frame in comparison to a case in which the reinforcing cord member is fixed using a cushion rubber, since the difference in hardness between the tire and the reinforcing cord layer is reduced. As described above, the "resin material" is a concept including a thermoplastic resin (including a thermoplastic elastomer) and a thermosetting resin, and does not include a vulcanized rubber.

Furthermore, in a case in which the reinforcing cord member is particularly a steel cord, a vulcanized rubber is hardly isolated from the reinforcing cord member with only heating, when an attempt is made to separate the reinforcing cord member from the cushion rubber at the time of tire disposal. In contrast, in a case in which the reinforcing cord member contains the resin material, it is possible to easily isolate the reinforcing cord member with only heating. Therefore, containing the resin material in the reinforcing cord layer is advantageous in the point of the tire recycling. In addition, the resin material generally has a lower loss coefficient (tan δ) when compared to a vulcanized rubber. Therefore, the rolling property of the tire may be improved. Furthermore, the resin material, which has a higher elastic modulus when compared to a vulcanized rubber, has an advantage such as large in-plane shear rigidity, which leads to excellent steering stability or abrasion resistance at the time of running the tire.

Examples of the thermosetting resin capable of being used in the reinforcing cord layer include a phenol resin, a urea resin, a melamine resin, an epoxy resin, a polyamide resin, and a polyester resin.

Examples of the thermoplastic resin include a urethane resin, an olefin resin, a vinyl chloride resin, a polyamide resin, and a polyester resin.

Examples of the thermoplastic elastomer include the amide-based thermoplastic elastomers (TPA), ester-based thermoplastic elastomers (TPC), olefin-based thermoplastic elastomers (TPO), styrene-based thermoplastic elastomers (TPS), urethane-based thermoplastic elastomers (TPU), thermoplastic rubber vulcanizates (TPV), and other thermoplastic elastomers (TPZ), which are set forth in JIS K6418: 2007. The thermoplastic elastomer is preferably used in consideration of the elasticity necessary at the time of the running and the formability at the time of the manufacture, and the like.

The resin material of the same kind refers to a combination of ester-based resin materials, a combination of styrene-based resin materials, or the like.

The elastic modulus (JIS K7113: 1995) of the resin material used in the reinforcing cord layer is preferably set within a range of from 0.1 fold to 10 folds of the elastic modulus of the thermoplastic resin that forms the tire frame. When the elastic modulus of the resin material is 10 folds or less of the elastic modulus of the thermoplastic resin material that forms the tire frame, the crown portion is not too hard and the rim fitting is facilitated. Meanwhile, when the elastic modulus of the resin material is 0.1 fold or more of the elastic modulus of the thermoplastic of the resin material that forms the tire frame, the resin that constitutes the reinforcing cord layer is not too soft, and the belt in-plane shear rigidity is excellent and the cornering force is improved.

In a case in which the reinforcing cord layer contains the resin material in the tires (3) and (6) of the present invention, the surface of the reinforcing cord member is covered with the resin material, preferably by 20% or more, and further preferably by 50% or more, from a viewpoint of enhancing the pull-out property (difficulty to be pulled out) of the reinforcing cord. The content of the resin material in the reinforcing cord layer is preferably 20 mass % or more, and further preferably 50 mass % or more, with respect to the total amount of the materials that constitute the reinforcing cord layer except the reinforcing cord, from a viewpoint of enhancing the pull-out property of the reinforcing cord.

[First Exemplary Embodiment of Tires (1) to (7) of Present Invention]

Hereinafter, a tire according to a first exemplary embodiment of tires (1) to (7) of the present invention will be described with reference to the drawings.

Unless particularly stated otherwise, the items related to the first exemplary embodiment that will be described below are items which are common as the first exemplary embodiment of the tires (1) to (7) of the present invention.

Figure 1B:
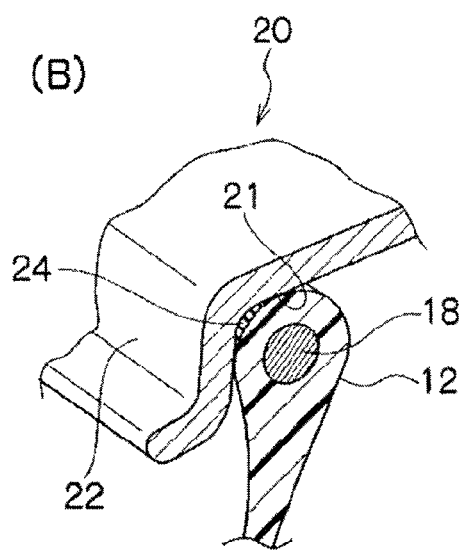
FIG. 1B is a cross-sectional diagram of a bead portion mounted on the rim.

A tire 10 of the first exemplary embodiment will be described. FIG. 1(A) is a perspective diagram illustrating the cross-section of a part of the tire according to an embodiment of the present invention. FIG. 1(B) is a cross-sectional diagram of a bead portion mounted on a rim. As illustrated in FIG. 1, the tire 10 of the first exemplary embodiment has substantially the same cross-sectional shape as that of conventional general pneumatic tires.

As illustrated in FIG. 1(A), the tire 10 has a tire case 17 which includes: a pair of bead portions 12 that are each in contact with a bead sheet 21 and a rim flange 22 of a rim 20 illustrated in FIG. 1(B); side portions 14 that extend from the bead portions 12 to the exterior in the tire radial direction; and a crown portion 16 (an outer circumference) that connects the external edge in the tire radial direction of one of the side portions 14 and the external edge in the tire radial direction of the other of the side portions 14.

When the tire case 17 is a tire case provided to the tire (1) of the present invention, the tire case 17 is formed of a polyester-based thermoplastic elastomer ("HYTREL 5557" manufactured by DuPont-Toray Co., Ltd.).

When the tire case 17 is a tire case provided to the tire (2) of the present invention, the tire case 17 is formed of a thermoplastic resin material containing a polyester-based thermoplastic elastomer ("HYTREL 6347" manufactured by DuPont-Toray Co., Ltd.) and a polyurethane-based thermoplastic elastomer ("ET680" manufactured by BASF SE) in a mass ratio of 80:20.

When the tire case 17 is a tire case provided to the tire (3) of the present invention, the tire case 17 is formed of a thermoplastic resin material containing a polyester-based thermoplastic elastomer (manufactured by DuPont-Toray Co., Ltd., HYTREL 6347) and a butadiene rubber (BR) in a mass ratio of 70:30.

When the tire case 17 is a tire case provided to the tire (4) of the present invention, the tire case 17 is formed of a mixed material of a polyester-based thermoplastic elastomer ("HYTREL 3046" manufactured by DuPont-Toray Co., Ltd.) and a polyester resin ("DURANEX 2000" manufactured by Polyplastics Co., Ltd.).

When the tire case 17 is a tire case provided to the tire (5) of the present invention, the tire case 17 is formed of a mixed material [acid value of thermoplastic resin material=1.11 mg-$CH_3ONa/g$] of a polyester-based thermoplastic elastomer ("HYTREL 6347" manufactured by DuPont-Toray Co., Ltd.) and an acid-modified α-olefin-based thermoplastic elastomer ("TAFMER MA7010" manufactured by Mitsui Chemical Co., Ltd.).

When the tire case 17 is a tire case provided to the tire (6) of the present invention, the tire case 17 is formed of a thermoplastic resin material composed of a mixed material of a polyester-based thermoplastic elastomer (polyester-based thermoplastic elastomer "HYTREL 6347" manufactured by DuPont-Toray Co., Ltd.), a specific copolymer (ethylene-methacrylic acid copolymer "NUCREL N035C" manufactured by DuPont-Mitsui Polychemicals Co., Ltd.), and a specific acid-modified copolymer (acid modification product of an ethylene-acrylate ethyl ester copolymer "HPR, AR2011" manufactured by DuPont-Mitsui Polychemicals Co., Ltd.).

When the tire case 17 is a tire case provided to the tire (7) of the present invention, the tire case 17 is formed of a mixture of a polyester-based elastomer (first thermoplastic elastomer) ("HYTREL 7247" manufactured by DuPont-Toray Co., Ltd.; elastic modulus: 422 MPa, Tan δ: 0.102) and a polyester-based elastomer (second thermoplastic elastomer) ("HYTREL 4047" manufactured by DuPont-Toray Co., Ltd.; elastic modulus 45 MPa, Tan δ: 0.029).

The mass ratio (x/y) of the first thermoplastic elastomer (x) and the second thermoplastic elastomer (y) is 55:45.

The tire case 17 in the first exemplary embodiment is formed of a thermoplastic resin material according to the present invention (a thermoplastic resin material containing a polyester-based thermoplastic elastomer) only. However, the present invention is not intended to be limited to this configuration, and similarly to conventional general pneumatic tires, thermoplastic resin materials having different characteristics may be used respectively for the various parts (side portion 14, crown portion 16, bead portion 12, and the like) of the tire case 17. Furthermore, the tire case 17 may also be reinforced with a reinforcing material by embedding the reinforcing material (a polymer material, or a fiber, cord, non-woven fabric, woven fabric or the like made of metal) in the tire case 17 (for example, bead portion 12, side portion 14, and crown portion 16).

The tire case 17 of the first exemplary embodiment is a product produced by bonding a pair of tire case half parts (tire frame pieces) 17A formed of a thermoplastic resin material. The tire case half part 17A is formed by molding one bead portion 12, one side portion 14, and a half-width crown portion 16 into one unit through injection molding or the like, arranging annular tire case half parts 17A having the same shape to face each other, and bonding the case half parts at the tire equatorial plane area.

In the tire (1) of the present invention, a pair of tire case half parts 17A is formed by using a thermoplastic resin material containing a polyester-based thermoplastic elastomer.

In the tire (2) of the present invention, a pair of tire case half parts 17A is formed by using a thermoplastic resin material containing a polyester-based thermoplastic elastomer and another elastomer.

In the tire (3) of the present invention, a pair of tire case half parts 17A is formed by using a thermoplastic resin material containing a polyester-based thermoplastic elastomer and a rubber.

In the tire (4) of the present invention, a pair of tire case half parts 17A is formed by using a thermoplastic resin material containing a polyester-based thermoplastic elastomer (A) and a polyester resin (B).

In the tire (5) of the present invention, a pair of tire case half parts 17A is formed by using a thermoplastic resin material containing a polyester-based thermoplastic elastomer and an acid-modified elastomer. Particularly, when the acid value of the thermoplastic resin material is from 0.1 mg-$CH_3ONa$/g to 5 mg-$CH_3ONa$/g, the thermoplastic resin material has excellent fluidity, has a suppressed increase of melt viscosity, and exhibits excellent injection molding property.

In the tire (6) of the present invention, a pair of tire case half parts 17A is formed by using a thermoplastic resin material containing a polyester-based thermoplastic elastomer and at least one of a specific copolymer or a specific acid-modified copolymer. Therefore, the thermoplastic resin material has excellent fluidity, and injection molding of the tire case half parts 17A can be easily carried out.

In the tire (7) of the present invention, a pair of tire case half parts (tire frame pieces) 17A is formed by using a resin material containing a first thermoplastic elastomer and a second thermoplastic elastomer.

Meanwhile, regarding the tire case 17, formation of the tire case is not limited to that made by bonding two members, and the tire case may also be formed by bonding three or more members.

The tire case half part 17A formed of a resin material containing a polyester-based thermoplastic elastomer may be molded by, for example, vacuum forming, pressure forming, injection molding, or melt casting. Therefore, when compared with the case of molding a tire case from rubber as in conventional cases, it is not necessary to perform vulcanization, and the production process can be simplified to a large extent, and the molding time may be shortened.

Furthermore, in the present exemplary embodiment, since the tire case half parts 17A have laterally symmetrical shapes, that is, one of the tire case halves 17A and the other one of the tire case halves 17A have the same shape, there is an advantage in that only one kind of mold is necessary for molding the tire case half parts 17A.

According to the present first exemplary embodiment, as illustrated in FIG. 1(B), an annular bead core 18 formed from a steel cord is embedded in the bead portion 12, similarly to the conventional general pneumatic tires. However, the present invention is not intended to be limited to this configuration, and as long as rigidity of the bead portion 12 is secured and there is no problem with the fitting with the rim 20, the bead core 18 may be omitted. The bead core may also be formed from an organic fiber cord, a resin-coated organic fiber cord, a rigid resin, or the like, in addition to the steel cord.

In the first exemplary embodiment, a annular sealing layer 24 formed of a material, such as a rubber, having a sealing property superior to that of the resin material constituting the tire case 17 is formed in the area which is brought into contact with the rim 20 of the bead portion 12, or at least in the area which is brought into contact with a rim flange 22 of the rim 20. The sealing layer 24 may be formed in the area where the tire case 17 (bead portion 12) is brought into contact with the bead sheet 21. Regarding the material having a sealing property superior to that of the polyester-based thermoplastic elastomer that constitutes the tire case 17, a material which is soft as compared with the polyester-based thermoplastic elastomer that constitutes the tire case 17 may be used. As the rubber that can be used in the sealing layer 24, it is preferable to use a rubber of the same kind as the rubber used in the outer surface of the bead portion of conventional general pneumatic tires made of rubber. Furthermore, if the sealing property to the rim 20 can be secured only with the resin material that forms the tire case 17, the rubber sealing layer 24 may be omitted, and a thermoplastic resin (including a thermoplastic elastomer) having an excellent sealing property may be used.

Examples of such a thermoplastic resin that is applied to the first exemplary embodiment of the tires (1) to (7) of the present invention include resins such as a polyamide resin, a polyurethane-based resin, a polyolefin-based resin, a polystyrene-based resin, or a polyester resin; and blends of these resins with rubbers or elastomers. Furthermore, examples of the thermoplastic elastomer include a polyamide-based thermoplastic elastomer, a polyurethane-based thermoplastic elastomer, a polystyrene-based thermoplastic elastomer, a polyolefin-based thermoplastic elastomer, a polyester-based thermoplastic elastomer, combinations of these elastomers, and blends of these elastomers with rubbers.

As illustrated in FIG. 1, in the crown portion 16, reinforcing cords 26 having higher rigidity than the resin material that constitutes the tire case 17 are wound in a circumferential direction of the tire case 17. When viewed from a cross-sectional direction of the tire case dissected along the axial direction of the tire case 17, the reinforcing cords 26 are helically wound in a state that at least portions of the reinforcing cords are embedded in the crown portion 16, whereby a reinforcing cord layer 28 is formed. On the outer circumferential side in the tire radial direction of the reinforcing cord layer 28, a tread 30 formed of a material having an abrasion resistance superior to that of the polyester-based thermoplastic elastomer that constitutes the tire case 17, for example, a rubber, is disposed.

Figure 2:
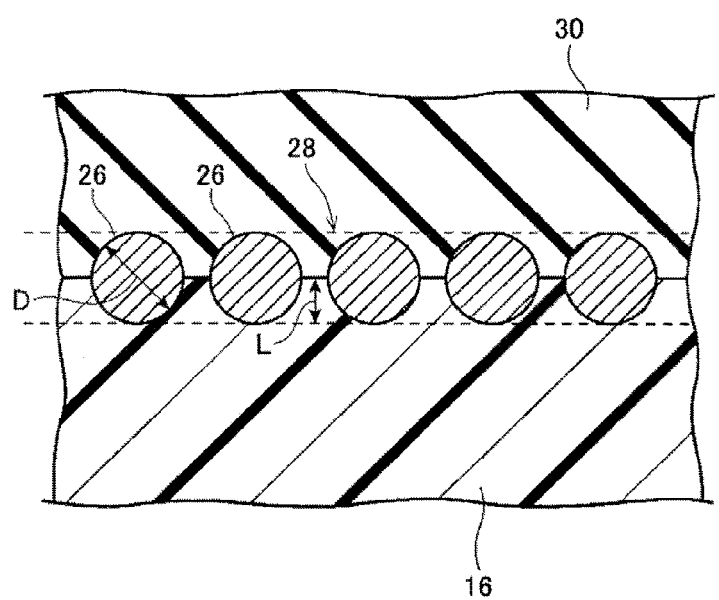
FIG. 2 is a cross-sectional diagram of the tire of the present invention related to the first to seventh aspects dissected along an axis of tire rotation, illustrating the state in which a reinforcing cord is embedded in a crown section of a tire case of the tire according to a first exemplary embodiment.

The reinforcing cord layer 28 that is formed from the reinforcing cords 26 will be described by using FIG. 2. FIG. 2 is a cross-sectional diagram, dissected along the axis of tire rotation, illustrating the state in which the reinforcing cords 26 are embedded in the crown portion of the tire case of the tire of the first exemplary embodiment. As illustrated in FIG. 2, from a cross-sectional view dissected along the axial direction of the tire case 17, the reinforcing cords 26 are helically wound in a state that at least portions of the reinforcing cords are embedded in the crown portion 16, and the reinforcing cords 26 form, together with a part of an outer circumference of the tire case 17, the reinforcing cord layer 28 illustrated in the dotted-lined area in FIG. 2. The part of the reinforcing cords 26 that is embedded in the crown portion 16 is in a state of closely adhering to the resin material that constitutes the crown portion 16 (tire case 17). As the reinforcing cord 26, a monofilament (single wire) of a metal fiber, an organic fiber or the like; a multifilament (twisted wire) obtained by twisting these fibers, such as a steel cord produced by twisting steel fiber; or the like may be used. In the first exemplary embodiment, a steel cord is used as the reinforcing cord 26.

Furthermore, the depth L in FIG. 2 represents the depth of embedding of the reinforcing cord 26 in the direction of the axis of tire rotation in the tire case 17 (crown portion 16). The depth L of embedding of a reinforcing cord 26 in the crown portion 16 is preferably ⅕ or more, and more preferably greater than ½, of the diameter D of the reinforcing cord 26. Further, it is most preferable that the entirety of the reinforcing cord 26 be embedded in the crown portion 16. When the depth L of embedding of the reinforcing cord 26 is greater than ½ of the diameter D of the reinforcing cord 26, it is difficult for the reinforcing cord 26 to escape from the embedded section from the viewpoint of dimension thereof. Furthermore, when the entirety of the reinforcing cord 26 is embedded in the crown portion 16, the surface (outer circumferential surface) becomes flat, and inclusion of air in the surroundings of the reinforcing cords can be suppressed even when members are mounted on the crown portion 16 where the reinforcing cords 26 are embedded. The reinforcing cord layer 28 corresponds to the belt that is disposed on the outer circumferential surface of the carcass of a conventional pneumatic tire made of rubber.

As described above, a tread 30 is disposed on the outer circumferential side in the tire radial direction of the reinforcing cord layer 28. For the rubber used in the tread 30, a rubber of the same kind as the rubber used in conventional pneumatic tires made of rubber is preferably used. Meanwhile, instead of the tread 30, a tread formed from a thermoplastic resin material of a different kind, which has abrasion resistance superior to that of the polyester-based thermoplastic elastomer that constitutes the tire case 17, may be used. Furthermore, in the tread 30, a tread pattern including plural grooves is formed on the contact surface with the road surface, similarly to conventional pneumatic tires made of rubber.

Hereinafter, the method for producing a tire of the present invention will be described.

(Tire Case Molding Step)

First, tire case half parts that are each supported by a thin metal supporting ring are arranged to face each other. Subsequently, a bonding mold, which is not depicted in the drawings, is arranged so as to be in contact with the outer circumferential surfaces of the colliding parts of the tire case half parts. Here, the bonding mold is configured to press the vicinity of the bonding section (colliding part) of a tire case half part A with a predetermined pressure. Subsequently, the vicinity of the bonding sections of the tire case half parts are pressed at a temperature equal to or higher than the melting temperature of the thermoplastic resin material that constitutes the tire case. By heating the bonding sections of the tire case half parts under pressure using the bonding mold, the bonding sections melt and the tire case half parts fuse together, whereby these members are integrated to form the tire case 17. Since the resin material that constitutes the tire case contains a polyester-based thermoplastic elastomer, the resin material exhibits less deformation or change in hardness which is caused by temperature fluctuation in the use environment. Therefore, it is assumed that the influence of temperature change on the ride quality is small.

In the present embodiment, the bonding sections of the tire case half parts are heated using a bonding mold. However, the production method of the present invention is not intended to be limited to this, and for example, the tire case half parts may also be bonded by heating the bonding sections using a high-frequency heater or the like that is separately provided, or softening or melting the bonding sections in advance by hot air, irradiation of infrared radiation, or the like, followed by pressing the bonding sections using a bonding mold.

(Reinforcing Cord Member Winding Step)

Figure 3:
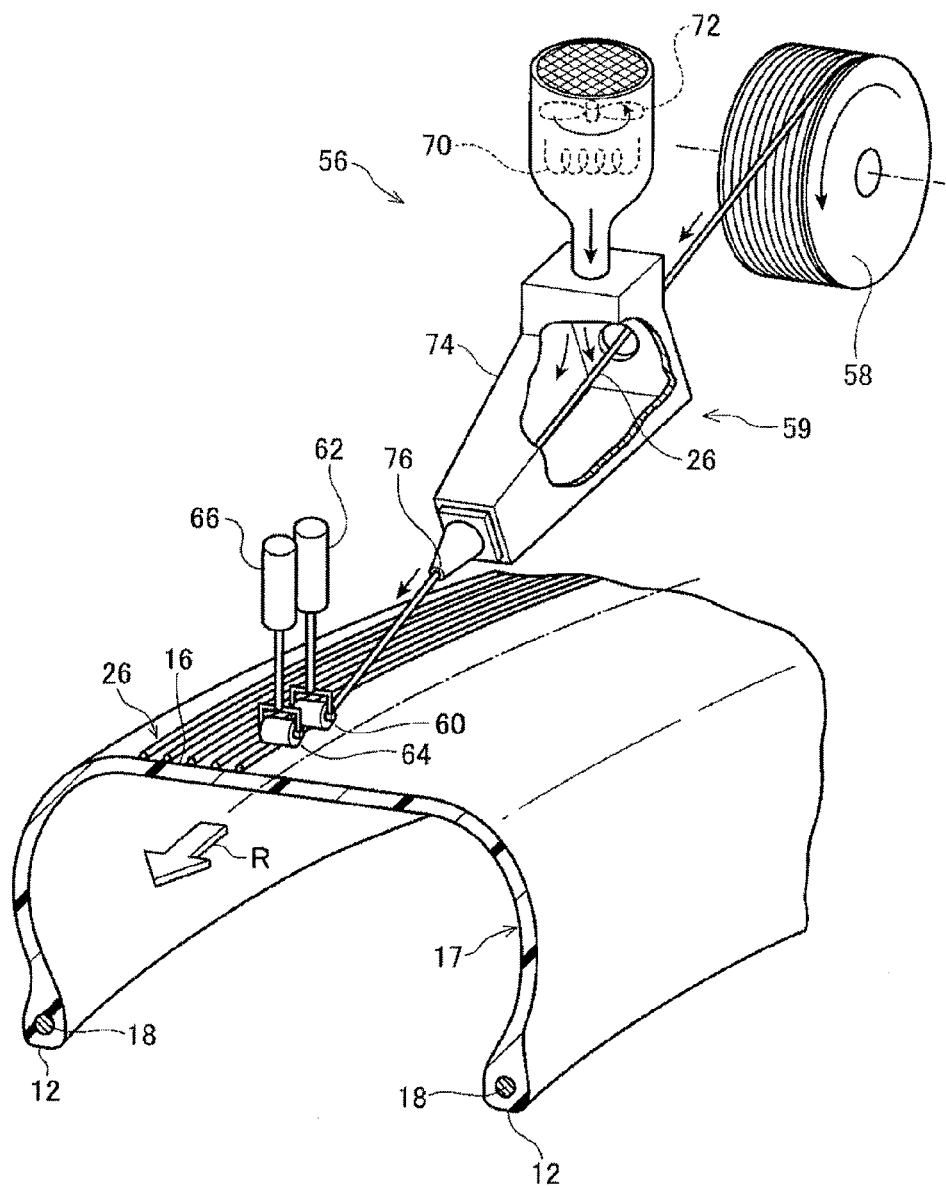
FIG. 3 is an explanatory diagram for explaining a cord heating apparatus, and the operation of embedding a reinforcing cord in the crown section of the tire case by using rollers.

Next, the reinforcing cord winding step will be described by using FIG. 3. FIG. 3 is an explanatory diagram for explaining the operation of embedding reinforcing cords in the crown portion of the tire case by using a cord heating device and rollers. In FIG. 3, a cord feeding apparatus 56 includes: a reel 58 having a reinforcing cord 26 wound around; a cord heating device 59 disposed downstream in the cord conveyance direction of the reel 58; a first roller 60 disposed downstream in the conveyance direction of the reinforcing cord 26; a first cylinder apparatus 62 that moves in the direction of contacting and detaching the first roller 60 with respect to the outer circumferential surface of the tire; a second roller 64 disposed downstream in the reinforcing cord 26 conveyance direction of the first roller 60; and a second cylinder apparatus 66 that moves in the direction of contacting and detaching the second roller 64 with respect to the outer circumferential surface of the tire. The second roller 64 may be used as a cooling roller made of a metal. Furthermore, in the present embodiment, the surface of the first roller 60 or second roller 64 is coated with a fluororesin (in the present embodiment, TEFLON (registered trademark)) in order to suppress attachment of the molten or softened thermoplastic resin material. While, in the present embodiment, the cord feeding apparatus 56 is configured to have two rollers of the first roller 60 or the second roller 64, the present invention is not intended to be limited to this configuration, and the cord feeding apparatus 56 may be configured to have only one of the above-mentioned rollers (that is, having one roller).

The cord heating device 59 includes a heater 70 that generates hot air and a fan 72. Furthermore, the cord heating device 59 includes: a heating box 74 into which the hot air is supplied therein, and in which the reinforcing cord 26 passes therethrough; and a discharge port 76 through which a heated cord 26 is discharged.

In the present step, first, the temperature of the heater 70 of the cord heating device 59 is raised, and the air in the surroundings which is heated by the heater 70 is sent to the heating box 74 by the wind generated by rotation of the fan 72. Subsequently, a reinforcing cord 26 that is wound off from the reel 58 is sent into and heated in the heating box 74 in which the internal space has been heated by hot air (for example, the reinforcing cord 26 is heated to a temperature of about 100° C. to 200° C.). The heated reinforcing cord 26 is passed through the discharge port 76 and is helically wound, with a certain tension, around the outer circumferential surface of the crown portion 16 of the tire case 17 that rotates in the direction of arrow R in FIG. 3. Here, when the heated reinforcing cord 26 is brought into contact with the outer circumferential surface of the crown portion 16, the thermoplastic resin material at the contact area melts or softens, and at least a portion of the heated reinforcing cord is embedded in the outer circumferential surface of the crown portion 16. At this time, since the heated reinforcing cord 26 is embedded in the thermoplastic resin material that has melted or softened, a state in which there is no gap between the thermoplastic resin material and the reinforcing cord 26, that is, a state in which the two members are closely adhered, is achieved. As a result, incorporation of air into the area where the reinforcing cord 26 is embedded is suppressed. By heating the reinforcing cord 26 to a temperature higher than the melting temperature of the thermoplastic resin material of the tire case 17, melting or softening of the thermoplastic resin material at the area of contact with the reinforcing cord 26 is enhanced. In this manner, it becomes easy to embed the reinforcing cord 26 in the outer circumferential surface of the crown portion 16, and also, incorporation of air can be effectively suppressed.

The depth L of embedding of the reinforcing cord 26 may be adjusted by means of the heating temperature of the reinforcing cord 26, the tension applied to the reinforcing cord 26, the pressing pressure applied by the first roller 60, or the like. In the present embodiment, it is configured such that the depth L of embedding of the reinforcing cord 26 is ⅕ or more of the diameter D of the reinforcing cord 26. Meanwhile, the depth L of embedding of the reinforcing cord 26 is more preferably greater than ½ of the diameter D, and it is most preferable that the entirety of the reinforcing cord 26 be embedded.

In this manner, by winding the heated reinforcing cord 26 while embedding the reinforcing cord in the outer circumferential surface of the crown portion 16, the reinforcing cord layer 28 is formed on the outer circumferential side of the crown portion 16 of the tire case 17.

Subsequently, a vulcanized band-shaped tread 30 is wound once on the outer circumferential surface of the tire case 17, and the tread 30 is adhered to the outer circumferential surface of the tire case 17 using an adhesive or the like. As the tread 30, a precure tread that is used in conventionally known retreaded tires, may be used. The present step is a step similar to the step of adhering a precure tread to the outer circumferential surface of a casing of a retreaded tire.

Then, a sealing layer 24 formed of a vulcanized rubber is adhered to the bead portion 12 of the tire case 17 using an adhesive or the like, thereby obtaining the tire 10.

(Operation)

When the tire 10 is the tire (1) of the present invention, since the tire case 17 is formed of a polyester-based thermoplastic elastomer, the tire 10 is excellent in heat resistance, tensile elastic modulus, tensile strength, and fracture strain. Furthermore, since the tire 10 of the present embodiment is a tire using a thermoplastic resin material and the structure thereof thus can be simplified, the tire has a lighter weight as compared to conventional rubber tires. Accordingly, the tire 10 of the present embodiment has high abrasion resistance and high durability, and a car equipped with this tire has satisfactory fuel efficiency.

When the tire 10 is the tire (2) of the present invention, since the tire case 17 is formed of a thermoplastic resin material containing a polyester-based thermoplastic elastomer and another elastomer, that is, a polyurethane-based thermoplastic elastomer, the tire is excellent in heat resistance, tensile elastic modulus, tensile strength, and fracture strain. Furthermore, since the tire 10 of the present embodiment is a tire using a thermoplastic resin material, the structure thereof is simple and the tire has a lighter weight, as compared with conventional rubber tires. Therefore, the tire 10 of the present embodiment has excellent impact resistance and has high abrasion resistance and high durability, and a car equipped with this tire has satisfactory fuel efficiency.

When the tire 10 is the tire (3) of the present invention, in the tire 10, since the tire case 17 is formed by using a thermoplastic resin material containing a polyester-based thermoplastic elastomer (manufactured by DuPont-Toray Co., Ltd., HYTREL 6347; registered trademark) and a butadiene rubber (BR) at a mass ratio of 70:30, the tire is excellent in impact resistance, tensile elastic modulus, and tensile strength. Furthermore, the tire exhibits less deformation or change in hardness that is caused by temperature fluctuation in the use environment, and exhibits strong impact resistance. Therefore, the tire 10 of the present embodiment has excellent durability. Furthermore, since the tire structure can be simplified, the tire has a light weight as compared to conventional rubber. Also, the Tan δ value can be decreased. Therefore, since the tire 10 of the present embodiment can be subjected to weight reduction, and rolling resistance can also be suppressed, the fuel efficiency of a car using such a tire can be improved.

When the tire 10 is the tire (4) of the present invention, in the tire 10, since the tire case 17 is formed by using a thermoplastic resin material which is a mixed material of a polyester-based thermoplastic elastomer (A) and a polyester resin (B), even if the elastic modulus of the thermoplastic resin material is increased, the Tan δ value of the thermoplastic resin material does not easily increase, and rolling resistance of the tire can be suppressed. Furthermore, since the tire 10 of the present embodiment is a tire using a thermoplastic resin material, the structure can be simplified, and therefore, the tire has a light weight as compared to the rubber that has been used in conventional tires. Accordingly, when the tire 10 of the present embodiment is applied to a car, weight reduction can be achieved, and fuel consumption can be suppressed.

When the tire 10 is the tire (5) of the present invention, in the tire 10, since the tire case 17 is formed by using the thermoplastic resin material described above, the tire has excellent tensile elastic modulus and fracture properties. Furthermore, since the tire 10 of the present embodiment is a tire using a thermoplastic resin material, the structure can be simplified, and therefore, the tire has a light weight as compared to the rubber that has been used in conventional tires. Accordingly, when the tire 10 of the present embodiment is applied to a car, weight reduction can be achieved, and fuel consumption can be suppressed.

Particularly, when the acid value of the thermoplastic resin material used in the formation of the tire case 17 is from 0.1 mg-CH$_3$ONa/g to 10 mg-CH$_3$ONa/g, in the thermoplastic resin material having a sea-island structure in which a polyester-based thermoplastic elastomer constitutes the sea phase, and an acid-modified elastomer, or an acid-modified elastomer and another thermoplastic elastomer (unmodified) constitutes the island phase, the island is finely dispersed, and impact resistance and tensile characteristics of the tire are enhanced.

When the tire 10 is the tire (6) of the present invention, the tire 10 exhibits excellent impact resistance because the tire case 17 is formed by using a thermoplastic resin material containing at least one of a specific copolymer or a specific acid-modified copolymer and a polyester-based thermoplastic elastomer. Also, the tire exhibits less deformation or change in hardness that is caused by temperature fluctuation in the use environment. Further, since the tire structure can be simplified, the tire has a light weight as compared with conventional rubber. Therefore, when the tire 10 of the present embodiment is applied to a car, excellent durability is obtained. Also, since weight reduction of the tire can be achieved, the fuel efficiency of a car using such a tire can be improved.

When the tire 10 is the tire (7) of the present invention, the elastic modulus is increased while the loss factor (Tan δ) of the tire frame is maintained at a low level in the tire 10 as compared with the case of using the first or second thermoplastic elastomer alone because the tire case 17 is formed by using a resin material containing a polyester-based elastomer (first thermoplastic elastomer) (elastic modulus: 422 MPa, Tan δ: 0.102) and a polyester-based elastomer (second thermoplastic elastomer) (elastic modulus: 45 MPa, Tan δ: 0.029). Therefore, the tire 10 has excellent heat resistance and has lowered rolling resistance. Further, since the tire 10 has a simple structure as compared with conventional tires made of rubber, the tire has a light weight. Accordingly, the tire 10 of the present embodiment has high abrasion resistance and durability.

Furthermore, in regard to the tires (1) to (7) of the present invention, the resin material that is applied to the first exemplary embodiment has adhesiveness to the reinforcing cord 26. Therefore, the phenomenon in which air remains (incorporation of air) in the vicinity of the reinforcing cord 26 in the reinforcing cord winding step can be suppressed. When the resin material has adhesiveness to the reinforcing cord 26, and incorporation of air into the vicinity of the reinforcing cord members is suppressed, it is possible to effectively prevent the movement of the reinforcing cord 26 which is caused by the force applied thereto at the time of driving or the like. As a result, for example, since the movement of the reinforcing cord members is suppressed, even in the case where a tire-constituting member is arranged so as to cover the entirety of the reinforcing cord members in an outer circumference of the tire frame, the occurrence of separation or the like between these members (including the tire frame) is suppressed, and durability of the tire 10 is enhanced.

Furthermore, in the tire (5) of the present invention, since the thermoplastic resin material contains an acid-modified elastomer, the thermoplastic resin material exhibits excellent fluidity, and by adjusting the modification ratio of the acid-modified elastomer to the range previously described, the thermoplastic resin material exhibits particularly excellent injection molding property. Thereby, the production efficiency of the tire is enhanced, and also, energy saving can be achieved so that it is environmentally preferable.

Furthermore, in the tire 10 of the first exemplary embodiment, since the reinforcing cord 26 having a higher rigidity than that of the resin material containing a polyester-based thermoplastic elastomer is helically wound in a circumferential direction on the outer circumferential surface of the crown portion 16 of the tire case 17 that is formed of the thermoplastic resin material, the resistance to puncture, resistance to cutting, and rigidity in a circumferential direction of the tire are enhanced. In addition, as the rigidity in a circumferential direction of the tire 10 is enhanced, creeping in the tire case 17 formed of the thermoplastic resin material is prevented.

Since, in the cross-sectional view dissected along the axial direction of the tire case 17 (cross-section illustrated in FIG. 1), at least a portion of the reinforcing cord 26 is embedded in the outer circumferential surface of the crown portion 16 of the tire case 17 formed of a resin material, and the reinforcing cord is adhering to the resin material, incorporation of air at the time of production is suppressed, and the movement of the reinforcing cord 26 caused by the force applied thereto at the time of driving or the like is prevented. As a result, the occurrence of separation or the like of the reinforcing cord 26, tire case 17 and tread 30 is suppressed, and durability of the tire 10 is enhanced.

As illustrated in FIG. 2, since the depth L of embedding of the reinforcing cord 26 is 1/5 or more of the diameter D, incorporation of air at the time of production is effectively suppressed, and the movement of the reinforcing cord 26 caused by the force applied thereto at the time of driving or the like is further suppressed.

As such, when the reinforcing cord layer 28 is composed of a thermoplastic resin material containing a polyester-based thermoplastic elastomer, the difference in hardness between the tire case 17 and the reinforcing cord layer 28 can be made small as compared with the case of fixing the reinforcing cord 26 using a cushion rubber, and therefore, the reinforcing cords 26 can be further adhered and fixed to the tire case 17. As a result, the incorporation of air described above can be effectively prevented, and the reinforcing cord members can be effectively prevented from moving around at the time of driving.

Furthermore, when the reinforcing cord 26 is a steel cord in particular, since the reinforcing cord 26 can be easily separated and collected from the thermoplastic resin material by heating at the time of disposal of the tire, it is advantageous in view of the recyclability of the tire 10.

Furthermore, since the polyester-based thermoplastic elastomer has a lower loss factors (Tan δ) as compared with vulcanized rubbers, the rolling property of the tire can be enhanced when the reinforcing cord 28 contains a large proportion of a polyester-based thermoplastic elastomer.

Moreover, the polyester-based thermoplastic elastomer that is contained in the resin material has an advantage in that the elastomer has high in-plane shear rigidity, leading to excellent steering stability at the time of driving the tire and excellent abrasion resistance.

Since the tread 30 that is brought into contact with the road surface is constructed from a rubber material having a higher abrasion resistance than the thermoplastic resin material, abrasion resistance of the tire 10 is enhanced.

Furthermore, since the annular bead core 18 formed of a metal material is embedded in the bead portion 12, the tire case 17, that is, the tire 10, is maintained rigid against the rim 20, similarly to the conventional pneumatic tires made of rubber.

Also, since a sealing layer 24 which is formed of a rubber material and has a higher sealing property than the thermoplastic resin material, is provided at the area of the bead portion 12 which is in contact with the rim 20, the sealing property between the tire 10 and the rim 20 is enhanced. Therefore, as compared with the case of sealing the rim 20 with a polyester-based thermoplastic elastomer, air leakage in the tire is further suppressed. Also, as the sealing layer 24 is provided, rim fittability is also enhanced.

In the first exemplary embodiment, the reinforcing cord 26 is heated, and the resin material at the area that is brought into contact with the heated reinforcing cord 26 is melted or softened. However, the present invention is not intended to be limited to this configuration, and it is also acceptable to adopt a configuration in which the reinforcing cord 26 is not heated, but the outer circumferential surface of the crown portion 16 where the reinforcing cord 26 is to be embedded is heated using a hot air generating apparatus, followed by embedding the reinforcing cord 26 in the crown portion 16.

In the first exemplary embodiment, the heat source of the cord heating device 59 includes a heater and a fan. However, the present invention is not limited to this configuration, and a configuration in which the reinforcing cord 26 is directly heated by radiant heat (for example, infrared radiation) may be adopted.

In the configuration of the first exemplary embodiment, the area of the thermoplastic resin material having the reinforcing cord 26 embedded therein which has been melted or softened, is forcibly cooled using a second roller 64 made of a metal. However, the present invention is not intended to be limited to this configuration, and a configuration in which cold air is directly blown to the area where the thermoplastic resin material has been melted or softened, to forcibly cool and solidify the area where the thermoplastic resin material has been melted or softened, may also be adopted.

In the configuration of the first exemplary embodiment, the reinforcing cord 26 is heated. However, for example, a configuration in which an outer circumference of the reinforcing cord 26 is coated with the same thermoplastic resin material as that used in the tire case 17 may also be adopted. In this case, when the coated reinforcing cord is wound around the crown portion 16 of the tire case 17, the thermoplastic resin material that is coating the reinforcing cord is also heated together with the reinforcing cord 26, whereby incorporation of air at the time of embedding in the crown portion 16 can be effectively suppressed.

Furthermore, helically winding the reinforcing cord 26 is easier in view of production, but a method of winding the reinforcing cords 26 discontinuously in the width direction, or the like may also be considered.

The tire 10 of the first exemplary embodiment is a so-called tubeless tire in which an air chamber is formed between the tire 10 and the rim 20 by mounting the bead portion 12 on the rim 20. However, the present invention is not intended to be limited to this configuration, and a complete tube shape may also be employed.

Figure 7:
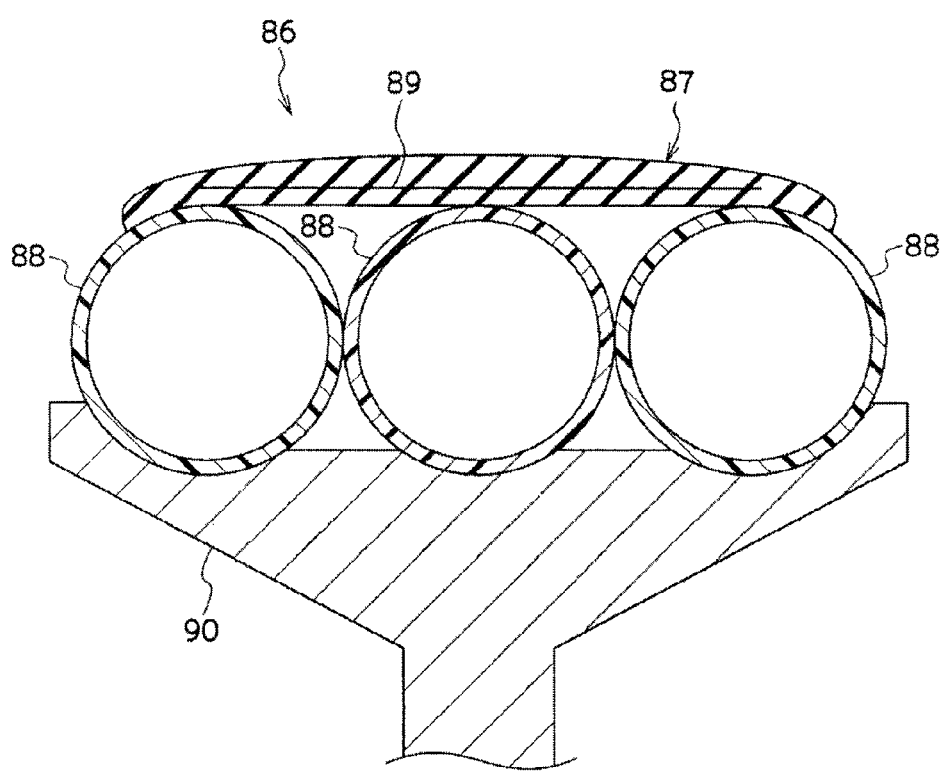
FIG. 7 is a cross-sectional diagram of a tire according to another embodiment of the tire of the present invention related to the sixth and seventh aspects.

Meanwhile, when the tire 10 of the first exemplary embodiment is the tire (6) or (7) of the present invention, the tire of a complete tube shape may be, for example, in an embodiment having three annularly shaped tire frames are disposed in the tire width direction as illustrated in FIG. 7. FIG. 7 is a cross-sectional diagram of a tire according to another embodiment. As illustrated in FIG. 7, a tire 86 includes a tread rubber layer 87; annularly shaped hollow tubes (tire frames) 88 formed of the same resin material as that used in the first exemplary embodiment; a belt (reinforcing cords) 89; and a rim 90. The tubes 88 are disposed such that three pieces are disposed in parallel in the tire width direction of the tire 86. On an outer circumference of the tubes 88, the tread rubber layer 87 having the belt 89 embedded therein is adhered. Further, the tubes 88 are mounted on the rim 90 having concave sections that engage with the tubes 88. In addition, this tire 86 is not provided with a bead core.

The first exemplary embodiment of the tires (1) to (7) of the present invention has been explained by way of embodiments. However, these embodiments are only examples, and various modifications may be carried out to the extent that the gist is maintained. Also, it is needless to say that the scope of the present invention is not intended to be limited to these embodiments.

[Second Exemplary Embodiment]

Next, a second exemplary embodiment of the tires (1) to (7) of the present invention and a production method thereof will be described with reference to the drawings.

Unless particularly stated otherwise, the items related to the first exemplary embodiment that will be described below are items which are common as the second exemplary embodiment of the tires (1) to (7) of the present invention.

Figure 4A:
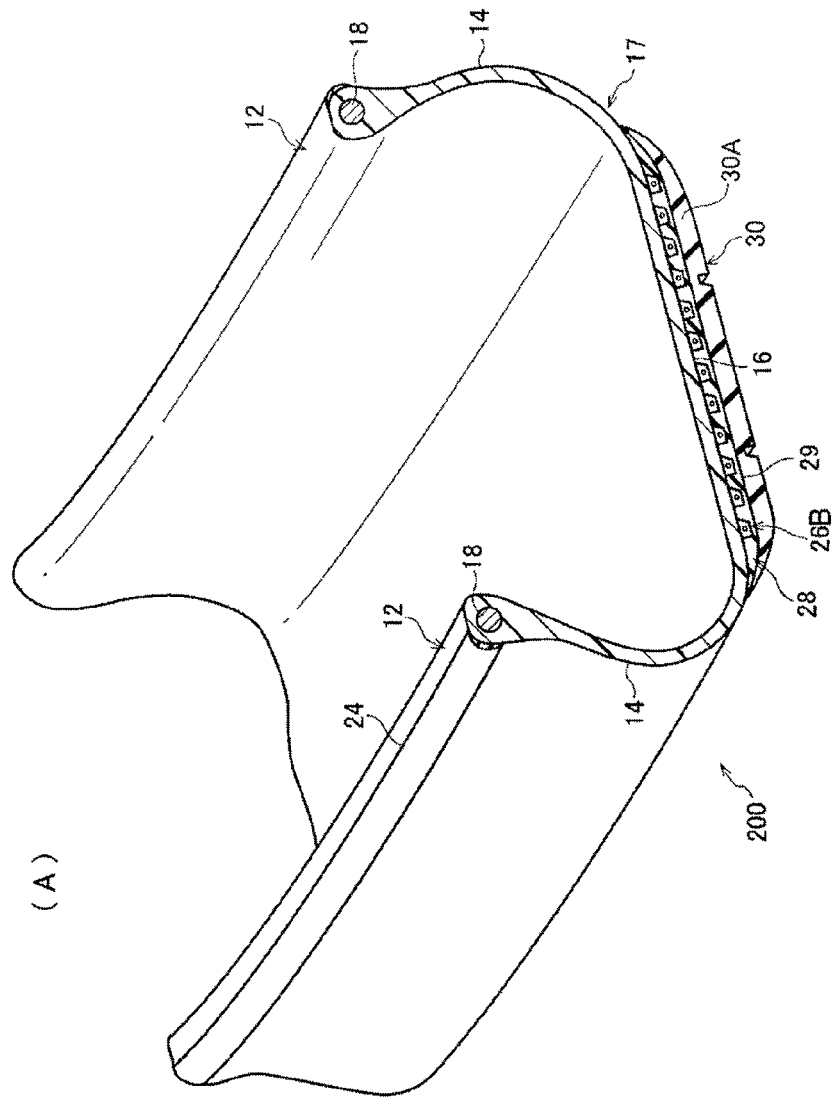
FIG. 4A is a cross-sectional diagram of a tire according to an embodiment of the tire of the present invention related to the first to seventh aspects, dissected along a tire width direction.
Figure 4B:
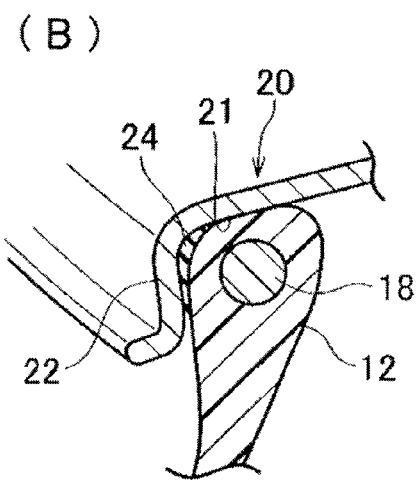
FIG. 4B is a magnified diagram of the cross-section of the bead portion in a state in which a rim is fitted to the tire, dissected along a tire width direction.
Figure 5:
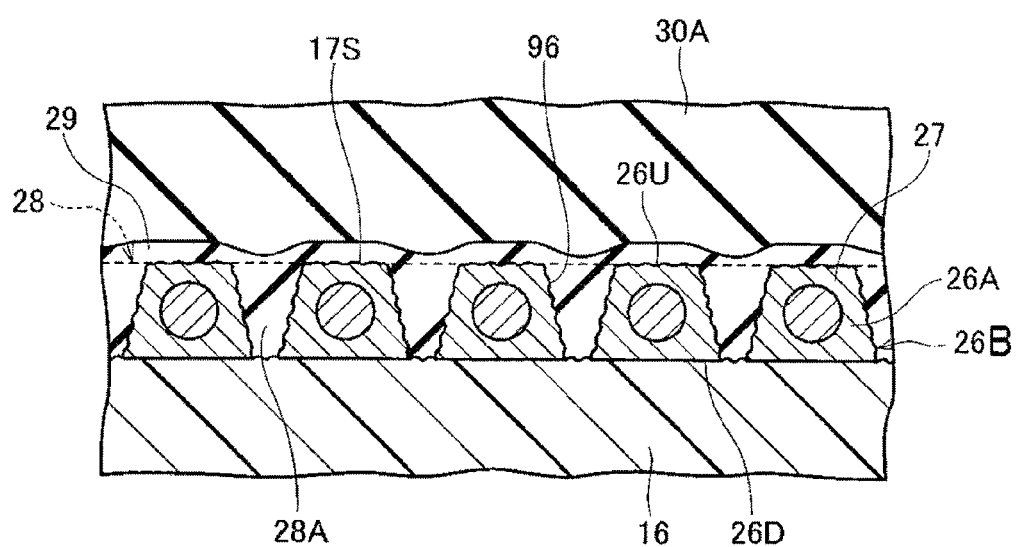
FIG. 5 is a cross-sectional diagram illustrating the vicinity of the reinforcing layer of a tire according to a second exemplary embodiment of the tire of the present invention related to the first to seventh aspects, dissected along a tire width direction.

The tire of the second exemplary embodiment has substantially the same cross-sectional shape as that of conventional general pneumatic tires made of rubber, similarly to the first exemplary embodiment described above. Therefore, in the following drawings, the same reference numerals will be assigned to the same configurations as those of the first exemplary embodiment. FIG. 4(A) is a cross-sectional diagram of the tire of the second exemplary embodiment dissected along the tire width direction, and FIG. 4(B) is an enlarged diagram of the cross-section of the bead portion in a state in which the rim is fitted to the tire of the second exemplary embodiment, dissected along the tire width direction. Furthermore, FIG. 5 is a cross-sectional diagram illustrating the vicinity of the reinforcing layer of the tire of the second exemplary embodiment, dissected along the tire width direction.

When the tire case 17 according to the second exemplary embodiment is a tire case provided to the tire (1) of the present invention, the tire case 17 is formed of a polyester-based thermoplastic elastomer ("HYTREL 5557" manufactured by DuPont-Toray Co., Ltd.), similarly to the first exemplary embodiment.

When the tire case 17 according to the second exemplary embodiment is a tire case provided to the tire (2) of the present invention, the tire case 17 is formed of a thermoplastic resin material containing a polyester-based thermoplastic elastomer ("HYTREL 6347" manufactured by DuPont-Toray Co., Ltd.) and a polyurethane-based thermoplastic elastomer ("ET680" manufactured by BASF) in a mass ratio of 80:20, similarly to the first exemplary embodiment.

When the tire case 17 according to the second exemplary embodiment is a tire case provided to the tire (3) of the present invention, similarly to the first exemplary embodiment, the tire case 17 is formed of a thermoplastic resin material containing a polyester-based thermoplastic elastomer (manufactured by DuPont-Toray Co., Ltd., HYTREL 6347; registered trademark) and a butadiene rubber (BR) at a mass ratio of 70:30.

When the tire case 17 according to the second exemplary embodiment is a tire case provided to the tire (4) of the present invention, similarly to the first exemplary embodiment, the tire case 17 is formed of a thermoplastic resin material [a mixed material of a polyester-based thermoplastic elastomer ("HYTREL 3046"; registered trademark, manufactured by DuPont-Toray Co., Ltd.) and a polyester resin ("DURANEX 2000"; registered trademark, manufactured by Polyplastics Co., Ltd.).

When the tire case 17 according to the second exemplary embodiment is a tire case provided to the tire (5) of the present invention, similarly to the first exemplary embodiment, the tire case 17 is formed of a thermoplastic resin material [a mixed material of a polyester-based thermoplastic elastomer ("HYTREL 6347"; registered trademark, manufactured by DuPont-Toray Co., Ltd.) and an acid-modified α-olefin-based thermoplastic elastomer ("TAFMER MA7010"; registered trademark, manufactured by Mitsui Chemicals, Inc.): acid value of the thermoplastic resin material=1.11 mg-$CH_3ONa$/g].

When the tire case 17 according to the second exemplary embodiment is a tire case provided to the tire (6) of the present invention, similarly to the first exemplary embodiment, the tire case 17 is formed of a thermoplastic resin material which is composed of a mixture material of a polyester-based thermoplastic elastomer (polyester-based thermoplastic elastomer "HYTREL 6347" manufactured by DuPont-Toray Co., Ltd.), a specific copolymer (ethylene-methacrylic acid copolymer "NUCREL N035C" manufactured by DuPont-Mitsui Polychemicals Co., Ltd.) and a specific acid-modified copolymer (acid modification product of ethylene-acrylate ethyl ester copolymer "HPR, AR2011" manufactured by DuPont-Mitsui Polychemicals Co., Ltd.).

When the tire case 17 according to the second exemplary embodiment is a tire case provided to the tire (7) of the present invention, similarly to the first exemplary embodiment, the tire case 17 is formed of a mixture of a polyester-based elastomer (first thermoplastic elastomer) ("HYTREL 7247" manufactured by DuPont-Toray Co., Ltd.; elastic modulus: 422 MPa, Tan δ: 0.102) and a polyester-based elastomer (second thermoplastic elastomer) ("HYTREL 4047" manufactured by DuPont-Toray Co., Ltd.; elastic modulus: 45 MPa, Tan δ: 0.029).

Further, the mass ratio (x/y) of the first thermoplastic elastomer (x) and the second thermoplastic elastomer (y) is 55:45.

As shown in FIGS. 4 and 5, in a tire 200 according to the second exemplary embodiment, a reinforcing cord layer 28 (indicated by the dashed line in FIG. 5) in which coated cord members 26B are wound in a circumferential direction, is superposed on a crown portion 16. The reinforcing cord layer 28 constitutes an outer circumference of the tire case 17 and reinforces the rigidity in a circumferential direction of the crown portion 16. The outer circumferential surface of the reinforcing cord layer 28 is included in the outer circumferential surface 17S of the tire case 17.

The coated cord members 26B are each formed by coating a cord member 26A having a higher rigidity than that of the thermoplastic resin material that forms the tire case 17, with a resin material for coating 27 that is physically different from the thermoplastic resin material that forms the tire case 17. Furthermore, the coated cord members 26B and the crow section 16 are bonded (for example, welded, or adhered with an adhesive) in the contact area between the coated cord members 26B and the crown portion 16.

The elastic modulus of the resin material for coating 27 is preferably set within the range of 0.1 times to 10 times the elastic modulus of the resin material that forms the tire case 17. When the elastic modulus of the resin material for coating 27 is 10 times or less the elastic modulus of the thermoplastic resin material that forms the tire case 17, the crown portion does not become too hard, and the rim fitting is facilitated. Also, when the elastic modulus of the resin material for coating 27 is 0.1 times or more the elastic modulus of the thermoplastic resin material that forms the tire case 17, the resin that constitutes the reinforcing cord layer 28 does not become too soft, the in-plane shear rigidity of the belt is excellent, and the cornering power is enhanced.

In the tire (1) of the present invention, the same material as the thermoplastic resin material that constitutes the tire case 17 ["HYTREL 5557" manufactured by DuPont-Toray Co., Ltd.] is used as the resin material for coating 27.

In the tire (2) of the present invention, a material which is similar to the thermoplastic resin material that constitutes the tire case 17 [a mixture of a polyester-based thermoplastic elastomer ("HYTREL 6347" manufactured by DuPont-Toray Co., Ltd.) and a polyurethane-based thermoplastic elastomer ("ET680" manufactured by BASF SE) (mass ratio 80:20)] is used as the resin material for coating 27.

In the tire (3) of the present invention, a material which is similar to the thermoplastic resin material that constitutes the tire case 17 [a thermoplastic resin material containing a polyester-based thermoplastic elastomer ("HYTREL 6347" manufactured by DuPont-Toray Co., Ltd.) and a butadiene rubber (BR) at a mass ratio of 70:30] is used as the resin material for coating 27.

In the tire (4) of the present invention, a material of the same kind as that of the thermoplastic resin material that constitutes the tire case 17 [a mixed material of "HYTREL 3046" manufactured by DuPont-Toray Co., Ltd. and a polyester resin ("DURANEX 2000" manufactured by Polyplastics Co., Ltd.)] is used as the resin material for coating 27.

In the tire (5) of the present invention, a material of the same kind as the thermoplastic resin material that constitutes the tire case 17 [a mixed material of "HYTREL 6347" manufactured by DuPont-Toray Co., Ltd. and an acid-modified α-olefin-based thermoplastic elastomer ("TAFMER MA7010" manufactured by Mitsui Chemicals, Inc.); acid value of the thermoplastic resin material=1.11 mg-CH$_3$ONa/g] is used as the resin material for coating 27.

In the tire (6) of the present invention, a material which is similar to the thermoplastic resin material that constitutes the tire case 17 [a thermoplastic resin material composed of a mixed material of a polyester-based thermoplastic elastomer (polyester-based thermoplastic elastomer "HYTREL 6347" manufactured by DuPont-Toray Co., Ltd., a specific copolymer (ethylene-methacrylic acid copolymer "NUCREL N035C" manufactured by DuPont-Mitsui Polychemicals Co., Ltd.), and a specific acid-modified copolymer (acid modification product of ethylene-acrylate ethyl ester copolymer "HPR, AR2011" manufactured by DuPont-Mitsui Polychemicals Co. Ltd.)) is used as the resin material for coating 27.

In the tire (6) of the present invention, a material which is similar to the resin material that constitutes the tire case 17 is used as the resin material for coating 27.

Furthermore, as illustrated in FIG. 5, the coated cord members 26B each have a substantially trapezoidal cross-sectional shape. Meanwhile, in the following, the upper surface of the coated cord member 26B (the outer surface in the tire radial direction) is indicated with reference symbol 26U, and the lower surface (the inner surface in the tire radial direction) is indicted with reference symbol 26D. In the second exemplary embodiment, a coated cord member 26B is configured to have a substantially trapezoidal cross-sectional shape. however, the present invention is not intended to be limited to this configuration, and any shape may be employed, except for a cross-sectional shape which becomes broader in width from the lower surface 26D side (inner side in the tire radial direction) toward the upper surface 26U side (outer side in the tire radial direction).

As illustrated in FIG. 5, since the coated cord members 26B are arranged at an interval in a circumferential direction, gaps 28A are formed between adjacent coated cord members 26B. Therefore, the outer circumferential surface of the reinforcing cord layer 28 is provided with surface asperities, and the outer circumferential surface 17S of the tire case 17 in which this reinforcing cord layer 28 constitutes an outer circumference is also provided with surface asperities.

On the outer circumferential surface 17S (including the surface asperities) of the tire case 17, finely roughened surface asperities 96 are uniformly formed, and a cushion rubber 29 is bonded thereon by means of a bonding agent. In regard to this cushion rubber 29, the rubber part of the inner side in the radial direction flows into the roughened surface asperities 96.

Furthermore, a tread 30 formed of a material, such as a rubber, having an abrasion resistance superior to that of the resin material that forms the tire case 17 is bonded to the top (outer circumferential surface) of the cushion rubber 29.

As the rubber used for the tread 30 (tread rubber 30A), a rubber of the same kind as that of the rubber used in the conventional pneumatic tires made of rubber is preferably used. Instead of the tread 30, a tread formed of a resin material of another kind and having an abrasion resistance superior to that of the resin material that forms the tire case 17 may be used. Furthermore, in the tread 30, a tread pattern (not depicted in the drawings) having plural grooves is formed on the contact surface with the road surface, similarly to the conventional pneumatic tires made of rubber.

Next, the method for producing a tire of the second exemplary embodiment will be described.

(Tire Frame Forming Step)

(1) First, tire case half parts 17A are formed in the same manner as in the first exemplary embodiment described above, and they are heated and pressed using a bonding mold, to thereby form a tire case 17.

(Reinforcing Cord Member Winding Step)

The tire producing apparatus used in the second exemplary embodiment is similar to that is the first exemplary embodiment, except that a coated cord member 26B that has a substantially trapezoidal cross-sectional shape and that is obtained by coating a cord member 26A with a resin material for coating 27 (the thermoplastic resin material in the present exemplary embodiment), is wound around the reel 58 in the cord feeding apparatus 56 illustrated in FIG. 3 of the first exemplary embodiment. Furthermore, a blasting apparatus for roughening the outer circumferential surface 17S of the tire case 17, which is not depicted in the drawings, is movably mounted on a guide rail 54.

First, the temperature of the heater 70 is increased, and the air in the surroundings that has been heated by the heater 70 is sent to the heating box 74 by means of the wind generated by rotation of the fan 72. The coated cord member 26B that is wound off from the reel 58 is sent into the heating box 74 in which the internal space has been heated by hot air, so as to be heated (for example, the temperature at the outer circumferential surface of the coated cord member 26B is adjusted to a temperature equal to or higher than the melting temperature of the resin material for coating 27). Here, as the coated cord member 26B is heated, the resin material for coating 27 is brought to a state of being melted or softened.

The coated cord member 26B is passed through the discharge port 76 and is helically wound, with a certain tension, around the outer circumferential surface of the crown portion 16 of the tire case 17 that rotates in the near side direction of the plane of paper. At this time, the lower surface 26D of the coated cord member 26B is brought into contact with the outer circumferential surface of the crown portion 16. The resin material for coating 27 that is in a molten or softened state at the contact area spreads over the outer circumferential surface of the crown portion 16, and the coated cord member 26B is welded to the outer circumferential surface of the crown portion 16. As a result, the bonding strength between the crown portion 16 and the coated cord member 26B is enhanced.

(Roughening Treatment Step)

(3) Next, in the blasting apparatus that is not depicted in the drawings, a projection material is injected out at a high speed onto the outer circumferential surface 17S toward the outer circumferential surface 17S of the tire case 17, while rotating the tire case 17. The projection material that has been injected collides with the outer circumferential surface 17S, and forms finely roughened surface asperities 96 having an arithmetic mean roughness Ra of 0.05 mm or larger on the outer circumferential surface 17S.

When finely roughened surface asperities are formed on the outer circumferential surface 17S of the tire case 17 in this manner, the outer circumferential surface 17S becomes hydrophilic, and the wettability of the bonding agent that will be described below is enhanced.

(Superposing Step)

(4) Next, a bonding agent is applied on the outer circumferential surface 17S of the tire case 17 that has been subjected to a roughening treatment.

Note that examples of the bonding agent include a triazinethiol-based adhesive, a chlorinated rubber-based adhesive, a phenolic resin adhesive, an isocyanate-based adhesive, and a halogenated rubber-based adhesive, and there are no particular limitations. However, it is preferable that the bonding agent is capable of reacting at a temperature at which the cushion rubber 29 is vulcanized (90° C. to 140° C.).

(5) Next, a cushion rubber 29 in an unvulcanized state is wound once on the outer circumferential surface 17S where the bonding agent has been applied, and on the cushion rubber 29, for example, a bonding agent such as a rubber cement composition is applied. A tread rubber 30A that is in a vulcanized or semi-vulcanized state is wound once thereon, thereby obtaining a tire case in a raw state.

(Vulcanizing Step)

(6) Next, the raw tire case is accommodated in a vulcanizing can or mold and is subjected to vulcanization. At this time, an unvulcanized cushion rubber 29 flows into the roughened surface asperities 96 that are formed on the outer circumferential surface 17S of the tire case by the roughening treatment. After completion of the vulcanization, an anchor effect is exhibited by the cushion rubber 29 that has flown into the roughened surface asperities 96, and the bonding strength between the tire case 17 and the cushion rubber 29 is thus enhanced. In other words, the bonding strength between the tire case 17 and the tread 30 is enhanced by means of the cushion rubber 29.

In the vulcanizing step, it is necessary to increase the temperature up to a temperature (90° C. to 140° C.) which enables vulcanization of the cushion rubber 29. Thus, when only a thermoplastic resin other than the polyester-based thermoplastic elastomer is used in the tire case, the tire case 17 is caused to undergo flection due to the increase in temperature at the time of vulcanization, and therefore, shape maintainability of the tire may be affected thereby. In contrast to this, since polyester-based thermoplastic elastomers have a high deflection temperature under load as compared with other thermoplastic elastomers, the shape maintainability of the tire is further enhanced, and also, manufacturability of the tire can also be enhanced.

As such, since the thermoplastic resin material according to the present invention contains a polyester-based thermoplastic elastomer, the resin material exhibits less deformation or change in hardness that is caused by temperature fluctuation in the use environment, and is strong against impact. Therefore, during the vulcanizing step, even if the tire case is heated for a long time, the tire case is not easily deformed.

(7) Then, a sealing layer 24 formed of a soft material which is softer than the resin material is adhered to the bead portion 12 of the tire case 17 by using an adhesive or the like, thereby obtaining the tire 200.

(Operation)

When the tire 200 is the tire (1) of the present invention, since the tire case 17 is formed of a polyester-based thermoplastic elastomer, the tire 200 is excellent in heat resistance, tensile elastic modulus, tensile strength and fracture strain. Furthermore, since the tire 200 of the present exemplary embodiment is a tire using a thermoplastic resin material and the structure thereof can be simplified, the tire has a lighter weight as compared with conventional rubber tires. Accordingly, the tire 200 of the present exemplary embodiment has high abrasion resistance and high durability.

When the tire 200 is the tire (2) of the present invention, since the tire case 17 is formed of a thermoplastic resin material containing a polyester-based thermoplastic elastomer and a polyurethane-based thermoplastic elastomer as another elastomer, the tire is excellent in heat resistance, tensile elastic modulus, tensile strength and fracture strain. Furthermore, since the tire 200 of the present exemplary embodiment is a tire using a thermoplastic resin material, the structure thereof is simple, and the tire has a lighter weight, as compared with the conventional tires made of rubber. Accordingly, the tire 200 of the present exemplary embodiment has excellent impact resistance, and has high abrasion resistance and durability.

When the tire 200 is the tire (3) of the present invention, in this tire 200, since the tire case 17 is formed of a thermoplastic resin material containing a polyester-based thermoplastic elastomer and a rubber at a mass ratio of 70:30, the tire exhibits excellent impact resistance, tensile elastic modulus and tensile strength. Furthermore, the tire exhibits less deformation or change in hardness that is caused by temperature fluctuation in the use environment, and has strong impact resistance. Accordingly, the tire 200 of the present exemplary embodiment has excellent durability. Furthermore, since the tire structure can be simplified, the tire has a light weight as compared with conventional rubber. Also, the Tan δ value can be decreased. Therefore, since the tire 200 of the present exemplary embodiment can be subjected to weight reduction and to suppression of the rolling resistance, the fuel efficiency of a car using such a tire can be improved.

When the tire 200 is the tire (4) of the present invention, in the tire 200, since the tire case 17 is formed of a thermoplastic resin material which is a mixed material of a polyester-based thermoplastic elastomer (A) and a polyester resin (B), even if the elastic modulus of the thermoplastic resin material is increased, the Tan δ value of the thermoplastic resin material does not easily increase, and rolling resistance of the tire can be suppressed. Furthermore, since the tire 200 of the present exemplary embodiment uses a thermoplastic resin material, the structure can be simplified. Therefore, the tire has a light weight as compared with conventional rubber tires. Accordingly, the tire 200 of the present exemplary embodiment can be subjected to weight reduction, and a car equipped with this tire exhibits satisfactory fuel efficiency.

When the tire 200 is the tire (5) of the present invention, in this tire 200, since the tire case 17 is formed of the thermoplastic resin material described above, the tire exhibits excellent heat resistance, tensile elastic modulus, tensile strength and fracture strain. Furthermore, since the tire 10 of the present exemplary embodiment uses a thermoplastic resin material, the structure can be simplified. Therefore, the tire has a light weight as compared with rubber that has been used in conventional tires. Accordingly, the tire 200 of the present exemplary embodiment has high abrasion resistance and durability.

When the tire 200 is the tire (6) of the present invention, in the tire 200, since the tire case 17 is formed of a thermoplastic resin material containing at least one of a specific copolymer or a specific acid-modified copolymer and a polyester-based thermoplastic elastomer, the tire has excellent impact resistance. Further, the tire exhibits less deformation and change in hardness that is caused by temperature fluctuation in the use environment. Furthermore, since the tire structure can be simplified, the tire has a light weight as compared with conventional rubber. Accordingly, when the tire 200 of the present exemplary embodiment is applied to a car, excellent durability is obtained. Further, since weight reduction of the tire can be realized, the fuel efficiency of a car using such a tire can be improved.

When the tire 200 is the tire (7) of the present invention, since the tire case 17 is formed of a resin material containing a polyester-based elastomer (first thermoplastic elastomer) (elastic modulus: 422 MPa, Tan δ: 0.102) and a polyester-based elastomer (second thermoplastic elastomer) (elastic modulus: 45 MPa, Tan δ: 0.029), the elastic modulus is increased while the loss factor (Tan δ) of the tire frame is maintained at a low level in the tire 200 as compared with the case of using the polyester-based elastomer alone. Accordingly, the tire 200 has excellent heat resistance, and has decreased rolling resistance. Further, since the tire 10 has a simple structure as compared with the conventional tires made of rubber, the tire has a light weight. Therefore, the tire 200 of the present exemplary embodiment has high abrasion resistance and high durability.

The resin material such as a polyester-based thermoplastic elastomer has adhesiveness to the coated cord member 26B that constitutes the reinforcing cord layer 28.

As such, when the reinforcing cord layer 28 is configured to include the coated cord members 26B, the difference in hardness between the tire case 17 and the reinforcing cord layer 28 can be reduced as compared with the case of fixing the cord member 26A simply using a cushion rubber 29, whereby the coated cord member 26B can be further adhered and fixed to the tire case 17. As a result, incorporation of air can be effectively prevented, and the reinforcing cord member can be effectively prevented from moving at the time of driving.

Furthermore, when the cord member 26A is a steel cord in particular, the cord member 26A can be easily separated and collected from the coated cord member 26B only by heating at the time of tire disposal. Therefore, it is advantageous in view of the recyclability of the tire 200. Furthermore, since the polyester-based thermoplastic elastomer has a lower loss factors (Tan δ) as compared with vulcanized rubbers, the rolling property of the tire can be improved. Moreover, a resin material having a relatively higher elastic modulus compared with vulcanized rubbers, has an advantage in that the resin material exhibits high in-plane shear rigidity, leading to excellent steering stability at the time of tire driving and excellent abrasion resistance.

In the second method for producing a tire, since the outer circumferential surface 17S of the tire case 17 is roughened before the tire case 17, the cushion rubber 29, and the tread rubber 30A are integrated, the bonding property (adhesion property) is increased owing to an anchor effect. Furthermore, since the resin material that forms the tire case 17 is dug up as a result of the collision of the projection material, wettability of the bonding agent is enhanced. Whereby, the bonding agent is retained in a uniformly applied state on the outer circumferential surface 17S of the tire case 17, and the bonding strength between the tire case 17 and the cushion rubber 29 can thus be secured.

Particularly, even when surface asperities 96 are formed on the outer circumferential surface 17S of the tire case 17, a roughening treatment in the vicinity of the concave sections (concave walls and concave bottoms) is achieved by causing a projection material to collide with the concave sections (gaps 28A). Thus, the bonding strength between the tire case 17 and the cushion rubber 29 can be secured.

On the other hand, since the cushion rubber 29 is superposed within the roughened region of the outer circumferential surface 17S of the tire case 17, the bonding strength between the tire case 17 and the cushion rubber 29 can be effectively secured.

In the vulcanizing step, when the cushion rubber 29 is vulcanized, the cushion rubber 29 flows into the surface-roughened asperities 96 that have been formed on the outer circumferential surface 17S of the tire case 17 by a roughening treatment. After completion of the vulcanization, an anchor effect is exhibited by the cushion rubber 29 that has flown into the surface-roughened asperities 96, and the bonding strength between the tire case 17 and the cushion rubber 29 is enhanced.

In the tire 200 that is produced by such a method for producing a tire, the bonding strength between the tire case 17 and the cushion rubber 29 is secured. In other words, the bonding strength between the tire case 17 and the tread 30 is secured by means of the cushion rubber 29. Thus, on the occasion of driving or the like, separation between the outer circumferential surface 17S of the tire case 17 and the cushion rubber 29 in the tire 200 is suppressed.

Furthermore, since an outer circumference of the tire case 17 is configured to include the reinforcing cord layer 28, the resistance to puncture and resistance to cutting are enhanced as compared with the case where an outer circumference is configured to include a member other than the reinforcing cord layer 28.

Furthermore, since the reinforcing cord layer 28 is formed by winding the coated cord member 26B, the rigidity in a circumferential direction of the tire 200 is increased. As the rigidity in a circumferential direction is increased, creeping (a phenomenon in which plastic deformation of the tire case 17 increases with time under a constant stress) in the tire case 17 is suppressed, and pressure resistance against the air pressure from the inner side in the tire radial direction is enhanced.

In the second exemplary embodiment, the outer circumferential surface 17S of the tire case 17 is configured to include surface asperities. However, the present invention is not intended to be limited to this, and the outer circumferential surface 17S may be flat.

Furthermore, in the tire case 17, the reinforcing cord layer may be formed such that the coated cord member that is wound and bonded to the crown portion of the tire case is covered with a thermoplastic material for coating. In this case, the thermoplastic material for coating that is in a molten or softened state may be ejected on the reinforcing cord layer 28, thereby forming a coating layer. Furthermore, a coating layer may be formed by heating a welding sheet to a molten or softened state and pasting the welding sheet on the surface (outer circumferential surface) of the reinforcing cord layer 28, without using an extruder.

In the second exemplary embodiment, a configuration in which casing divisions (tire case half parts 17A) are bonded to form the tire case 17 is employed. However, the present invention is not intended to be limited to this configuration, and the tire case 17 may also be formed integrally using a mold or the like.

The tire 200 of the second exemplary embodiment is a so-called tubeless tire in which an air chamber is formed between the tire 200 and the rim 20 by mounting a bead portion 12 to the rim 20. However, the present invention is not intended to be limited to this configuration, and the tire 200 may also have, for example, a perfect tube shape (for example, the shape illustrated in FIG. 7).

In the second exemplary embodiment, the cushion rubber 29 is disposed between the tire case 17 and the tread 30. However, the present invention is not intended to be limited to this, and a configuration in which the cushion rubber 29 is not disposed may be employed.

In the second exemplary embodiment, a configuration in which the coated cord member 26B is helically wound in the crown portion 16 is employed. However, the present invention is not intended to be limited to this, and a configuration in which the coated cord members 26B are wound discontinuously in the width direction may also be used.

In the second exemplary embodiment, a configuration is employed, in which a thermoplastic material is used as the resin material for coating 27 that forms the coated cord members 26B, and the coated cord member 26B is welded to the outer circumferential surface of the crown portion 16 by melting or softening the resin material for coating 27 by heating. However, the present invention is not intended to be limited to this configuration, and a configuration in which the coated cord member 26B is adhered to the outer circumferential surface of the crown portion 16 by using an adhesive or the like, without heating the resin material for coating 27, may be used.

Furthermore, a configuration in which a thermosetting resin is used as the resin material for coating 27, and the resin material for coating 27 is adhered to the outer circumferential surface of the crown portion 16 by using an adhesive or the like, without heating the coated cord member 26B, may also be used.

Moreover, a configuration in which a thermosetting resin is used as the resin material for coating 27 that forms the coated cord members 26B, and the tire case 17 is formed from a thermoplastic material, may also be employed. In this case, the coated cord members 26B may be adhered to the outer circumferential surface of the crown portion 16 by using an adhesive or the like, or the coated cord member 26B may be welded to the outer circumferential surface of the crown portion 16 after the site in the tire case 17 where the coated cord member 26B is to be arranged has been heated to a molten or softened state.

Also, a configuration in which a thermoplastic material is used as the resin material for coating 27 that forms the coated cord members 26B, and the tire case 17 is formed from a thermoplastic material, may also be employed.

In this case, the coated cord member 26B may be adhered to the outer circumferential surface of the crown portion 16 by using an adhesive or the like, or the coated cord member 26B may be welded to the outer circumferential surface of the crown portion 16 by heating the resin material for coating 27 to a molten or softened state, while heating the site in the tire case 17 where the coated cord member 26B is to be arranged, to a molten or softened state. When both the tire case 17 and the coated cord member 26B are heated to a molten or softened state, the bonding strength is increased since both components are highly miscible. Furthermore, in the case of the resin material that forms the tire case 17 as well as the resin material for coating 27 that forms the coated cord members 26B are thermoplastic materials, it is preferable that the thermoplastic materials are of the same kind, and particularly preferably are the same thermoplastic material.

In addition, the front surface of the outer circumferential surface 17S of the tire case 17 that has been subjected to a roughening treatment may be activated by a corona treatment, a plasma treatment or the like to increase hydrophilicity, and then an adhesive may be applied thereon.

Also, the procedures for producing the tire 200 of the second exemplary embodiment are not intended to be limited to the procedures of the second exemplary embodiment, and may be appropriately modified.

Thus, embodiments of the tires (1) to (7) of the present invention have been explained by way of exemplary embodiments. However, these embodiments are only examples, and various modifications can be made to the extent that the gist is maintained. Furthermore, it is needless to say that the scope of rights of the present invention is not limited to these exemplary embodiments.

Thus, specific aspects of the present invention have been explained by means of the first exemplary embodiment and the second exemplary embodiment, but the present invention is not intended to be limited to the embodiments described above.

The tire (1) of the present invention may be configured as follows, as disclosed in the first exemplary embodiment.

(1-1-1) The tire (1) of the present invention may have a configuration in which at least a portion of the reinforcing cord member is embedded, as viewed from a cross-section of the tire frame dissected along the axial direction, in an outer circumference of a tire frame formed of a thermoplastic resin material containing a polyester-based thermoplastic elastomer.

As such, when a portion of the reinforcing cord member is embedded in an outer circumference of the tire frame, the phenomenon in which air remains in the vicinity of the cord (incorporation of air) at the time of winding the reinforcing cord member, can be further suppressed. When incorporation of air into the surroundings of the reinforcing cord member is suppressed, the movement of the reinforcing cord member caused by the force applied thereto at the time of driving or the like is suppressed. As a result, for example, when a tire-constituting member is provided so as to cover the entirety of the reinforcing cord member on an outer circumference of the tire frame, the occurrence of separation or the like between these members (including the tire frame) is suppressed since the movement of the reinforcing cord member is prevented, and durability is thus improved.

(1-1-2) The tire (1) of the present invention may be provided with a tread that is formed of a material having a higher abrasion resistance than that of the thermoplastic resin material, on the outer side in the radial direction of the reinforcing cord layer.

As such, when the tread that is brought into contact with the road surface is formed from a material having a higher abrasion resistance than that of the thermoplastic resin material, abrasion resistance of the tire can be further enhanced.

(1-1-3) In the tire (1) of the present invention, a depth of embedding of $\frac{1}{5}$ or more of the diameter of the reinforcing cord member as viewed from a cross-section of the tire frame dissected along the axial direction, may be embedded in an outer circumference of the tire frame along a circumferential direction.

As such, when a depth of embedding of $\frac{1}{5}$ or more of the diameter of the reinforcing cord member as viewed from a cross-section of the tire frame dissected along the axial direction is embedded in an outer circumference of the tire frame, incorporation of air into the surroundings of the reinforcing cord member can be effectively suppressed, and the movement of the reinforcing cord member which is caused by the force applied thereto at the time of driving or the like can be further prevented.

(1-1-4) The tire (1) of the present invention may have a configuration in which the tire frame includes a bead portion that is brought into contact with the bead sheet and the rim flange of the rim in the inner side of the radial direction, and an annular bead core formed of a metal material is embedded in the bead portion.

As such, when a bead portion which is a site for fitting with the rim is provided in the tire frame, and the annular bead core formed of a metal material is embedded in this bead portion, a tire frame (i.e., the tire) can be maintained rigid against the rim, similarly to the conventional pneumatic tires made of rubber.

(1-1-5) The tire (1) of the present invention may be provided with a seal section formed of a material having a higher sealing property (adhesiveness to the rim) than the thermoplastic resin material, at the area where the bead portion is brought into contact with the rim.

As such, when the seal section formed of a material having a higher sealing property than the thermoplastic resin material is provided at the area where the tire frame is brought into contact with the rim, the adhesion property between the tire (tire frame) and the rim can be increased. As a result, as compared with the case where only a rim and a thermoplastic resin material are used, air leakage inside the tire can be further suppressed. Furthermore, the rim fittability of the tire can also be increased by providing the seal section.

(1-1-6) The tire (1) of the present invention may be produced according to a production method which includes: a tire frame piece forming step of forming a tire frame piece for constituting a portion of a circular tire frame, by using a thermoplastic resin material containing at least a polyester-based thermoplastic elastomer; a tire frame piece bonding step of forming a tire frame by fusing two or more of the tire frame pieces, which make a pair, by applying heat to the bonding surfaces of the tire frame pieces; and a reinforcing cord member winding step of forming a reinforcing cord layer by winding a reinforcing cord member around an outer circumference of the tire frame in a circumferential direction thereof.

(1-1-7) The production method for the tire (1) described above may be configured such that, in the tire frame piece bonding step, the bonding surface of the tire frame piece is heated to a temperature equal to of higher than the melting temperature of the thermoplastic resin material that constitutes the tire frame piece.

As such, when the bonding surface of the division is heated to a temperature equal to or higher than the melting temperature of the thermoplastic resin material that constitutes the tire frame piece, fusion between the tire frame pieces can be sufficiently achieved. Therefore, productivity of the tire can be increased, while durability of the tire is improved.

(1-1-8) The production method for the tire (1) described above may be configured such that, in the reinforcing cord member winding step, the reinforcing cord member is wound around an outer circumference of the tire frame in such a manner that at least a portion of the reinforcing cord member is embedded while the outer circumference of the tire frame formed in the tire frame piece bonding step is melted or softened.

As such, when the reinforcing cord member is wound around an outer circumference of the tire frame in such a manner that at least a portion of the reinforcing cord member is embedded while the outer circumference of the tire frame is melted or softened, the at least portion of the reinforcing cord member that has been embedded can be welded to the thermoplastic resin material that has been melted or softened. As a result, incorporation of air between the outer circumference of the tire frame and the reinforcing cord member from a cross-sectional view of the tire frame along the axial direction can be further suppressed. Also, when the area where the reinforcing cord member is embedded is cooled and solidified, the fixing condition of the reinforcing cord member embedded in the tire frame is improved.

(1-1-9) The production method for the tire (1) described above may be configured such that, in the reinforcing cord member winding step, a depth of embedding of $\frac{1}{5}$ or more of the diameter of the reinforcing cord as viewed from a cross-section of the tire along the axial direction is embedded in an outer circumference of the tire frame.

As such, when a depth of embedding of $\frac{1}{5}$ or more of the diameter of the reinforcing cord member as viewed from a cross-section of the tire frame along the axial direction is embedded in an outer circumference of the tire frame, incorporation of air into the vicinity of the reinforcing cord at the time of production can be effectively suppressed, and also, the embedded reinforcing cord member can be made to hardly separate from the tire frame.

(1-1-10) The production method for the tire (1) described above may be configured such that, in the reinforcing cord member winding step, the heated reinforcing cord member is embedded in the tire frame.

As such, in a case in which the reinforcing cord member is embedded in the tire frame while being heated in the reinforcing cord winding step, when the heated reinforcing cord member is brought into contact with an outer circumference of the tire frame, the contact area is melted or softened. Therefore, it becomes easy to embed the reinforcing cord member in the outer circumference of the tire frame.

(1-1-11) The production method for the tire (1) described above may be configured such that, in the cord member winding step, the area of an outer circumference of the tire frame where the reinforcing cord member is to be embedded is heated.

As such, when the area of an outer circumference of the tire frame where the reinforcing member is to be embedded is heated, the heated area of the tire frame is melted or softened, and therefore, it becomes easy to embed the reinforcing member.

(1-1-12) The production method for the tire (1) described above may be configured such that, in the cord member winding step, the reinforcing cord member is helically wound in a circumferential direction of an outer circumference of the tire frame, while the reinforcing cord member is pressed to the outer circumference of the tire frame.

As such, when the reinforcing cord member is helically wound while the reinforcing cord member is pressed to the outer circumference of the tire frame, the depth of embedding of the reinforcing cord member in an outer circumference of the tire frame can be adjusted.

(1-1-13) According to the production method of the tire (1) described above, a configuration may be employed, in which, in the cord member winding step, the molten or softened area of an outer circumference of the tire frame is cooled after the reinforcing cord members are wound around the tire frame.

As such, when the molten or softened area of an outer circumference of the tire frame is forcibly cooled after the reinforcing cord member is embedded, the molten or softened area of the outer circumference of the tire frame can be more rapidly cooled and solidified than in a case of natural cooling. By cooling the tire outer circumference more rapidly than in the case of natural cooling, deformation of the outer circumference of the tire frame can be suppressed, and also the movement of the reinforcing cord member can be prevented.

The tire (1) of the present invention may be configured as follows, as described in connection with the second exemplary embodiment.

(1-2-1) The tire (1) of the present invention may have a configuration in which the method for producing a tire as described above further includes a roughening treatment step of roughening an outer circumference of the tire frame by causing a particulate projection material to collide with the outer circumferential surface of the tire frame; and a superposing step of superposing a tire-constituting rubber member on the roughened outer circumferential surface using a bonding agent.

As such, when a roughening treatment step is provided, a particulate projection material collides with the outer circumferential surface of the circular tire frame formed by using a thermoplastic resin material containing a polyester-based thermoplastic elastomer, and finely roughened surface asperities are formed on the relevant outer circumferential surface. The treatment of causing a projection material to collide with the outer circumferential surface of the tire frame, to thereby form finely roughened surface asperities is referred to as a roughening treatment. Thereafter, a tire-constituting rubber member is superposed on the roughened outer circumferential surface by means of a bonding agent. Here, on the occasion of integrating the tire frame and the tire-constituting rubber member, since an outer circumference of the tire frame is roughened, bonding property (adhesion property) is enhanced by an anchor effect. Furthermore, since the resin material that forms the tire frame is dug up by collision of the projection material, wettability of the outer circumferential surface is enhanced. Thereby, the bonding agent is retained in a uniformly applied state on the outer circumferential surface of the tire frame, and the bonding strength between the tire frame and the tire-constituting rubber member can thus be secured.

(1-2-2) In the tire (1) of the present invention, at least a portion of the outer circumferential surface of the tire frame is a surface asperity section, and the surface asperity section may be produced by applying a roughening treatment in the roughening treatment step.

As such, even if at least a portion of the outer circumferential surface of the tire frame is made into a surface asperity section, a roughening treatment is achieved in the vicinity of the concave sections (concave walls and concave bottoms) by causing a projection material to collide with the surface asperity section, whereby the bonding strength between the tire frame and the tire-constituting rubber member can be secured.

(1-2-3) In the tire (1) of the present invention, an outer circumference of the tire frame is configured to include a reinforcing layer that constitutes the surface asperity section on the outer circumferential surface thereof, and the reinforcing layer may be configured such that a coated cord member which is produced by coating a reinforcing cord with a resin material that is identical with or different from the resin material that forms the tire frame, is wound in the circumferential direction of the tire frame.

As such, when an outer circumference of the tire frame is configured to include a reinforcing layer produced by winding a coated cord member in the circumferential direction of the tire frame, the rigidity in the circumferential direction of the tire frame can be enhanced.

(1-2-4) In the tire (1) of the present invention, a thermoplastic resin material may be used as the resin material as a component of the coated cord member.

As such, when a thermoplastic material having thermoplasticity is used as the resin material as a component of the coated cord member, tire production is facilitated, and recycling is made easier, as compared with the case of using a thermosetting material as the resin material.

(1-2-5) The tire (1) of the present invention may be configured such that, in the roughening treatment step, a region which is broader than the superposed region of the tire-constituting rubber member is roughened.

As such, when a roughening treatment is applied to a region broader than the superposed region of the tire-constituting rubber member in the roughening treatment step, the bonding strength between the tire frame and the tire-constituting rubber member can be reliably secured.

(1-2-6) The tire (1) of the present invention may be configured such that in the roughening treatment step, the outer circumferential surface is roughened so as to obtain an arithmetic mean roughness Ra of 0.05 mm or greater.

As such, when the outer circumferential surface of the tire frame is roughened in the roughening treatment step so as to obtain an arithmetic mean roughness Ra of 0.05 mm or greater, in the case where, for example, a tire-constituting rubber member in an unvulcanized or semivulcanized state is superposed on the roughened outer circumferential surface by means of a bonding agent and vulcanized, the rubber of the tire-constituting rubber member can be caused to flow in to the bottom of the roughened surface asperities formed by the roughening treatment. When rubber of the tire-constituting rubber member is caused to flow in to the bottom of the roughened surface asperities, a sufficient anchor effect is exhibited between the outer circumferential surface and the tire-constituting rubber member, and the bonding strength between the tire frame and the tire-constituting rubber member can be increased.

(1-2-7) In the tire (1) of the present invention, a rubber in an unvulcanized or semivulcanized state may be used as the tire-constituting rubber member.

As such, in a case in which a rubber in an unvulcanized or semivulcanized state is used as the tire-constituting rubber member, when the tire-constituting rubber member is vulcanized, the rubber flows into the roughened surface asperities that have been formed on the outer circumferential surface of the tire frame by the roughening treatment. After completion of the vulcanization, an anchor effect is exhibited by the rubber (in a vulcanized state) that has flowed into the roughened surface asperities, and the bonding strength between the tire frame and the tire-constituting rubber members can be increased.

The vulcanized state means a state in which a degree of vulcanization required for a final product is achieved, and the semivulcanized state means a state in which a degree of vulcanization is higher than that of an unvulcanized state, but does not reach the degree of vulcanization required for a final product.

(1-2-8) The tire (1) of the present invention may be configured to include: a circular tire frame that is formed using a thermoplastic resin material containing a polyester-based thermoplastic elastomer and that has its outer circumferential surface roughened by causing a particulate projection material to collide with the outer circumferential surface; and a tire-constituting rubber member that is superposed on the roughened outer circumferential surface using a bonding agent.

As such, when a roughened circular tire frame is used, the bonding strength between the tire frame and the tire-constituting rubber member can be increased by an anchor effect. Furthermore, since the outer circumferential surface is roughened, wettability of the bonding agent is satisfactory. As a result, the bonding agent is retained in a uniformly applied state on the outer circumferential surface of the tire frame, and the bonding strength between the tire frame and the tire-constituting rubber member is secured, so that separation between the tire frame and the tire-constituting rubber member can be suppressed.

The tire (2) of the present invention may be configured as follows, as disclosed in the first exemplary embodiment.

(2-1-1) The tire (2) of the present invention may be configured such that at least a portion of the reinforcing cord member as viewed from a cross-section of the tire frame dissected along the axial direction, is embedded in an outer circumference of the tire frame formed of a thermoplastic resin material.

As such, when a portion of the reinforcing cord member is embedded in an outer circumference of the tire frame, the phenomenon in which air remains (incorporation of air) in the vicinity of the cords at the time of winding the reinforcing cord members can be further suppressed. When incorporation of air into the vicinity of the reinforcing cord members is suppressed, the movement of the reinforcing cord member which is caused by the force applied thereto at the time of driving or the like is prevented. As a result, for example, even when a tire-constituting member is provided on the outer circumference of the tire frame so as to cover the entirety of the reinforcing cord member, the occurrence of separation or the like between these members (including the tire frame) is suppressed, and durability is improved since the movement of the reinforcing cord member is prevented.

(2-1-2) The tire (2) of the present invention may be provided with a tread that is formed of a material having higher abrasion resistance than the thermoplastic resin material described above, on the outer side in the radial direction of the reinforcing cord layer.

As such, when the tread that is brought into contact with the road surface is formed of a material having higher abrasion resistance than the thermoplastic resin material, abrasion resistance of the tire can be further enhanced.

(2-1-3) In the tire (2) of the present invention, a depth of embedding of ⅕ or more of the diameter of the reinforcing cord member as viewed from a cross-section of the tire frame along the axial direction, can be embedded along a circumferential direction of an outer circumference of the tire frame.

As such, when a depth of embedding of ⅕ or more of the diameter of the reinforcing cord member as viewed from a cross-section of the tire frame dissected along the axial direction is embedded in an outer circumference of the tire frame, incorporation of air into the vicinity of the reinforcing cord member can be effectively suppressed, and the movement of the reinforcing cord member which is caused by the force applied thereto at the time of driving or the like is further prevented.

(2-1-4) The tire (2) of the present invention may be configured such that the tire frame includes a bead portion which is brought into contact with the bead sheet and the rim flange of the rim in the inner side of the radial direction, and an annular bead core formed of a metal material is embedded in the bead portion.

As such, when a bead portion which is a site of fitting with the rim is provided in the tire frame, and the annular bead core formed of a metal material is embedded in the bead portion, the tire frame (i.e., the tire) can be maintained rigid against the rim, similarly to the conventional pneumatic tires made of rubber.

(2-1-5) The tire (2) of the present invention may be provided with a seal section formed of a material having a higher sealing property (adhesiveness to the rim) than the thermoplastic resin material at the area where the bead portion is brought into contact with the rim.

As such, when a seal section formed of a material having a higher sealing property than the thermoplastic resin material is provided at the area where the tire frame is brought into contact with the rim, the adhesion property between the tire (tire frame) and the rim can be enhanced. As a result, as compared with the case of using only the rim and the thermoplastic resin material, air leakage inside the tire can be further suppressed. Furthermore, the rim fittability of the tire can also be improved by providing the seal section.

(2-1-6) The tire (2) of the present invention may be produced according to a production method which includes: a tire frame piece forming step of forming a tire frame piece for constituting a portion of a circular tire frame by using a thermoplastic resin material containing at least a polyester-based thermoplastic elastomer and another elastomer; a tire frame piece bonding step of forming the tire frame by fusing two or more of the tire frame pieces, which make a pair, by applying heat to the bonding surfaces of the tire frame pieces; and a reinforcing cord member winding step of forming a reinforcing cord layer by winding a reinforcing cord member around an outer circumference of the tire frame in a circumferential direction.

(2-1-7) The production method for the tire (2) described above may be configured such that, in the tire frame piece bonding step, the bonding surface of the tire frame piece is heated to a temperature equal to or higher than the melting temperature of the thermoplastic resin material that constitutes the tire frame piece.

As such, when the bonding surface of the division is heated to a temperature equal to or higher than the melting temperature of the thermoplastic resin material that constitutes the tire frame piece, fusion between the tire frame pieces can be sufficiently achieved. Therefore, productivity of the tire can be increased while durability of the tire is enhanced.

(2-1-8) The production method for the tire (2) may be configured such that, in the reinforcing cord member winding step, the reinforcing cord member is wound around an outer circumference of the tire frame in such a manner that at least a portion of the reinforcing cord member is embedded while the outer circumference of the tire frame formed in the tire frame piece bonding step is melted or softened.

As such, by embedding at least a portion of the reinforcing cord member while melting or softening the outer circumference of the tire frame, and winding the reinforcing cord member around the outer circumference of the tire frame, at least a portion of the reinforcing cord member that has been embedded can be welded to the molten or softened thermoplastic resin material. As a result, from a cross-sectional view of the tire frame dissected along the axial direction, incorporation of air between an outer circumference of the tire frame and the reinforcing members can be further suppressed. Furthermore, when the area where the reinforcing cord member is embedded is cooled and solidified, the fixing condition of the reinforcing cord members embedded in the tire frame is improved.

(2-1-9) The production method for the tire (2) may be configured such that, in the reinforcing cord member winding step, a depth of embedding of ⅕ or more of the diameter of the reinforcing cord as viewed from a cross-section of the tire along the axial direction is embedded in an outer circumference of the tire frame.

As such, when a depth of embedding of ⅕ or more of the diameter of the reinforcing cord as viewed from a cross-section of the tire along the axial direction is embedded in the outer circumference of the tire frame, incorporation of air into the vicinity of the reinforcing cord at the time of production can be effectively suppressed, and the embedded reinforcing cord member can be made to hardly separate from the tire frame.

(2-1-10) The production method for the tire (2) may be configured such that, in the reinforcing cord member winding step, the heated reinforcing cord member is embedded in the tire frame.

As such, in a case in which the reinforcing cord member is embedded in the tire frame while being heated in the reinforcing cord winding step, the contact area is melted or softened when the heated reinforcing cord member is brought into contact with the outer circumference of the tire frame. Thus, it becomes easy to embed the reinforcing cord member in the outer circumference of the tire frame.

(2-1-11) The production method for the tire (2) may be configured such that, in the cord member winding step, the area of the outer circumference of the tire frame where the reinforcing cord member is to be embedded is heated.

As such, when the area of an outer circumference of the tire frame where the reinforcing cord member is to be embedded is heated, the heated area of the tire frame is melted or softened, whereby it becomes easy to embed the reinforcing cord member.

(2-1-12) The production method for the tire (2) may be configured such that, in the cord member winding step, the reinforcing cord member is helically wound in the circumferential direction of an outer circumference of the tire frame, while the reinforcing cord member is pressed to the outer circumference of the tire frame.

As such, when the reinforcing cord member is helically wound while the reinforcing cord member is pressed to the outer circumference of the tire frame, the depth of embedding of the reinforcing cord member in the outer circumference of the tire frame can be adjusted.

(2-1-13) The production method for the tire (2) may be configured such that, in the cord member winding step, the molten or softened area of an outer circumference of the tire frame is cooled after the reinforcing cord member is wound around the tire frame.

As such, when the molten or softened area of the outer circumference of the tire frame is forcibly cooled after the reinforcing cord member is embedded, the molten or softened area of the circumference of the tire frame can be more rapidly cooled and solidified than in the case of natural cooling. By cooling the tire outer circumference more rapidly than in the case of natural cooling, deformation of an outer circumference of the tire frame can be suppressed, and also the movement of the reinforcing cord member can be prevented.

The tire (2) of the present invention may be configured as follows, as described in connection with the second exemplary embodiment.

(2-2-1) The tire (2) of the present invention may be configured such that the production method described above further includes: a roughening treatment step of roughening an outer circumference of the tire frame by causing a particulate projection material to collide with the outer circumferential surface of the tire frame; and a superposing step of superposing a tire-constituting rubber member on the roughened outer circumferential surface by means of a bonding agent.

As such, when a roughening treatment step is provided, a particulate projection material collides with the outer circumferential surface of the circular tire frame formed using a thermoplastic resin material containing a polyester-based thermoplastic elastomer and another elastomer, whereby finely roughened surface asperities are formed on the outer circumferential surface. The treatment of causing a projection material to collide with the outer circumferential surface of the tire frame, to thereby form finely roughened surface asperities is referred to as a roughening treatment. Thereafter, a tire-constituting rubber member is superposed on the roughened outer circumferential surface by means of the bonding agent. Here, on the occasion of integrating the tire frame and the tire-constituting rubber member, bonding property (adhesion property) is enhanced by an anchor effect since the outer circumference of the tire frame is roughened. Furthermore, since the resin material that forms the tire frame is dug up by collision of the projection material, wettability of the outer circumferential surface is enhanced. As a result, the bonding agent is retained in a uniformly applied state on the outer circumferential surface of the tire frame, and the bonding strength between the tire frame and the tire-constituting rubber member thus can be secured.

(2-2-2) In the tire (2) of the present invention, at least a portion of the outer circumferential surface of the tire frame is a surface asperity section, and the surface asperity section may be produced by applying a roughening treatment in the roughening treatment step.

As such, even if at least a portion of the outer circumferential surface of the tire frame is made into a surface asperity section, a roughening treatment is achieved in the vicinity of the concave sections (concave walls and concave bottoms) by causing a projection material to collide with the surface asperity section, whereby the bonding strength between the tire frame and the tire-constituting rubber member can be secured.

(2-2-3) In the tire (2) of the present invention, an outer circumference of the tire frame is configured to include a reinforcing layer that constitutes the surface asperity section on the outer circumferential surface thereof, and the reinforcing layer may be configured such that a coated cord member which is produced by coating a reinforcing cord with a resin material that is the same kind as or different from the resin material that forms the tire frame, is wound in the circumferential direction of the tire frame.

As such, when an outer circumference of the tire frame is configured to include a reinforcing layer produced by winding a coated cord member in the circumferential direction of the tire frame, the rigidity in the circumferential direction of the tire frame can be enhanced.

(2-2-4) In the tire (2) of the present invention, a thermoplastic resin material may be used as the resin material as a component of the coated cord member.

As such, when a thermoplastic material having thermoplasticity is used as the resin material as a component of the coated cord member, tire production is facilitated, and recycling is made easier, as compared with the case of using a thermosetting material as the resin material.

(2-2-5) The tire (2) of the present invention may be configured such that, in the roughening treatment step, a region which is broader than the superposed region of the tire-constituting rubber member is roughened.

As such, when a roughening treatment is applied to a region broader than the superposed region of the tire-constituting rubber member in the roughening treatment step, the bonding strength between the tire frame and the tire-constituting rubber member can be reliably secured.

(2-2-6) The tire (2) of the present invention can be configured such that in the roughening treatment step, the outer circumferential surface is roughened so as to obtain an arithmetic mean roughness Ra of 0.05 mm or greater.

As such, when the outer circumferential surface of the tire frame is roughened in the roughening treatment step so as to obtain an arithmetic mean roughness Ra of 0.05 mm or greater, in the case where, for example, a tire-constituting rubber member in an unvulcanized or semivulcanized state is superposed on the roughened outer circumferential surface by means of a bonding agent and vulcanized, the rubber of the tire-constituting rubber member can be caused to flow in to the bottom of the roughened surface asperities formed by the roughening treatment. When rubber of the tire-constituting rubber member is caused to flow in to the bottom of the roughened surface asperities, a sufficient anchor effect is exhibited between the outer circumferential surface and the tire-constituting rubber member, and the bonding strength between the tire frame and the tire-constituting rubber member can be increased.

(2-2-7) In the tire (2) of the present invention, a rubber in an unvulcanized or semivulcanized state may be used as the tire-constituting rubber member.

As such, in a case in which a rubber in an unvulcanized or semivulcanized state is used as the tire-constituting rubber member, when the tire-constituting rubber member is vulcanized, the rubber flows into the roughened surface asperities that have been formed on the outer circumferential surface of the tire frame by the roughening treatment. After completion of the vulcanization, an anchor effect is exhibited by the rubber (in a vulcanized state) that has flowed into the roughened surface asperities, and the bonding strength between the tire frame and the tire-constituting rubber members can be increased.

The vulcanized state means a state in which a degree of vulcanization required for a final product is achieved, and the semivulcanized state means a state in which a degree of vulcanization is higher than that of an unvulcanized state, but does not reach the degree of vulcanization required for a final product.

(2-2-8) The tire (2) of the present invention may be configured to include: a circular tire frame that is formed using a thermoplastic resin material containing a polyester-based thermoplastic elastomer and another elastomer and that has its outer circumferential surface roughened by causing a particulate projection material to collide with the outer circumferential surface; and a tire-constituting rubber member that is superposed on the roughened outer circumferential surface using a bonding agent.

As such, when a roughened circular tire frame is used, the bonding strength between the tire frame and the tire-constituting rubber member can be increased by an anchor effect. Furthermore, since the outer circumferential surface is roughened, wettability of the bonding agent is satisfactory. As a result, the bonding agent is retained in a uniformly applied state on the outer circumferential surface of the tire frame, and the bonding strength between the tire frame and the tire-constituting rubber member is secured, so that separation between the tire frame and the tire-constituting rubber member can be suppressed.

The tire (3) of the present invention can be configured as follows, as disclosed in the first exemplary embodiment.

(3-1-1) The tire (3) of the present invention can be configured such that at least a portion of the reinforcing cord member as viewed from a cross-section of the tire frame dissected along the axial direction, is embedded in the outer circumference of the tire frame formed of a thermoplastic resin material.

As such, when a portion of the reinforcing cord member is embedded in the outer circumference of the tire frame, the phenomenon in which air remains in the vicinity of the cord at the time of winding the reinforcing cord member (incorporation of air) can be further suppressed. When incorporation of air into the vicinity of the reinforcing cord member is suppressed, the reinforcing cord member is prevented from moving around as a result of the force applied thereto or the like at the time of driving. Thereby, for example, when tire-constituting members are provided on the outer circumference of the tire frame so as to cover the entirety of the reinforcing cord member, since the reinforcing cord member are prevented from moving around, the occurrence of separation or the like between these members (including the tire frame) is suppressed, and durability is improved.

(3-1-2) The tire (3) of the present invention may be provided with a tread that is formed of a material having higher abrasion resistance than the thermoplastic resin material described above, on the outer side in the radial direction of the reinforcing cord layer.

As such, when the tread that is brought into contact with the road surface is formed of a material having higher abrasion resistance than the thermoplastic resin material, abrasion resistance of the tire can be further enhanced.

(3-1-3) In the tire (3) of the present invention, a volume of $\frac{1}{5}$ or more of the diameter of the reinforcing cord member as viewed from a cross-section of the tire frame along the axial direction, can be embedded along the circumferential direction of the outer circumference of the tire frame.

As such, when a volume of $\frac{1}{5}$ or more of the diameter of the reinforcing cord member as viewed from a cross-section of the tire frame dissected along the axial direction is embedded in the outer circumference of the tire frame, incorporation of air into the vicinity of the reinforcing cord member can be effectively suppressed, and the reinforcing cord member can be further prevented from moving around as a result of the force applied thereto or the like at the time of driving.

(3-1-4) The tire (3) of the present invention can be configured such that the tire frame includes a bead portion which is brought into contact with the bead sheet and a rim flange of the rim in the inner side of the radial direction, and annular bead cores formed of a metal material are embedded in a bead portion.

As such, when a bead portion which is a site of fitting with the rim is provided in the tire frame, and annular bead cores formed of a metal material are embedded in the bead portion, similarly to the conventional pneumatic tires made of rubber, the tire frame (that is to say, the tire) can be maintained rigid against the rim.

(3-1-5) The tire (3) of the present invention can be provided with a seal section formed of a material having higher sealing properties (adhesiveness to the rim) than the thermoplastic resin material at the area where the bead portion is brought into contact with the rim.

As such, when a seal section formed of a material having higher sealing properties than the thermoplastic resin material is provided at the area where the tire frame is brought into contact with the rim, the adhesiveness between the tire (tire frame) and the rim can be enhanced. Thereby, as compared with the case of using only the rim and the thermoplastic resin material, air leakage inside the tire can be further suppressed. Furthermore, fittability of the tire onto a rim can also be enhanced by providing the seal section.

(3-1-6) The tire (3) of the present invention can be produced according to a production method which includes a tire frame piece forming step of forming a tire frame piece for constituting a portion of a circular tire frame, using a thermoplastic resin material including at least a polyester-based thermoplastic elastomer and another elastomer; a tire frame piece bonding step of forming the tire frame by fusing two or more of the tire frame pieces, which make a pair, by applying heat to bonding surfaces of the tire frame pieces, and thereby forming the tire frame; and a reinforcing cord member winding step of winding a reinforcing cord member around the outer circumference of the tire frame in the circumferential direction, and thereby forming a reinforcing cord layer.

(3-1-7) The production method of the tire (3) described above can be configured such that in the tire frame piece bonding step, the bonding surfaces of the tire frame pieces is heated to a temperature higher than or equal to the melting temperature of the thermoplastic resin material that constitutes the tire frame piece.

As such, when the bonding surface of a division is heated to a temperature higher than or equal to the melting temperature of the thermoplastic resin material that constitutes the tire frame piece, fusion between the tire frame pieces can be sufficiently achieved. Therefore, productivity of the tire can be increased while durability of the tire is enhanced.

(3-1-8) The production method of the tire (3) can be configured such that in the reinforcing cord member winding step, at least a portion of the reinforcing cord member is embedded while the outer circumference of the tire frame formed in the tire frame piece bonding step is melted or softened, and thereby the reinforcing cord member is wound around the outer circumference of the tire frame.

As such, by embedding at least a portion of the reinforcing cord member while melting or softening the outer circumference of the tire frame, and winding the reinforcing cord member around the outer circumference of the tire frame, the at least a portion of the reinforcing cord member that has been embedded can be welded to the molten or softened thermoplastic resin material. Thereby, from a cross-sectional view of the tire frame dissected along the axial direction, incorporation of air between the outer circumference of the tire frame and the reinforcing members can be further suppressed. Furthermore, when the area where the reinforcing cord member is embedded is cooled and solidified, the fixing condition of the reinforcing cord member embedded in the tire frame is improved.

(3-1-9) The production method of the tire (3) can be configured such that in the reinforcing cord member winding step, a volume of ⅕ or more of the diameter of the reinforcing cord as viewed from a cross-section of the tire along the axial direction is embedded in the outer circumference of the tire frame.

As such, when a volume of ⅕ or more of the diameter of the reinforcing cord as viewed from a cross-section of the tire along the axial direction is embedded in the outer circumference of the tire frame, incorporation of air into the vicinity of the reinforcing cord at the time of production can be effectively suppressed, and the embedded reinforcing cord member can be made to hardly separate from the tire frame.

(3-1-10) The production method of the tire (3) can be configured such that in the reinforcing cord member winding step, the heated reinforcing cord member is embedded in the tire frame.

As such, if the reinforcing cord member is embedded in the tire frame while heated in the reinforcing cord winding step, when the heated reinforcing cord member is brought into contact with the outer circumference of the tire frame, the contact area is melted or softened. Therefore, it becomes easy to embed the reinforcing cord member in the outer circumference of the tire frame.

(3-1-11) The production method of the tire (3) can be configured such that in the cord member winding step, the area of the outer circumference of the tire frame where the reinforcing cord member is embedded is heated.

As such, when the area of the outer circumference of the tire frame where the reinforcing cord member is embedded is heated, the heated area of the tire frame is melted or softened. Therefore, it becomes easy to embed the reinforcing cord member.

(3-1-12) The production method of the tire (3) can be configured such that in the cord member winding step, the reinforcing cord member is helically wound in the circumferential direction of the outer circumference of the tire frame, while the reinforcing cord member is pressed to the outer circumference of the tire frame.

As such, when the reinforcing cord member is helically wound while the reinforcing cord member is pressed to the outer circumference of the tire frame, a depth of embedding of the reinforcing cord member in the outer circumference of the tire frame can be adjusted.

(3-1-13) The production method of the tire (3) can be configured such that in the cord member winding step, after the reinforcing cord member is wound around the tire frame, the molten or softened area of the outer circumference of the tire frame is cooled.

As such, when the molten or softened area of the outer circumference of the tire frame is forcibly cooled after the reinforcing cord member is embedded, the molten or softened area of the circumference of the tire frame can be more rapidly cooled and solidified than in the case of natural cooling. By cooling the tire outer circumference more rapidly than in the case of natural cooling, deformation of the outer circumference of the tire frame can be suppressed, and also the reinforcing cord member can be prevented from moving around.

Furthermore, the tire (3) of the present invention can be configured as follows, as described in connection with the second exemplary embodiment.

(3-2-1) The tire (3) of the present invention can be configured such that the production method described above further includes a roughening treatment step of roughening the outer circumferential surface of the tire frame by causing a particulate projection material to collide with the outer circumferential surface of the tire frame; and a superposing step of superposing a tire-constituting rubber member on the roughened outer circumferential surface by means of a bonding agent.

As such, when a roughening treatment step is provided, a particulate projection material collides with the outer circumferential surface of the circular tire frame formed by using a thermoplastic resin material, and finely roughened surface asperities are formed on the relevant outer circumferential surface. Meanwhile, the treatment of causing a projection material to collide with the outer circumferential surface of the tire frame and thereby forming finely roughened surface asperities is referred to as a roughening treatment. Thereafter, a tire-constituting rubber member is laminated on the roughened outer circumferential surface by means of the bonding agent. Here, on the occasion of integrating the tire frame and the tire-constituting rubber member, since the outer circumferential surface of the tire frame is roughened, bonding property (adhesion property) is enhanced by an anchor effect. Furthermore, since the resin material that forms the tire frame is dug up by collision of the projection material, wettability of the outer circumferential surface is enhanced. Thereby, the bonding agent is maintained in a uniformly applied state on the outer circumferential surface of the tire frame, and thus, the bonding strength between the tire frame and the tire-constituting rubber member can be secured.

(3-2-2) The tire (3) of the present invention is such that at least a portion of the outer circumferential surface of the tire frame is a surface asperity section, and the surface asperity section can be produced by applying a roughening treatment in the roughening treatment step.

As such, even if at least a portion of the outer circumferential surface of the tire frame is configured into a surface asperity section, a roughening treatment is achieved in the vicinity of the concave sections (concave walls and concave bottoms) by causing a projection material to collide with the surface asperity section, and thereby, the bonding strength between the tire frame and the tire-constituting rubber member can be secured.

(3-2-3) In the tire (3) of the present invention, the outer circumference of the tire frame is configured to include a reinforcing layer that constitutes the surface asperity section on the outer circumferential surface, and the reinforcing layer can be configured such that a coated cord member which is produced by coating a reinforcing cord with a resin material that is the same kind as or different from the resin material that forms the tire frame, is wound in the circumferential direction of the tire frame.

As such, when the outer circumference of the tire frame is configured to include a reinforcing layer produced by winding a coated cord member in the circumferential direction of the tire frame, the rigidity in the circumferential direction of the tire frame can be enhanced.

(3-2-4) In the tire (3) of the present invention, a thermoplastic resin material can be used as the resin material that constitutes the coated cord member.

As such, when a thermoplastic material having thermoplasticity is used as the resin material that constitutes the coated cord member, as compared with the case of using a thermosetting material as the resin material, tire production is facilitated, and recycling is made easier.

(3-2-5) The tire (3) of the present invention can be configured such that in the roughening treatment step, a region which is broader than the laminated region of the tire-constituting rubber member is roughened.

As such, when a roughening treatment is applied to a region broader than the laminated region of the tire-constituting rubber member in the roughening treatment step, the bonding strength between the tire frame and the tire-constituting rubber member can be reliably secured.

(3-2-6) The tire (3) of the present invention can be configured such that in the roughening treatment step, the outer circumferential surface is roughened so as to obtain an arithmetic mean roughness Ra of 0.05 mm or greater.

As such, when the outer circumferential surface of the tire frame is roughened in the roughening treatment step so as to obtain an arithmetic mean roughness Ra of 0.05 mm or greater, in the case where, for example, a tire-constituting rubber member in an unvulcanized or semivulcanized state is laminated on the roughened outer circumferential surface by means of a bonding agent and vulcanized, the rubber of the tire-constituting rubber member can be caused to flow in to the bottom of the roughened surface asperities formed by the roughening treatment. When rubber of the tire-constituting rubber member is caused to flow in to the bottom of the roughened surface asperities, a sufficient anchor effect is exhibited between the outer circumferential surface and the tire-constituting rubber member, and the bonding strength between the tire frame and the tire-constituting rubber member can be increased.

(3-2-7) In the tire (3) of the present invention, a rubber in an unvulcanized or semivulcanized state can be used as the tire-constituting rubber member.

As such, if a rubber in an unvulcanized or semivulcanized state is used as the tire-constituting rubber member, when the tire-constituting rubber member is vulcanized, the rubber flows into the roughened surface asperities that have been formed on the outer circumferential surface of the tire frame by the roughening treatment. Then, when vulcanization is completed, an anchor effect is exhibited by the rubber (in a vulcanized state) that has flowed into the roughened surface asperities, and the bonding strength between the tire frame and the tire-constituting rubber members can be increased.

Meanwhile, the vulcanized state means a state in which the degree of vulcanization required from final products has been reached, and the semivulcanized state means a state in which the degree of vulcanization is higher than that of an unvulcanized state, but the degree of vulcanization required from final products has not been reached.

(3-2-8) The tire (3) of the present invention can be configured to include a circular tire frame that is formed by using a thermoplastic resin material according to the present invention and has its outer circumferential surface roughened by causing a particulate projection material to collide with the outer circumferential surface; and a tire-constituting rubber member that is laminated on the roughened outer circumferential surface by means of a bonding agent.

As such, when a roughened circular tire frame is used, the bonding strength between the tire frame and the tire-constituting rubber member can be increased by an anchor effect. Furthermore, since the outer circumferential surface is roughened, wettability of the bonding agent is satisfactory. Thereby, the bonding agent is maintained in a uniformly applied state on the outer circumferential surface of the tire frame, and the bonding strength between the tire frame and the tire-constituting rubber member is secured, so that separation between the tire frame and the tire-constituting rubber member can be suppressed.

The tire (4) of the present invention can be configured as follows, as disclosed in the first exemplary embodiment.

(4-1-1) The tire (4) of the present invention can be configured such that at least a portion of the reinforcing cord member as viewed from a cross-section of the tire frame dissected along the axial direction, is embedded in the outer circumference of the tire frame formed of a thermoplastic resin material.

As such, when a portion of the reinforcing cord member is embedded in the outer circumference of the tire frame, the phenomenon in which air remains in the vicinity of the cord at the time of winding the reinforcing cord member (incorporation of air) can be further suppressed. When incorporation of air into the vicinity of the reinforcing cord member is suppressed, the reinforcing cord member is prevented from moving around as a result of the force applied thereto or the like at the time of driving. Thereby, for example, when tire-constituting members are provided on the outer circumference of the tire frame so as to cover the entirety of the reinforcing cord member, since the reinforcing cord member is prevented from moving around, the occurrence of separation or the like between these members (including the tire frame) is suppressed, and durability is improved.

(4-1-2) The tire (4) of the present invention may be provided with a tread that is formed of a material having higher abrasion resistance than the thermoplastic resin material, on the outer side in the radial direction of the reinforcing cord layer described above.

As such, when the tread that is brought into contact with the road surface is formed of a material having higher abrasion resistance than the thermoplastic resin material, abrasion resistance of the tire can be further enhanced.

(4-1-3) In the tire (4) of the present invention, a volume of ⅕ or more of the diameter of the reinforcing cord member as viewed from a cross-section of the tire frame along the axial direction, can be embedded along the circumferential direction of the outer circumference of the tire frame.

As such, when a volume of ⅕ or more of the diameter of the reinforcing cord member as viewed from a cross-section of the tire frame dissected along the axial direction is embedded in the outer circumference of the tire frame, incorporation of air into the vicinity of the reinforcing cord member can be effectively suppressed, and the reinforcing cord member can be further prevented from moving around as a result of the force applied thereto or the like at the time of driving.

(4-1-4) The tire (4) of the present invention can be configured such that the tire frame includes a bead portion which is brought into contact with the bead sheet and the rim flange of the rim in the inner side of the radial direction, and annular bead cores formed of a metal material are embedded in the bead portion.

As such, when a bead portion which is a site of fitting with the rim is provided in the tire frame, and annular bead cores formed of a metal material are embedded in the bead portion, similarly to the conventional pneumatic tires made of rubber, the tire frame (that is to say, the tire) can be maintained rigid against the rim.

(4-1-5) The tire (4) of the present invention can be provided with a seal section formed of a material having higher sealing properties (adhesiveness to the rim) than the thermoplastic resin material at the area where the bead portion is brought into contact with the rim.

As such, when a seal section formed of a material having higher sealing properties than the thermoplastic resin material is provided at the area where the tire frame is brought into contact with the rim, the adhesiveness between the tire (tire frame) and the rim can be enhanced. Thereby, as compared with the case of using only the rim and the thermoplastic resin material, air leakage inside the tire can be further suppressed. Furthermore, the fittability of the tire onto a rim can also be enhanced by providing the seal section.

(4-1-6) The tire (4) of the present invention can be produced according to a production method which includes a tire frame piece forming step of forming a tire frame piece for constituting a portion of a circular tire frame, using a thermoplastic resin material including at least a polyester-based thermoplastic elastomer (A) and a polyester resin (B); a tire frame piece bonding step of forming the tire frame by fusing two or more of the tire frame pieces, which make a pair, by applying heat to bonding surfaces of the tire frame pieces, and thereby forming the tire frame; and a reinforcing cord member winding step of winding a reinforcing cord member around the outer circumference of the tire frame in the circumferential direction, and thereby forming a reinforcing cord layer.

(4-1-7) The production method of the tire (4) described above can be configured such that in the tire frame piece bonding step, the bonding surfaces of the tire frame pieces is heated to a temperature higher than or equal to the melting temperature of the thermoplastic resin material that constitutes the tire frame piece.

As such, when the bonding surface of a division is heated to a temperature higher than or equal to the melting temperature of the thermoplastic resin material that constitutes the tire frame piece, fusion between the tire frame pieces can be sufficiently achieved. Therefore, productivity of the tire can be increased while durability of the tire is enhanced.

(4-1-8) The production method of the tire (4) described above can be configured such that in the reinforcing cord member winding step, at least a portion of the reinforcing cord member is embedded while the outer circumference of the tire frame formed in the tire frame piece bonding step is melted or softened, and thereby the reinforcing cord member is wound around the outer circumference of the tire frame.

As such, by embedding at least a portion of the reinforcing cord member while melting or softening the outer circumference of the tire frame, and winding the reinforcing cord member around the outer circumference of the tire frame, the at least a portion of the reinforcing cord member that has been embedded can be welded to the molten or softened thermoplastic resin material. Thereby, from a cross-sectional view of the tire frame dissected along the axial direction, incorporation of air between the outer circumference of the tire frame and the reinforcing member can be further suppressed. Furthermore, when the area where the reinforcing cord member is embedded is cooled and solidified, the fixing condition of the reinforcing cord member embedded in the tire frame is improved.

(4-1-9) The production method of the tire (4) can be configured such that in the reinforcing cord member winding step, a volume of ⅕ or more of the diameter of the reinforcing cord as viewed from a cross-section of the tire along the axial direction is embedded in the outer circumference of the tire frame.

As such, when a volume of ⅕ or more of the diameter of the reinforcing cord as viewed from a cross-section of the tire along the axial direction is embedded in the outer circumference of the tire frame, incorporation of air into the vicinity of the reinforcing cords at the time of production can be effectively suppressed, and the embedded reinforcing cord member can be made to hardly separate from the tire frame.

(4-1-10) The production method of the tire (4) can be configured such that in the reinforcing cord member winding step, the heated reinforcing cord member is embedded in the tire frame.

As such, if the reinforcing cord member is embedded in the tire frame while heated in the reinforcing cord winding step, when the heated reinforcing cord member is brought into contact with the outer circumference of the tire frame, the contact area is melted or softened. Therefore, it becomes easy to embed the reinforcing cord member in the outer circumference of the tire frame.

(4-1-11) The production method of the tire (4) can be configured such that in the cord member winding step, the area of the outer circumference of the tire frame where the reinforcing cord member is embedded is heated.

As such, when the area of the outer circumference of the tire frame where the reinforcing cord member is embedded is heated, the heated area of the tire frame is melted or softened. Therefore, it becomes easy to embed the reinforcing cord member.

(4-1-12) The production method of the tire (4) can be configured such that in the cord member winding step, the reinforcing cord member is helically wound in the circumferential direction of the outer circumference of the tire frame, while the reinforcing cord member is pressed to the outer circumference of the tire frame.

As such, when the reinforcing cord member is helically wound while the reinforcing cord member is pressed to the outer circumference of the tire frame, a depth of embedding of the reinforcing cord member in the outer circumference of the tire frame can be adjusted.

(4-1-13) The production method of the tire (4) can be configured such that in the cord member winding step, after the reinforcing cord member is wound around the tire frame, the molten or softened area of the outer circumference of the tire frame is cooled.

As such, when the molten or softened area of the outer circumference of the tire frame is forcibly cooled after the reinforcing cord member is embedded, the molten or softened area of the circumference of the tire frame can be more rapidly cooled and solidified than in the case of natural cooling. By cooling the tire outer circumference more rapidly than in the case of natural cooling, deformation of the outer circumference of the tire frame can be suppressed, and also the reinforcing cord member can be prevented from moving around.

Furthermore, the tire (4) of the present invention can be configured as follows, as described in connection with the second exemplary embodiment.

(4-2-1) The tire (4) of the present invention can be configured such that the production method described above further includes a roughening treatment step of roughening the outer circumferential surface of the tire frame by causing a particulate projection material to collide with the outer circumferential surface of the tire frame; and a superposing step of superposing a tire-constituting rubber member on the roughened outer circumferential surface by means of a bonding agent.

As such, when a roughening treatment step is provided, a particulate projection material collides with the outer circumferential surface of the circular tire frame formed by using a thermoplastic resin material including a polyester-based thermoplastic elastomer (A) and a polyester resin (B), and finely roughened surface asperities are formed on the relevant outer circumferential surface. Meanwhile, the treatment of causing a projection material to collide with the outer circumferential surface of the tire frame and thereby forming finely roughened surface asperities is referred to as a roughening treatment. Thereafter, a tire-constituting rubber member is laminated on the roughened outer circumferential surface by means of the bonding agent. Here, on the occasion of integrating the tire frame and the tire-constituting rubber member, since the outer circumferential surface of the tire frame is roughened, bonding property (adhesion property) is enhanced by an anchor effect. Furthermore, since the resin material that forms the tire frame is dug up by collision of the projection material, wettability of the outer circumferential surface is enhanced. Thereby, the bonding agent is maintained in a uniformly applied state on the outer circumferential surface of the tire frame, and thus, the bonding strength between the tire frame and the tire-constituting rubber member can be secured.

(4-2-2) The tire (4) of the present invention is such that at least a portion of the outer circumferential surface of the tire frame is a surface asperity section, and the surface asperity section can be produced by applying a roughening treatment in the roughening treatment step.

As such, even if at least a portion of the outer circumferential surface of the tire frame is configured into a surface asperity section, a roughening treatment is achieved in the vicinity of the concave sections (concave walls and concave bottoms) by causing a projection material to collide with the surface asperity section, and thereby, the bonding strength between the tire frame and the tire-constituting rubber member can be secured.

(4-2-3) In the tire (4) of the present invention, the outer circumference of the tire frame is configured to include a reinforcing layer that constitutes the surface asperity section on the outer circumferential surface, and the reinforcing layer can be configured such that a coated cord member which is produced by coating a reinforcing cord with a resin material that is identical with or different from the resin material that forms the tire frame, is wound in the circumferential direction of the tire frame.

As such, when the outer circumference of the tire frame is configured to include a reinforcing layer produced by winding a coated cord member in the circumferential direction of the tire frame, the rigidity in the circumferential direction of the tire frame can be enhanced.

(4-2-4) In the tire (4) of the present invention, a thermoplastic resin material can be used as the resin material that constitutes the coated cord member.

As such, when a thermoplastic material having thermoplasticity is used as the resin material that constitutes the coated cord member, as compared with the case of using a thermosetting material as the resin material, tire production is facilitated, and recycling is made easier.

(4-2-5) The tire (4) of the present invention can be configured such that in the roughening treatment step, a region which is broader than the laminated region of the tire-constituting rubber member is roughened.

As such, when a roughening treatment is applied to a region broader than the laminated region of the tire-constituting rubber member in the roughening treatment step, the bonding strength between the tire frame and the tire-constituting rubber member can be reliably secured.

(4-2-6) The tire (4) of the present invention can be configured such that in the roughening treatment step, the outer circumferential surface is roughened so as to obtain an arithmetic mean roughness Ra of 0.05 mm or greater.

As such, when the outer circumferential surface of the tire frame is roughened in the roughening treatment step so as to obtain an arithmetic mean roughness Ra of 0.05 mm or greater, in the case where, for example, a tire-constituting rubber member in an unvulcanized or semivulcanized state is laminated on the roughened outer circumferential surface by means of a bonding agent and vulcanized, the rubber of the tire-constituting rubber member can be caused to flow in to the bottom of the roughened surface asperities formed by the roughening treatment. When rubber of the tire-constituting rubber member is caused to flow in to the bottom of the roughened surface asperities, a sufficient anchor effect is exhibited between the outer circumferential surface and the tire-constituting rubber member, and the bonding strength between the tire frame and the tire-constituting rubber member can be increased.

(4-2-7) In the tire (4) of the present invention, a rubber in an unvulcanized or semivulcanized state can be used as the tire-constituting rubber member.

As such, if a rubber in an unvulcanized or semivulcanized state is used as the tire-constituting rubber member, when the tire-constituting rubber member is vulcanized, the rubber flows into the roughened surface asperities that have been formed on the outer circumferential surface of the tire frame by the roughening treatment. Then, when vulcanization is completed, an anchor effect is exhibited by the rubber (in a vulcanized state) that has flowed into the roughened surface asperities, and the bonding strength between the tire frame and the tire-constituting rubber members can be increased.

Meanwhile, the vulcanized state means a state in which the degree of vulcanization required from final products has been reached, and the semivulcanized state means a state in which the degree of vulcanization is higher than that of an unvulcanized state, but the degree of vulcanization required from final products has not been reached.

(4-2-8) The tire (4) of the present invention can be configured to include a circular tire frame that is formed by using a thermoplastic resin material and has its outer circumferential surface roughened by causing a particulate projection material to collide with the outer circumferential surface; and a tire-constituting rubber member that is laminated on the roughened outer circumferential surface by means of a bonding agent.

As such, when a roughened circular tire frame is used, the bonding strength between the tire frame and the tire-constituting rubber member can be increased by an anchor effect. Furthermore, since the outer circumferential surface is roughened, wettability of the bonding agent is satisfactory. Thereby, the bonding agent is maintained in a uniformly applied state on the outer circumferential surface of the tire frame, and the bonding strength between the tire frame and the tire-constituting rubber member is secured, so that separation between the tire frame and the tire-constituting rubber member can be suppressed.

The tire (5) of the present invention can be configured as follows, as disclosed in the first exemplary embodiment.

(5-1-1) The tire (5) of the present invention can be configured such that at least a portion of the reinforcing cord member as viewed from a cross-section of the tire frame dissected along the axial direction, is embedded in the outer circumference of the tire frame formed of a thermoplastic resin material according to the present invention.

As such, when a portion of the reinforcing cord member is embedded in the outer circumference of the tire frame, the phenomenon in which air remains in the vicinity of the cord at the time of winding the reinforcing cord member (incorporation of air) can be further suppressed. When incorporation of air into the vicinity of the reinforcing cord member is suppressed, the reinforcing cord member is prevented from moving around as a result of the force applied thereto or the like at the time of driving. Thereby, for example, when tire-constituting members are provided on the outer circumference of the tire frame so as to cover the entirety of the reinforcing cord member, since the reinforcing cord member is prevented from moving around, the occurrence of separation or the like between these members (including the tire frame) is suppressed, and durability is improved.

(5-1-2) The tire (5) of the present invention may be provided with a tread that is formed of a material having higher abrasion resistance than the thermoplastic resin material, on the outer side in the radial direction of the reinforcing cord layer described above.

As such, when the tread that is brought into contact with the road surface is formed of a material having higher abrasion resistance than the thermoplastic resin material, abrasion resistance of the tire can be further enhanced.

(5-1-3) In the tire (5) of the present invention, a volume of ⅕ or more of the diameter of the reinforcing cord member as viewed from a cross-section of the tire frame along the axial direction, can be embedded along the circumferential direction of the outer circumference of the tire frame.

As such, when a volume of ⅕ or more of the diameter of the reinforcing cord member as viewed from a cross-section of the tire frame dissected along the axial direction is embedded in the outer circumference of the tire frame, incorporation of air into the vicinity of the reinforcing cord member can be effectively suppressed, and the reinforcing cord member can be further prevented from moving around as a result of the force applied thereto or the like at the time of driving.

(5-1-4) The tire (5) of the present invention can be configured such that the tire frame includes a bead portion which is brought into contact with the bead sheet and the rim flange of the rim in the inner side of the radial direction, and annular bead cores formed of a metal material are embedded in the bead portion.

As such, when a bead portion which is a site of fitting with the rim is provided in the tire frame, and annular bead cores formed of a metal material are embedded in this bead portion, similarly to the conventional pneumatic tires made of rubber, the tire frame (that is to say, the tire) can be maintained rigid against the rim.

(5-1-5) The tire (5) of the present invention can be provided with a seal section formed of a material having higher sealing properties (adhesiveness to the rim) than the thermoplastic resin material at the area where the bead portion is brought into contact with the rim.

As such, when a seal section formed of a material having higher sealing properties than the thermoplastic resin material is provided at the area where the tire frame is brought into contact with the rim, the adhesiveness between the tire (tire frame) and the rim can be enhanced. Thereby, as compared with the case of using only the rim and the thermoplastic resin material, air leakage inside the tire can be further suppressed. Furthermore, the fittability of the tire onto a rim can also be enhanced by providing the seal section.

(5-1-6) The tire (5) of the present invention can be produced according to a production method which includes a tire frame piece forming step of forming a tire frame piece for constituting a portion of a circular tire frame, using a thermoplastic resin material including at least a polyester-based thermoplastic elastomer; a tire frame piece bonding step of forming the tire frame by fusing two or more of the tire frame pieces, which make a pair, by applying heat to bonding surfaces of the tire frame pieces, and thereby forming the tire frame; and a reinforcing cord member winding step of winding a reinforcing cord member around the outer circumference of the tire frame in the circumferential direction, and thereby forming a reinforcing cord layer.

(5-1-7) The production method of the tire (5) of the present invention can be configured such that in the tire frame piece bonding step, the bonding surface of the tire frame piece is heated to a temperature higher than or equal to the melting temperature of the thermoplastic resin material that constitutes the tire frame piece.

As such, when the bonding surface of a division is heated to a temperature higher than or equal to the melting temperature of the thermoplastic resin material that constitutes the tire frame piece, fusion between the tire frame pieces can be sufficiently achieved. Therefore, productivity of the tire can be increased while durability of the tire is enhanced.

(5-1-8) The production method of the tire (5) of the present invention can be configured such that in the reinforcing cord member winding step, at least a portion of the reinforcing cord member is embedded while the outer circumference of the tire frame formed in the tire frame piece bonding step is melted or softened, and thereby the reinforcing cord member is wound around the outer circumference of the tire frame.

As such, by embedding at least a portion of the reinforcing cord member while melting or softening the outer circumference of the tire frame, and winding the reinforcing cord member around the outer circumference of the tire frame, the at least a portion of the reinforcing cord member that has been embedded can be welded to the molten or softened thermoplastic resin material. Thereby, from a cross-sectional view of the tire frame dissected along the axial direction, incorporation of air between the outer circumference of the tire frame and the reinforcing member can be further suppressed. Furthermore, when the area where the reinforcing cord member is embedded is cooled and solidified, the fixing condition of the reinforcing cord member embedded in the tire frame is improved.

(5-1-9) The production method of the tire (5) of the present invention can be configured such that in the reinforcing cord member winding step, a volume of ⅕ or more of the diameter of the reinforcing cord as viewed from a cross-section of the tire along the axial direction is embedded in the outer circumference of the tire frame.

As such, when a volume of ⅕ or more of the diameter of the reinforcing cord as viewed from a cross-section of the tire along the axial direction is embedded in the outer circumference of the tire frame, incorporation of air into the vicinity of the reinforcing cord at the time of production can be effectively suppressed, and the embedded reinforcing cord member can be made to hardly separate from the tire frame.

(5-1-10) The production method of the tire (5) of the present invention can be configured such that in the reinforcing cord member winding step, the heated reinforcing cord members are embedded in the tire frame.

As such, if the reinforcing cord member is embedded in the tire frame while heated in the reinforcing cord winding step, when the heated reinforcing cord member is brought into contact with the outer circumference of the tire frame, the contact area is melted or softened. Therefore, it becomes easy to embed the reinforcing cord member in the outer circumference of the tire frame.

(5-1-11) The production method of the tire (5) of the present invention can be configured such that in the cord member winding step, the area of the outer circumference of the tire frame where the reinforcing cord member is embedded is heated.

As such, when the area of the outer circumference of the tire frame where the reinforcing cord member is embedded is heated, the heated area of the tire frame is melted or softened. Therefore, it becomes easy to embed the reinforcing cord member.

(5-1-12) The production method of the tire (5) of the present invention can be configured such that in the cord member winding step, the reinforcing cord member is helically wound in the circumferential direction of the outer circumference of the tire frame, while the reinforcing cord member is pressed to the outer circumference of the tire frame.

As such, when the reinforcing cord member is helically wound while the reinforcing cord member is pressed to the outer circumference of the tire frame, a depth of embedding of the reinforcing cord member in the outer circumference of the tire frame can be adjusted.

(5-1-13) The production method of the tire (5) of the present invention can be configured such that in the cord member winding step, after the reinforcing cord member is wound around the tire frame, the molten or softened area of the outer circumference of the tire frame is cooled.

As such, when the molten or softened area of the outer circumference of the tire frame is forcibly cooled after the reinforcing cord member is embedded, the molten or softened area of the circumference of the tire frame can be more rapidly cooled and solidified than in the case of natural cooling. By cooling the tire outer circumference more rapidly than in the case of natural cooling, deformation of the outer circumference of the tire frame can be suppressed, and also the reinforcing cord member can be prevented from moving around.

Furthermore, the tire (5) of the present invention can be configured as follows, as described in connection with the second exemplary embodiment.

(5-2-1) The production method of the tire (5) of the present invention can be configured to further include a roughening treatment step of roughening the outer circumferential surface of the tire frame by causing a particulate projection material to collide with the outer circumferential surface of the tire frame; and a superposing step of superposing a tire-constituting rubber member on the roughened outer circumferential surface by means of a bonding agent.

As such, when a roughening treatment step is provided, a particulate projection material collides with the outer circumferential surface of the circular tire frame formed by using a thermoplastic resin material, and finely roughened surface asperities are formed on the relevant outer circumferential surface. Meanwhile, the treatment of causing a projection material to collide with the outer circumferential surface of the tire frame and thereby forming finely roughened surface asperities is referred to as a roughening treatment. Thereafter, a tire-constituting rubber member is laminated on the roughened outer circumferential surface by means of the bonding agent. Here, on the occasion of integrating the tire frame and the tire-constituting rubber member, since the outer circumference of the tire frame is roughened, bonding property (adhesion property) is enhanced by an anchor effect. Furthermore, since the resin material that forms the tire frame is dug up by collision of the projection material, wettability of the outer circumferential surface is enhanced. Thereby, the bonding agent is maintained in a uniformly applied state on the outer circumferential surface of the tire frame, and thus, the bonding strength between the tire frame and the tire-constituting rubber member can be secured.

(5-2-2) The tire (5) of the present invention is such that at least a portion of the outer circumferential surface of the tire frame is a surface asperity section, and the surface asperity section can be produced by applying a roughening treatment in the roughening treatment step.

As such, even if at least a portion of the outer circumferential surface of the tire frame is configured into a surface asperity section, a roughening treatment is achieved in the vicinity of the concave sections (concave walls and concave bottoms) by causing a projection material to collide with the surface asperity section, and thereby, the bonding strength between the tire frame and the tire-constituting rubber member can be secured.

(5-2-3) In the tire (5) of the present invention, the outer circumference of the tire frame is configured to include a reinforcing layer that constitutes the surface asperity section on the outer circumferential surface, and the reinforcing layer can be configured such that a coated cord member which is produced by coating a reinforcing cord with a resin material that is identical with or different from the resin material that forms the tire frame, is wound in the circumferential direction of the tire frame.

As such, when the outer circumference of the tire frame is configured to include a reinforcing layer produced by winding a coated cord member in the circumferential direction of the tire frame, the rigidity in the circumferential direction of the tire frame can be enhanced.

(5-2-4) In the tire (5) of the present invention, a thermoplastic resin material can be used as the resin material that constitutes the coated cord member.

As such, when a thermoplastic material having thermoplasticity is used as the resin material that constitutes the coated cord member, as compared with the case of using a thermosetting material as the resin material, tire production is facilitated, and recycling is made easier.

(5-2-5) The tire (5) of the present invention can be configured such that in the roughening treatment step, a region which is broader than the laminated region of the tire-constituting rubber member is roughened.

As such, when a roughening treatment is applied to a region broader than the laminated region of the tire-constituting rubber member in the roughening treatment step, the bonding strength between the tire frame and the tire-constituting rubber member can be reliably secured.

(5-2-6) The tire (5) of the present invention can be configured such that in the roughening treatment step, the outer circumferential surface is roughened so as to obtain an arithmetic mean roughness Ra of 0.05 mm or greater.

As such, when the outer circumferential surface of the tire frame is roughened in the roughening treatment step so as to obtain an arithmetic mean roughness Ra of 0.05 mm or greater, in the case where, for example, a tire-constituting rubber member in an unvulcanized or semivulcanized state is laminated on the roughened outer circumferential surface by means of a bonding agent and vulcanized, the rubber of the tire-constituting rubber member can be caused to flow in to the bottom of the roughened surface asperities formed by the roughening treatment. When rubber of the tire-constituting rubber member is caused to flow in to the bottom of the roughened surface asperities, a sufficient anchor effect is exhibited between the outer circumferential surface and the tire-constituting rubber member, and the bonding strength between the tire frame and the tire-constituting rubber member can be increased.

(5-2-7) In the tire (5) of the present invention, a rubber in an unvulcanized or semivulcanized state can be used as the tire-constituting rubber member.

As such, if a rubber in an unvulcanized or semivulcanized state is used as the tire-constituting rubber member, when the tire-constituting rubber member is vulcanized, the rubber flows into the roughened surface asperities that have been formed on the outer circumferential surface of the tire frame by the roughening treatment. Then, when vulcanization is completed, an anchor effect is exhibited by the rubber (in a vulcanized state) that has flowed into the roughened surface asperities, and the bonding strength between the tire frame and the tire-constituting rubber members can be increased.

Meanwhile, the vulcanized state means a state in which the degree of vulcanization required from final products has been reached, and the semivulcanized state means a state in which the degree of vulcanization is higher than that of an unvulcanized state, but the degree of vulcanization required from final products has not been reached.

(5-2-8) The tire (5) of the present invention can be configured to include a circular tire frame that is formed by using a thermoplastic resin material according to the present invention and has its outer circumferential surface roughened by causing a particulate projection material to collide with the outer circumferential surface; and a tire-constituting rubber member that is laminated on the roughened outer circumferential surface by means of a bonding agent.

As such, when a roughened circular tire frame is used, the bonding strength between the tire frame and the tire-constituting rubber member can be increased by an anchor effect. Furthermore, since the outer circumferential surface is roughened, wettability of the bonding agent is satisfactory. Thereby, the bonding agent is maintained in a uniformly applied state on the outer circumferential surface of the tire frame, and the bonding strength between the tire frame and the tire-constituting rubber member is secured, so that separation between the tire frame and the tire-constituting rubber member can be suppressed.

The tire (6) of the present invention can be configured as follows, as shown in the first exemplary embodiment.

(6-1-1) The tire (6) of the present invention can be configured such that at least a portion of the reinforcing cord member is embedded in an outer circumference of the tire frame formed of a thermoplastic resin material according to the present invention as viewed from a cross-section of the tire frame dissected along the axial direction.

When a portion of the reinforcing cord member is embedded in an outer circumference of the tire frame as such, the phenomenon in which air remains in the vicinity of the cords at the time of winding the reinforcing cord member (incorporation of air) can be further suppressed. When incorporation of air into the vicinity of the reinforcing cord member is suppressed, moving of the reinforcing cord member as a result of the force applied thereto or the like at the time of driving is suppressed. Thereby, for example, when a tire-constituting member is provided on an outer circumference of the tire frame so as to cover the entirety of the reinforcing cord member, since the moving of the reinforcing cord member is suppressed, the occurrence of separation or the like between the members (including the tire frame) is suppressed, and durability is improved.

(6-1-2) The tire (6) of the present invention may be provided with, on the outer side in the radial direction of the reinforcing cord layer, a tread that is formed of a material having higher abrasion resistance than the thermoplastic resin material.

When the tread that is brought into contact with the road surface is formed of a material having higher abrasion resistance than the thermoplastic resin material as such, abrasion resistance of the tire can be further enhanced.

(6-1-3) In the tire (6) of the present invention, a volume of $\frac{1}{5}$ or more of the diameter of the reinforcing cord member as viewed from a cross-section of the tire frame along the axial direction can be embedded along a circumferential direction of an outer circumference of the tire frame.

When a volume of $\frac{1}{5}$ or more of the diameter of the reinforcing cord member as viewed from a cross-section of the tire frame dissected along the axial direction is embedded in an outer circumference of the tire frame as such, incorporation of air into the vicinity of the reinforcing cord member can be effectively suppressed, and moving of the reinforcing cord member as a result of the force applied thereto or the like at the time of driving can be suppressed.

(6-1-4) The tire (6) of the present invention can be configured such that the tire frame includes bead portions which are brought into contact with the bead sheet and the rim flange of the rim in the inner side of the radial direction, and annular bead cores formed of a metal material are embedded in the bead portions.

When a bead portions which are sites of fitting onto the rim are provided in the tire frame and annular bead cores formed of a metal material are embedded in the bead portions as such, similarly to the conventional pneumatic tires made of rubber, the tire frame (that is to say, the tire) can be maintained rigid against the rim.

(6-1-5) The tire (6) of the present invention can be provided with, at the area where the bead portion is brought into contact with the rim, a seal portion formed of a material having higher sealing properties (adhesiveness to the rim) than the thermoplastic resin material.

When a seal portion formed of a material having higher sealing properties than the thermoplastic resin material is provided at the area where the tire frame is brought into contact with the rim as such, the adhesiveness between the tire (tire frame) and the rim can be enhanced. Thereby, as compared with the case of using only the rim and the thermoplastic resin material, air leakage inside the tire can be further suppressed. Further, the rim fittability of the tire can also be enhanced by providing the seal portion.

(6-1-6) The method of producing the tire (6) of the present invention is configured to include a tire frame piece forming step of forming a tire frame piece that constitutes a portion of a circular tire frame, using a thermoplastic resin material containing at least a polyester-based thermoplastic elastomer and at least one of a specific copolymer or a specific acid-modified copolymer; and a tire frame piece bonding step of forming the tire frame by fusing two or more of the tire frame pieces, which make a pair, by applying heat to bonding sections of the tire frame pieces. The method of producing the tire of the present invention can be configured to further include a reinforcing cord member winding step of winding a reinforcing cord member around an outer circumference of the tire frame in a circumferential direction, and thereby forming a reinforcing cord layer.

Regarding the polyester-based thermoplastic elastomer, for example, a polyester-based thermoplastic elastomer, "HYTREL 6347", manufactured by DuPont-Toray Co., Ltd. can be used; regarding the specific copolymer, for example, an ethylene-methacrylic acid copolymer, "NUCREL N035C", manufactured by DuPont-Mitsui Polychemicals Co., Ltd. can be used; and regarding the specific acid-modified copolymer, for example, an acid modification product of an ethylene-acrylate ethyl ester copolymer, "HPR, AR2011", manufactured by DuPont-Mitsui Polychemicals Co., Ltd. can be used.

As described above, a thermoplastic resin material containing a polyester-based thermoplastic elastomer and at least one of a specific copolymer or a specific acid-modified copolymer exhibits less deformation or change in hardness that is caused by temperature fluctuation in the use environment, has excellent impact resistance, and exhibits excellent fluidity so that injection molding can be easily carried out. Therefore, on the occasion of forming a tire frame piece that constitutes a portion of a circular tire frame using the thermoplastic resin material according to the present invention, if the tire frame piece is formed by injection molding, the tire frame piece can be efficiently formed, and excellent productivity of tire is obtained.

(6-1-7) The method of producing the tire (6) described above can be configured such that in the tire frame piece bonding step, the bonding surface of the tire frame piece is heated to equal to or higher than a equal to or higher thanmelting temperature of the thermoplastic resin material that constitutes the tire frame piece.

When the bonding surface of the division is heated to a temperature equal to or higher than the melting temperature of the thermoplastic resin material that constitutes the tire frame piece, fusion between the tire frame pieces can be sufficiently achieved. Therefore, productivity of the tire can be increased while durability of the tire is enhanced.

(6-1-8) The method of producing the tire (6) of the present invention can be configured such that in the reinforcing cord member winding step, at least a portion of the reinforcing cord member is embedded while an outer circumference of the tire frame formed in the tire frame piece bonding step is melted or softened and the reinforcing cord member is wound around an outer circumference of the tire frame.

By embedding at least a portion of the reinforcing cord member while melting or softening an outer circumference of the tire frame and winding the reinforcing cord member around an outer circumference of the tire frame as such, the at least a portion of the reinforcing cord member that has been embedded can be welded to the molten or softened thermoplastic resin material. Thereby, from a cross-sectional view of the tire frame dissected along the axial direction, incorporation of air between an outer circumference of the tire frame and the reinforcing members can be further suppressed. Further, when the area where the reinforcing cord member is embedded is cooled and solidified, the fixing condition of the reinforcing cord member embedded in the tire frame is improved.

(6-1-9) The method of producing the tire (6) described above can be configured such that in the reinforcing cord member winding step, a volume of ⅕ or more of the diameter of the reinforcing cord as viewed from a cross-section of the tire along the axial direction is embedded in an outer circumference of the tire frame.

When a volume of ⅕ or more of the diameter of the reinforcing cord as viewed from a cross-section of the tire along the axial direction is embedded in an outer circumference of the tire frame as such, incorporation of air into the vicinity of the reinforcing cords at the time of production can be effectively suppressed, and the embedded reinforcing cord member can be made to hardly separate from the tire frame.

(6-1-10) The method of producing the tire (6) described above can be configured such that in the reinforcing cord member winding step, the reinforcing cord member which is heated is embedded in the tire frame.

If the reinforcing cord member is embedded in the tire frame while being heated in the reinforcing cord winding step as such, when the heated reinforcing cord member is brought into contact with an outer circumference of the tire frame, the contact area is melted or softened. Therefore, it becomes easy to embed the reinforcing cord member in an outer circumference of the tire frame.

(6-1-11) The method of producing the tire (6) described above can be configured such that in the cord member winding step, the area of an outer circumference of the tire frame where the reinforcing cord member is embedded is heated.

When the area of an outer circumference of the tire frame where the reinforcing cord member is embedded is heated as such, the heated area of the tire frame is melted or softened. Therefore, it becomes easy to embed the reinforcing cord member.

(6-1-12) The method of producing the tire (6) described above can be configured such that in the cord member winding step, the reinforcing cord member is helically wound in a circumferential direction of an outer circumference of the tire frame, while the reinforcing cord member is pressed to an outer circumference of the tire frame.

When the reinforcing cord member is helically wound while the reinforcing cord member is pressed to an outer circumference of the tire frame as such, the embedding amount of the reinforcing cord member in an outer circumference of the tire frame can be adjusted.

(6-1-13) The method of producing the tire (6) can be configured such that in the cord member winding step, after the reinforcing cord member is wound around the tire frame, the molten or softened area of an outer circumference of the tire frame is cooled.

When the molten or softened area of an outer circumference of the tire frame is forcibly cooled after the reinforcing cord member is embedded as such, the molten or softened area of the periphery of the tire frame can be more rapidly cooled and solidified than in the case of natural cooling. By cooling the tire outer circumference more rapidly than in the case of natural cooling, deformation of an outer circumference of the tire frame can be suppressed, and also moving of the reinforcing cord members can be suppressed.

Further, the tire (6) of the present invention can be configured as follows, as explained in connection with the second exemplary embodiment.

(6-2-1) The tire (6) of the present invention can be configured such that the production method described above further includes a roughening treatment step of roughening an outer circumference of the tire frame by causing a particulate projection material to collide with the outer peripheral surface of the tire frame; and a superposing step of superposing a tire-constituting rubber member on the roughened outer peripheral surface using a bonding agent.

When a roughening treatment step is provided as such, a particulate projection material collides with the outer peripheral surface of the circular tire frame formed by using a thermoplastic resin material, and finely roughened surface asperities are formed on the outer peripheral surface. Meanwhile, the treatment of causing a projection material to collide with the outer peripheral surface of the tire frame and thereby forming finely roughened surface asperities is referred to as a roughening treatment. Thereafter, a tire-constituting rubber member is superposed on the roughened outer peripheral surface by means of the bonding agent. Here, when the tire frame and the tire-constituting rubber member are integrated, since an outer circumference of the tire frame is roughened, bonding property (adhesiveness) is enhanced by an anchor effect. Further, since the resin material that forms the tire frame is dug up by collision of the projection material, wettability of the outer peripheral surface is enhanced. Thereby, the bonding agent is maintained in a uniformly applied state on the outer peripheral surface of the tire frame, and thus, the bonding strength between the tire frame and the tire-constituting rubber member can be secured.

(6-2-2) The tire (6) of the present invention is such that at least a portion of the outer peripheral surface of the tire frame is a surface asperity section, and the surface asperity section can be produced by applying a roughening treatment in the roughening treatment step.

Even if at least a portion of the outer peripheral surface of the tire frame is configured to be a surface asperity section as such, a roughening treatment is achieved in the vicinity of the concave sections (concave walls and concave bottoms) by causing a projection material to collide with the surface asperity section, and thereby, the bonding strength between the tire frame and the tire-constituting rubber member can be secured.

(6-2-3) In the tire (6) of the present invention, an outer circumference of the tire frame is configured to include a reinforcing layer that constitutes the surface asperity section on the outer peripheral surface, and the reinforcing layer can be configured such that a coated cord member which is produced by coating a reinforcing cord with a resin material that is the same kind as or different from the resin material that forms the tire frame, is wound in a circumferential direction of the tire frame.

When an outer circumference of the tire frame is configured to include a reinforcing layer produced by winding a coated cord member in a circumferential direction of the tire frame as such, the rigidity in a circumferential direction of the tire frame can be enhanced.

(6-2-4) In the tire (6) of the present invention, a thermoplastic resin material can be used as the resin material that constitutes the coated cord member.

When a thermoplastic material having thermoplasticity is used as the resin material that constitutes the coated cord member as such, tire production is facilitated and recycling is made easier as compared with the case of using a thermosetting material as the resin material.

(6-2-5) The tire (6) of the present invention can be configured such that in the roughening treatment step, a region which is larger than the superposed region of the tire-constituting rubber member is roughened.

As such, when a roughening treatment is applied to a region larger than the superposed region of the tire-constituting rubber member in the roughening treatment step, the bonding strength between the tire frame and the tire-constituting rubber member can be reliably secured.

(2-6) The tire (6) of the present invention can be configured such that in the roughening treatment step, the outer peripheral surface is roughened so as to obtain an arithmetic mean roughness Ra of 0.06 to 5 mm or greater.

When the outer peripheral surface of the tire frame is roughened in the roughening treatment step so as to obtain an arithmetic mean roughness Ra of 0.05 mm or greater as such, in the case where, for example, a tire-constituting rubber member in an unvulcanized or semivulcanized state is superposed on the roughened outer peripheral surface by means of a bonding agent and vulcanized, the rubber of the tire-constituting rubber member can be caused to flow into the bottom of the roughened surface asperities formed by the roughening treatment. When rubber of the tire-constituting rubber member is caused to flow into the bottom of the roughened surface asperities, a sufficient anchor effect is exhibited between the outer peripheral surface and the tire-constituting rubber member, and the bonding strength between the tire frame and the tire-constituting rubber member can be increased.

(6-2-7) In the tire (6) of the present invention, a rubber in an unvulcanized or semivulcanized state can be used as the tire-constituting rubber member.

When a rubber in an unvulcanized or semivulcanized state is used as the tire-constituting rubber member as such, in the case where the tire-constituting rubber member is vulcanized, the rubber flows into the roughened surface asperities formed on the outer peripheral surface of the tire frame by the roughening treatment. Then, when vulcanization is completed, an anchor effect is exhibited by the rubber (in a vulcanized state) that has flowed into the roughened surface asperities, and the bonding strength between the tire frame and the tire-constituting rubber members can be increased.

Meanwhile, the vulcanized state means a state which satisfies a degree of vulcanization required for final products, and the semivulcanized state means a state which has a degree of vulcanization which is higher than that of an unvulcanized state but does not satisfy the degree of vulcanization required for final products.

(6-2-8) The tire (6) of the present invention can be configured to include: a circular tire frame that is formed using a thermoplastic resin material according to the present invention and has its outer peripheral surface roughened by causing a particulate projection material to collide with the outer peripheral surface; and a tire-constituting rubber member that is superposed on the roughened outer peripheral surface by means of a bonding agent.

When a roughened circular tire frame is used as such, the bonding strength between the tire frame and the tire-constituting rubber member can be increased by an anchor effect. Further, since the outer peripheral surface is roughened, wettability of the bonding agent is satisfactory. Thereby, the bonding agent is maintained in a uniformly applied state on the outer peripheral surface of the tire frame, and the bonding strength between the tire frame and the tire-constituting rubber member is secured, so that separation between the tire frame and the tire-constituting rubber member can be suppressed.

Further, the tire (7) of the present invention can be configured as follows, as shown in the first exemplary embodiment.

(7-1-1) The tire (7) of the present invention can be configured such that at least a portion of the reinforcing cord member is embedded in an outer circumference of the tire frame formed of a thermoplastic resin material as viewed from a cross-section of the tire frame dissected along the axial direction.

When a portion of the reinforcing cord member is embedded in an outer circumference of the tire frame as such, the phenomenon in which air remains in the vicinity of the cords at the time of winding the reinforcing cord member (incorporation of air) can be further suppressed. When incorporation of air into the vicinity of the reinforcing cord member is suppressed, moving of the reinforcing cord member as a result of the force applied thereto or the like at the time of driving is suppressed. Thereby, for example, when a tire-constituting member is provided on an outer circumference of the tire frame so as to cover the entirety of the reinforcing cord member, since moving of the reinforcing cord member is suppressed, the occurrence of separation or the like between the members (including the tire frame) is suppressed, and durability is improved.

(7-1-2) The tire (7) of the present invention may be provided with, on the outer side in the radial direction of the reinforcing cord layer described above, a tread that is formed of a material having higher abrasion resistance than the thermoplastic resin material.

When the tread that is brought into contact with the road surface is formed of a material having higher abrasion resistance than the thermoplastic resin material as such, abrasion resistance of the tire can be further enhanced.

(7-1-3) In the tire (7) of the present invention, a volume of ⅕ or more of the diameter of the reinforcing cord member as viewed from a cross-section of the tire frame along the axial direction can be embedded along a circumferential direction of an outer circumference of the tire frame.

When a volume of ⅕ or more of the diameter of the reinforcing cord member as viewed from a cross-section of the tire frame dissected along the axial direction is embedded in an outer circumference of the tire frame as such, incorporation of air into the vicinity of the reinforcing cord member can be effectively suppressed, and moving of the reinforcing cord member as a result of the force applied thereto or the like at the time of driving can be suppressed.

(7-1-4) The tire (7) of the present invention can be configured such that the tire frame includes bead portions which are brought into contact with the bead sheet and the rim flange of the rim in the inner side of the radial direction, and annular bead cores formed of a metal material are embedded in the bead portions.

When bead portions which are sites of fitting onto the rim are provided in the tire frame and annular bead cores formed of a metal material are embedded in the bead portions as such, similarly to the conventional pneumatic tires made of rubber, the tire frame (that is to say, the tire) can be maintained rigid against the rim.

(7-1-5) The tire (7) of the present invention can be provided with, at the area where the bead portion is brought into contact with the rim, a seal portion formed of a material having higher sealing properties (adhesiveness to the rim) than the thermoplastic resin material.

When a seal portion formed of a material having higher sealing properties than the thermoplastic resin material is provided at the area where the tire frame is brought into contact with the rim as such, the adhesiveness between the tire (tire frame) and the rim can be enhanced. Thereby, as compared with the case of using only the rim and the thermoplastic resin material, air leakage inside the tire can be further suppressed. Furthermore, the rim fittability of the tire can also be enhanced by providing the seal portion.

(7-1-6) The tire (7) of the present invention can be produced according to a production method which includes: a tire frame piece forming step of forming a tire frame piece that constitutes a portion of a circular tire frame, using at least the thermoplastic resin material; a tire frame piece bonding step of forming the tire frame by fusing two or more of the tire frame pieces, which make a pair, by applying heat to bonding sections of the tire frame pieces; and a reinforcing cord member winding step of winding a reinforcing cord member around an outer circumference of the tire frame in a circumferential direction, and thereby forming a reinforcing cord layer.

(7-1-7) The method of producing the tire (7) described above can be configured such that in the tire frame piece bonding step, the bonding surface of the tire frame piece is heated to a temperature equal to or higher than the melting temperature of the thermoplastic resin material that constitutes the tire frame piece (for example, from ten degrees Celsius higher than the melting temperature to 150 degrees Celsius higher than the melting temperature).

When the bonding surface of the division is heated to a temperature equal to or higher than the melting temperature of the thermoplastic resin material that constitutes the tire frame piece, fusion between the tire frame pieces can be sufficiently achieved. Therefore, productivity of the tire can be increased while durability of the tire is enhanced.

(7-1-8) The method of producing the tire (7) described above can be configured such that in the reinforcing cord member winding step, at least a portion of the reinforcing cord member is embedded while an outer circumference of the tire frame formed in the tire frame piece bonding step is melted or softened and the reinforcing cord member is wound around an outer circumference of the tire frame.

By embedding at least a portion of the reinforcing cord member while melting or softening an outer circumference of the tire frame and winding the reinforcing cord member around an outer circumference of the tire frame as such, the at least a portion of the reinforcing cord member that has been embedded can be welded to the molten or softened thermoplastic resin material. Thereby, from a cross-sectional view of the tire frame dissected along the axial direction, incorporation of air between an outer circumference of the tire frame and the reinforcing members can be further suppressed. Further, when the area where the reinforcing cord member is embedded is cooled and solidified, the fixing condition of the reinforcing cord member embedded in the tire frame is improved.

(7-1-9) The method of producing the tire (7) described above can be configured such that in the reinforcing cord member winding step, a volume of ⅕ or more of the diameter of the reinforcing cord as viewed from a cross-section of the tire along the axial direction is embedded in an outer circumference of the tire frame.

When a volume of ⅕ or more of the diameter of the reinforcing cord as viewed from a cross-section of the tire along the axial direction is embedded in an outer circumference of the tire frame as such, incorporation of air into the vicinity of the reinforcing cords at the time of production can be effectively suppressed, and the embedded reinforcing cord member can be made to hardly separate from the tire frame.

(7-1-10) The method of producing the tire (7) described above can be configured such that in the reinforcing cord member winding step, the reinforcing cord member which is heated is embedded in the tire frame.

If the reinforcing cord member is embedded in the tire frame while being heated in the reinforcing cord winding step as such, when the heated reinforcing cord member is brought into contact with an outer circumference of the tire frame, the contact area is melted or softened. Therefore, it becomes easy to embed the reinforcing cord member in an outer circumference of the tire frame.

(7-1-11) The method of producing the tire (7) described above can be configured such that in the cord member winding step, the area of an outer circumference of the tire frame where the reinforcing cord member is embedded is heated.

When the area of an outer circumference of the tire frame where the reinforcing cord member is embedded is heated as such, the heated area of the tire frame is melted or softened. Therefore, it becomes easy to embed the reinforcing cord member.

(7-1-12) The method of producing the tire (7) described above can be configured such that in the cord member winding step, the reinforcing cord member is helically wound in a circumferential direction of an outer circumference of the tire frame, while the reinforcing cord member is pressed to an outer circumference of the tire frame.

When the reinforcing cord member is helically wound while the reinforcing cord member is pressed to an outer circumference of the tire frame as such, the embedding volume of the reinforcing cord member in an outer circumference of the tire frame can be adjusted.

(7-1-13) The method of producing the tire (7) can be configured such that in the cord member winding step, after the reinforcing cord member is wound around the tire frame, the molten or softened area of an outer circumference of the tire frame is cooled.

When the molten or softened area of an outer circumference of the tire frame is forcibly cooled after the reinforcing cord member is embedded as such, the molten or softened area of the periphery of the tire frame can be more rapidly cooled and solidified than in the case of natural cooling. By cooling the tire outer circumference more rapidly than in the case of natural cooling, deformation of an outer circumference of the tire frame can be suppressed, and also moving of the reinforcing cord member can be suppressed.

Further, the tire of the present invention can be configured as follows, as explained in the second exemplary embodiment.

(7-2-1) The tire (7) of the present invention can be configured such that the production method described above further includes a roughening treatment step of roughening an outer circumference of the tire frame by causing a particulate projection material to collide with the outer peripheral surface of the tire frame; and a superposing step of superposing a tire-constituting rubber member on the roughened outer peripheral surface using a bonding agent.

When a roughening treatment step is provided as such, a particulate projection material collides with the outer peripheral surface of the circular tire frame formed by using a thermoplastic resin material containing a polyester-based thermoplastic elastomer, and finely roughened surface asperities are formed on the outer peripheral surface. Meanwhile, the treatment of causing a projection material to collide with the outer peripheral surface of the tire frame and thereby forming finely roughened surface asperities is referred to as a roughening treatment. Thereafter, a tire-constituting rubber member is superposed on the roughened outer peripheral surface by means of the bonding agent. Here, when the tire frame and the tire-constituting rubber member are integrated, since an outer circumference of the tire frame is roughened, bonding property (adhesiveness) is enhanced by an anchor effect. Further, since the resin material that forms the tire frame is dug up by collision of the projection material, wettability of the outer peripheral surface is enhanced. Thereby, the bonding agent is maintained in a uniformly applied state on the outer peripheral surface of the tire frame, and thus, the bonding strength between the tire frame and the tire-constituting rubber member can be secured.

(7-2-2) The tire (7) of the present invention is such that at least a portion of the outer peripheral surface of the tire frame is a surface asperity section, and the surface asperity section can be produced by applying a roughening treatment in the roughening treatment step.

Even if at least a portion of the outer peripheral surface of the tire frame is configured to be a surface asperity section as such, a roughening treatment is achieved in the vicinity of the concave sections (concave walls and concave bottoms) by causing a projection material to collide with the surface asperity section, and thereby, the bonding strength between the tire frame and the tire-constituting rubber member can be secured.

(7-2-3) In the tire (7) of the present invention, an outer circumference of the tire frame is configured to include a reinforcing layer that constitutes the surface asperity section on the outer peripheral surface, and the reinforcing layer can be configured such that a coated cord member which is produced by coating a reinforcing cord with a resin material that is of the same kind as or different from the resin material that forms the tire frame, is wound in a circumferential direction of the tire frame.

When an outer circumference of the tire frame is configured to include a reinforcing layer produced by winding a coated cord member in a circumferential direction of the tire frame as such, the rigidity in a circumferential direction of the tire frame can be enhanced.

(7-2-4) In the tire (7) of the present invention, a thermoplastic resin material can be used as the resin material that constitutes the coated cord member.

When a thermoplastic material having thermoplasticity is used as the resin material that constitutes the coated cord member as such, tire production is facilitated and recycling is made easier as compared with the case of using a thermosetting material as the resin material.

(7-2-5) The tire (7) of the present invention can be configured such that in the roughening treatment step, a region which is larger than the superposed region of the tire-constituting rubber member is roughened.

As such, when a roughening treatment is applied to a region larger than the superposed region of the tire-constituting rubber member in the roughening treatment step, the bonding strength between the tire frame and the tire-constituting rubber member can be reliably secured.

(7-2-6) The tire (7) of the present invention can be configured such that in the roughening treatment step, the outer peripheral surface is roughened so as to obtain an arithmetic mean roughness Ra of 0.05 mm or greater.

When the outer peripheral surface of the tire frame is roughened in the roughening treatment step so as to obtain an arithmetic mean roughness Ra of 0.05 mm or greater as such, in the case where, for example, a tire-constituting rubber member in an unvulcanized or semivulcanized state is superposed on the roughened outer peripheral surface by means of a bonding agent and vulcanized, the rubber of the tire-constituting rubber member can be caused to flow in to the bottom of the roughened surface asperities formed by the roughening treatment. When rubber of the tire-constituting rubber member is caused to flow in to the bottom of the roughened surface asperities, a sufficient anchor effect is exhibited between the outer peripheral surface and the tire-constituting rubber member, and the bonding strength between the tire frame and the tire-constituting rubber member can be increased.

(7-2-7) In the tire (7) of the present invention, a rubber in an unvulcanized or semivulcanized state can be used as the tire-constituting rubber member.

When a rubber in an unvulcanized or semivulcanized state is used as the tire-constituting rubber member as such, in the case where the tire-constituting rubber member is vulcanized, the rubber flows into the roughened surface asperities formed on the outer peripheral surface of the tire frame by the roughening treatment. Then, when vulcanization is completed, an anchor effect is exhibited by the rubber (in a vulcanized state) that has flowed into the roughened surface asperities, and the bonding strength between the tire frame and the tire-constituting rubber members can be increased.

Meanwhile, the vulcanized state means a state which satisfies a degree of vulcanization required for final products, and the semivulcanized state means a state which has a degree of vulcanization which is higher than that of an unvulcanized state but does not satisfy the degree of vulcanization required for final products.

(7-2-8) The tire (7) of the present invention can be configured to include: a circular tire frame that is formed using the resin material and has its outer peripheral surface roughened by causing a particulate projection material to collide with the outer peripheral surface; and a tire-constituting rubber member that is superposed on the roughened outer peripheral surface by means of a bonding agent.

When a roughened circular tire frame is used as such, the bonding strength between the tire frame and the tire-constituting rubber member can be increased by an anchor effect. Further, since the outer peripheral surface is roughened, wettability of the bonding agent is satisfactory. Thereby, the bonding agent is maintained in a uniformly applied state on the outer peripheral surface of the tire frame, and the bonding strength between the tire frame and the tire-constituting rubber member is secured, so that separation between the tire frame and the tire-constituting rubber member can be suppressed.

Specific embodiments of the present invention have been described above by way of the first exemplary embodiment and the second exemplary embodiment, but the present invention is not intended to be limited to the embodiments described above.

EXAMPLES

Examples 1-1 to 1-3 and Comparative Example 1-1

Hereinbelow, the first aspect of the present invention will be more specifically explained by way of Examples. However, the present invention is not intended to be limited to these.

First, various tires of the Examples and Comparative Example were molded according to the first exemplary embodiment described above.

At this time, the materials described in the following Table 1-1 were used as the materials for forming tire cases.

Also, for the respective Examples and Comparative Example, evaluations of the tensile characteristics, deflection temperature under load, bonding property and tire performance were carried out.

In Comparative Example 1-1, since the tire case half parts were not sufficiently bonded, it was not possible to produce a tire.

<Production of Pellet>

Pellets to be used in the respective Examples and Comparative Example were obtained by using the thermoplastic elastomers described in Table 1-1, and appropriately subjecting the elastomers to preliminary drying.

<Evaluation>

1-1. Evaluation of Tensile Characteristics (Tensile Elastic Modulus, Tensile Strength, and Elongation at Break)

The pellets thus produced were used as molding materials, and injection molding was carried out using a mold having a size of 127 mm×12.7 mm and a thickness of 1.6 mm, under the following molding conditions, thereby obtaining specimens.

Injection molding machine: SE30D, Sumitomo Heavy Industries, Ltd.

Molding temperature (temperature of thermoplastic resin material): 200° C. to 240° C. for Examples, and 320° C. for Comparative Example Mold temperature: 50° C. to 70° C. for Examples, and 130° C. for Comparative Example The respective specimens thus obtained were punched, and dumbbell-shaped specimens (No. 5 specimens) as defined in JIS K6251: 1993 were produced.

Subsequently, the tensile elastic modulus, tensile strength and elongation at break of each of the dumbbell-shaped specimens were measured using a Shimadzu Autograph AGS-J (5 KN) manufactured by Shimadzu Corp., under a tensile speed of 200 mm/min.

The results are shown in Table 1-1.

1-2. Evaluation of Deflection Temperature Under Load

The pellets produced as described above were used as molding materials, and injection molding was carried out using a mold having a multipurpose specimen (JIS K7139: 2009, ISO-3167) shape, under the following molding conditions, thereby obtaining multipurpose specimens having a thickness of 4 mm.

Injection molding machine: SE30D, Sumitomo Heavy Industries, Ltd.

Molding temperature (temperature of thermoplastic resin material): 200° C. to 240° C. for Examples, and 320° C. for Comparative Example Mold temperature: 50° C. to 70° C. for Examples, and 130° C. for Comparative Example The multipurpose specimens thus obtained were cut into evaluation specimens having a size of 127 mm×10 mm and a thickness of 4 mm.

For the evaluation specimens thus obtained, the deflection temperature under load (ASTM D648) under the respective loads of 0.45 MPa and 1.8 MPa were measured using a HDT/VSPT testing apparatus (manufactured by Ueshima Seisakusho Co., Ltd.).

The measurement method and conditions were as follows.

An evaluation specimen was supported at two points thereof separated by a distance of 100 mm, and a load of 0.46 MPa or 1.8 MPa was applied at the center of the two points. The surroundings of the specimen were filled with a silicone oil, and the temperature was elevated at a rate of temperature increase of 120° C./hr. The temperature at which the amount of deformation of the evaluation specimen reached 0.2% was measured as the deflection temperature under load.

The results are shown in Table 1-1.

The measurement of the deflection temperature under load was started from 0.45 MPa, and, in Examples 1-1 to 1-3 in which the deflection temperatures under load was measured, the measurement at 1.8 MPa was thus not carried out.

A deflection temperature under load of 50° C. or higher is in the range in which there is no practical problem in view of the performance required for a tire.

The results are shown in Table 1-1.

1-3. Evaluation of Bonding Property

The same thermoplastic resin materials as those used in the tire case half parts produced in the respective Examples and Comparative Example were heated at 210° C. to 250° C. for 90 seconds under a press pressure of 3 kgf/cm², using a thermal gradient testing machine ("TYPE-HG-100" manufactured by Toyo Seiki Seisakusho, Ltd.), thereby producing bonded samples having a seal size of 10 mm×25 mm.

The bonded samples thus produced were respectively subjected to a 180° peel test using a Shimadzu Autograph AGS-J (5 KN) manufactured by Shimadzu Corp. under a tensile speed of 50 mm/min, to thereby measure the bonded area ratios (%) of the respective bonded samples. The bonded area ratios (%) thus obtained were evaluated as the indices for bonding property.

The results are shown in Table 1-1.

<Evaluation of Tire>

—Manufacturability—

In regard to manufacturability, the injection molding temperature used for injection molding of the tire case is shown in Table 1-1.

—Tire Driving Properties—

For the respective tires of the Examples and Comparative Example obtained according to the first exemplary embodiment described above, a high speed performance test was carried out according to JIS D4230: 1999 (High speed performance test B).

The results are shown in Table 1-1.

—Shape Retaining Properties—

During the high speed performance test described above, the widths of the tire before and after driving were measured and compared, and the deformation ratio (%) was calculated. The results are shown in Table 1-1.

TABLE 1-1

|  |  |  | Example 1-1 | Example 1-2 | Example 1-3 | Comparative Example 1-1 |
|---|---|---|---|---|---|---|
| Tire case |  | Kind of resin | TPEE | TPEE | TPEE | PPS |
|  |  | Trade name | HYTREL | HYTREL | HYTREL | FORTRON |
|  |  | Grade | 5557 | 6347 | 7247 | 220A |
| Evaluation | Tensile characteristics | Tensile elastic modulus (MPa) | 211 | 414 | 549 | >1000 |
|  |  | Tensile strength (MPa) | 26 | 27 | 33 | 79 |
|  |  | Elongation at break (%) | 370 | 310 | 310 | 20 |
|  | Deflection temperature under load (° C.) | 0.45 MPa | 109 | 136 | 150 | — |
|  |  | 1.8 MPa | — | — | — | 100 |
|  | Bonding property (%) | 210° C. | 0 | 0 | 0 | 0 |
|  |  | 220° C. | 0 | 0 | 0 | 0 |
|  |  | 230° C. | 100 | 60 | 100 | 0 |
|  |  | 240° C. | 100 | 100 | 100 | 0 |
|  |  | 250° C. | 100 | 100 | 100 | 0 |
|  | Manufacturability | Injection molding properties (° C.) | 250 | 250 | 250 | 340 |
|  | Driving performance | Tire driving properties (km/h) | Completed | Completed | Completed | — |
|  |  | Shape retaining properties (%) | <1% | 0 | 0 | — |

The details of the abbreviations for the kinds of resin and the trade names indicated in Table 1-1 are as follows.

TPEE: Polyester-based thermoplastic elastomer

PPS: Polyphenylene sulfide resin

HYTREL: manufactured by DuPont-Toray Co., Ltd.

FORTRON: manufactured by Polyplastics Co., Ltd.

As can be seen from Table 1-1, in Examples 1-1 to 1-3 in which a tire case was formed using a thermoplastic resin material containing a polyester-based elastomer, satisfactory values were obtained for all of the tensile elastic modulus, tensile strength and elongation at break in view of the performance required for a tire, as compared with Comparative Example 1-1.

Furthermore, also for the deflection temperature under load, it can be seen that the thermoplastic resin material containing a polyester-based elastomer used in Examples 1-1 to 1-3 sufficiently satisfied the performance required for a tire.

Also, it is understood that the thermoplastic resin material containing a polyester-based elastomer used in Examples 1-1 to 1-3 exhibited satisfactory bonding property that is required for tire molding. On the contrary, with the PPS used in Comparative Example 1-1, it was not possible to achieve the bonding of tire case half parts at the same bonding temperatures as that used in the Examples.

In addition, the thermoplastic resin material used in the tire molding of Examples 1-1 to 1-3 exhibited excellent injection molding property, and also exhibited satisfactory driving performance such as the driving properties and shape retaining properties of the tires thus obtained.

Examples 2-1 to 2-11 and Comparative Example 2-1

Hereinbelow, the second aspect of the present invention will be more specifically explained by way of Examples. However, the present invention is not intended to be limited to these.

First, various tires of the Examples and Comparative Example were molded according to the second exemplary embodiment described above. At this time, the materials described in the following Table 2-1 were used as the materials for forming tire cases.

Also, for the respective Examples and Comparative Example, evaluations of the tensile characteristics and tire performance were carried out as described below.

<Production of Specimen>
1. Polyester-Based Thermoplastic Elastomer
"HYTREL 6347" manufactured by DuPont-Toray Co., Ltd.
2. Polyurethane-Based Thermoplastic Elastomer
1) "ELASTOLLAN ET680" manufactured by BASF Corp.; ester-based
2) "ELASTOLLAN ET880" manufactured by BASF Corp.; ether-based
3. Polystyrene-Based Thermoplastic Elastomer
1) "TUFTEC M1943" manufactured by Asahi Kasei Chemicals Corp.
2) "TUFTEC H1052" manufactured by Asahi Kasei Chemicals Corp.
4. α-Polyolefin-Based Thermoplastic Elastomer
1) "TAFMER MH7007" manufactured by Mitsui Chemicals, Inc.
2) "TAFMER MI-17010" manufactured by Mitsui Chemicals, Inc.
3) "TAFMER A1050S" manufactured by Mitsui Chemicals, Inc.
5. Polyester-Based Thermoplastic Elastomer
1) "ELVALOY AC 3427AC" manufactured by DuPont-Mitsui Polychemicals Co., Ltd.; ethylene-butyl acrylate copolymer The thermoplastic elastomers were mixed (on a mass basis) at the compositions shown in Table 2-1, and the mixtures were respectively kneaded with a twin-screw extruder "LABO PLASTOMILL 50MR", manufactured by Toyo Seiki Seisakusho, Ltd., thereby obtaining pellets. Meanwhile, in Comparative Example 2-1, a mixed system was not employed, and a pellet was prepared using a polyester-based thermoplastic elastomer only.

Subsequently, the pellets thus obtained were used as molding materials, and injection molding was carried out using a mold having a size of 12.7 mm×127 mm and a thickness of 1.6 mm under the following conditions, thereby obtaining specimens.

Injection molding machine: SE30D, Sumitomo Heavy Industries, Ltd.
Molding temperature (temperature of thermoplastic resin material): 235° C.
Mold temperature: 50° C.

The specimens thus obtained were each punched, thereby producing dumbbell-shaped specimens (No. 5 specimens) as defined in JIS K6251: 1993.

<Evaluation of Tensile Characteristics (Tensile Strength, Elongation at Break and Tensile Elastic Modulus)>

The tensile characteristics (tensile strength, elongation at break and tensile elastic modulus) of the each of the specimens were measured using a Shimadzu Autograph AGS-J (5 KN) manufactured by Shimadzu Corp. and JIS No. 5 dumbbells, by pulling the specimens at a tensile rate of 200 mm/min.

The results are shown in the following Table 2-1.

TABLE 2-1

| | | | | Comparative Example | Example | | | | | | | | | | |
|---|---|---|---|---|---|---|---|---|---|---|---|---|---|---|---|
| | Kind of resin | Trade name | Grade | 2-1 | 2-1 | 2-2 | 2-3 | 2-4 | 2-5 | 2-6 | 2-7 | 2-8 | 2-9 | 2-10 | 2-11 |
| Thermoplastic resin material | Polyester elastomer | HYTREL | 6347 | 100 | 80 | 60 | 80 | 60 | 70 | 70 | 70 | 70 | 60 | 70 | 70 |
| | Polyurethane-based elastomer | ELASTOLLAN | ET680 | | 20 | 40 | | | | | | | | | |
| | | | ET880 | | | | 20 | 40 | | | | | | | |
| | Styrene-based elastomer | TUFTEC | M1943 | | | | | | 30 | | | | | | |
| | | | H1052 | | | | | | | 30 | | | | | |
| | Olefin-based elastomer | TAFMER | MH7007 | | | | | | | | 30 | | | | |
| | | | MH7010 | | | | | | | | | 30 | 40 | | |
| | | | A1050S | | | | | | | | | | | 30 | |
| | | ELVALOY AC | 3427AC | | | | | | | | | | | | 30 |
| Evaluation | Tensile strength [MPa] | | | 27 | 25 | 19 | 37 | 15 | 23 | 21 | 24 | 23 | 21 | 20 | 22 |
| | Elongation at break [%] | | | 310 | 435 | 370 | 450 | 210 | 335 | 400 | 370 | 360 | 350 | 300 | 320 |
| | Tensile elastic modulus [MPa] | | | 414 | 287 | 194 | 284 | 166 | 260 | 255 | 234 | 234 | 178 | 239 | 297 |

As can be seen from Table 2-1, it is understood that when a polyester-based thermoplastic elastomer is used in combination with another elastomer as in the case of the Examples, the elastic modulus is decreased as compared with Comparative Example 2-1 in which the polyester-based thermoplastic elastomer alone is used. This implies that by using a combination of a polyester-based thermoplastic elastomer and another elastomer, the elastic modulus of the thermoplastic resin material that constitutes the tire case may be easily controlled to a desired range. Therefore, for the tires produced using the tire cases that were formed by using the same thermoplastic resin materials as those used in the specimens produced in the respective Examples, impact resistance can be further enhanced as compared with the case in which the polyester-based thermoplastic elastomer was used alone as the thermoplastic resin material.

For the respective tires produced in Examples 2-1 to 2-11 and Comparative Example 2-1, a drum driving test was carried out. As a result, there was no problem with the safety on driving in all of the tires.

Examples 3-1 to 3-8 and Comparative Example 3-1

Hereinafter, the third aspect of the present invention will be more specifically explained by way of Examples. However, the present invention is not intended to be limited to these.

First, various tires of the Examples and Comparative Example were molded according to the second exemplary embodiment described above. At this time, the materials described in the following Table 3-1 and Table 3-2 were used as the materials for forming tire cases. Also, for the respective Examples and Comparative Example, the tire performance was investigated from the evaluation of material properties.

[Production of Specimens]
1. Polyester-based thermoplastic elastomer
Manufactured by DuPont-Toray Co., Ltd., HYTREL 6347
2. Rubber
1) Butadiene rubber (BR)
2) Styrene-butadiene copolymer rubber (SBR)
3) Acrylonitrile-butadiene copolymer rubber (NBR)
BR, SBR and NBR were all extruded by a single-screw extruder and pelletized for use.
3. Rubber-affinitive thermoplastic elastomer
1) Acid-modified α-olefin-based thermoplastic elastomer Manufactured by Mitsui Chemicals, Inc., TAFMER MH7010
2) Acid-modified hydrogenated polystyrene-based thermoplastic elastomer (SEBS) Manufactured by Asahi Kasei Corp., TUFTEC M1913
4) Vulcanized rubber (DV1 to DV3)

The various rubbers of BR, SBR and NBR described above were used, and the components of the kinds indicated in the following Table 3-1 were mixed in the amounts indicated in the same table. The mixtures were respectively kneaded with a Banbury mixer, formed into sheet-shaped by using two-rolls, subsequently extruded by a single-screw extruder, and pelletized for use.

In addition, the rubbers thus obtained were subjected to crosslinking during the process of kneading with a polyester-based thermoplastic elastomer in a twin-screw extruder.

TABLE 3-1

| Incorporated agent | DV1 | DV2 | DV3 |
|---|---|---|---|
| BR | 100 | | |
| SBR | | 100 | |
| NBR | | | 100 |
| Ordinary sulfur (5% oil-treated) | 0.525 | 0.525 | 0.525 |
| N,N'-diphenylmethanebismaleimide | 2 | 2 | 2 |
| Accelerating agent CZ | 1.5 | 1.5 | 1.5 |
| Accelerating agent TS | 1 | 1 | 1 |
| Stearic acid | 2 | 2 | 2 |
| Zinc flowers II (ZnO) | 5 | 5 | 5 |

The details of the ordinary sulfur, the accelerating agent CZ and the accelerating agent TS in Table 3-1 are as follows.

Ordinary sulfur: manufactured by Tsurumi Chemical Industry Co., Ltd., ordinary sulfur Vulcanization accelerating agent CZ: "NOCCELER CZ"; registered trademark, manufactured by Ouchi Shinko Chemical Industrial Co., Ltd.
(N-cyclohexyl-2-benzothiazylsulfenamide)

Accelerating agent TS: "NOCCELER TS"; registered trademark, manufactured by Ouchi Shinko Chemical Industrial Co., Ltd. (Tetramethylthiuram monosulfide)

[Production of Pellets of Thermoplastic Resin Material]

The components indicated in Table 3-2 were mixed (on a mass basis) at the compositions indicated in Table 3-2, and the mixtures were respectively kneaded with a twin-screw extruder, LABO PLASTOMILL 50MR; registered trademark, manufactured by Toyo Seiki Seisakusho, Ltd. Thus, pellets were obtained. Meanwhile, in Comparative Example 3-1, a mixed system was not obtained, and pellets were prepared by using a polyester-based thermoplastic elastomer only.

1. Evaluation of Tensile Strength, Elongation at Break, and Tensile Elastic Modulus Injection molding was carried out by using the pellets thus produced, and by using SE30D manufactured by Sumitomo Heavy Industries, Ltd. The molding temperature was adjusted to 200° C. to 235° C., the mold temperature was adjusted to 50° C. to 70° C., and a mold having a size of 12.7 mm×127 mm and a thickness of 1.6 mm was used to obtain specimens.

The respective specimens were punched, and thus, dumbbell-shaped specimens (No. 5 specimens) as defined in JIS K6251:1993 were produced.

Subsequently, the tensile elastic modulus, tensile strength and elongation at break of each of the dumbbell-shaped specimens were measured by using a Shimadzu Autograph AGS-J (5 KN) manufactured by Shimadzu Corp. and by setting the tensile speed at 200 mm/min.

The results are presented in the following Table 3-2.

2. Measurement of Tan δ

The loss tangent (Tan δ) at a temperature of 30° C., a measurement frequency of 20 Hz, and a dynamic strain of 1% was measured by using a dynamic viscoelasticity measuring test instrument, "ARES III" manufactured by Rheometrics, Inc.

The tensile strength, elongation at break, tensile elastic modulus, and Tan δ of the specimens of the Examples and Comparative Examples are presented in Table 3-2.

TABLE 3-2

|  | Comparative Example 3-1 | Example 3-1 | Example 3-2 | Example 3-3 | Example 3-4 | Example 3-5 | Example 3-6 | Example 3-7 | Example 3-8 |
|---|---|---|---|---|---|---|---|---|---|
| Polyester-based thermoplastic elastomer | | | | | | | | | |
| HYTREL 6347 | 100 | 70 | 70 | 70 | 70 | 70 | 70 | 70 | 70 |
| Rubber | | | | | | | | | |
| BR | | 30 | 15 | | | | | | |
| SBR | | | | 30 | 15 | | | | |
| NBR | | | | | | 30 | | | |
| Rubber-philic thermoplastic elastomer | | | | | | | | | |
| Acid-modified α-olefin | | | 15 | | | | | | |
| Acid-modified SEBS | | | | | 15 | | | | |
| Vulcanized rubber | | | | | | | | | |
| DV1 | | | | | | | 30 | | |
| DV2 | | | | | | | | 30 | |
| DV3 | | | | | | | | | 30 |
| Tensile characteristics | | | | | | | | | |
| Tensile strength (MPa) | 27 | 21 | 25 | 21 | 26 | 21 | 16 | 15 | 15 |
| Elongation at break (%) | 310 | 290 | 325 | 315 | 380 | 365 | 180 | 105 | 240 |
| Tensile elastic modulus (MPa) | 414 | 290 | 258 | 242 | 247 | 217 | 331 | 354 | 348 |
| Tan δ | 0.136 | 0.11 | 0.105 | 0.11 | 0.125 | 0.115 | 0.073 | 0.089 | 0.093 |

As can be seen from Table 3-2, it is understood that the specimens produced in the respective Examples had smaller tensile elastic modulus and high flexibility as compared with the specimen produced in the Comparative Example. This implies that the tires produced by using tire cases that are formed by using the same thermoplastic resin materials as the specimens described in the Examples, exhibit excellent impact resistance and exhibits, for example, durability to the extent that even if the tire is brought into contact with a curbstone or the like, the tire is not easily damaged. Furthermore, the specimens of the Examples all have small Tan δ values as compared with the specimen of the Comparative Example. Therefore, the rolling resistance of the tires produced by using the same thermoplastic resin materials as the specimens described in the Examples is suppressed, and it is understood that when such a tire is applied to a car, low fuel consumption can be achieved.

Meanwhile, a drum driving test was carried out for each of the tires formed by using the various thermoplastic resin materials of Examples 3-1 to 3-8 and Comparative Example 3-1. However, none of the tires had problems with the safety on driving.

Examples 4-1 to 4-4 and Comparative Examples 4-1 to 4-6

Hereinafter, the fourth aspect of the present invention will be more specifically explained by way of Examples. However, the present invention is not intended to be limited to these.

First, tires of Examples and Comparative Examples were molded according to the first exemplary embodiment described above. At this time, the materials described in the following Table 4-1 were used as the materials for forming tire cases. Furthermore, specimens having a size of 127 mm×12.7 mm and a thickness of 1.6 mm, which had the same component compositions as those of the tire cases formed under the same conditions as those of the Examples and Comparative Examples, were produced, and the tensile strength, elongation at break, and tensile elastic modulus of each of the specimens were evaluated.

The production method, various evaluation methods and evaluation conditions for the respective specimens are as follows.

<Production of Specimens>

(A) Polyester-Based Thermoplastic Elastomer

1) Manufactured by DuPont-Toray Co., Ltd., HYTREL 3046

2) Manufactured by DuPont-Toray Co., Ltd., HYTREL 5557

3) Manufactured by DuPont-Toray Co., Ltd., HYTREL 6347

4) Manufactured by DuPont-Toray Co., Ltd., HYTREL 7247

5) Manufactured by DuPont-Toray Co., Ltd., HYTREL 2751

(B) Polyester Resin (Polybutylene Terephthalate Resin)

1) Manufactured by Polyplastics Co., Ltd., DURANEX 2000

2) Manufactured by Polyplastics Co., Ltd., DURANEX 2002

(C) Resin for Comparison (Acrylonitrile-Butadiene-Styrene Copolymer)

1) Manufactured by Techno Polymer Co., Ltd., TECHNO ABS 130

—Elastic Modulus of Polyester Resin—

(B) The various resins indicated as polyester resins were used as the molding material, and injection molding was carried out with a mold having a size of 127 mm×12.7 mm and a thickness of 1.6 mm. Thus, specimens were produced. The molding conditions were as follows.

Injection molding machine: SE30D, Sumitomo Heavy Industries, Ltd.

Molding temperature (temperature of thermoplastic resin material): 200° C. to 240° C.

Mold temperature: 40° C. to 60° C.

The tensile elastic modulus of each of the specimens thus obtained was investigated by using a Shimadzu Autograph, AGS-J (5 KN), manufactured by Shimadzu Corp. and by pulling at a tensile rate of 1 mm/min. Thus, the following results were obtained.

(B) Polyester Resin (Polybutylene Terephthalate Resin)

1) Manufactured by Polyplastics Co., Ltd., DURANEX 2000, elastic modulus=1100 MPa 2) Manufactured by Polyplastics Co., Ltd., DURANEX 2002, elastic modulus=1250 MPa The tensile strength, elongation at break, tensile elastic modulus, and Tan δ of the specimens of the Examples and Comparative Examples are presented in Table 4-1.

3. Relationship Between Elastic Modulus (Tensile Elastic Modulus) and Tan δ

Figure 6:
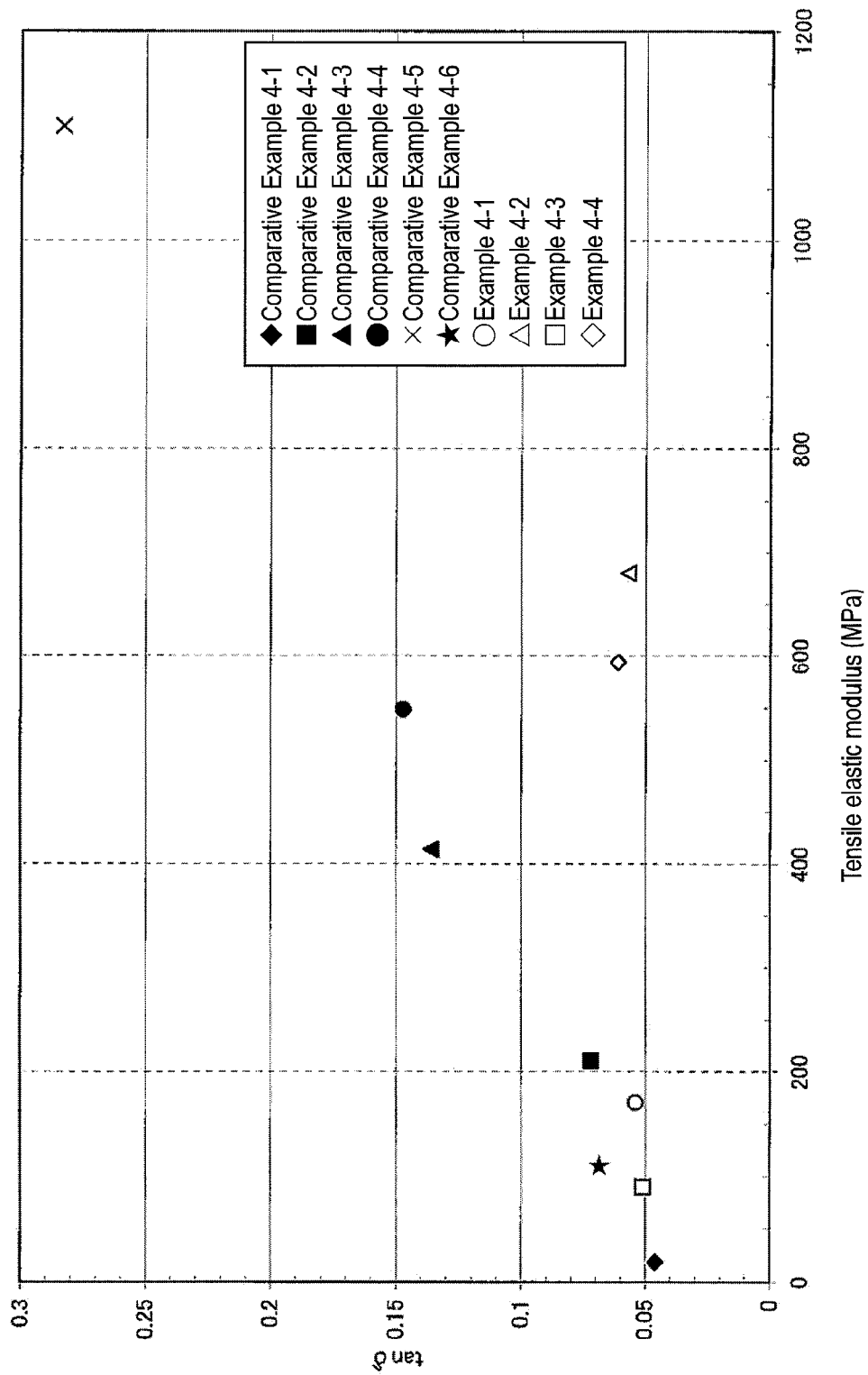
FIG. 6 is a graph plotting the relationship between tensile elastic modulus and Tan δ of the various specimens of Examples and Comparative Examples produced from thermoplastic resin materials in connection with the tire of the present invention related to the fourth aspect.

The relationship between the tensile elastic modulus and Tan δ of the specimens of Examples 4-1 to 4-4 and Comparative Examples 4-1 to 4-6 are plotted in FIG. 6.

TABLE 4-1

|   |   |   |   | Example | | | | Comparative Example | | | | | |
|---|---|---|---|---|---|---|---|---|---|---|---|---|---|
|   |   |   |   | 4-1 | 4-2 | 4-3 | 4-4 | 4-1 | 4-2 | 4-3 | 4-4 | 4-5 | 4-6 |
| A | Polyester-based elastomer | HYTREL | 3046 | 75 | 50 | 75 | 50 | 100 |   |   |   |   | 70 |
|   |   |   | 5557 |   |   |   |   |   | 100 |   |   |   |   |
|   |   |   | 6347 |   |   |   |   |   |   | 100 |   |   |   |
|   |   |   | 7247 |   |   |   |   |   |   |   | 100 |   |   |
|   |   |   | 2751 |   |   |   |   |   |   |   |   | 100 |   |
| B | Polyester resin | DURANEX | 2000 | 25 | 50 |   |   |   |   |   |   |   |   |
|   |   |   | 2002 |   |   | 25 | 50 |   |   |   |   |   |   |
| C | Resin for comparison | TECHNO ABS | 130 |   |   |   |   |   |   |   |   |   | 30 |
| Evaluation |   | Tensile strength (MPa) |   | 18 | 27 | 15 | 22 | 17 | 26 | 27 | 33 | 37 | 9 |
|   |   | Elongation at break (%) |   | 465 | 365 | 430 | 310 | 800< | 370 | 310 | 310 | 320 | 200 |
|   |   | Tensile elastic modulus (MPa) |   | 171 | 680 | 90 | 594 | 19 | 211 | 414 | 549 | 1110 | 118 |
|   |   | Tan δ |   | 0.054 | 0.057 | 0.051 | 0.061 | 0.046 | 0.072 | 0.136 | 0.147 | 0.283 | 0.069 |

The polyester-based thermoplastic elastomer and the polyester resin described above were mixed (on a mass basis) at the compositions described in Table 4-1, and the mixtures were respectively kneaded with a twin-screw extruder, LABO PLASTOMILL 50MR, manufactured by Toyo Seiki Seisakusho, Ltd. Thus, pellets were obtained. Meanwhile, in Comparative Examples 4-1 to 4-4, mixed systems were not obtained, and pellets formed of the polyester-based thermoplastic elastomers indicated in Table 4-1 were prepared.

Injection molding was carried out using the respective pellets of the Examples and Comparative Examples thus prepared, under the following conditions. Thus, specimens having a thickness of 1.6 mm were obtained.

For the injection molding, SE30D manufactured by Sumitomo Heavy Industries, Ltd. was used. The molding temperature was adjusted to 200° C. to 235° C., the mold temperature was adjusted to 50° C. to 70° C., and a mold having a size of 127 mm×12.7 mm and a thickness of 1.6 mm was used.

<Evaluation Methods>

1. Evaluation of Tensile Strength, Elongation at Break and Tensile Elastic Modulus The specimens obtained by injection molding were punched, and thus, dumbbell-shaped specimens (No. 5 specimens) as defined in JIS K6251:1993 were produced.

The tensile strength, elongation at break, and tensile elastic modulus were measured by using a Shimadzu Autograph AGS-J (5 KN) manufactured by Shimadzu Corp. and by pulling each of the dumbbell-shaped specimens thus obtained at a tensile speed of 200 mm/min.

2. Measurement of Tan δ

The loss tangent (Tan δ) at a temperature of 30° C., a measurement frequency of 20 Hz, and a dynamic strain of 1% was measured by using a dynamic viscoelasticity measuring test instrument, "ARES III" manufactured by Rheometrics, Inc.

As can be seen from Table 4-1, the evaluation results for the specimens produced in the Examples are not affected by a fluctuation of the tensile elastic modulus, and the fluctuation range of Tan δ that serves as an index representing the rolling resistance of a tire is small, as compared with the evaluation results for the specimens of the Comparative Examples. Therefore, it is understood that an increase in the rolling resistance is suppressed.

This is also understood from FIG. 6. In FIG. 6, Tan δ is plotted against the tensile elastic modulus. The regression line (not shown in the diagram) figured out from the plots of Comparative Examples 4-1 to 4-6 has a large gradient, and as the tensile elastic modulus increases, the Tan δ value also increases. However, the regression line (not shown in the diagram) figured out from the plots of Examples 4-1 to 4-4 has a small gradient, and it can be seen that even though the tensile elastic modulus increases, the Tan δ value does not easily increase.

Furthermore, it can be seen that the respective specimens produced in the Examples sufficiently satisfy all of the tensile strength, elongation at break and tensile elastic modulus to the extent that is required of a tire. This implies that the tires produced by using tire cases that are formed by using the same thermoplastic resin materials as the specimens of Examples 4-1 to 4-4 have the rolling resistance prevented from increasing, and also exhibit excellent durability. Furthermore, it is speculated that a car constructed by using such a tire exhibits satisfactory fuel efficiency.

In addition, a drum driving test was carried out for the various tires formed by using the various thermoplastic resin materials of Examples 4-1 to 4-4 and Comparative Example 4-1, and none of the tires had problems with the safety on driving.

Examples 5-1 to 5-10 and Comparative Examples 5-1 to 5-6

Hereinafter, the fifth aspect of the present invention will be more specifically explained by way of Examples. However, the present invention is not intended to be limited to these.

First, tires of Examples and Comparative Examples were molded according to the first exemplary embodiment described above. At this time, the materials described in the following Table 5-1 were used as the materials for forming tire cases. Also, sheet-shaped specimens having a size of 127 mm×12.7 mm and a thickness of 1.6 mm, which had the same component compositions as those of the tire cases formed under the same conditions as those of the Examples and Comparative Examples, were produced, and the injection molding property, tensile strength, elongation at break, tensile elastic modulus, and the state of fracture of each of the specimens were evaluated. The results are presented in Table 5-1.

The production method, various evaluation methods and evaluation conditions for the respective specimens are as follows.

<Production of Specimens>

1. Polyester-Based Thermoplastic Elastomer

"HYTREL 6347" manufactured by DuPont-Toray Co., Ltd.

2. Polyamide-Based Thermoplastic Elastomer

"UBESTA XPA9055X1" manufactured by Ube Industries, Ltd.

3. α-Olefin-Based Thermoplastic Elastomer

1) "TAFMER MA8510" manufactured by Mitsui Chemicals, Inc.

2) "TAFMER MH7007" manufactured by Mitsui Chemicals, Inc.

3) "TAFMER MH7010" manufactured by Mitsui Chemicals, Inc.

4) "TAFMER MH7020" manufactured by Mitsui Chemicals, Inc.

5) "TAFMER A1050S" manufactured by Mitsui Chemicals, Inc.

4. Styrene-Based Thermoplastic Elastomer [Fully Hydrogenated Type (SEBS)]

1) "TUFTEC H1052" manufactured by Asahi Kasei Chemicals Corp.

2) "TUFTEC M1943" manufactured by Asahi Kasei Chemicals Corp.

The thermoplastic elastomers were mixed (on a mass basis) at the compositions indicated in Table 5-1, and the mixtures were respectively kneaded with a twin-screw extruder, LABO PLASTOMILL 50MR, manufactured by Toyo Seiki Seisakusho, Ltd. Thus, pellets were obtained.

Subsequently, the pellets thus obtained were used as the molding material, and injection molding was carried out by using a mold having a size of 127 mm×12.7 mm and a thickness of 1.6 mm, under the following conditions. Thus, specimens were obtained.

Injection molding machine: SE30D, manufactured by Sumitomo Heavy Industries, Ltd.
Molding temperature (temperature of thermoplastic resin): 200° C. to 235° C.
Mold temperature: 50° C. to 70° C.

The respective specimens thus obtained were punched, and thus, dumbbell-shaped specimens (No. 5 specimens) as defined in JIS K6251-1993:1993 were produced.

Meanwhile, for the respective pellets of Comparative Examples 5-1 and 5-4 that could not be injection molded under the conditions described above, the pellets were heat pressed by heating at 200° C. and 12 MPa for 5 minutes by using an electric heat press manufactured by Kodaira Seisakusho Co., Ltd. Thus, specimens having a size of 120 mm×120 mm and a thickness of 2 mm were obtained.

<Measurement of Acid Value of Thermoplastic Resin Material>

The acid value of the thermoplastic resin material was calculated by Calculating Formula (1) or Calculating Formula (2), from the mass [mg] of sodium methoxide ($CH_3ONa$) used when neutralization titration was carried out by using sodium methoxide ($CH_3ONa$) for each of the elastomers used in the Examples and Comparative Examples. The results are presented in Table 5-1.

<Evaluation>

1. Evaluation of Tensile Characteristics (Tensile Strength, Elongation at Break, Tensile Elastic Modulus, and State of Fracture)

The tensile strength, elongation at break, tensile elastic modulus and state of fracture were evaluated as follows, by using the specimens thus obtained. The results are presented in Table 5-1.

The tensile strength, elongation at break and tensile elastic modulus were measured by using a Shimadzu Autograph "AGS-J (5 KN)" manufactured by Shimadzu Corp. and a JIS No. 5 dumbbell, and by pulling the specimen at a tensile speed of 200 mm/min.

The state of fracture was evaluated on the following evaluation criteria, after observing a fractured surface of each specimen by visual inspection.

—Evaluation Criteria—

A: The specimen fractured by ductile fracture.

B: The specimen fractured by lamellar fracture.

C: The specimen fractured by brittle fracture.

2. Evaluation of Injection Molding Property

Evaluation of fluidity [MFR (g/10 min, 230° C.)] and evaluation of injection molding property The respective pellets of the Examples and Comparative Examples were subjected to a load of 21.18 N, 49.03 N, or 98.07 N according to ASTM A1238 (B method) by using a semi melt flow indexer type 2A manufactured by Toyo Seiki Seisakusho, Ltd., and the fluidity (MFR) was measured.

Meanwhile, the measurement was started from the smaller load (21.18 N), and in the case where the MFR could not be measured under this condition, the measurement was made under a larger load. When measurement was not initiated even after 3 minutes had passed from the initiation of measurement, it is indicated as "-" in Table 5-1.

Furthermore, an evaluation of injection molding property was carried out by using SE30D manufactured by Sumitomo Heavy Industries, Ltd. under the conditions of a molding temperature of 200° C. to 235° C. and a mold temperature of 50° C. to 70° C., and the results are presented in Table 5-1. In Table 5-1, a specimen that was capable of injection molding under the relevant conditions is indicated as A, and a specimen that was not capable of injection molding under the relevant conditions is indicated as B.

A specimen rated as A in the evaluation of injection molding property implies that the specimen exhibits injection molding property that is free of any practical problem on the occasion of the production of a tire. The results are presented in the following Table 5-1.

TABLE 5-1

| | Kind of resin | Trade name | Grade | Comparative Example 5-1 | 5-2 | 5-3 | 5-4 | 5-5 | 5-6 | Example 5-1 | 5-2 | 5-3 | 5-4 |
|---|---|---|---|---|---|---|---|---|---|---|---|---|---|
| Thermoplastic resin material | Polyester elastomer | HYTREL | 6347 | | | | | 100 | 70 | 70 | 70 | 70 | 70 |
| | Polyamide elastomer | UBESTA | XPA9055X | 70 | 70 | 70 | 70 | | | | | | |
| | α-Olefin-based elastomer | TAFMER | MA8510 | | | | | | | | | | |
| | | | MH7007 | | | | | | | | | | |
| | | | MH7010 | | | | | | | | 30 | | |
| | | | MH7020 | 30 | | | | | | | | 30 | 20 |
| | | | A1050S | | 30 | | | | | | | | 10 |
| | Styrene-based elastomer (SEBS) | TUFTEC | H1052 | | | 30 | | | 30 | 30 | | | |
| | | | M1943 | | | | 30 | | | | | | |
| | Acid value of thermoplastic resin material [mg-CH₃ONa/g] | | | 2.22 | 0 | 0 | 3 | 0 | 0 | 0.78 | 1.11 | 2.22 | 0.74 |
| Evaluation | Injection molding property | MFR (230° C., g/10 min) | Load: 21.18N | — | 14.62 | 31.2 | — | 13.09 | 18.02 | 5.96 | 5.34 | 5.3 | 5.67 |
| | | | Load: 49.03N | — | | | — | | | | | | |
| | | | Load: 98.07N | — | | | — | | | | | | |
| | | Feasibility of specimen production | Injection molding | B | A | A | B | A | A | A | A | A | A |
| | | | Heat press | A | — | — | A | — | — | — | — | — | — |
| | Tensile characteristics | Tensile strength [MPa] | | 35 | 20 | 23 | 32 | 27 | 21 | 24 | 23 | 25 | 22 |
| | | Elongation at break [%] | | 475 | 250 | 405 | 455 | 310 | 400 | 370 | 360 | 400 | 350 |
| | | Tensile elastic modulus [MPa] | | 156 | 164 | 178 | 158 | 414 | 255 | 234 | 234 | 231 | 232 |
| | | State of fracture | | A | B | B | A | A | B | A | A | A | A |

| | Kind of resin | Trade name | Grade | Example 5-5 | 5-6 | 5-7 | 5-8 | 5-9 | 5-10 |
|---|---|---|---|---|---|---|---|---|---|
| | Thermoplastic resin material | Polyester elastomer | HYTREL | 6347 | 60 | 60 | 70 | 70 | 70 | 60 |
| | | Polyamide elastomer | UBESTA | XPA9055X | | | | | | |
| | | α-Olefin-based elastomer | TAFMER | MA8510 | | | | | | |
| | | | | MH7007 | | | | | | |
| | | | | MH7010 | 20 | 40 | | | | |
| | | | | MH7020 | | | | | | |
| | | | | A1050S | 20 | | | | | |
| | | Styrene-based elastomer (SEBS) | TUFTEC | H1052 | | | | 15 | 10 | |
| | | | | M1943 | | | 30 | 15 | 20 | 40 |
| | | Acid value of thermoplastic resin material [mg-CH₃ONa/g] | | | 0.74 | 1.48 | 3 | 1.5 | 2 | 4 |
| Evaluation | Injection molding property | MFR (230° C., g/10 min) | | Load: 21.18N | 4.48 | 4.04 | 8.92 | 8.78 | 8.94 | 3.92 |
| | | | | Load: 49.03N | | | | | | |
| | | | | Load: 98.07N | | | | | | |
| | | Feasibility of specimen production | | Injection molding | A | A | A | A | A | A |
| | | | | Heat press | — | — | — | — | — | — |
| | Tensile characteristics | Tensile strength [MPa] | | | 20 | 21 | 22 | 23 | 23 | 22 |
| | | Elongation at break [%] | | | 345 | 350 | 350 | 340 | 335 | 350 |
| | | Tensile elastic modulus [MPa] | | | 182 | 178 | 266 | 217 | 260 | 207 |
| | | State of fracture | | | A | A | A | A | A | A |

As can be seen from Table 5-1, it is understood that the specimens produced in the various Examples exhibit both satisfactory tensile characteristics and satisfactory state of fracture, and also exhibit excellent injection molding property at the time of production of specimens, as compared with the specimens produced in the Comparative Examples. This implies that the tires produced by using tire cases that are formed by using the same thermoplastic resin materials as the specimens disclosed in Examples 5-1 to 5-12 have durability and exhibit excellent manufacturability.

In addition, a drum driving test was carried out for the various tires obtained in Examples 5-1 to 5-10 and Comparative Examples 5-1 to 5-6, and none of the tires had problems with the safety on driving.

Examples 6-1 to 6-4 and Comparative Examples 6-1 to 6-4

Hereinafter, the sixth aspect of the present invention will be more specifically explained by way of Examples. However, the present invention is not intended to be limited to these.

First, tires of Examples and Comparative Examples were molded according to the second exemplary embodiment described above. At this time, the materials described in the following Table 6-1 were used as the materials for forming tire cases. Further, for the respective Examples and Comparative Examples, the tire performance was investigated from the evaluation of material properties.

<Production of Specimens>

1. Polyamide-Based Thermoplastic Elastomer

UBESTA XPA 9055X1, manufactured by Ube Industries, Ltd.

2. Polyester-Based Thermoplastic Elastomer

HYTREL, 6347, manufactured by DuPont-Toray Co., Ltd.

3. Ethylene-Acrylate Ethyl Ester Copolymer (Specific Acid-Modified Copolymer)

HPR, AR2011, manufactured by DuPont-Mitsui Polychemicals Co., Ltd.

4. Ethylene-Methacrylic Acid Copolymer (Specific Copolymer)

NUCREL, N035C, manufactured by DuPont-Mitsui Polychemicals Co., Ltd.,

[Production of Pellets]

The elastomers and the copolymers were mixed (on a mass basis) at the compositions indicated in Table 6-1, and the mixtures were respectively kneaded with a biaxial extruder "LABO PLASTOMILL 50MR" manufactured by Toyo Seiki Seisakusho, Ltd. Thus, pellets were obtained. Meanwhile, in Comparative Example 6-1 and Comparative Example 6-5, mixed systems were not obtained, and pellets of a polyamide-based thermoplastic elastomer or pellets of a polyester-based thermoplastic elastomer were respectively prepared.

<1. Evaluation of Tensile Elastic Modulus, Tensile Strength, Breaking Elongation, and Fracture Property>

Injection molding was carried out by using the pellets thus prepared and by using SE30D manufactured by Sumitomo Heavy Industries, Ltd. Specimens were obtained by setting the molding temperature to from 200° C. to 240° C. and the mold temperature to from 40° C. to 70° C., and by using a mold having a size of 12.7 mm×127 mm and a thickness of 1.6 mm.

The respective specimens were punched, and thus, dumbbell-shaped specimens (No. 5 specimens) as defined in JIS K6251-1993 were produced.

In addition, for the pellets of Comparative Example 6-2, since injection molding could not be achieved under the injection molding conditions described above, the pellets were heat pressed by heating at 200° C. and 12 MPa for 5 minutes by using an electric heat press manufactured by Kodaira Seisakusho Co., Ltd. Thus, specimens having a size of 120 mm×120 mm and a thickness of 2 mm were obtained.

Subsequently, the tensile elastic modulus, tensile strength, breaking elongation and fracture properties (state of fracture) of each of the dumbbell-shaped specimens were investigated by using a Shimadzu Autograph AGS-J (5 KN) manufactured by Shimadzu Corporation, and by setting the tensile speed at 200 mm/min. The results are shown in the following Table 6-1.

Table 6-1 shows, in the column "Tensile properties 4) Difference in elastic modulus with non-added specimens", the differences between the elastic moduli of systems that did not contain at least one of the specific copolymer or the specific acid-modified copolymer (Comparative Example 6-1 and Comparative Example 6-5) and the elastic moduli of systems that contained at least one of the specific copolymer or the specific acid-modified copolymer (Comparative Examples 6-2 to 6-4 and Examples 6-2 to 6-4).

For Comparative Examples 6-1 to 6-5, the differences between the elastic modulus of the specimen of Comparative Example 1 and the elastic moduli of other specimens are shown; and for Comparative Example 6-5 and Examples 6-1 to 6-4, the differences between the elastic modulus of the specimen of Comparative Example 6-1 and the elastic moduli of other specimens are shown. A larger value implies a higher degree of softening.

Meanwhile, the state of fracture of cross-sections of the specimens were visually observed, and the fracture properties were evaluated on the basis of the following evaluation criteria.

—Evaluation Criteria—

A: Fracture of the specimen was ductile fracture.

B: Fracture of the specimen was lamellar fracture.

C: Fracture of the specimen was brittle fracture.

<2. Evaluation of Fluidity [MFR (g/10 min, 230° C.)]>

The respective pellets of the Examples and Comparative Examples were subjected measurement of the fluidity (MFR) according to ASTM A1238 (B method) by applying a load of 21.18 N, 49.03 N, or 98.07 N by using a semi melt flow indexer type 2A manufactured by Toyo Seiki Seisakusho, Ltd. Meanwhile, the measurement was started from the smaller load (21.18 N), and in the case where the MFR could not be measured under this condition, the measurement was made under a larger load. When measurement was not initiated even after 3 minutes had passed from the initiation of measurement, it is indicated as "-" in Table 6-1.

TABLE 6-1

|  | Comparative Example 6-1 | Comparative Example 6-2 | Comparative Example 6-3 | Comparative Example 6-4 | Comparative Example 6-5 | Example 6-1 | Example 6-2 | Example 6-3 | Example 6-4 |
|---|---|---|---|---|---|---|---|---|---|
| Polyamide-based thermoplastic elastomer |  |  |  |  |  |  |  |  |  |
| UBESTA XPA 9055X1 | 100 | 70 | 70 | 70 |  |  |  |  |  |
| Polyester-based thermoplastic elastomer |  |  |  |  |  |  |  |  |  |
| HYTREL 6347 |  |  |  |  | 100 | 70 | 70 | 70 | 70 |
| Acid modification product of ethylene-ethyl acrylate copolymer |  |  |  |  |  |  |  |  |  |
| HPRAR2011 |  | 30 | 15 | 10 |  | 30 | 10 | 15 |  |
| Ethylene-methacrylic acid copolymer |  |  |  |  |  |  |  |  |  |
| NUCREL N035C |  |  | 15 | 20 |  |  | 20 | 15 | 30 |
| Tensile properties |  |  |  |  |  |  |  |  |  |
| 1) Tensile strength (MPa) | 41 | 17 | 29 | 35 | 27 | 19 | 20 | 19 | 21 |
| 2) Breaking elongation (%) | 350 | 225 | 210 | 290 | 310 | 270 | 300 | 270 | 315 |

TABLE 6-1-continued

|  | Comparative Example 6-1 | Comparative Example 6-2 | Comparative Example 6-3 | Comparative Example 6-4 | Comparative Example 6-5 | Example 6-1 | Example 6-2 | Example 6-3 | Example 6-4 |
|---|---|---|---|---|---|---|---|---|---|
| 3) Tensile elastic modulus (MPa) | 303 | 180 | 239 | 258 | 414 | 253 | 268 | 257 | 297 |
| 4) Difference in elastic modulus compared with non-added specimens | 0 | −123 | −64 | −45 | 0 | −161 | −146 | −157 | −117 |
| 5) State of fracture | A | A | A | A | A | A | A | A | A |
| Fluidity [230° C.,(g/10 min)] | | | | | | | | | |
| MFR load: 21.18N | 20.1 | — | — | — | 13.09 | 12.29 | 12.83 | 12.91 | 15.11 |
| MFR load: 49.03N | | — | — | 4.18 | | | | | |
| MFR load: 98.07N | | — | 8.22 | | | | | | |

As can be seen from Table 6-1, the specimens produced in Examples 6-1 to 6-4 had the tensile elastic moduli decreased by 117 MPa or more as compared with Comparative Example 6-5 that did not contain at least one of the specific copolymer or the specific acid-modified copolymer, and became significantly flexible. Therefore, it is understood that when tires are formed by using the same thermoplastic resin materials as the specimens of Examples 6-1 to 6-4, tires having excellent impact resistance can be obtained. Further, at the same time, the specimens produced in the respective Examples could be subjected to MFR measurement under a load of 21.18 N, and thus it was found that the specimens had excellent injection molding property. Accordingly, it is understood that when the same thermoplastic resin materials as such specimens are used, injection molding can be easily carried out, production of tires can be efficiently carried out, and productivity of tires can be enhanced.

On the other hand, the specimens produced in Comparative Examples 6-2 to 6-4 can be said to have smaller decrement in the elastic moduli as compared with the elastic modulus of Comparative Example 6-1, which was a non-added specimen, and to be less flexible. Further, the specimens of Comparative Examples 6-1 to 6-5 could not achieve both of flexibility (low elastic modulus) and fluidity.

In addition, a drum driving test was carried out for the respective tires formed by using thermoplastic resin materials having the same compositions as the respective specimens of Examples 6-1 to 6-4 and Comparative Examples 6-1 to 6-4, and none of the tires had a problem with the safety on driving.

Examples 7-1 to 7-6 and Comparative Examples 7-1 to 7-6

Hereinafter, the seventh aspect of the present invention will be more specifically explained by way of Examples. However, the present invention is not intended to be limited to these.

First, tires of Examples and Comparative Examples were molded according to the second exemplary embodiment described above. At this time, the materials described in the following Table 7-1 were used as the materials for forming tire cases. Further, an evaluation of the material properties and an evaluation of tire performance were carried out as follows for the respective Examples and Comparative Examples.

[Production of Pellets]

For the respective resin materials used in the tire cases of the Examples and Comparative Examples, the respective materials were mixed (on a mass basis) at the compositions indicated in Table 7-1. Subsequently, the resin materials were respectively kneaded with a biaxial extruder "LABO PLASTOMILL 50MR" manufactured by Toyo Seiki Seisakusho, Ltd., and thus, pellets were obtained. Meanwhile, in some Comparative Examples, mixed systems were not obtained, and pellets of a polyamide-based thermoplastic elastomer or a polyester-based thermoplastic elastomer were respectively prepared.

The first and second thermoplastic elastomers were kneaded at a mixing temperature of 230° C. for a kneading time of 3 minutes.

<Evaluation of Loss Factor (Tan δ) and Tensile Elastic Modulus>

Injection molding was carried out by using the pellets thus produced and by using SE30D manufactured by Sumitomo Heavy Industries, Ltd. Samples were obtained by setting the molding temperature to from 180° C. to 260° C. and the mold temperature to from 50° C. to 70° C., and by using a mold having a size of 100 mm×30 mm and a thickness of 2.0 mm.

The respective samples were punched, and thus, dumbbell-shaped specimens (No. 5 specimens) as defined in JIS K6251-1993 were produced.

Subsequently, the tensile moduli at 30° C. and 80° C. and the Tan δ values of the respective dumbbell-shaped specimens were measured by using a Shimadzu Autograph AGS-J (5 KN) manufactured by Shimadzu Corporation and by setting the tensile speed of at 200 mm/min. The results are shown in Table 7-1.

TABLE 7-1

|  |  | Example 7-1 | Example 7-2 | Example 7-3 | Example 74 | Example 7-5 | Example 7-6 | Comparative Example 7-1 | Comparative Example 7-2 | Comparative Example 7-3 | Comparative Example 7-4 | Comparative Example 7-5 | Comparative Example 7-6 |
|---|---|---|---|---|---|---|---|---|---|---|---|---|---|
| Tire case | First thermoplastic elastomer | PE1 | PA1 | PE3 | PE3 | PA1 | PA1 | PE1 | PE2 | PA1 | PA2 | PE3 | PE4 |

TABLE 7-1-continued

| | | Example 7-1 | Example 7-2 | Example 7-3 | Example 74 | Example 7-5 | Example 7-6 | Comparative Example 7-1 | Comparative Example 7-2 | Comparative Example 7-3 | Comparative Example 7-4 | Comparative Example 7-5 | Comparative Example 7-6 |
|---|---|---|---|---|---|---|---|---|---|---|---|---|---|
| | Tensile elastic modulus/MPa | 422 | 303 | 414 | 414 | 303 | 303 | 422 | 45 | 303 | 183 | 414 | 19 |
| | Loss factor (tan δ) | 0.11 | 0.12 | 0.136 | 0.136 | 0.12 | 0.12 | 0.11 | 0.03 | 0.12 | 0.07 | 0.136 | 0.05 |
| | Content/% | 55 | 55 | 25 | 50 | 75 | 50 | 100 | 100 | 100 | 100 | 100 | 100 |
| Second thermoplastic elastomer | | PE2 | PA2 | PA2 | PA2 | PE4 | PE4 | — | — | — | — | — | — |
| | Tensile elastic modulus/MPa | 45 | 183 | 183 | 183 | 19 | 19 | — | — | — | — | — | — |
| | Loss factor (tan δ) | 0.03 | 0.07 | 0.07 | 0.07 | 0.05 | 0.05 | — | — | — | — | — | — |
| | Content/% | 45 | 45 | 75 | 50 | 25 | 50 | — | — | — | — | — | — |
| Evaluation | Tensile elastic modulus/ 30° C. | 275 | 265 | 220 | 277 | 256 | 172 | 422 | 45 | 303 | 183 | 414 | 19 |
| | Tensile elastic modulus/ 80° C. | 192 | 188 | 130 | 155 | 140 | 96 | 224 | 21 | 162 | 102 | 225 | 10 |
| | Loss factor (tan δ) | 0.06 | 0.06 | 0.1 | 0.11 | 0.11 | 0.1 | 0.11 | 0.03 | 0.12 | 0.07 | 0.135 | 0.005 |

Descriptions of the abbreviations used in Table 7-1 will be given below.

PE1: Polyester-based elastomer (first thermoplastic elastomer)
(Polybutylene terephthalate/polyether block copolymer "HYTREL 7247" manufactured by DuPont-Toray Co., Ltd., hard segment content: 60% by mass)

PA1: Polyamide-based elastomer (first thermoplastic elastomer)
(Polyamide 12/polyether block copolymer "UBESTA XPA 9055X1" manufactured by Ube Industries, Ltd., hard segment content: 50% by mass)

PE2: Polyester-based elastomer (second thermoplastic elastomer)
(Polybutylene terephthalate/polyether block copolymer "HYTREL 4047" manufactured by DuPont-Toray Co., Ltd., hard segment content: 40% by mass)

PA2: Polyamide-based elastomer (second thermoplastic elastomer)
(Polyamide 12/polyether block copolymer "UBESTA XPA9048X1" manufactured by Ube Industries, Ltd., hard segment content: 40% by mass)

PE3: Polyester-based elastomer (first thermoplastic elastomer)
(Polybutylene phthalate/polyether "HYTREL 6347" manufactured by DuPont-Toray Co., Ltd., hard segment content: 45% by mass)

PE4: Polyester-based elastomer (first or second thermoplastic elastomer)
(Polybutylene terephthalate/polyether "HYTREL 3047" manufactured by DuPont-Toray Co., Ltd., hard segment content: 10% by mass)

As can be seen from Table 7-1, it is understood that the materials for tire cases of Examples 7-1 to 7-6 have improved tensile moduli while maintaining low loss factors (Tan δ), as compared with Comparative Examples 7-1 to 7-6. Further, it can be seen that the materials for tire cases of Examples 7-1 to 7-6 have small differences between the tensile elastic moduli at 30° C. and the tensile elastic moduli at 80° C., and have improved heat resistance as compared with Comparative Examples 7-1 to 7-6.

Furthermore, the tires of the Examples have smaller rolling resistance and superior heat resistance.

The inventions described below are included in the first aspect of the present invention.

<1-1> A tire comprising at least a circular tire frame formed of a thermoplastic resin material, the tire including a reinforcing cord member that is wound around an outer circumference of the tire frame in a circumferential direction and that forms a reinforcing cord layer, and the thermoplastic resin material including at least a polyester-based thermoplastic elastomer.

<1-2> The tire of <1-1>, wherein the reinforcing cord layer is configured to include a resin material.

<1-3> The tire of <1-1> or <1-2>, wherein a content percentage of the polyester-based thermoplastic elastomer in the thermoplastic resin material is 50% to 100% by mass.

<1-4> The tire of any one of <1-1> to <1-3>, wherein the polyester-based thermoplastic elastomer is a copolymer including: a hard segment including an aromatic polyester, and a soft segment including at least one selected from an aliphatic polyether or an aliphatic polyester.

The inventions described below are included in the second aspect of the present invention.

<2-1> A tire comprising at least a circular tire frame formed of a thermoplastic resin material, the tire including a reinforcing cord member that is wound around an outer circumference of the tire frame in a circumferential direction and forms a reinforcing cord layer, and the thermoplastic resin material including at least a polyester-based thermoplastic elastomer and an elastomer other than the polyester-based thermoplastic elastomer.

<2-2> The tire of <2-1>, wherein the reinforcing cord layer is configured to include a resin material.

<2-3> The tire of <2-1> or <2-2>, wherein a mass ratio (a:b) of the polyester-based thermoplastic elastomer (a) and the different elastomer (b) in the thermoplastic resin is from 95:5 to 50:50.

<2-4> The tire of any one of <2-1> to <2-3>, wherein the different elastomer is selected from a polyurethane-based thermoplastic elastomer, a polyolefin-based thermoplastic elastomer, or a polystyrene-based thermoplastic elastomer.

The inventions described below are included in the third aspect of the present invention.

<3-1> A tire comprising at least a circular tire frame formed of a thermoplastic resin material, the tire including a reinforcing cord member that is wound around an outer circumference of the tire frame in a circumferential direction and forms a reinforcing cord layer, and the thermoplastic resin material including at least a polyester-based thermoplastic elastomer and a rubber.

<3-2> The tire of <3-1>, wherein the thermoplastic resin material further includes a thermoplastic elastomer having high affinity for the rubber.

<3-3> The tire of <3-1> or <3-2>, wherein the reinforcing cord layer is configured to include a resin material.

<3-4> The tire of any one of <3-1> to <3-3>, wherein a mass ratio (x:y) of the polyester-based thermoplastic elastomer (x) and the rubber (y) in the thermoplastic resin is from 95:5 to 50: 50.

<3-5> The tire of <3-2> or <3-3>, wherein a mass ratio (x:y+z) of the polyester-based thermoplastic elastomer (x), the rubber (y), and the thermoplastic elastomer (z) having high affinity for the rubber in the thermoplastic resin material is from 95:5 to 50:50.

<3-6> The tire of any one of <3-1> to <3-4>, wherein a total content of the polyester-based thermoplastic elastomer and the rubber in the thermoplastic resin material is from 50% by mass to 100% by mass.

<3-7> The tire of <3-2>, <3-3> or <3-5>, wherein a total content of the polyester-based thermoplastic elastomer, the rubber, and the thermoplastic elastomer having high affinity for the rubber in the thermoplastic resin material is from 50% by mass to 100% by mass.

The inventions described below are included in the fourth aspect of the present invention.

<4-1> A tire comprising a circular tire frame formed of a thermoplastic resin material, the thermoplastic resin material including:
a polyester-based thermoplastic elastomer (A) including: a hard segment including a polyester resin; and a soft segment; and
a polyester resin (B) other than a thermoplastic elastomer.

<4-2> The tire of <4-1>, wherein an elastic modulus of the polyester resin (B) is 700 MPa or greater.

<4-3> The tire of <4-1> or <4-2>, wherein a mass ratio (A:B) of the polyester-based thermoplastic elastomer (A) and the polyester resin (B) other than a thermoplastic elastomer is from 95:5 to 50: 50.

<4-4> The tire of any one of <4-1> to <4-3>, wherein a content of the polyester-based thermoplastic elastomer (A) in the thermoplastic resin material is from 50% by mass to 95% by mass.

<4-5> The tire of any one of <4-1> to <4-4>, further comprising a reinforcing cord member that is wound around an outer circumference of the tire frame in a circumferential direction and forms a reinforcing cord layer.

The inventions described below are included in the fifth aspect of the present invention.

<5-1> A tire comprising a circular tire frame formed of a thermoplastic resin material,
the thermoplastic resin material including:
a polyester-based thermoplastic elastomer; and
an acid-modified elastomer obtained by acid-modifying a thermoplastic elastomer other than the polyester-based thermoplastic elastomer, or a mixture of a thermoplastic elastomer other than the polyester-based thermoplastic elastomer and an acid-modified elastomer obtained by acid-modifying the elastomer other than the polyester-based thermoplastic elastomer.

<5-2> The tire of <5-1>, wherein an acid value of the thermoplastic resin material is from 0.1 mg-CH$_3$ONa/g to 10 mg-CH$_3$ONa/g.

<5-3> The tire of <5-1> or <5-2>, wherein a ratio (A:B) of a mass (A) of the polyester-based thermoplastic elastomer and a total mass (B) of the thermoplastic elastomer other than the polyester-based thermoplastic elastomer and the acid-modified elastomer in the thermoplastic resin material is from 90:10 to 50:50.

<5-4> The tire of any one of <5-1> to <5-3>, wherein a content percentage of the polyester-based thermoplastic elastomer in the thermoplastic resin material is from 50% by mass to 95% by mass.

<5-5> The tire of any one of <5-1> to <5-4>, further comprising a reinforcing cord member that is wound around an outer circumference of the tire frame in a circumferential direction and form a reinforcing cord layer.

<5-6> A method of producing a tire, the method comprising:
a tire frame piece forming step of forming a tire frame piece for constituting a portion of a circular tire frame, using a thermoplastic resin material comprising at least:
a polyester-based thermoplastic elastomer; and
an acid-modified elastomer obtained by acid-modifying a thermoplastic elastomer other than the polyester-based thermoplastic elastomer, or a mixture of a thermoplastic elastomer other than the polyester-based thermoplastic elastomer and an acid-modified elastomer obtained by acid-modifying the elastomer other than the polyester-based thermoplastic elastomer; and
a tire frame piece bonding step of forming the tire frame by fusing two or more of the tire frame pieces, which make a pair, by applying heat to bonding sections of the tire frame pieces.

<5-7> The method of producing a tire of <5-6>, wherein an acid value of the thermoplastic resin material is from 0.1 mg-CH$_3$ONa/g to 10 mg-CH$_3$ONa/g.

<5-8> The method of producing a tire of <5-7>, wherein the tire frame piece forming step comprises a step of performing injection molding using the thermoplastic resin material.

The inventions described below are included in the sixth aspect of the present invention.

<6-1> A tire comprising at least a circular tire frame formed of a thermoplastic resin material, the thermoplastic resin material including a polyester-based thermoplastic elastomer and at least one copolymer of an olefin-(meth)acrylic acid copolymer or an acid-modified copolymer obtained by acid-modifying an olefin-(meth)acrylate copolymer.

<6-2> The tire of <6-1>, wherein a mass ratio (x:y+z) of the polyester-based thermoplastic elastomer (x) and the olefin-(meth)acrylic acid copolymer (y) and the acid-modified copolymer (z) is from 95:5 to 50:50.

<6-3> The tire of <6-1> or <6-2>, wherein a total content of the polyester-based thermoplastic elastomer, the olefin- (meth)acrylic acid copolymer, and the acid-modified copolymer in the thermoplastic resin material is from 50% by mass to 100% by mass.

<6-4> A method of producing a tire, the method comprising:
   a tire frame piece forming step of forming a tire frame piece for constituting a portion of a circular tire frame, using a thermoplastic resin material comprising at least:
      a polyester-based thermoplastic elastomer; and
      at least one copolymer of an olefin-(meth)acrylic acid copolymer or an acid-modified copolymer obtained by acid-modifying an olefin-(meth)acrylate copolymer; and
   a tire frame piece bonding step of forming the tire frame by fusing two or more of the tire frame pieces, which make a pair, by applying heat to bonding sections of the tire frame pieces.

The inventions described below are included in the seventh aspect of the present invention.

<7-1> A tire comprising at least a circular tire frame formed of a resin material, the resin material including a first thermoplastic elastomer having a tensile elastic modulus in the range of from 150 MPa to 700 MPa, and a second thermoplastic elastomer having a loss factor (Tan δ) smaller than that of the first thermoplastic elastomer.

<7-2> The tire of <7-1>, wherein the tensile elastic modulus of the first thermoplastic elastomer is in the range of from 200 MPa to 500 MPa.

<7-3> The tire of <7-1> or <7-2>, wherein the loss factor (Tan δ) of the second thermoplastic elastomer is 0.01 to 0.08.

<7-4> The tire of any one of <7-1> to <7-3>, wherein a mass ratio (x/y) of the first thermoplastic elastomer (x) and the second thermoplastic elastomer (y) is from 10/90 to 90/10.

The disclosures of Japanese Patent Application Nos. 2010-188908, 2010-188906, 2010-188909, 2010-188907, 2010-188905, 2010-203737, 2010-188917, 2011-183582, and 2011-183583 are incorporated herein by reference. All publications, patent applications, and technical standards mentioned in this specification are herein incorporated by reference to the same extent as if each individual publication, patent application, or technical standard was specifically and individually indicated to be incorporated by reference.

The invention claimed is:

1. A tire comprising at least a circular tire frame formed of a thermoplastic resin material,
   the tire including a reinforcing cord member and a tread provided on the circular tire frame in this order, the reinforcing cord member forming a reinforcing cord layer on an outer circumference of the tire frame, the reinforcing cord member being a coated reinforcing cord member, the coated reinforcing cord member being coated with a resin material that is physically different from the thermoplastic resin material which forms the tire frame at a cord member, and the resin material for coating being a resin material that does not include a vulcanized rubber, wherein the tread is formed of a rubber, and the cord member does not directly come in contact with the rubber; and
   the thermoplastic resin material including at least a polyester-based thermoplastic elastomer, wherein
   the content ratio of the polyester-based thermoplastic elastomer in the thermoplastic resin material is from 50% by mass to 100% by mass,
   the polyester-based thermoplastic elastomer is a copolymer having a hard segment including an aromatic polyester and a soft segment including at least one selected from the group consisting of an aliphatic polyether and an aliphatic polyester,
   the resin material for coating the reinforcing cord member is the same kind as the thermoplastic resin material that forms the tire frame, and
   the tire is physically different from a rim and the tire frame includes a bead portion.

2. The tire according to claim 1, wherein the reinforcing cord layer includes only a layer having the coated reinforcing cord member that is wound around an outer circumference.

3. The tire according to claim 1, wherein the tire frame includes only a layer that is formed with the thermoplastic resin material.

4. A tire comprising at least a circular tire frame formed of a thermoplastic resin material,
   the tire including a reinforcing cord member and a tread provided on the circular tire frame in this order, the reinforcing cord member forming a reinforcing cord layer on an outer circumference of the tire frame, the reinforcing cord member being a coated reinforcing cord member, the coated reinforcing cord member being coated with a resin material that is physically different from the thermoplastic resin material which forms the tire frame at a cord member, and the resin material for coating being a resin material that does not include a vulcanized rubber, wherein the tread is formed of a rubber, and the cord member does not directly come in contact with the rubber; and
   the thermoplastic resin material comprising at least a polyester-based thermoplastic elastomer and an elastomer other than the polyester-based thermoplastic elastomer, wherein
   the total content ratio of the polyester-based thermoplastic elastomer and the elastomer other than the polyester-based thermoplastic elastomer in the thermoplastic resin material is from 50% by mass to 100% by mass with respect to the total amount of the thermoplastic resin material;
   the polyester-based thermoplastic elastomer is a copolymer having a hard segment including an aromatic polyester and a soft segment including at least one selected from the group consisting of an aliphatic polyether and an aliphatic polyester;
   the resin material for coating the reinforcing cord member is the same kind as the thermoplastic resin material that forms the tire frame; and
   the tire is physically different from a rim and the tire frame includes a bead portion.

5. The tire according to claim 4, wherein the total content ratio of the polyester-based thermoplastic elastomer and the other elastomer in the thermoplastic resin material is 50 mass % or more with respect to the total amount of the thermoplastic resin material.

6. A tire comprising at least a circular tire frame formed of a thermoplastic resin material,
   the tire including a reinforcing cord member and a tread provided on the circular tire frame in this order, the reinforcing cord member forming a reinforcing cord layer on an outer circumference of the tire frame, the reinforcing cord member being a coated reinforcing cord member, the coated reinforcing cord member being coated with a resin material that is physically different from the thermoplastic resin material which forms the tire frame at a cord member, and the resin material for coating being a resin material that does not include a vulcanized rubber, wherein the tread is formed of a rubber, and the cord member does not directly come in contact with the rubber; and the thermoplastic resin material including at least a polyester-based thermoplastic elastomer and a rubber, wherein the total content ratio of the polyester-based thermoplastic elastomer and the rubber in the thermoplastic resin material is from 50% by mass to 100% by mass with respect to the total amount of the thermoplastic resin material;

the polyester-based thermoplastic elastomer is a copolymer having a hard segment including an aromatic polyester and a soft segment including at least one selected from the group consisting of an aliphatic polyether and an aliphatic polyester;

the resin material for coating the reinforcing cord member is the same kind as the thermoplastic resin material that forms the tire frame; and the tire is physically different from a rim and the tire frame includes a bead portion.

7. The tire according to claim 6, wherein the total content of the polyester-based thermoplastic elastomer and the rubber in the thermoplastic resin material is from 50 mass% to 100 mass % with respect to the total amount of the thermoplastic resin material.

\* \* \* \* \*